(12) United States Patent
    Atarius et al.

(10) Patent No.: US 10,965,479 B2
(45) Date of Patent: Mar. 30, 2021

(54) BEARER MODIFICATION FOR V2X COMMUNICATIONS

(71) Applicant: Comcast Cable Communications, LLC, Philadelphia, PA (US)

(72) Inventors: Roozbeh Atarius, Herndon, VA (US); Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/472,801

(22) Filed: Mar. 29, 2017

(65) Prior Publication Data
    US 2017/0288886 A1    Oct. 5, 2017

Related U.S. Application Data

(60) Provisional application No. 62/317,520, filed on Apr. 2, 2016, provisional application No. 62/339,845, filed on May 21, 2016.

(51) Int. Cl.
    *H04L 12/14*    (2006.01)
    *H04L 12/813*    (2013.01)
    (Continued)

(52) U.S. Cl.
    CPC .......... *H04L 12/1407* (2013.01); *H04L 47/20* (2013.01); *H04L 65/105* (2013.01);
    (Continued)

(58) Field of Classification Search
    CPC ... H04L 12/1407; H04L 47/20; H04L 67/125; H04W 28/0263
    See application file for complete search history.

(56) References Cited

U.S. PATENT DOCUMENTS

2010/0098012 A1    4/2010 Bala et al.
2011/0105107 A1    5/2011 Kwon et al.
                   (Continued)

FOREIGN PATENT DOCUMENTS

EP    2763338 A1    8/2014

OTHER PUBLICATIONS

3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

(Continued)

*Primary Examiner* — Kodzovi Acolatse
*Assistant Examiner* — Farhad Ali
(74) *Attorney, Agent, or Firm* — Banner & Witcoff, Ltd.

(57) ABSTRACT

A vehicle to everything application function (V2X AF) transmits a DIAMETER AA-request command to a policy and charging rule function (PCRF). The DIAMETER AA-request command comprises: an attribute value pairs (AVP) identifying a V2X application, and one of more quality of service (QoS) parameters. The one of more quality of service (QoS) parameters indicate a QoS of a V2X bearer for the V2X application employed by a wireless device. The PCRF decides one or more policy and charging control (PCC) provisions for the QoS provided for the V2X application identified by the AVP. The PCRF transmits a DIAMETER command to a policy charging enforcement function (PCEF). The DIAMETER command comprises the one or more PCC provisions for the QoS. The PCEF enforces the one or more PCC provisions for the QoS on a plurality of packets transmitted via the V2X bearer to the wireless device.

39 Claims, 72 Drawing Sheets

(51) Int. Cl.
| | |
|---|---|
| *H04L 29/06* | (2006.01) |
| *H04W 84/00* | (2009.01) |
| *H04W 28/12* | (2009.01) |
| *H04W 28/02* | (2009.01) |
| *H04M 15/00* | (2006.01) |
| *H04L 29/08* | (2006.01) |
| *H04L 12/833* | (2013.01) |

(52) U.S. Cl.
CPC ...... *H04L 65/1006* (2013.01); *H04L 65/1016* (2013.01); *H04L 65/1063* (2013.01); *H04L 65/80* (2013.01); *H04M 15/00* (2013.01); *H04M 15/66* (2013.01); *H04M 15/8016* (2013.01); *H04M 15/8214* (2013.01); *H04W 28/0257* (2013.01); *H04W 28/12* (2013.01); *H04W 84/005* (2013.01); *H04L 47/2458* (2013.01); *H04L 67/125* (2013.01)

(56) References Cited

U.S. PATENT DOCUMENTS

| | | | |
|---|---|---|---|
| 2011/0249578 A1 | 10/2011 | Nayeb Nazar et al. | |
| 2013/0028229 A1 | 1/2013 | Suh et al. | |
| 2013/0058233 A1 | 3/2013 | Kim | |
| 2013/0121297 A1 | 5/2013 | Kim et al. | |
| 2013/0301509 A1 | 11/2013 | Pumadi et al. | |
| 2014/0016593 A1 | 1/2014 | Park et al. | |
| 2014/0241319 A1 | 8/2014 | Lee et al. | |
| 2014/0344472 A1* | 11/2014 | Lovsen .................. H04L 47/72 709/232 |
| 2015/0043429 A1 | 2/2015 | Kim et al. | |
| 2015/0181576 A1 | 6/2015 | Papasakellariou et al. | |
| 2015/0365831 A1 | 12/2015 | Ko et al. | |
| 2015/0365963 A1 | 12/2015 | Won et al. | |
| 2016/0100353 A1* | 4/2016 | Gleixner ............... H04W 48/16 370/329 |
| 2016/0204905 A1 | 7/2016 | Lee et al. | |
| 2016/0227486 A1 | 8/2016 | Park | |
| 2016/0227602 A1 | 8/2016 | Yi et al. | |
| 2016/0295624 A1* | 10/2016 | Novlan ................. H04W 76/14 |
| 2017/0019887 A1 | 1/2017 | Jiang et al. | |
| 2017/0245245 A1 | 8/2017 | Kim et al. | |
| 2017/0325076 A1 | 11/2017 | Fujishiro et al. | |
| 2017/0347270 A1 | 11/2017 | Iouchi et al. | |
| 2017/0366679 A1* | 12/2017 | Mohamed ............. H04M 15/43 |
| 2017/0374665 A1 | 12/2017 | Lee et al. | |
| 2018/0007680 A1 | 1/2018 | Lee et al. | |
| 2018/0007693 A1 | 1/2018 | Lee et al. | |
| 2018/0027461 A1 | 1/2018 | Jia et al. | |
| 2018/0035276 A1 | 2/2018 | Kang et al. | |
| 2018/0035340 A1 | 2/2018 | Fujishiro et al. | |
| 2018/0049225 A1 | 2/2018 | Lee et al. | |
| 2018/0124707 A1 | 5/2018 | Lee et al. | |
| 2018/0159935 A1 | 6/2018 | Cavalcanti et al. | |
| 2018/0192268 A1 | 7/2018 | Xu et al. | |
| 2018/0206089 A1 | 7/2018 | Cavalcanti et al. | |
| 2018/0255569 A1 | 9/2018 | Aiba et al. | |
| 2019/0014563 A1 | 1/2019 | Lee et al. | |
| 2019/0098698 A1 | 3/2019 | Fukuta | |
| 2019/0182644 A1 | 6/2019 | Zheng et al. | |
| 2019/0245657 A1 | 8/2019 | Lee et al. | |

OTHER PUBLICATIONS

R2-162236; 3GPP TSG-RAN WG2 Meeting #93bis; Apr. 11-15, 2016, Dubrovnik, Croatia; Agenda Item: 8.8.2; Souce: Samsung; Title:Discussion on acknowledging SPS command.

R2-162264; 3GPP TSG-RAN WG2 Meeting #93b; Dubrovnik, Croatia, Apr. 11-15, 2016; Source: Huawei, HiSilicon; Title: On UL grants skipping.

R2-162265; 3GPP TSG-RAN WG2 Meeting #93bis; Dubrovnik, Croatia, Apr. 11-15, 2016; Agenda Item 8.8.2; Source: Huawei, HiSilicon; Title: Implicit SPS release under UL grants skipping.

R2-162266; 3GPP TSG-RAN WG2 Meeting #93b; Dubrovnik, Croatia, Apr. 11-15, 2016; Agenda item: 8.8.2; Source: Huawei, HiSilicon; Title: Necessity of feedback for SPS activation and deactivation.

R2-162415; 3GPP TSG-RAN WG2 Meeting #93bis; Dubrovnik, Croatia, Apr. 11-15, 2016; Agenda Item: 8.8.1; Source: CMCC; Title: Remaining issues related to UL SPS.

R2-162466; 3GPP TSG-RAN2 Meeting #93bis; Dubrovnik, Croatia Apr. 11-15, 2016; Agenda item: 8.8.1; Source: Intel Corporation; Title: Further aspects of short SPS interval.

R2-162467; 3GPP TSG-RAN2 Meeting #93bis; Dubrovnik, Croatia Apr. 11-15, 2016; Agenda item:8.8.2;Source: Intel Corporation; Title: Further aspects of UL grant skipping.

R2-162468; 3GPP TSG-RAN2 Meeting #93bis; Dubrovnik, Croatia Apr. 11-15, 2016; Agenda item: 8.8.3; Source: Intel Corporation; Title: SPS activation, reactivation and deactivation feedback.

R2-162515; 3GPP TSG RAN WG2 Meeting #93bis; Dubrovnik, Croatia, Apr. 11-15, 2016; Source:CATT; Title: Feedback for SPS PDCCH command.

R2-162572; 3GPP TSG-RAN WG2 Meeting #93bis; Dubrovnik, Croatia, Apr. 11-15, 2016; Source: ZTE Corporation; Title: Discussion on the feedback of the SPS activation command.

R2-162601; 3GPP TSG-RAN2 Meeting #93bis; Republika Hrvatska, Dubrovnik, Apr. 11-15, 2016; Agenda Item:8.8.2—LTE Rel-14: WI: L2 latency reduction techniques; Source: ASUSTeK;Title:Discussion on skipping UL grants.

R2-162781; 3GPP TSG-RAN WG2 #93bis; Dubrovnik, Croatia, Apr. 11-15, 2016; Agenda Item: 8.8.3; Source: Ericsson; Title: Acknowledgements for SPS commands.

R2-162901; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: Need for feedback of SPS command.

R2-162902; 3GPP TSG-RAN WG2 Meeting #93bis; Dubrovnik, Croatia, Apr. 11-15, 2016; Agenda Item: 8.8.2 (LTE_LATRED_L2-Core); Source: LG Electronics Inc.; Title: SPS feedback transmission.

R2-162909; 3GPP TSG-RAN2 Meeting #93bis; Dubrovnik, Croatia, Apr. 12-16, 2016; Agenda item: 8.8.2;Source: Qualcomm Incorporated; Title: Open issues for skipping UL grants.

R2-163385; 3GPP TSG-RAN2 Meeting #94; Nanjing, China, May 23-27, 2016; Agenda item: 8.8.1; Source: FiberHome; Title: UL SPS command feedback.

R2-163386; 3GPP TSG-RAN WG2 Meeting #94; Nanjing, China, May 23-27, 2016; Agenda Item: 8.8.2; Souce: FiberHome; Title: discussion of retransmission for short SPS period.

R2-163475; 3GPP TSG-RAN WG2 Meeting #94; Nanjing, China, May 23-27, 2016; Source: CATT; Title: Feedback for SPS activation and deactivation.

R2-163671; 3GPP TSG-RAN WG2 Meeting #94; May 23-27, 2016, Nanjing, China; Agenda Item: 8.8.1; Source: Samsung; Title: Feedback for SPS activation/deactivation.

R2-163698; 3GPP TSG-RAN WG2 Meeting #94; Nanjing, China, May 23-27, 2016; Agenda item: 8.8.1; Source: Nokia, Alcatel-Lucent Shanghai Bell; Title: Feedback for SPS activation/deactivation.

R2-163771; 3GPP TSG-RAN WG2 Meeting #94; Nanjing, China, May 23-27, 2016; Agenda Item: 8.8.2; Source: Fujitsu; Title: Considerations on the SPS resource efficiency.

R2-163781; 3GPP TSG-RAN WG2 #94; Nanjing, China, May 23-27, 2016; Agenda Item: 8.8.1; Source: Ericsson; Title: Acknowledgements for SPS commands.

R2-163916; 3GPP TSG-RAN WG2 Meeting #94; Nanjing, China, May 23-27, 2016; Agenda item: 8.8.1; Source: Huawei, HiSilicon; Title: Discussion on feedback for SPS activation and deactivation.

R2-163917; 3GPP TSG-RAN WG2 Meeting #94; Nanjing, China, May 23-27, 2016; Agenda Item: 8.8.2; Source: Huawei, HiSilicon; Title: Implicit SPS release under UL grants skipping.

R2-164207; 3GPP TSG-RAN WG2 Meeting #94; Nanjing, China, May 23-27, 2016; Agenda Item: 8.8.1 (LTE_LATRED_L2-Core); Source: LG Electronics Inc.; Title: SPS feedback for SPS release.

(56) References Cited

OTHER PUBLICATIONS

R2-164217; 3GPP TSG-RAN WG2 Meeting #94; Nanjing, China, May 23-27, 2016; Agenda Item: 8.8.1 (LTE_LATRED_L2-Core); Source: LG Electronics Inc.; Title: Need of feedback for SPS activation.
R2-165266; 3GPP TSG-RAN2 Meeting #95; Goteborg, Sweden, Aug. 22-26, 2016; Source: ZTE Corporation; Title: Discussion on the configurable feedback.
R2-165267; 3GPP TSG-RAN2 Meeting #95; Goteborg, Sweden, Aug. 22-26, 2016; Source: ZTE Corporation; Title: Discussion on the feedback transmission of SPS release.
R2-165354; 3GPP TSG-RAN WG2 #95; Gothenburg, Sweden, May 22-26, 2016; Agenda Item: 8.8; Source: Ericsson; Title: Remaining issues with SPS with skip padding and short periods.
R2-165663; 3GPP TSG-RAN WG2 Meeting #95; Gothenburg, Sweden, Aug. 22-26, 2016; Agenda Item: 8.8 (LTE_LATRED_L2-Core); Source: LG Electronics Inc.; Title: Remaining issues on SPS Confirmation MAC CE.
R2-165686; 3GPP TSG-RAN2 Meeting #95; Gothenburg, Sweden, Aug. 22-26, 2016; Agenda item: 8.8; Source: Qualcomm Incorporated; Title: Remaining Open Issues for Uplink Skipping.
3GPP TS 36.423 V14.0.0 (Sep. 2016); Technical Specification; 3rd Generation Partnership Project; Technical Specification Group Radio Access Network; Evolved Universal Ten-estrial Radio Access Network (E-UTRAN); X2 application protocol (X2AP) (Release 14).
R2-167409; 3GPP TSG RAN WG2 Meeting #96; Reno, USA, Nov. 14-18, 2016; 3GPP TSG RAN WG1 Meeting #86bis; R1-1610929; Lisboa, Portugal, Oct. 10-14, 2016; Title: LS response on DFN offset.
R2-167481; 3GPP TSG-RAN2 Meeting #96; Reno, USA, Nov. 14-18, 2016; Agenda Item: 8.13.2; Source: OPPO; Title: Discussion on Remain Issues of V2X SPS Enhancements.
R2-167482; 3GPP TSG-RAN2 Meeting #96; Reno, USA, Nov. 14-18, 2016; Agenda Item: 8.13.3; Source: OPPO; Title: Discussion on V2P.
R2-167567; 3GPP TSG-RAN WG2 #96; Reno, USA, Nov. 14-18, 2016; Agenda item: 8.13.2; Source: Samsung, Intel; Title: Handling Sidelink SPS Configurations.
R2-167889; 3GPP TSG-RAN WG2 Meeting #96; Reno, USA, Nov. 14-18, 2016; Agenda item: 8.13.2; Source: Qualcomm Incorporated; Title: SPS enhancement for V2X.
R2-167890; 3GPP TSG-RAN WG2 Meeting #96; Reno, USA, Nov. 14-18, 2016; Agenda item: 8.13.3; Source: Qualcomm Incorporated; Title: Sensing based resource selection for V2P.
R2-167919; 3GPP TSG RAN WG2 #96; Reno, USA, Nov. 14-18, 2016; Agenda Item: 8.13.3; Souce: Samsung; Title: Discussion about prioritization of P-UEs.
R2-167928; 3GPP TSG RAN WG2 Meeting #96; Reno, USA, Nov. 14-18, 2016; Agenda Item: 8.13.3; Source: Huawei, HiSilicon; Title: Discussion on P2X Sidelink Communication.
R2-167930; 3GPP TSG RAN WG2 Meeting #96; Reno, USA, Nov. 14-18, 2016; Agenda Item: 8.13.2; Source: Huawei, HiSilicon; Title: Discussions on Remaining Issues for SPS.
R2-167934; 3GPP TSG RAN WG2 Meeting #96; Reno, USA, Nov. 14-18, 2016; Agenda Item: 8.13.1; Source: Huawei, HiSilicon; Title: Multi-PLMN operation for Uu-based V2X.
R2-167998; 3GPP TSG RAN WG2 Meeting #96; Reno, USA, Nov. 14-18, 2016; Agenda item: 8.13.2; Source: Potevio; Title: Details of LCP for enhanced SPS configurations.
R2-167999; 3GPP TSG RAN WG2 Meeting #96; Reno, USA,Nov. 14-18, 2016; Source: Potevio; Title: Discussion on SPS configuration related issues.
R2-168043; 3GPP TSG-RAN WG2 #96; Reno, USA, Nov. 14-18, 2016; Agenda item: 8.13.3; Source: Kyocera; Title: Consideration of the P2V transmission scheme.
R2-168045; 3GPP TSG RAN WG2 #96; Reno, USA, Nov. 14-18, 2016; Agenda Item: 8.13.1; Souce: Samsung; Title: Supporting small and variable Service Area in non-overlapped local MBMS service area.
R2-168068; 3GPP TSG-RAN WG2 Meeting #96; Reno, Nevada, USA, Nov. 14-18, 2016; Agenda item: 8.13.3; Source: Samsung; Title: Resource configuration for P2V.
R2-168083; 3GPP TSG RAN WG2 Meeting #96; Reno, USA, Nov. 14-18, 2016; Source: CATT; Title: Discussion on Impact of LCP procedure in V2X SPS resource usage; Agenda Item: 8.13.2.
R2-168084; 3GPP TSG RAN WG2 Meeting #96; Reno, USA, Nov. 14-18, 2016; Source: CATT, ZTE, Potevio; Title: Discussion on V2X SPS.
3GPP TS 22.185 V0.2.0 (Feb. 2016), Technical Specification, 3rd Generation Partnership Project; Technical Specification Group Services and System Aspects; Service requirements for V2X services; Stage 1 (Release 14).
3GPP TS 23.203 V13.7.0 (Mar. 2016), Technical Specification, 3rd Generation Partnership Project; Technical Specification Group Services and System Aspects; Policy and charging control architecture (Release 13).
3GPP TS 23.303 V13.3.0 (Mar. 2016), Technical Specification, 3rd Generation Partnership Project; Technical Specification Group Services and System Aspects; Proximity-based services (ProSe); Stage 2 (Release 13).
3GPP TS 24.334 V13.3.1 (Mar. 2016)Technical Specification, 3rd Generation Partnership Project; Technical Specification Group Core Network and Terminals; Proximity-services (ProSe) User Equipment (UE) to ProSe function protocol aspects; Stage 3, (Release 13).
3GPP TS 29.214 V13.5.0 (Mar. 2016). Technical Specification, 3rd Generation Partnership Project; Technical Specification Group Core Network and Terminals; Policy and Charging Control over Rx reference point, (Release 13).
3GPP TS 36.213 V13.2.0 (Jun. 2016), Technical Specification, 3rd Generation Partnership Project; Technical Specification Group Radio Access Network; Evolved Universal Terrestrial Radio Access (E-UTRA); Physical layer Procedures (Release 13).
3GPP TS 36.300 V13.4.0 (Jun. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource control (RRC); Protocol specification (Release 13).
R1-164878, 3GPP TSG RAN WG1 Meeting #85, Nanjing, China May 23-27, 2016, Source: CMCC, Title: Discussion on SPS configurations.
R1-162122, 3GPP TSG RAN WG1 Meeting #84bis, Busan, Korea, Apr. 11-15, 2016, Agenda Item: 7.3.2.2.2, Source: Huawei, FliSilicon, Title: SPS enhancement for V2V.
R1-162340, 3GPP TSG RAN WG1 Meeting #84 bis, Busan, Korea, Apr. 11-15, 2016, Source: OPPO, Title: Discussion on the SPS configuration.
R1-162413, 3GPP TSG-RAN WG1 Meeting #84bis, Busan, Korea Apr. 11-15, 2016, Source: ZTE, Title: Discussion on V2V SPS resource scheme.
R1-162500, RAN WG1 Meeting #84bis, Busan, Korea, Apr. 11-15, 2016, Source: LG Electronics, Title: Discussions on UL enhancements for V2X.
R1-164421, 3GPP TSG-RAN WG1 #85, May 23-27, 2016, Nanjing, China, Agenda item: 6.2.2.3.1, Source: Qualcomm Incorporated, Title: eNodeB signaling for SPS resource allocation.
R1-164422, 3GPP TSG-RAN WG1 #85, May 23-27, 2016, Nanjing, China, Agenda item: 6.2.2.3.2, Source: Qualcomm Incorporated, Title: UE reporting for eNodeB resource allocation.
R1-164468, 3GPP TSG RAN WG1 Meeting #85, Nanjing, China, May 23-27, 2016, Source: Guangdong OPPO Mobile Telecom, Title: Discussion on the SPS configuration for mode-2.

(56) References Cited

OTHER PUBLICATIONS

R1-164514, 3GPP TSG RAN WG1 Meeting #85, Nanjing, China May 23-27, 2016, Source: LG Electronics, Title: Discussion on details of (E)PDCCH used for sidelink SPS.
R1-164515, 3GPP TSG RAN WG1 Meeting #85, Nanjing, China, May 23-27, 2016, Agenda item: 6.2.2.3.2, Source: LG Electronics, Title: Discussion on details of UE reporting.
R1-164538, 3GPP TSG RAN WG1 Meeting #85, Nanjing, China, May 23-27, 2016, Source: LG Electronics, Title: Discussion on UL SPS for V2X.
R1-164762, 3GPP TSG RAN WG1 Meeting #85, Nanjing, May 23-27, 2016, Agenda Item: 6.2.2.3.1, Source: Samsung, Title: Multiple SPS configuration support for SL.
R1-164763, 3GPP TSG RAN WG1 Meeting #85, Nanjing, May 23-27, 2016, Agenda Item: 6.2.2.3.2, Source: Samsung, Title: UE reporting procedure for SL SPS transmissions.
R1-164818, 3GPP TSG RAN WG1 Meeting #85, Nanjing, China, May 23-27, 2016, Agenda Item: 6.2.2.3, Source: Huawei, HiSilicon, Title: SPS enhancement for V2V.
R1-164906, 3GPP TSG RAN WG1 Meeting #85, Nanjing, China May 23-27, 2016, Source: Panasonic, Title: Signaling design to support SPS activation/release in V2V.
R1-164963, 3GPP TSG-RAN WG1 Meeting #85, Nanjing, China May 23-27, 2016, Source: ZTE, Title: Trigger and release of V2V SPS resources.
R1-164964, 3GPP TSG RAN WG1 Meeting #85, Nanjing, China May 23-27, 2016, Agenda item: 6.2.2.3.2, Source: ZTE, Title: Discussion on UE reporting.
R1-165193, 3GPP TSG RAN WG1 Meeting #85, Nanjing, China May 23-27, 2016, Source: NTTDocomo, Inc., Title: (E)PDCCH for sidelink SPS configuration switching.
R1-165194, 3GPP TSG RAN WG1 Meeting #85, Nanjing, China May 23-27, 2016, Source: NTT Docomo, Inc., Title: UE reporting for sidelink SPS operation.
R1-165246, 3GPP TSG RAN WG1 Meeting #85, Nanjing, PRC, May 23-27, 2016, Source: Ericsson, Title: Contents of Downlink Control Information for V2V over PCS.
R1-165272, 3GPP TSG RAN WG1 Meeting #85, Nanjing, PRC, May 23-27, 2016, Source: Ericsson, Title: Mode-1 SPS for V2V over PCS.
R1-165274, 3GPP TSG RAN WG1 Meeting #85, Nanjing, May 23-27, 2016, Source: Ericsson, Title: UL SPS and reporting to eNB for V2X.
R1-165309, 3GPP TSG RAN WG1 Meeting #85, Nanjing, China May 23-27, 2016, Source: Panasonic, Title: Details on PCS SPS enhancement.
R2-162197, 3GPP TSG-RAN2 Meeting #93bis, Dubrovnik, Croatia, Apr. 11-15, 2016, Agenda Item: 8.2.1, Source: OPPO, Title: Discussion on SPS Enhancements for V2V.
R2-162454, 3GPP TSG RAN WG2 Meeting #93bis, Dubrovnik, Croatia, Apr. 11-15, 2016, Agenda item: 8.2.1, Source: Intel Corporation, Title: SL resource allocation in SPS manner.
R2-162927, 3GPP TSG-RAN2 Meeting #93bis, Dubrovnik, Croatia, Apr. 11-15, 2016, Agenda item: 8.2.1, Source: LG Electronics Inc., Title: SL SPS enhancement for V2V.
R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.
R2-163421, 3GPP TSG RAN WG2 Meeting #94, Nanjing, China, May 23-25, 2016, Source: CATT, Title: Consideration on SPS Enhancement.
R2-163451, 3GPP TSG RAN WG2 Meeting #94, Nanjing, China, Apr. 23-25, 2016, Agenda Item: 8.2.4, Source: Samsung, Title: UE reporting and dynamic SL SPS transmission.
R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.

R2-163812, 3GPP TSG-RAN WG2 #94, Nanjing, China, May 23-27, 2016, Agenda Item: 8.2.4, Source: Huawei, HiSilicon, Title: Enhancements for Sidelink Resource Allocation.
R2-163840, 3GPP TSG RAN WG2 #94, Nanjing, China, May 23-27, 2016, Source: ZTE, Title: SPS enhancements for V2X over Uu.
R2-163865, 3GPP TSG RAN WG2 Meeting #94, Nanjing, China, May 23-25, 2016, Source: ITL, Title: SLSPS for V2V.
R2-163885, 3GPP TSG RAN WG2 Meeting #94, Nanjing, China, May 23-27, 2016, Source: Potevio, Title: UE assisted information for SPS.
R2-163900, 3GPP TSG-RAN WG2 Meeting #94, Nanjing, China, May 23-27, 2016, Agenda item: 8.11.1, Source: Nokia, Alcatel-Lucent Shanghai Bell, Title: Multiple inter-dependent UL SPS occasions.
R2-164063, 3GPP TSG-RAN WG2 Meeting #94, Nanjing, China, May 23-27, 2016, Agenda item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda item: 8.2.4, Source: LG Electronics Inc. Title: Support of Semi-Persistent Scheduling for PCS mode 1.
R2-164082, 3GPP TSG-RAN2 Meeting #94, Nanjing, China, Apr. 11-15, 2016, Agenda item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda item: 8.11.1, Source: Huawei, HiSilicon, Title: TP on CAM Characteristics.
Tdoc R2-161571, 3GPP TSG-RAN WG2 #93, St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.
3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.0.0 (Sep. 2016); Technical Specification; 3rd Generation Partnership Project; Technical Specification Group Radio Access Network; Evolved Universal Ten-estrial Radio Access (E-UTRA); Multiplexing and channel coding (Release 14).
3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).
R2-168085; 3GPP TSG-RAN WG2 Meeting #96; Reno, USA, Nov. 14-18, 2016; Source: CATT; Title: Consideration on pool management and resource selection.
R2-168137; 3GPP TSG-RAN WG2 #96; Reno, USA, Nov. 14-18, 2016; Agenda Item: 8.13.2; Source: ZTE; Title: Discussion on SPS related issues.
R2-168139; 3GPP TSG-RAN WG2 Meeting #96; Reno, USA, Nov. 14-18, 2016; Title: MBMS enhancement for Uu based V2X communication; Source: ZTE Corporation.
R2-168144; 3GPP TSG-RAN WG2 Meeting #96; Reno, USA, Nov. 14-18, 2016; Title: Discussion on V2P aspects; Source: ZTE.
R2-168273; 3GPP TSG-RAN WG2 Meeting #96; Reno, USA, Nov. 14-18, 2016; Agenda Item: 8.13.3; Source: Coolpad; Title: Discussion on power saving for PCS-based V2P.
R2-168409; 3GPP TSG-RAN WG2 #96; Reno, USA, Aug. 14-18, 2016; Agenda Item: 8.13.2; Source: LG Electronics Inc.; Title: SPS and UE assistant information for V2X.

(56) References Cited

OTHER PUBLICATIONS

R2-168410; 3GPP TSG-RAN WG2 #96; Reno, USA, Nov. 14-18, 2016; Agenda Item : 8.13.3; Source: LG Electronics Inc.; Title: Support for V2P service.
R2-168426; 3GPP TSG-RAN WG2 Meeting #96; Reno, USA, Nov. 14-18, 2016; Agenda item: 8.13.3; Source: Nokia, Alcatel-Lucent Shanghai Bell; Title: Efficient V2P/P2V activation.
R2-168427; 3GPP TSG-RAN WG2 Meeting #96; Reno, USA, Nov. 14-18, 2016; Agenda item: 8.13.2; Source: Nokia, Alcatel-Lucent Shanghai Bell; Title: Further discussion on SPS enhancements.
R2-168486; 3GPP TSG-RAN WG2 #96; Reno, Nevada, USA, Nov. 14-18, 2016; Agenda Item: 9.3.1.1.3; Source: Ericsson; Title: Consideration on mobility for URLLC and eV2x.
R2-168642; 3GPP TSG-RAN WG2 #96; Reno, Nevada, USA, Nov. 14-18, 2016; Agenda Item: 8.13.3; Source: Ericsson; Title: Discussion on Sidelink Operations for Pedestrian.
R2-168653; 3GPP TSG-RAN WG2 #96; Reno, Nevada, USA, Nov. 14-18, 2016; Agenda Item: 8.13.2; Source: Ericsson; Title: SPS Protocol for Uu.
R2-168701; 3GPP TSG-RAN WG2 #96; Reno, Nevada, USA, Nov. 14-18, 2016; Agenda Item: 8.13.2; Source: Ericsson, Interdigital, Qualcomm; Title: Configuration of UE Assistance Information.
R2-168702; 3GPP TSG-RAN WG2 #96; Reno, Nevada, USA, Nov. 14-18, 2016; Agenda Item: 8.13.2; Source: Ericsson, Interdigital, ITL; Title:vSidelink SPS Configuration.
R2-168789; 3GPP TSG RAN WG2 Meeting #96; Reno, NV, USA, Nov. 14-18, 2016; Title: DRAFT LS reply on Voice and Video enhancement for LTE.
International Search Report dated Jan. 11, 2018 in International Application No. PCT/US2017/045754.
R2-164105, 3GPP TSG-RAN WG2 Meeting #94, Nanjing, China, May 23-27, 2016, Source: Ericsson, Title: Sidelink Resource Allocation in V2X.
R2-163836, 3GPP TSG-RAN WG2 Meeting #94, Nanjing, China, May 23-27, 2016, Source: ZTE, Title: SPS enhancements for V2V over PC5.
3GPP TS 36.213 V11.3.0 (Jul. 2013), Technical Specification, 3rd Generation Partnership Project; Technical Specification LTE; Evolved Universal Terrestrial Radio Access (E-UTRA); (Release 11).
U.S. Appl. No. 15/469,023, Vehicle Wireless Device Discovery, filed Mar. 24, 2017.
U.S. Appl. No. 15/470,165, IMS Registration of a V2X Wireless Device, filed Mar. 27, 2017.
U.S. Appl. No. 15/670,788, Grant Validation in a Wireless Device and Wireless Network, filed Aug. 7, 2017.
U.S. Appl. No. 15/670,857, Deactivation Timer in a Wireless Device and Wireless Network, filed Aug. 7, 2017.
U.S. Appl. No. 15/671,801, Group Power Control for a Secondary Cell, filed Aug. 8, 2017.
U.S. Appl. No. 15/812,246, Semi-Persistent Scheduling Confirmation, filed Nov. 14, 2017.
U.S. Appl. No. 15/816,190, Handover of User Equipment with Multimedia Broadcasting Multicast Services, filed Nov. 17, 2017.

\* cited by examiner

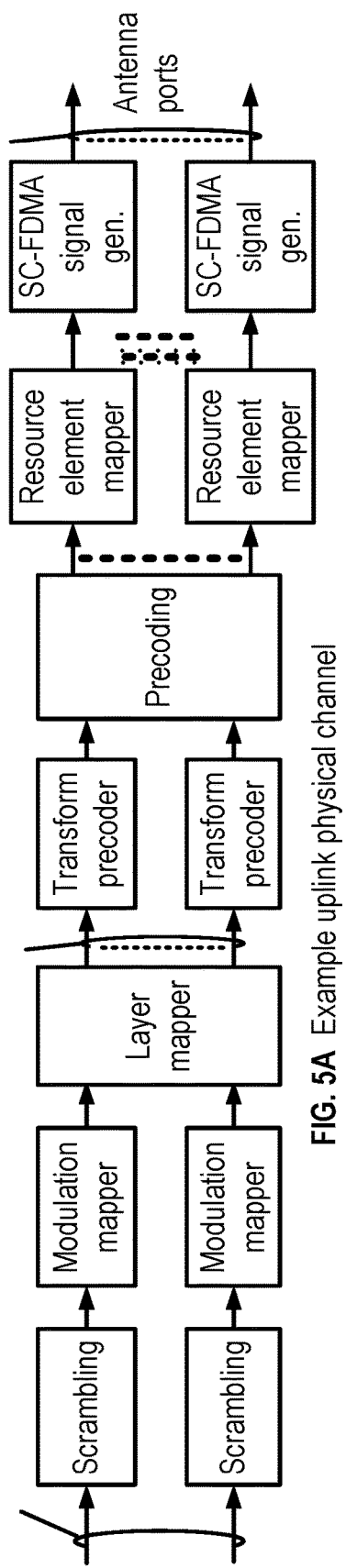
FIG. 5A Example uplink physical channel
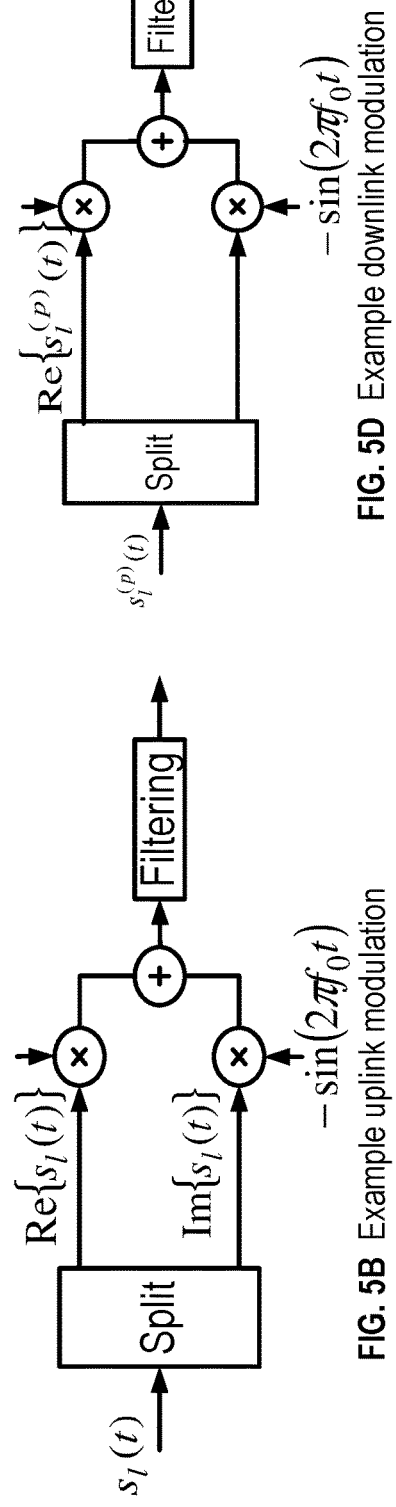
FIG. 5B Example uplink modulation
FIG. 5D Example downlink modulation
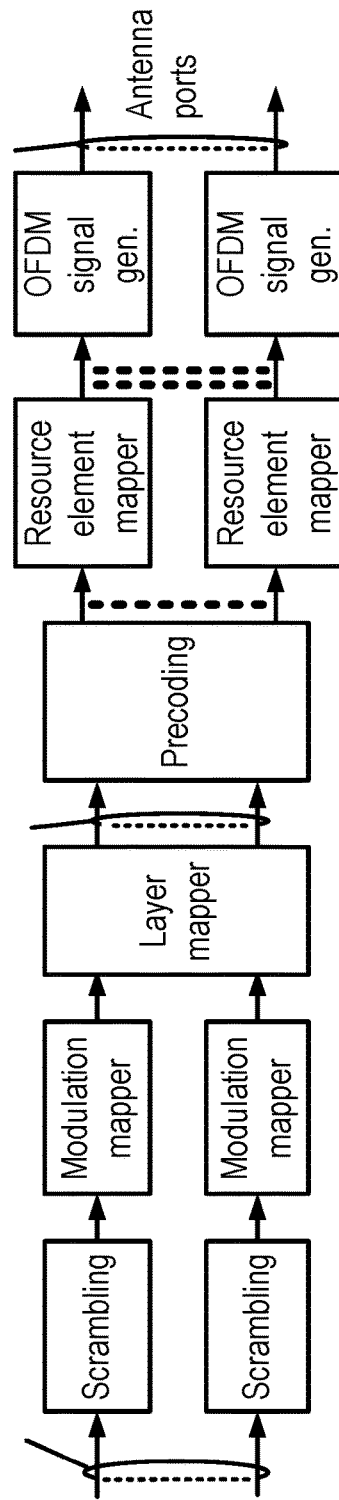
FIG. 5C Example downlink physical channel

E-UTRAN (RSU)

E-UTRAN (RSU)

$$\begin{array}{c}\text{UE 1}\\\text{UE 2}\\\text{UE 3}\\\text{UE 4}\end{array}\overbrace{\begin{bmatrix}1 & 1 & 1 & 1\\1 & 1 & 1 & 1\\1 & 1 & 1 & 1\\1 & 1 & 1 & 1\end{bmatrix}}^{\text{UE 1 UE 2 UE 3 UE 4}}$$

FIG. 36

$$\begin{array}{c} \text{UE 1 UE 2 UE 3 UE 4} \\ \begin{array}{c} \text{UE 1} \\ \text{UE 2} \\ \text{UE 3} \\ \text{UE 4} \end{array} \left( \begin{array}{cccc} 1 & 1 & 0 & 0 \\ 1 & 1 & 1 & 0 \\ 0 & 1 & 1 & 1 \\ 0 & 0 & 1 & 1 \end{array} \right) \end{array}$$

FIG. 38

$$\begin{array}{c} \text{UE 1 UE 2 UE 3 UE 4} \\ \left. \begin{array}{c} \text{UE 1} \\ \text{UE 2} \\ \text{UE 3} \\ \text{UE 4} \end{array} \right. \left\{ \begin{array}{cccc} 1 & 1 & 0 & 0 \uparrow 1 \\ 1 & 1 & 0 & 0 \uparrow 2 \\ 0 & 0 & 1 & 1 \\ 0 & 0 & 1 & 1 \end{array} \right\} \end{array}$$

FIG. 40

$$\begin{matrix} & \begin{matrix} \text{UE 1} & \text{UE 2} & \text{UE 3} & \text{UE 4} \end{matrix} \\ \begin{matrix} \text{UE 1} \\ \text{UE 2} \\ \text{UE 3} \\ \text{UE 4} \end{matrix} & \begin{pmatrix} 1 & 1 & 0 & 0 \\ 1 & 1 & 0 & 0 \\ 0 & 0 & 1 & 0 \\ 0 & 0 & 0 & 1 \end{pmatrix} \end{matrix}$$

FIG. 45

$$\begin{array}{c} \text{UE 1} \\ \text{UE 2} \\ \text{UE 3} \\ \text{UE 4} \end{array} \overbrace{\begin{pmatrix} 1 & 1 & 0 & 0 \\ 0 & 1 & 0 & 0 \\ 0 & 0 & 1 & 0 \\ 0 & 0 & 0 & 1 \end{pmatrix}}^{\text{UE 1 UE 2 UE 3 UE 4}}$$

FIG. 47

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|A|C|E|0 0|   PT=NL=xxx   |             length            |
+-+-+-+-+-+-+-+-+-+-+-+-+-+-+-+-+-+-+-+-+-+-+-+-+-+-+-+-+-+-+-+-+
|                         SSRC of sender                        |
+-+-+-+-+-+-+-+-+-+-+-+-+-+-+-+-+-+-+-+-+-+-+-+-+-+-+-+-+-+-+-+-+
|                           name=NLAP                           |
+-+-+-+-+-+-+-+-+-+-+-+-+-+-+-+-+-+-+-+-+-+-+-+-+-+-+-+-+-+-+-+-+
:                   possible authentication data                :
+-+-+-+-+-+-+-+-+-+-+-+-+-+-+-+-+-+-+-+-+-+-+-+-+-+-+-+-+-+-+-+-+
:                      neighbor ID field                        :
+-+-+-+-+-+-+-+-+-+-+-+-+-+-+-+-+-+-+-+-+-+-+-+-+-+-+-+-+-+-+-+-+
```

FIG. 53

```
    0 1 2 3 4 5 6 7 8
    +-+-+-+-+-+-+-+-+
    | Neighbor ID   |
    | Field Value   | 0
    +-+-+-+-+-+-+-+-+
    | Neighbor ID   |
    | Length Value  | 1
    +-+-+-+-+-+-+-+-+
    | Number of     |
    | segments      | 2
    +-+-+-+-+-+-+-+-+
    | Segment       |
    | Number        | 3
    +-+-+-+-+-+-+-+-+
    |       N       |
    +       E       +
    |       I       | 4
    +       G       +
    |       H       |
    +       B       +
    |       O       |
    :       R       :
    :               :
    :       I       :
    |       D       |
    +       S       + N
    +-+-+-+-+-+-+-+-+
```

FIG. 57

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|A|C|E|0 0|   PT=V2X=xxx  |             length            |
+-+-+-+-+-+-+-+-+-+-+-+-+-+-+-+-+-+-+-+-+-+-+-+-+-+-+-+-+-+-+-+-+
|                         SSRC of sender                        |
+-+-+-+-+-+-+-+-+-+-+-+-+-+-+-+-+-+-+-+-+-+-+-+-+-+-+-+-+-+-+-+-+
|                          name=V2XX                            |
+-+-+-+-+-+-+-+-+-+-+-+-+-+-+-+-+-+-+-+-+-+-+-+-+-+-+-+-+-+-+-+-+
|                   Information element field                   |
:                                                               :
+-+-+-+-+-+-+-+-+-+-+-+-+-+-+-+-+-+-+-+-+-+-+-+-+-+-+-+-+-+-+-+-+
```

FIG. 60

Discover, by a 1st off-network V2X wireless device, a 2nd off-network V2X wireless device employing a ProSe discovery procedure, wherein the 2nd off-network V2X wireless device capable of broadcasting a received V2X message
6710

Receive, by the 1st off-network V2X wireless device, a geographic location of the 2nd off-network wireless device
6720

Construct, by the 1st off-network V2X wireless device, the received V2X message comprising information element(s)
6730

Transmit, based on at least the geographic location, by the 1st off-network V2X wireless device to the 2nd off-network V2Xwireless device, the received V2X message
6740

FIG. 67

Receive, at a 1st computing device from a wireless device, an authorized data bearer modification request comprising a QoS modification, the 1st computing device comprising a V2X application function (AF)
6910

Transmit, from the 1st computing device to a 2nd computing device, a modification bearer message comprising a V2X attribute, the 2nd computing device comprising a PCRF, the modification bearer message configured to cause the 2nd computing device to transmit to a 3rd computing device, an implementation message comprising QoS data bearer modification information, the 3rd computing device comprising a PCEF, the implementation message configured by the 2nd computing device employing at least in part subscription data associated with the wireless device
6920

FIG. 69

Receive, at a 2nd computing device from a 1st computing device, a modification bearer message comprising a V2X attribute, the 2nd computing device comprising a PCRF, the 1st computing device comprising a V2X AF, the modification bearer message generated in response to an authorized data bearer modification request from a wireless device to the 1st computing device, the authorized data bearer modification request comprising a QoS modification
7010

Transmit, from the 2nd computing device to a 3rd computing device, an implementation message comprising QoS data bearer modification information, the 3rd computing device comprising a PCEF, the implementation message configured by the 2nd computing device employing at least in part subscription data associated with the wireless device, the implementation message configured to cause the 3rd computing device to modify the QoS data bearer
7020

BEARER MODIFICATION FOR V2X COMMUNICATIONS

CROSS-REFERENCE TO RELATED APPLICATIONS

This application claims the benefit of U.S. Provisional Application No. 62/317,520, filed Apr. 2, 2016, and U.S. Provisional Application No. 62/339,845, filed May 21, 2016, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 36 is an illustration of an example visibility matrix as per an aspect of an embodiment of the present disclosure.

FIG. 38 is an illustration of an example visibility matrix as per an aspect of an embodiment of the present disclosure.

FIG. 40 is a diagram of a visibility matrix illustrating media distribution and redistribution as per an aspect of an embodiment of the present disclosure.

FIG. 45 is an illustration of an example visibility matrix as per an aspect of an embodiment of the present disclosure.

FIG. 47 is a diagram of a visibility matrix illustrating media distribution and redistribution as per an aspect of an embodiment of the present disclosure.

FIG. 53 is a diagram illustrating an example packet format as per an aspect of an embodiment of the present disclosure.

FIG. 57 is a diagram illustrating an example information element as per an aspect of an embodiment of the present disclosure.

FIG. 60 is a diagram illustrating an example information element as per an aspect of an embodiment of the present disclosure.

FIG. 67 is an example flow diagram as per an aspect of an embodiment of the present disclosure.

FIG. 69 is an example flow diagram as per an aspect of an embodiment of the present disclosure.

FIG. 70 is an example flow diagram as per an aspect of an embodiment of the present disclosure.

DETAILED DESCRIPTION OF EMBODIMENTS

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
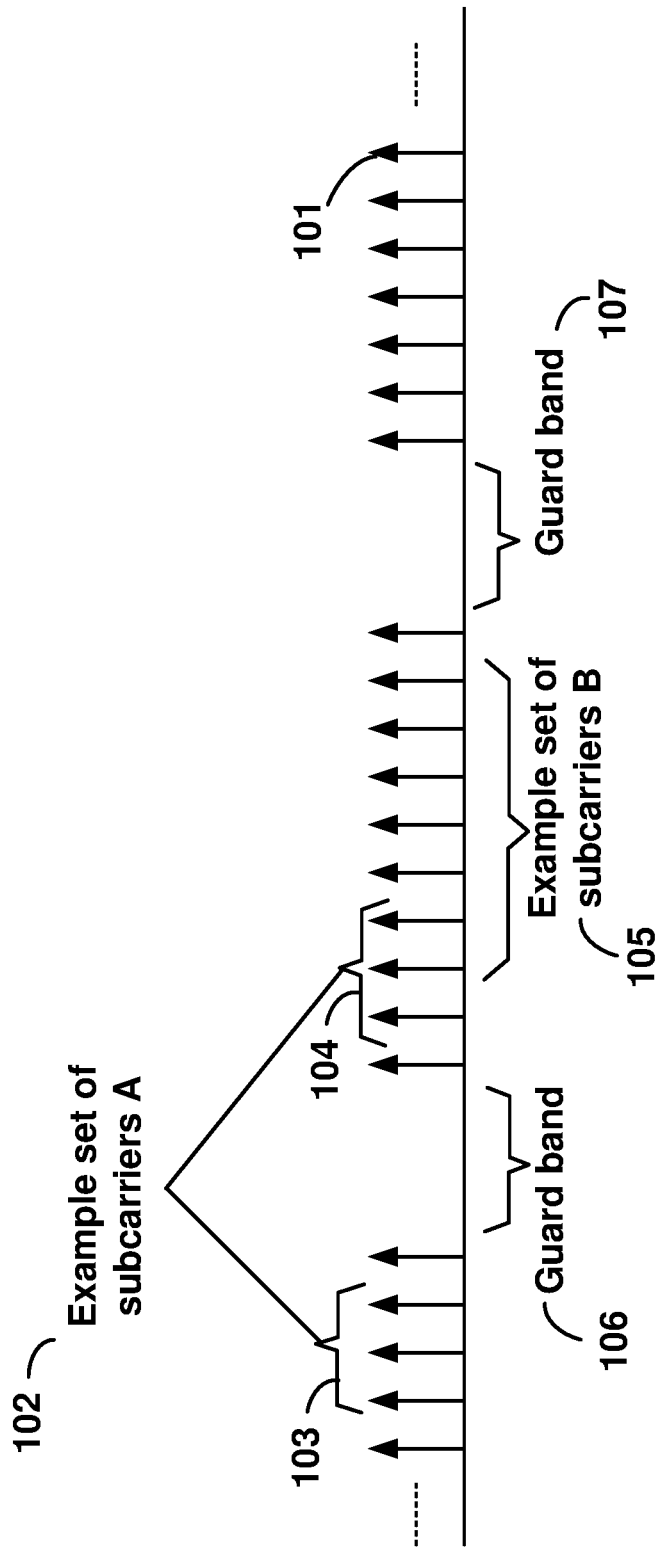
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
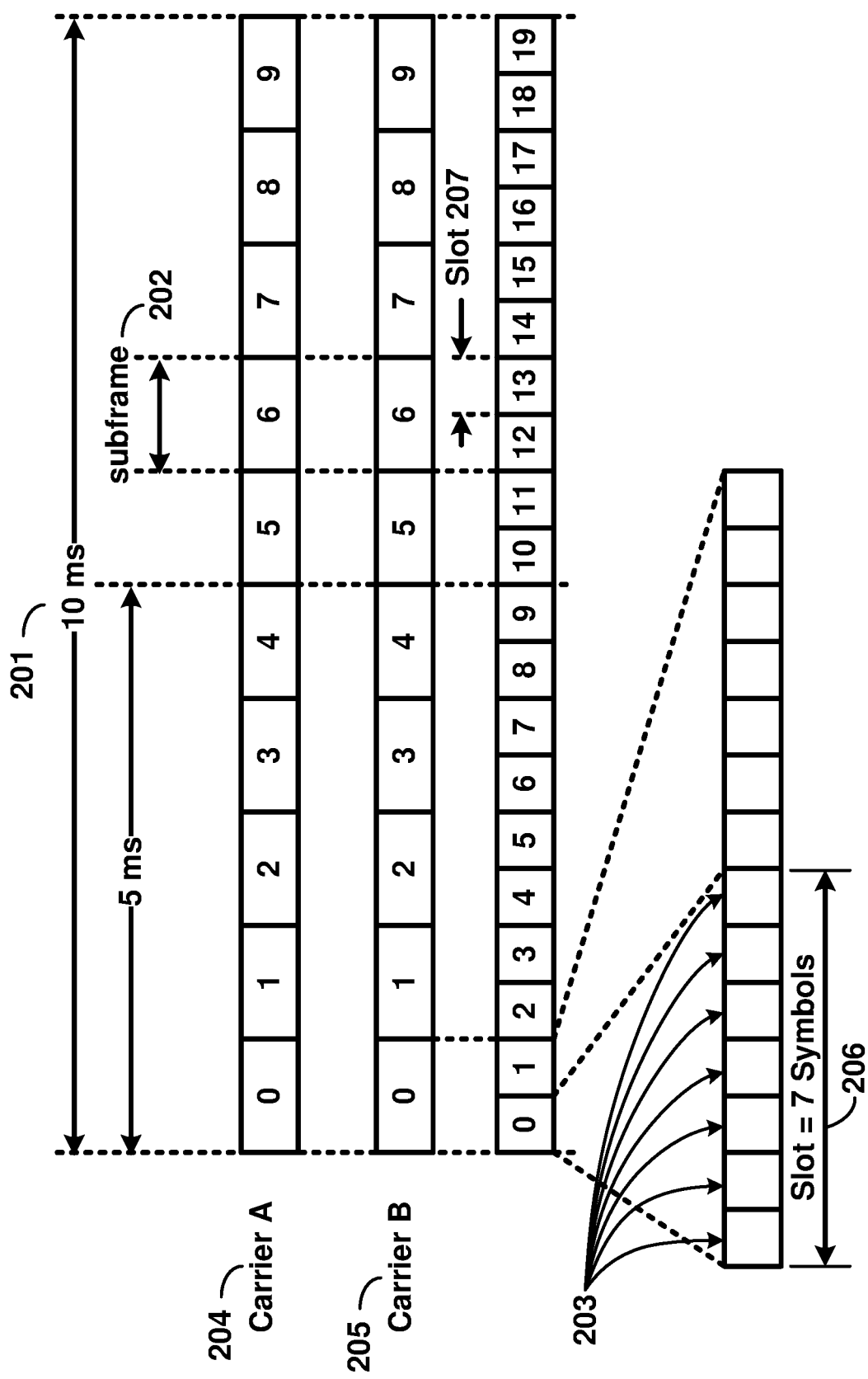
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
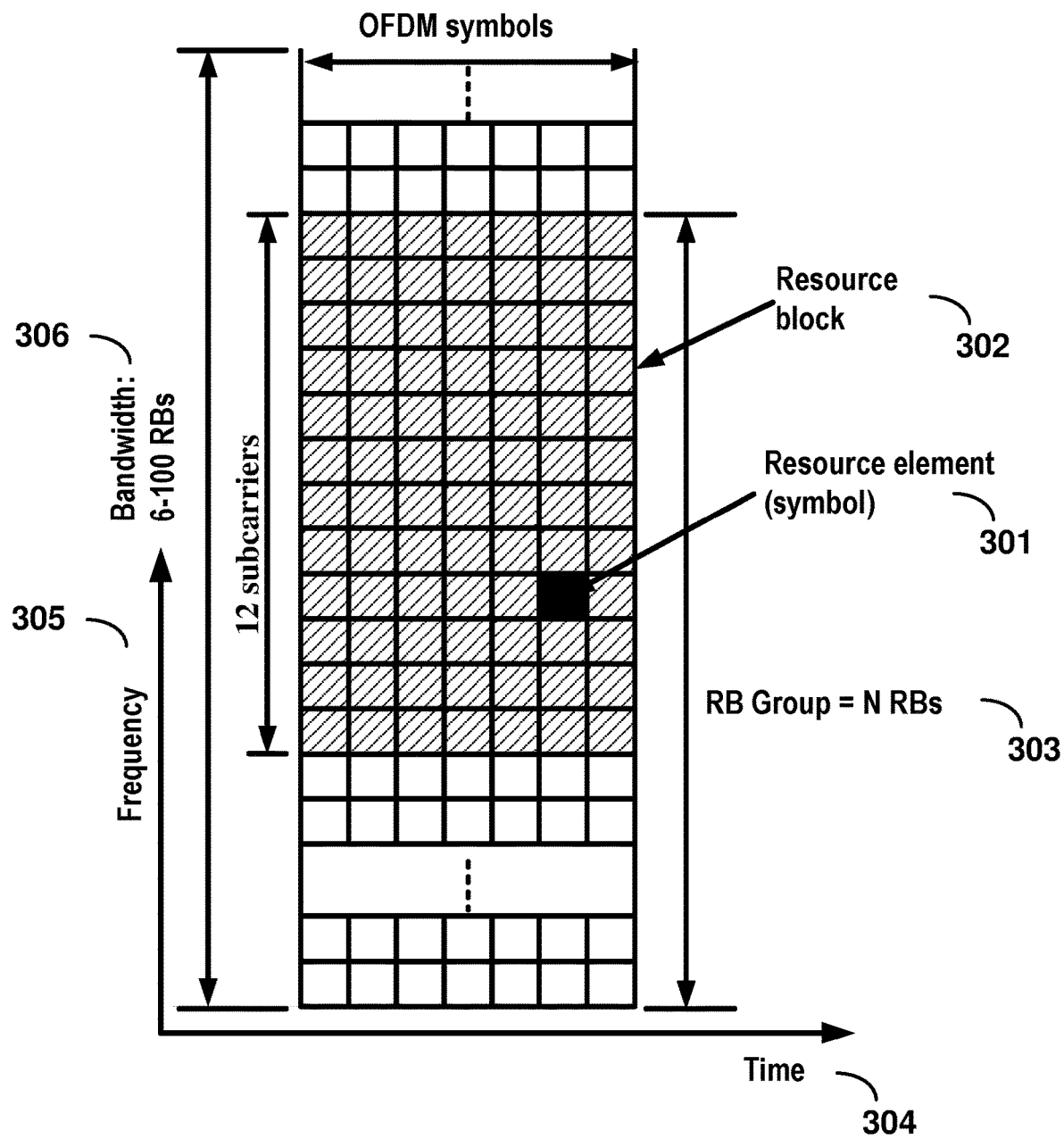
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
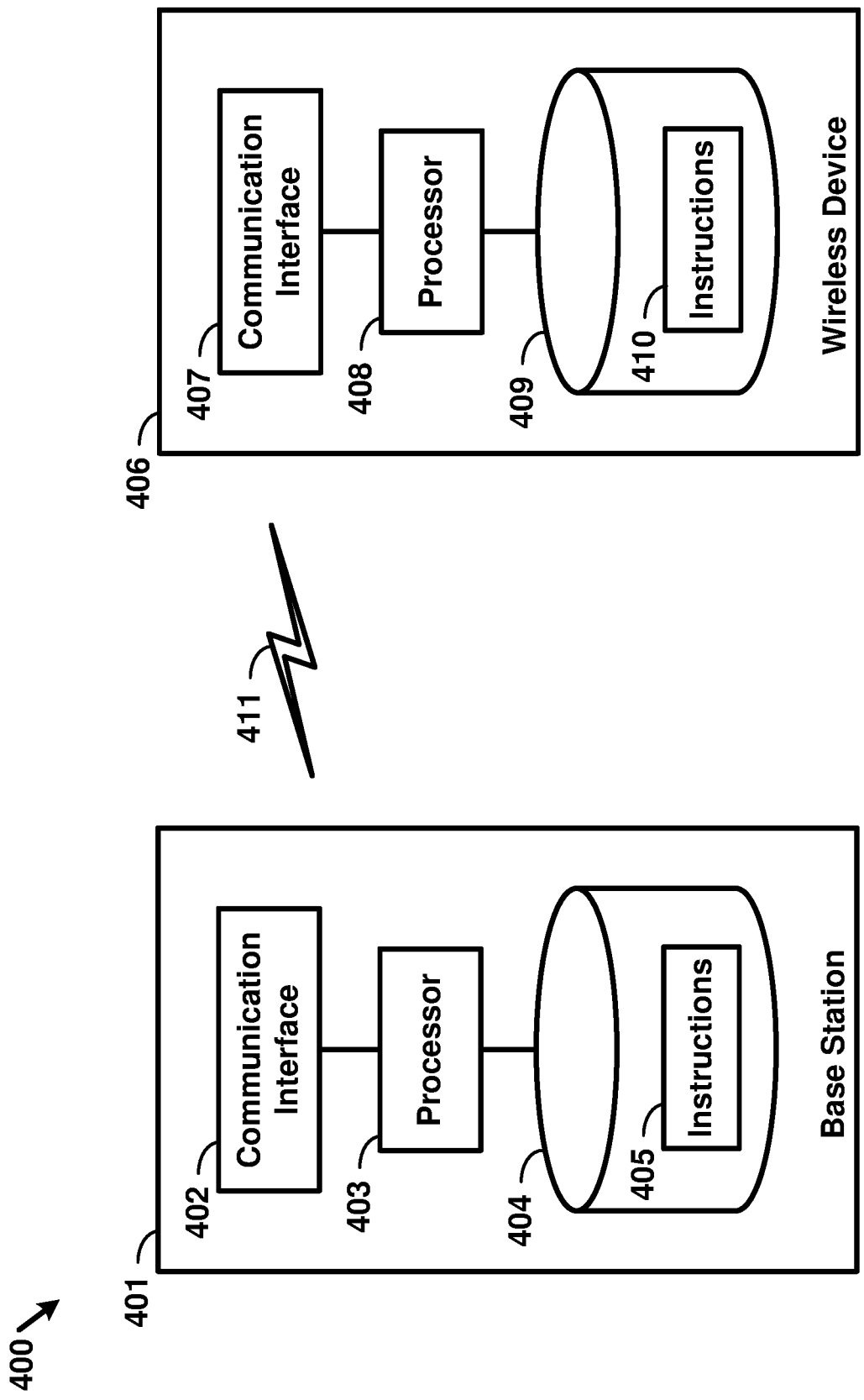
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
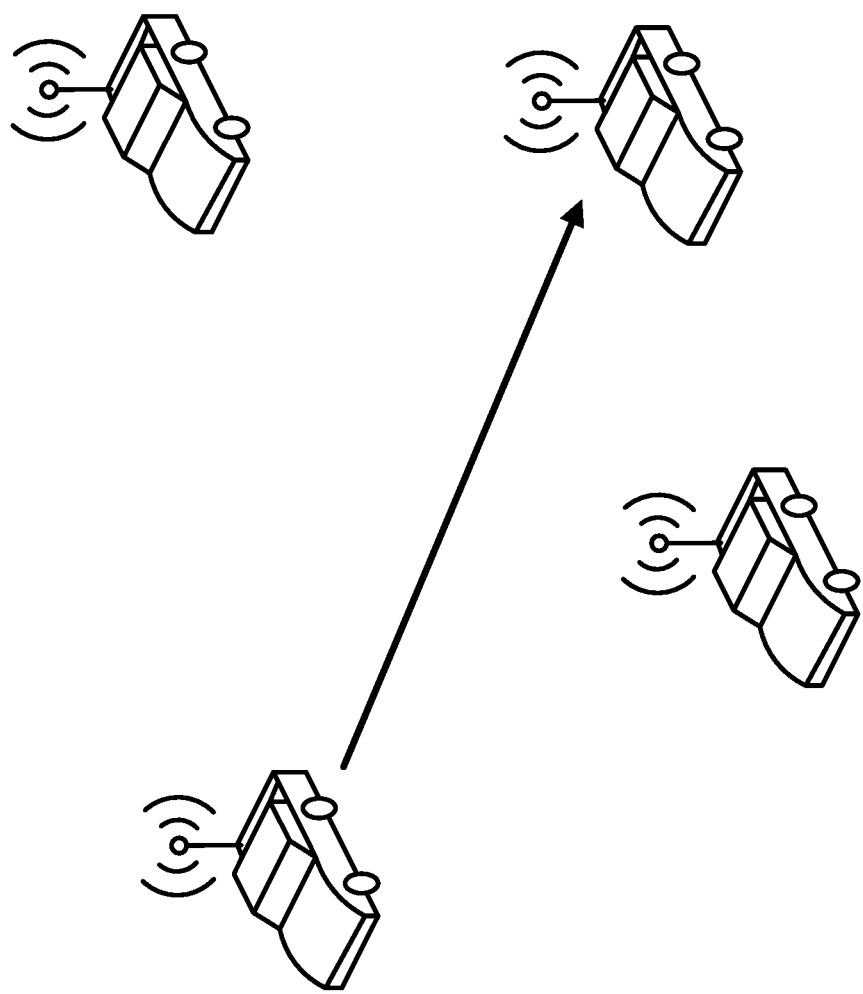
FIG. 6 is an illustration of an example one to one V2X communication as per an aspect of an embodiment of the present disclosure.
Figure 7:
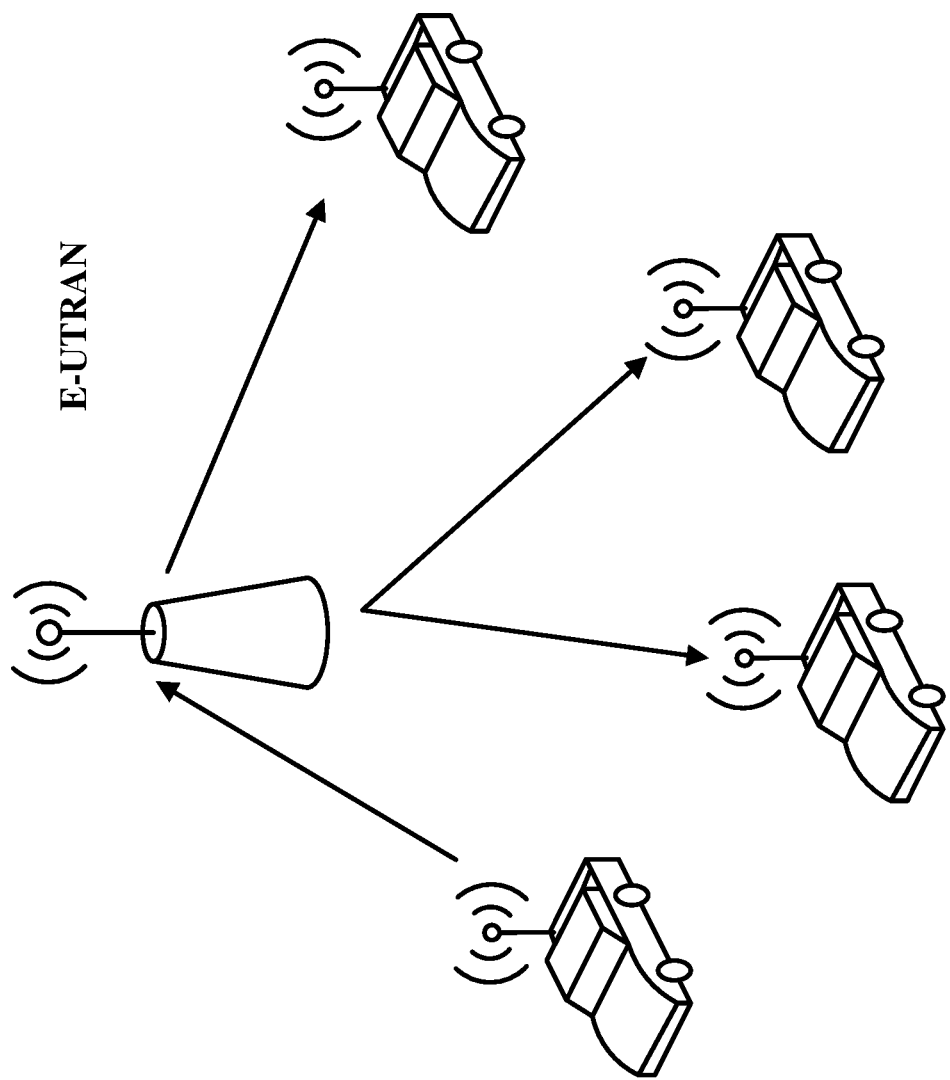
FIG. 7 is an illustration of an example one to many V2X communication as per an aspect of an embodiment of the present disclosure.

LTE based V2X services may comprise V2V or vehicle-to-vehicle direct communication between 2 or more vehicles. In an example embodiment, this communication may be one-to-one. In an example embodiment, this communication may be one-to-many. FIG. 6 shows an example embodiment where the communication is one-to-one. V2V may be via network communication between 2 or more vehicles. In an example embodiment, this communication may be one-to-one. In an example embodiment, this communication may be one-to-many. FIG. 7 shows an example embodiment where the communication is one-to-many.

Figure 8B:
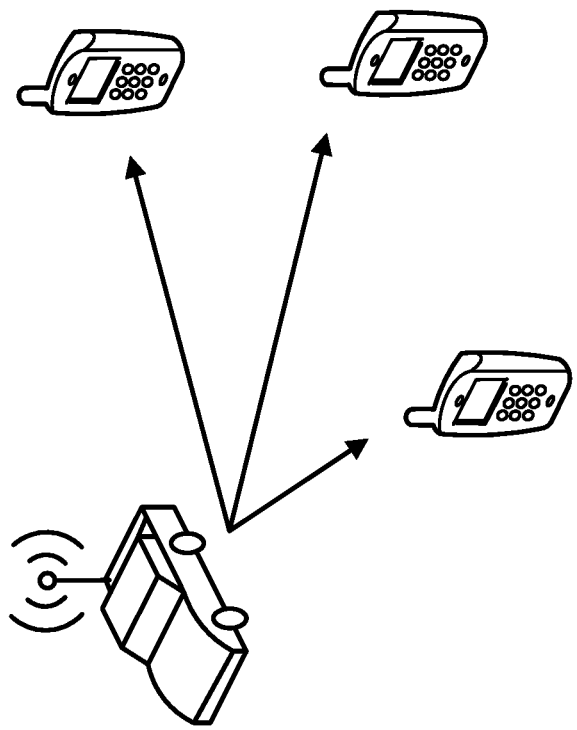
FIG. 8A and FIG. 8B illustrate example V2P communications as per an aspect of an embodiment of the present disclosure.
Figure 8A:
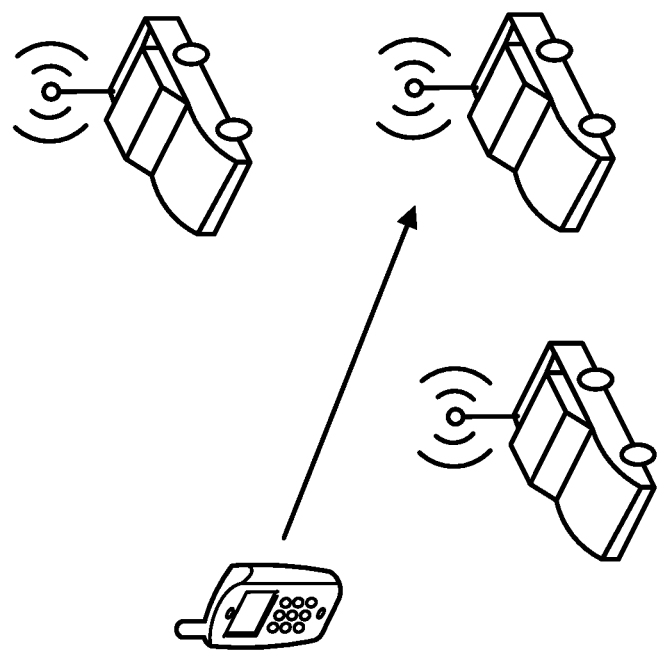
Figure 9B:
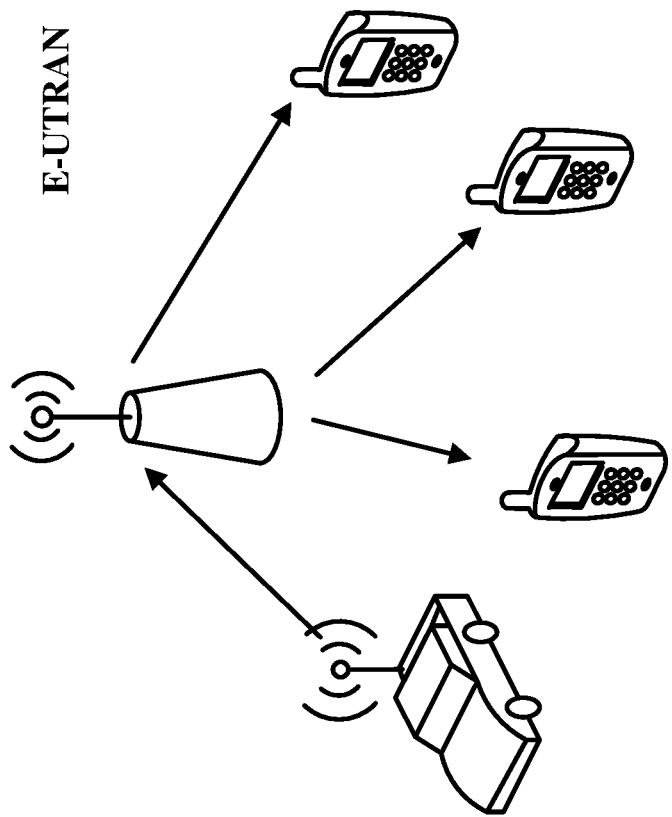
FIG. 9A and FIG. 9B illustrate example V2P communications through a network as per an aspect of an embodiment of the present disclosure.
Figure 9A:
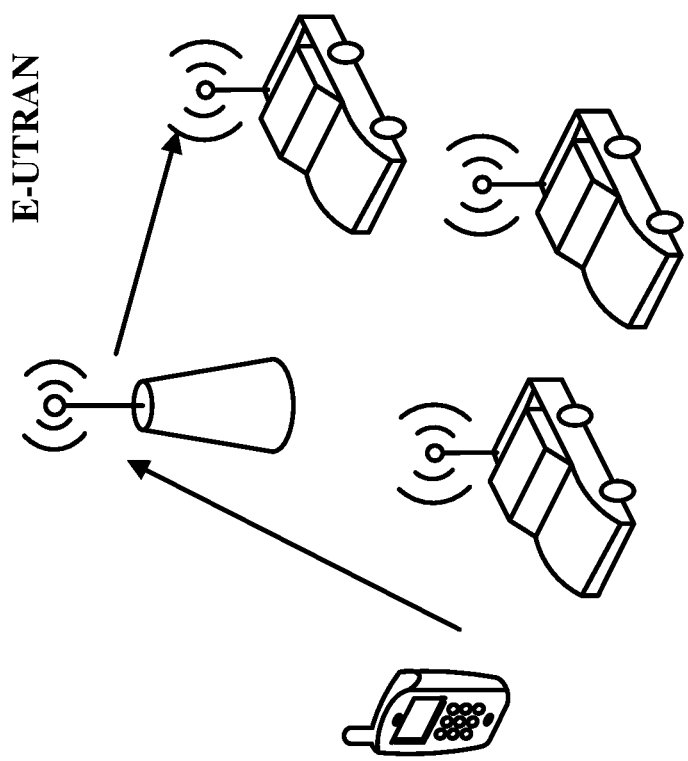

LTE based V2X services may be V2P or vehicle-to-pedestrian direct communications between vehicles and devices of mobile users. In an example embodiment, this communication may be one-to-one as shown in FIG. 8A. In an example embodiment, this communication may be one-to-many as shown in FIG. 8B. V2P may be via network communications between vehicles and devices of mobile users. In an example embodiment, this communication may be one-to-one as shown in FIG. 9A. In an example embodiment, this communication may be one-to-many as shown in FIG. 9B.

Figure 10B:
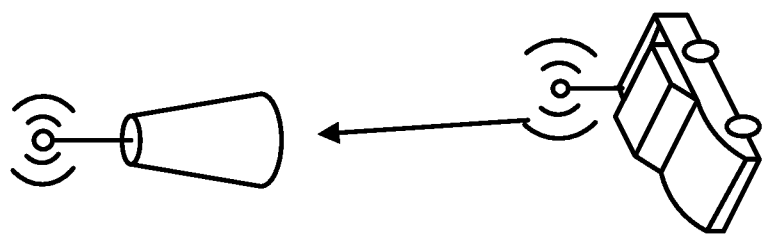
FIG. 10A and FIG. 10B illustrate example V2I communications as per an aspect of an embodiment of the present disclosure.
Figure 10A:
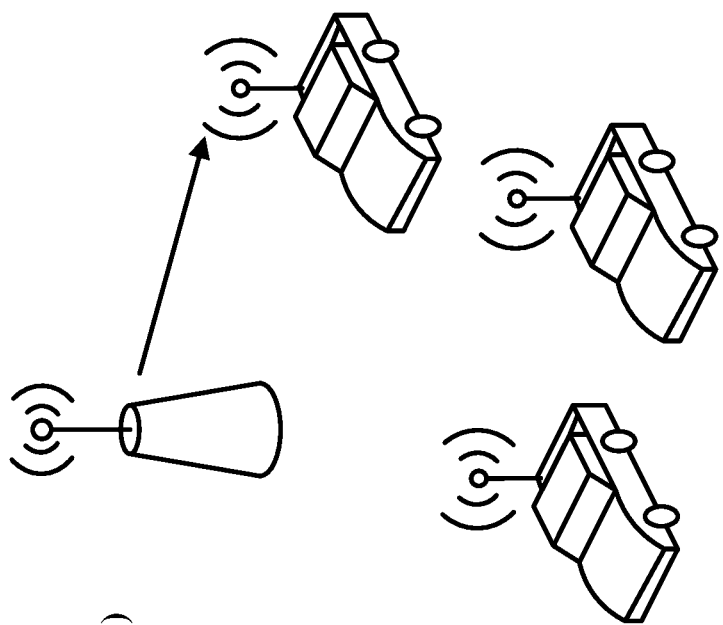
Figure 11B:
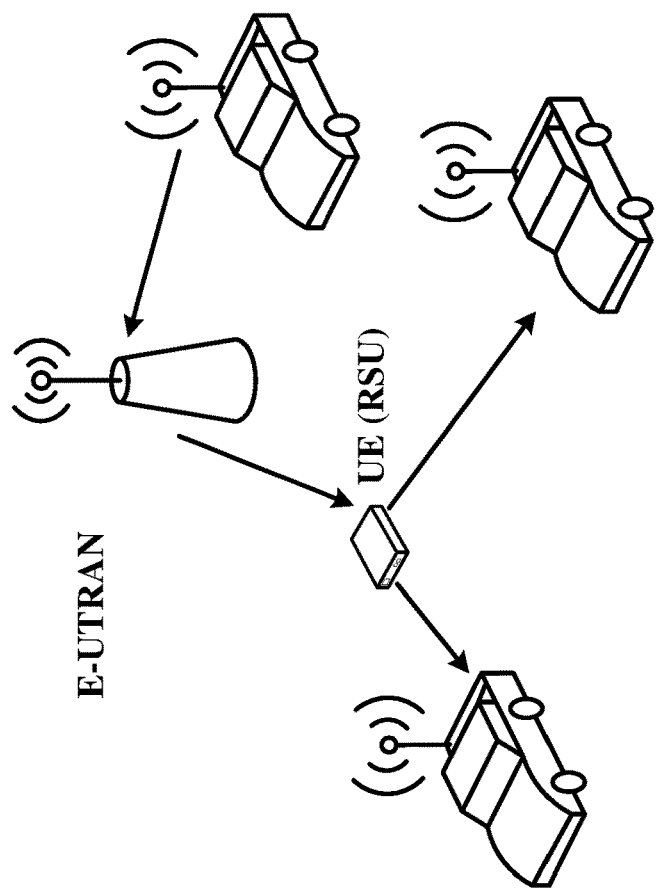
FIG. 11A and FIG. 11B illustrate example V2V communication through an RSU and a network as per an aspect of an embodiment of the present disclosure.
Figure 11A:
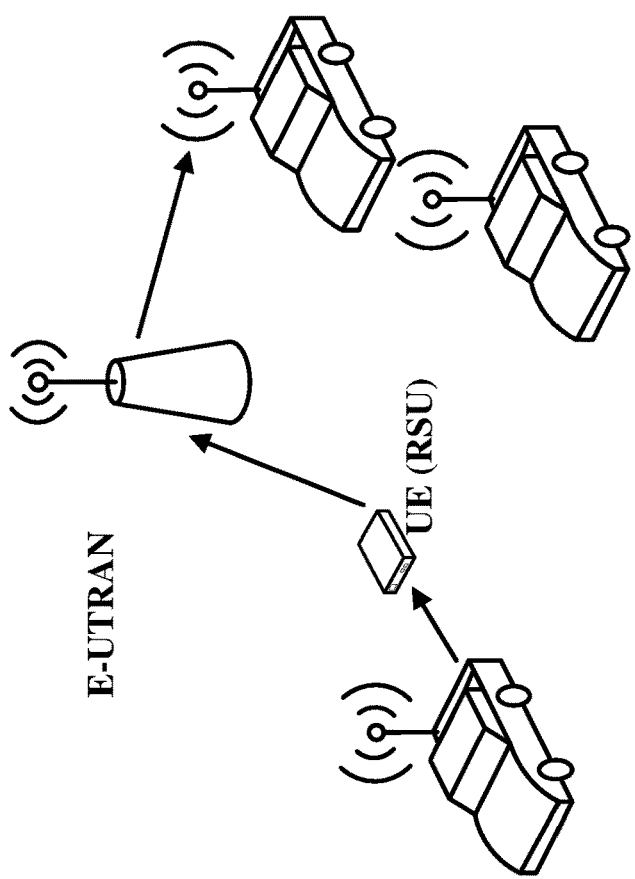

LTE based V2X services may be V2I/N or vehicle-to-infrastructure/network. LTE based communications between vehicles and roadside units (RSUs) or infrastructure. In an example embodiment, RSU may be eNB-type RSU (infrastructure) as shown in FIG. 10. In an example embodiment, communications between the RSU/network and the vehicle may be one-to-one as shown FIG. 10A and FIG. 10B In an example embodiment, the communications between the RSU/network and the vehicle may be one-to-many. In an example embodiment, RSU may be UE-type RSU and relay the UE to the network as shown in FIG. 11. In an example embodiment, communications between the RSU and the vehicle may be one-to-one as shown in FIG. 11A and In an example embodiment, the communications between the RSU and the vehicle may be one-to-many as shown FIG. 11B.

Figure 12B:
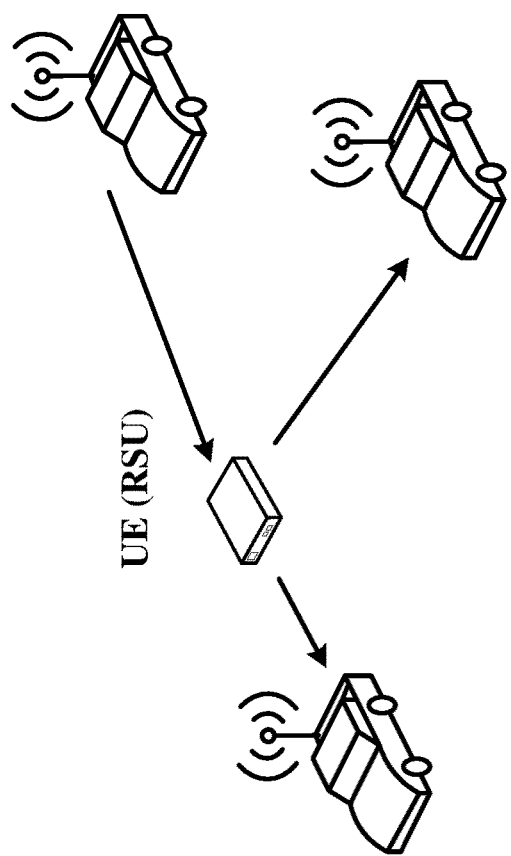
FIG. 12A and FIG. 12B illustrate example V2V communication through an RSU as per an aspect of an embodiment of the present disclosure.
Figure 12A:
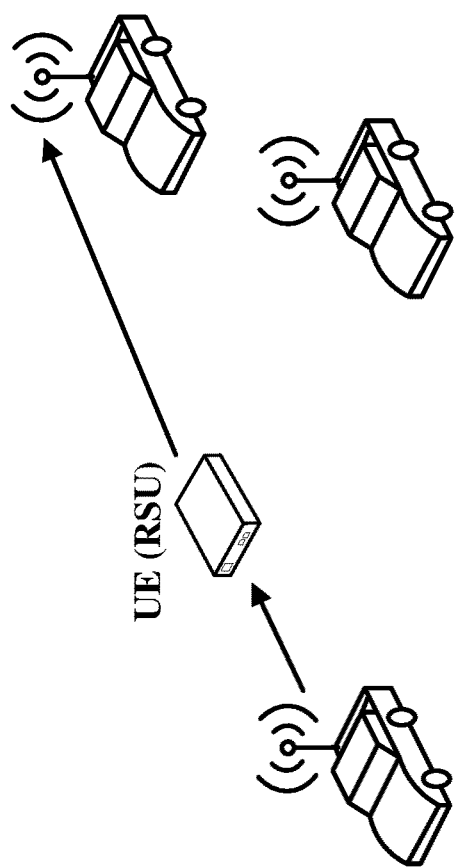

LTE based V2X services may be other combinations, such as V2I/V or vehicle-to-infrastructure/vehicle. In an example embodiment, RSU may be UE-type RSU and relay the vehicle to another vehicle as shown in FIG. 12. In an example embodiment, communications between the RSU and the vehicle may be one-to-one as shown in FIG. 12A. In an example embodiment, the communications between the RSU and the vehicle may be one-to-many as shown FIG. 12B.

Figure 13B:
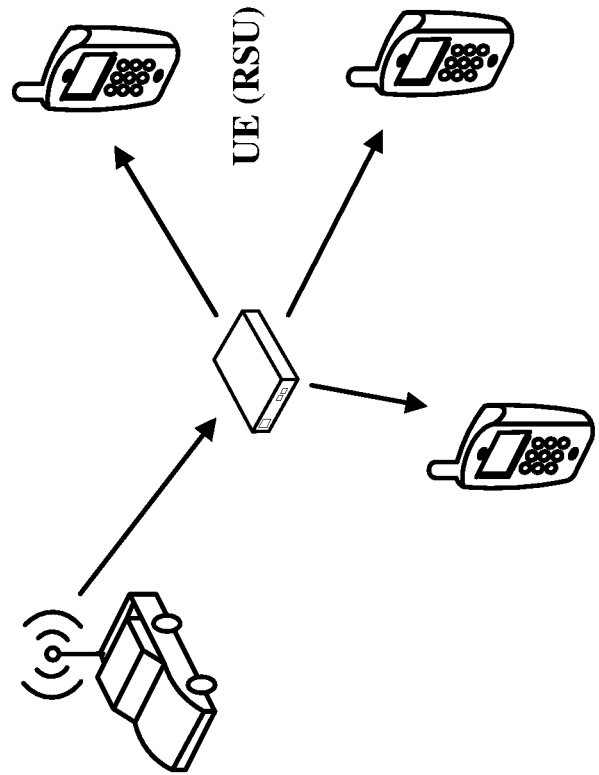
FIG. 13A and FIG. 13B illustrate example V2I/P communication through an RSU as per an aspect of an embodiment of the present disclosure.
Figure 13A:
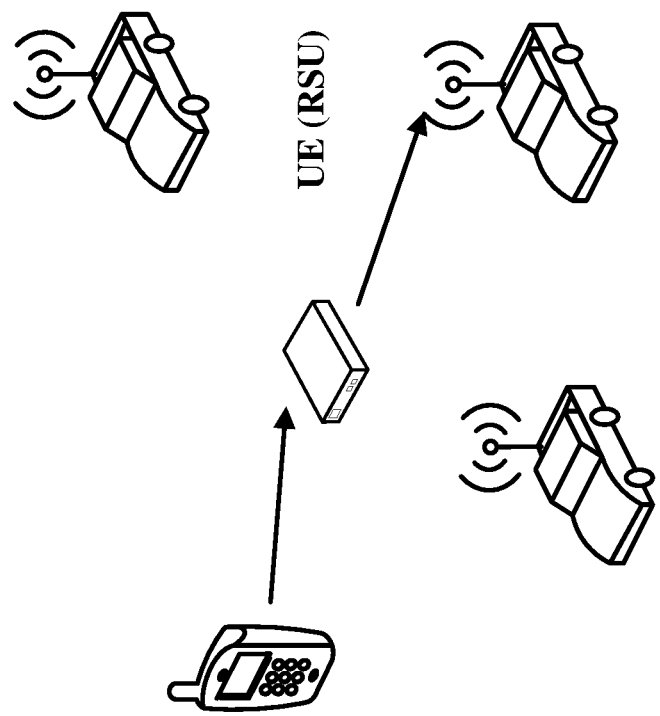

LTE based V2X services may be V2I/P or vehicle-to-infrastructure/pedestrian. In an example embodiment, RSU maybe UE-type RSU and relay the vehicle to pedestrians as shown in the FIG. 13. In an example embodiment, communications between the RSU and the vehicle may be one-to-one as shown in FIG. 13A. In an example embodiment, the communications between the RSU and the vehicle may be one-to-many as shown in FIG. 13B.

Figure 14:
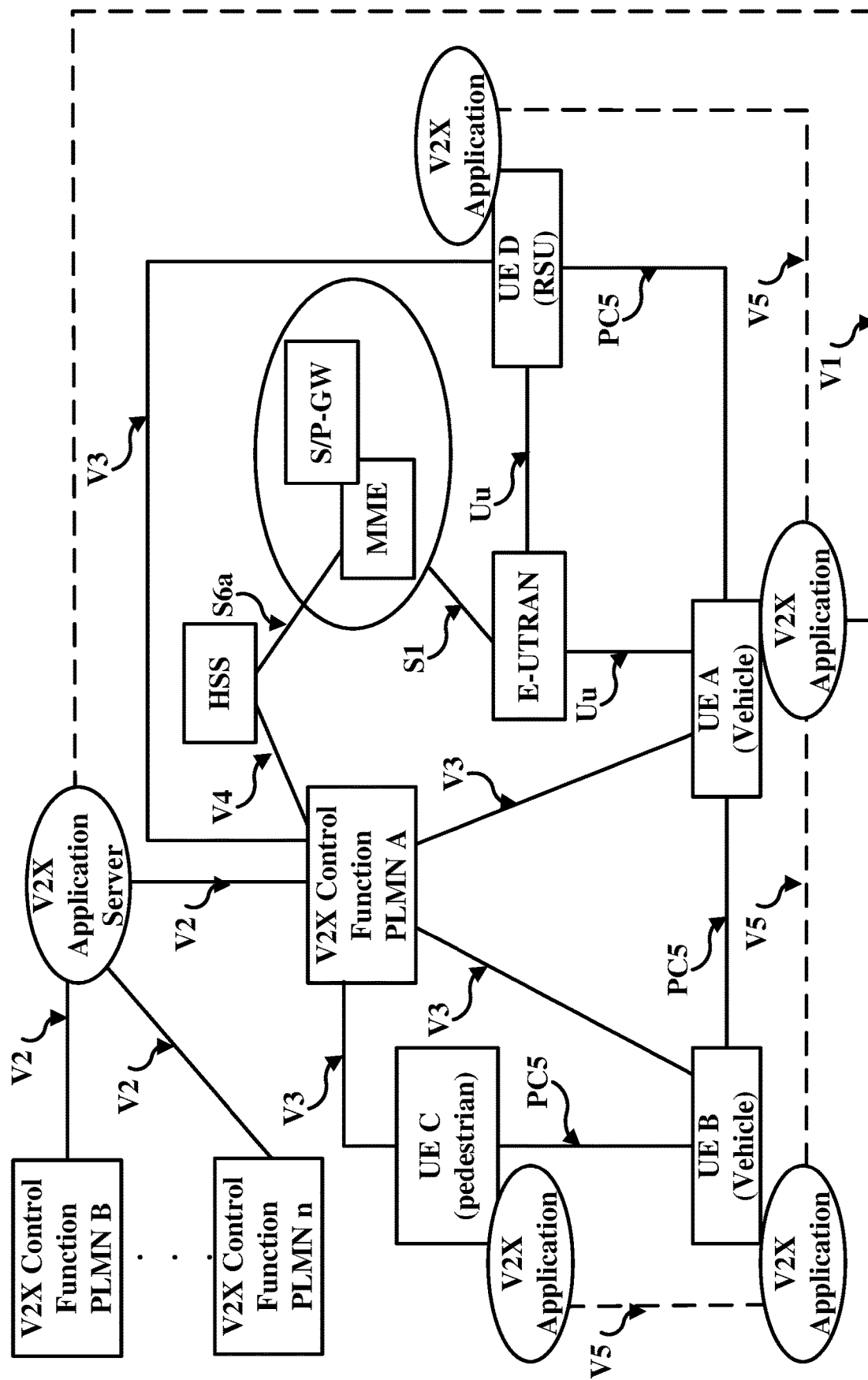
FIG. 14 is a block diagram of a V2X architecture as per an aspect of an embodiment of the present disclosure.

In an example embodiment, the architecture of V2X may be as shown in FIG. 14. In example network diagrams of the specification, some of the interfaces and/or network nodes may be considered optional and not all interfaces and/or nodes may be implemented where, MME=mobility management entity, HSS=home subscriber server, PLMN=public land mobile network, E-UTRAN=evolved universal terrestrial access network, UE=user equipment, S-GW=serving gateway, P-GW=public directory number gateway.

In an example embodiment, user equipment (UE) with the application V2X may be a pedestrian and may get credentials from V2X application server (AS) and V2X control function for discovery procedure on PC5. In an example embodiment, user equipment (UE) with the application V2X may be a vehicle and may get credentials from V2X application server (AS) and V2X control function for discovery procedure on PCF. In an example embodiment, user equipment (UE) with the application V2X may be a RSU and may get credentials from V2X application server (AS) and V2X control function for discovery procedure on PC5.

In an example embodiment, the first UE with the application V2X may communicate with the second UE with the application V2X by means for accessing the V2X control function and V2X AS. In an example embodiment, the first UE with the application V2X may communicate with the second UE with the application V2X by means for using PC5 interface. In an example embodiment, the first UE with the application V2X may communicate with the second UE with the application V2X by means for accessing the V2X control function and V2X AS through a third UE with the application V2X. In an example embodiment, the first UE with the application V2X may communicate with the second UE with the application V2X through the third UE with application V2X by means for first accessing the V2X control function and the V2X AS to access the third UE with the application V2X. In an example embodiment, the first UE with application V2X may communicate with the second UE with the application V2X through the third UE with the application V2X.

In an example embodiment, the UE may register to the LTE network by network attachment to receive services which may require registration. The network attachment may establish default evolved packet systems (EPS) bearer for the UE for the always-on IP connectivity. The policy and charging control (PCC) rules for the default EPS bearer may be pre-defined in the packet data network (PDN) gateway (GW).

In an example embodiment, the UE initiates the network attachment procedure by transmitting a non-access stratum (NAS) attach request message towards the eNodeB. In an example embodiment, NAS attach request message comprises protocol discriminator, security header type, attach request message identity, EPS attach type, NAS key set identifier, EPS mobile identity, UE network capability, EPS session management (ESM) message container for default EPS bearer context activation, tracking area identity, discontinuous transmission by UE (DRX) parameters, mobile station (MS) network capability, location area identification, mobile station classmark, supported codec list, voice domain preferences and UE's usage setting, device properties, MS network feature support, network resource identifier container, general packet radio service (GPRS) timers, extended discontinuous transmission by UE (DRX) parameters and/or the like.

In an example embodiment, an information element of the NAS attach request message may be used by the UE to inform the network about UE's V2X capabilities. The information element of the NAS attach request message may comprise the priority of the UE's V2X capabilities. The high priorities of UE's V2X capabilities may be assigned to law enforcement, medical units, public safety units, etc. In an example embodiment, V2X services may be V2V service, V2P service, V2I service, and/or V2N service. The information element comprising the priorities may apply to all V2X services. The network may utilize the priority indication of the UE's V2X capabilities for resource allocation.

In an example embodiment, the information element for UE network capability may provide the aspects of the UE related to EPS and may indicate UE characteristics. The UE network capability information element comprises indication for e.g. support for encryption algorithms, support for integrity algorithms, location services, positioning services, single radio voice and/or video continuity services, circuit switch fall back services, ProSe, Prose direct discover, ProSe direct communication, and/or V2X services. In an example embodiment, V2X services may be V2V service, V2P service, V2I service, and/or V2N service.

In an example embodiment, the network may employ V2X UE capabilities and/or its V2X priority to provide V2X related services to the UE, the services such as QoS allocation, charging, and policy. An example call flow is shown in the specification.

The network may also provide the UE IP address for multimedia broadcast multicast service gateway (MBMS-GW) for the V2X broadcast service by knowing that the UE is a V2X UE. For example, MME may transmit and/or receive with a network entity message comprising IP addresses (e.g. local broadcast and/or multicast addresses for a local MBMS-GW). The MME and/or other network nodes may employ V2X UE capabilities and/or its V2X priority to determine whether a UE is a V2X UE.

In an example embodiment, the network may use the capability and the priority of the V2I/N UE to broadcast the media to the vehicles or the pedestrians if knowing the UE is capable of V2I functionality of a roadside unit. MME determines whether a UE is capable of one or more V2X services based on V2X UE capabilities and/or its V2X priority. Based on this determination, MME may communicate V2X UE capabilities and/or its V2X priority and/or other related information to a network node to enable broadcast/multicast of V2X related information to the UE.

In an example embodiment, the UE may be attached to the LTE network and may request for an upgrade of the V2X service priority by using NAS bearer resource allocation request message to as a request for an increase of QoS. In an example embodiment, the UE may use NAS bearer resource modification request message to request for a new QoS due to the current priority.

In an example, the embodiment may register one or more capabilities such as for being V2X UE capable in the wireless network at the time of NAS attachment procedure. In an example, the embodiment may register the priority of one or more capabilities such as for being V2X UE capable in the wireless network at the time of NAS attachment procedure. In an example, the embodiment may register one or more capabilities such as for being V2X UE capable in the wireless network at the time of NAS attachment procedure by using NAS attach request message. In an example, the embodiment may register the priority of one or more capabilities such as for being V2X UE capable in the wireless network at the time of NAS attachment procedure by using NAS attach request message. In an example, the embodiment may register one or more capabilities such as for being pedestrian capable V2X UE in the wireless network at the time of NAS attachment procedure by using NAS attach request message. In an example, the embodiment may register the priority of one or more capabilities such as for being pedestrian capable V2X UE in the wireless network at the time of NAS attachment procedure by using NAS attach request message. In an example, the embodiment may register one or more capabilities such as for being pedestrian capable V2X UE in the wireless network at the time of NAS attachment procedure. In an example, the embodiment may register the priority of one or more capabilities such as for being pedestrian capable V2X UE in the wireless network at the time of NAS attachment procedure. In an example, the embodiment may register one or more capabilities such as for being pedestrian capable V2X UE in the wireless network at the time of NAS attachment procedure by using NAS attach request message. In an example, the embodiment may register the priority of one or more capabilities such as for being pedestrian capable V2X UE in the wireless network at the time of NAS attachment procedure by using NAS attach request message. In an example, the embodiment may register the priority of one or more capabilities such as for being vehicle capable V2X UE in the wireless network at the time of NAS attachment procedure. In an example, the embodiment may register one or more capabilities such as for being vehicle capable V2X UE in the wireless network at the time of NAS attachment procedure. In an example, the embodiment may register the priority of one or more capabilities such as for being vehicle capable V2X UE in the wireless network at the time of NAS attachment procedure. In an example, the embodiment may register one or more capabilities such as for being vehicle capable V2X UE in the wireless network at the time of NAS attachment procedure by using NAS attach request message. In an example, the embodiment may register the priority of one or more capabilities such as for being vehicle capable V2X UE in the wireless network at the time of NAS attachment procedure by using NAS attach request message. In an example, the embodiment may register one or more capabilities such as for being infrastructure capable V2X UE in the wireless network at the time of NAS attachment procedure. In an example, the embodiment may register the priority of one or more capabilities such as for being infrastructure capable V2X UE in the wireless network at the time of NAS attachment procedure. In an example, the embodiment may register one or more capabilities such as for being infrastructure capable V2X UE in the wireless network at the time of NAS attachment procedure by using NAS attach request message. In an example, the embodiment may register the priority of one or more capabilities such as for being infrastructure capable V2X UE in the wireless network at the time of NAS attachment procedure by using NAS attach request message. In an example, the embodiment may register one or more capabilities such as for being network capable V2X UE in the wireless network at the time of NAS attachment procedure. In an example, the embodiment may register the priority of one or more capabilities such as for being network capable V2X UE in the wireless network at the time of NAS attachment procedure. In an example, the embodiment may register one or more capabilities such as for being network capable V2X UE in the wireless network at the time of NAS attachment procedure by using NAS attach request message. In an example, the embodiment may register the priority of one or more capabilities such as for being network capable V2X UE in the wireless network at the time of NAS attachment procedure by using NAS attach request message.

In an example embodiment, the network may respond back to the UE by a NAS attach message accept message after the that network attachment had initiated by the UE. The NAS attach accept message comprises protocol discriminator, security header type, attach accept message identity, EPS attach result, spare half octet, general packet radio service (GPRS) timers, tracking area identity (TAI) list, EPS session management (ESM) message container, EPS mobile identity, location area identification, mobile identity, EPS mobility management (EMM) cause, public land mobile network (PLMN) list, emergency number list, EPS network feature support, and/or extended discontinuous transmission by UE (DRX) parameters.

In an example embodiment, an information element of the NAS attach accept message may be used by the network to inform the UE about network's V2X capabilities. The information element of the NAS attach accept message may comprise the priority of the network's V2X capabilities. The high priorities of network's V2X capabilities may be assigned to law enforcement, medical units, public safety units, etc. In an example embodiment, V2X services may be V2V service, V2P service, V2I service, and/or V2N service. The information element comprising the priorities may apply to all V2X services. The UE may utilize the priority indication of the network's V2X capabilities for V2X services requiring different priorities.

In an example embodiment, the information element for EPS network feature support may indicate supported features by the network. In an example embodiment, EPS network feature support comprises indication for e.g. IMS voice over packet switch (IMS VoPS), emergency bearer service, location service, support for extended service request for packet services, and/or V2X services. In an example embodiment, V2X services may be V2V service, V2P service, V2I service, and/or V2N service. In an example embodiment, the network may inform the UE its V2X capabilities and the priorities it is supporting for the V2X service.

The UE may use this information to utilize the V2X service for the warning services related to V2X if the network is V2X capable. The UE may initiate a signaling process for initializing or setting up V2X services if the network supports V2X services. For example, the UE may start processing V2X messages, when the network supports V2X services. For example, the UE may listen to broadcast messages related to V2X when the network supports V2X services. For example, the UE may communicate with a network entity supporting V2X services when the network supports V2X services. Other use cases are described in this specification. For example, the UE may utilize this information to use the V2X services which require high priorities such as emergency and medical services.

In an example embodiment, the UE may be attached to the LTE network and the LTE network may activate a dedicated EPS bearer context by using NAS activate dedicated EPS bearer context request message to establish a certain quality of service (QoS) assigned to the priority of the V2X service for the attached subscriber to the LTE network. In an example embodiment the network may use NAS modify EPS bearer context request message to request the UE modify the current QoS for EPS bearer.

In an example, the embodiment may declare one or more capabilities such as for being V2X network capable at the time of NAS attachment procedure. In an example, the embodiment may declare one or more capabilities such as for being pedestrian capable V2X network at the time of NAS attachment procedure. In an example, the embodiment may declare one or more capabilities such as for being vehicle capable V2X network at the time of NAS attachment procedure. In an example, the embodiment may declare one or more capabilities such as for being infrastructure capable V2X network at the time of NAS attachment procedure. In an example, the embodiment may declare one or more capabilities such as for being network capable V2X network at the time of NAS attachment procedure. In an example, the embodiment may declare one or more capabilities such as for being V2X network capable at the time of NAS attachment procedure by using NAS attach accept message. In an example, the embodiment may declare one or more capabilities such as for being pedestrian capable V2X network at the time of NAS attachment procedure by using NAS attach accept message. In an example, the embodiment may declare one or more capabilities such as for being vehicle capable V2X network at the time of NAS attachment procedure by using NAS attach accept message. In an example, the embodiment may declare one or more capabilities such as for being infrastructure capable V2X network at the time of NAS attachment procedure by using NAS attach accept message. In an example, the embodiment may declare one or more capabilities such as for being network capable V2X network at the time of NAS attachment procedure by using NAS attach accept message. In an example, the embodiment may declare the priority of one or more capabilities such as for being V2X network capable at the time of NAS attachment procedure. In an example, the embodiment may declare the priority of one or more capabilities such as for being pedestrian capable V2X network at the time of NAS attachment procedure. In an example, the embodiment may declare the priority of one or more capabilities such as for being vehicle capable V2X network at the time of NAS attachment procedure. In an example, the embodiment may declare the priority of one or more capabilities such as for being infrastructure capable V2X network at the time of NAS attachment procedure. In an example, the embodiment may declare the priority of one or more capabilities such as for being network capable V2X network at the time of NAS attachment procedure. In an example, the embodiment may declare the priority of one or more capabilities such as for being V2X network capable at the time of NAS attachment procedure by using NAS attach accept message. In an example, the embodiment may declare the priority of one or more capabilities such as for being pedestrian capable V2X network at the time of NAS attachment procedure by using NAS attach accept message. In an example, the embodiment may declare the priority of one or more capabilities such as for being vehicle capable V2X network at the time of NAS attachment procedure by using NAS attach accept message. In an example, the embodiment may declare the priority of one or more capabilities such as for being infrastructure capable V2X network at the time of NAS attachment procedure by using NAS attach accept message. In an example, the embodiment may declare the priority of one or more capabilities such as for being network capable V2X network at the time of NAS attachment procedure by using NAS attach accept message.

Figure 15:
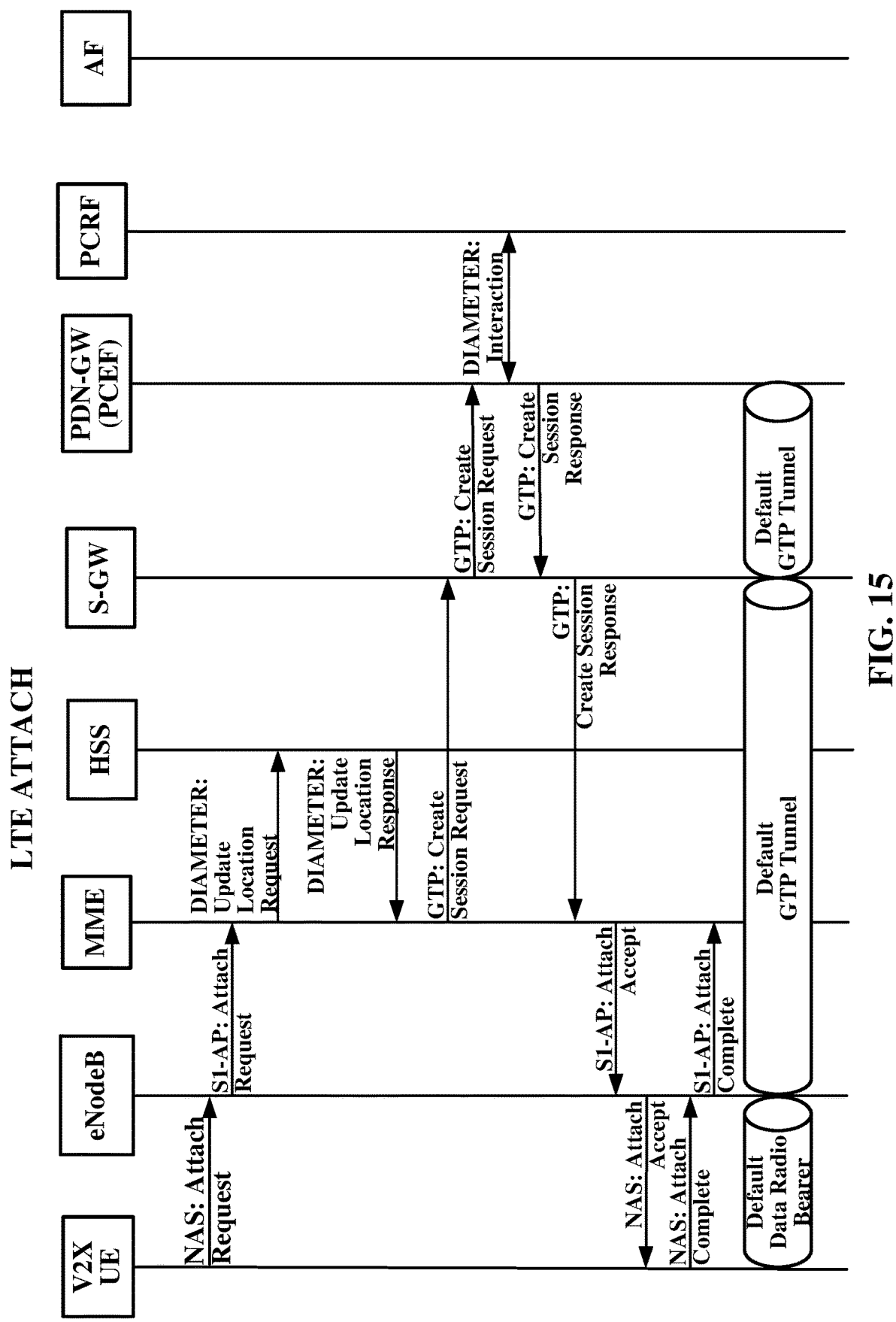
FIG. 15 is a flow diagram of an example LTE Attach process as per an aspect of an embodiment of the present disclosure.

In the following example embodiment, FIG. 15 shows an example procedure for the UE attach to the LTE network and default bearer setup. The example embodiment in FIG. 15 shows the UE initiates the attach procedure by sending NAS: attach request, wherein it may include international mobile subscriber identity (IMSI) or globally unique temporary UE identity (GUTI), tracking area identity (TAI) if available, UE capabilities for V2X service; V2V, V2I, V2P, and/or V2N services, attach type (may be EPS or combined EPS/IMSI), EPS session management (ESM) message container, and/or radio resource control (RRC) parameters. After authenticating the UE if it is not authenticated, the MME updating UE's location in HSS by employing DIAMETER: update location request. If the UE provides access point network (APN), the MME may use PDN-GW corresponding to that APN. If the UE does not provide APN, the MME may use PDN-GW corresponding to default APN provided by the HSS. If HSS does not provide any PDN-GW, the MME may select a PDN-GW by using a selecting function. The MME may select a S-GW and may create the default bearer by using GTP: create session request/response with V2X UE's information, PDN-GW address, APN, EPS bearer identity, user location information, and/or protocol type on the link between S-GW and PDN-GW which is assumed to be GTP in this context. The MME may transmit this GTP message towards the S-GW. The S-GW may add its information to GTP: create session request and may send it towards PDN-GW. The PDN-GW may communicate with PCRF and may provide PCRF the UE's information and its location, serving network, radio access technology (RAT) type, APN aggregate maximum bit rate (AMBR), and/or default EPE bearer QoS. PCRF may modify APN-AMBR and QoS of the default bearer due to V2X user's subscription. The PDN-GW may create a new entry in EPS bearer table and generate charging ID. PDN-GW may create GTP: create session response with information about PDN-GW address and its tunneling end ID (TEID) for user plane and control plane, PDN type and address, EPS bearer ID, EPS bearer QoS, charging ID, APN restriction, and/or APN-AMBR. The PDN-GW may send this GTP message towards the S-GW. S-GW may create GTP: create session response with information about S-GW and PDN-GW addresses and their TEIDs for user plane and control plane, PDN type and address, EPS bearer ID, EPS bearer QoS, charging ID, APN restriction, and/or APN-AMBR. The PDN-GW may send this GTP message towards the MME. The MME may decide the UE-AMBR being used by eNodeB due to V2X user's subscribed UE-AMBR and the APN-AMBR for the default APN. The MME may create S1-AP: attach accept message comprising EPS bearer ID and QoS, UE-AMBR, S-GW address and TEID for user plane and/or EPS network feature support. EPS network feature may comprise network capabilities, e.g. V2X which may comprise V2V, V2I, V2P, and/or V2N. The MME may transmit the attach accept message towards the UE via eNodeB. The UE may acknowledge by sending NAS: attach complete towards MME via eNodeB.

In an example embodiment, the V2X UEs may register with IP Multimedia Subsystem (IMS) network. At the time of registration to the IMS network, a V2X UE may include its supported IMS communication service identifier (ICSI) values for the IMS communication services it intends to use. The V2X UE may register its supported IMS application reference identifier (IARI) values for the IMS applications it intends to use at the time of IMS registration as described here. The V2X UE may include supported ICSI values in a g.3gpp.icsi-ref media feature tag for the IMS communication services it intends to use, and IARI values, for the IMS applications it intends to use in a g.3gpp.iari-ref media feature tag. The UE may include the media feature tags for supported streaming media types.

Figure 16:
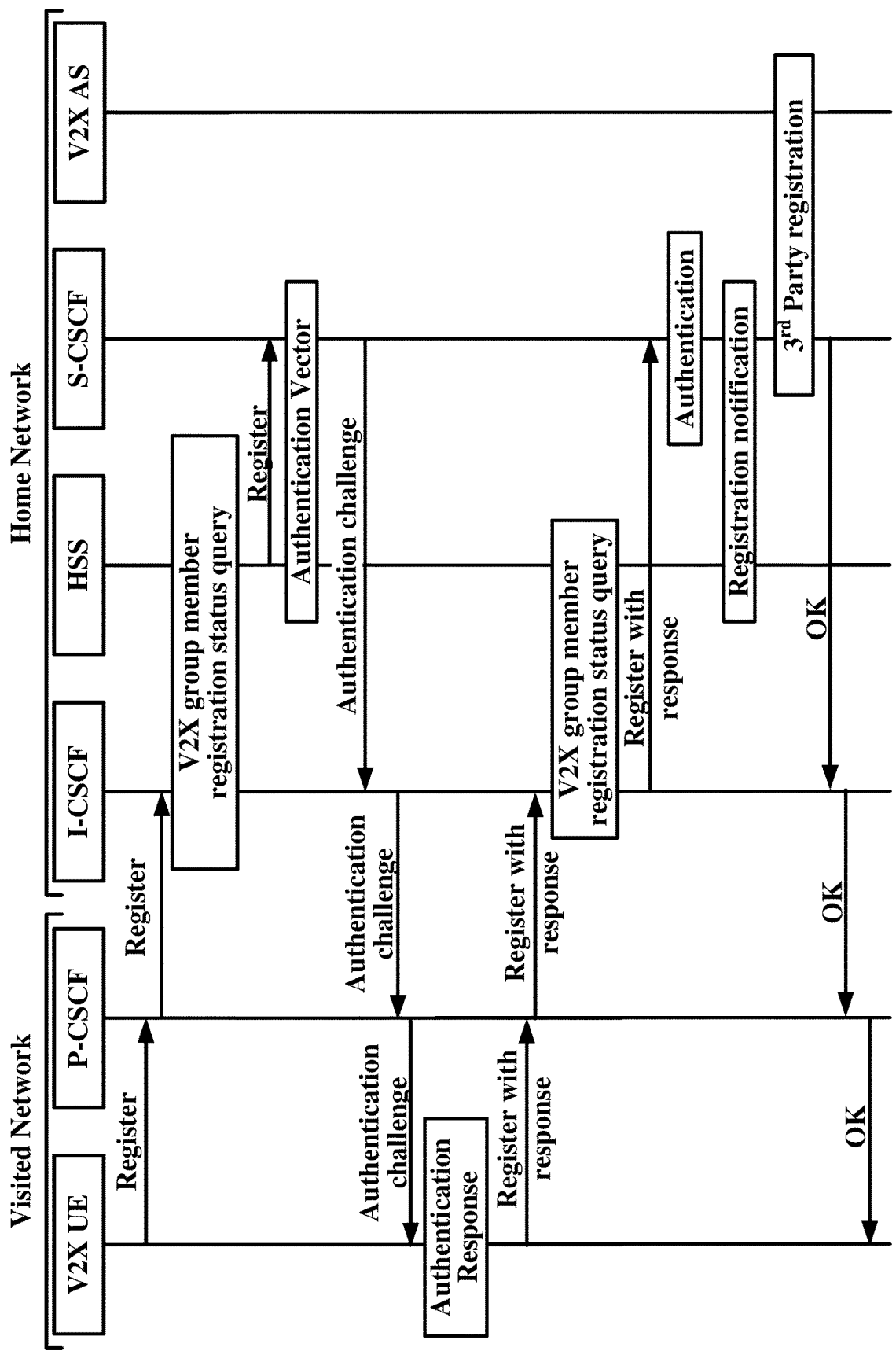
FIG. 16 is a flow diagram of an example IMS registration of a V2X UE as per an aspect of an embodiment of the present disclosure.

The flow diagram in FIG. 16 shows the example embodiment for IMS registration of a V2X UE. FIG. 16 shows V2X UE may send a session initial protocol (SIP) REGISTER request containing V2X feature tag in contact header field towards the proxy call session control function (P-CSCF) in the visiting network; P-CSCF may use the V2X UE's ID to locate the interrogating call session control function (I-CSCF) in the home network by domain name system (DNS) query; I-CSCF in the home network may select suitable serving call session control function (S-CSCF) with help of HSS. In an example embodiment, the HSS assigns the S-CSCF with the similar capabilities as of the UE to the UE at the time of registration; S-CSCF may challenge the registration by requesting an authentication. If the authentication information is not valid, S-CSCF may get it from HSS; V2X UE may provide authentication response and may send the SIP REGISTER request containing authentication response and the V2X feature tag in the contact header towards the P-CSCF in the visiting network; P-CSCF may use the V2X UE's ID to locate the I-CSCF in the home network by DNS query; I-CSCF in the home network may select suitable S-CSCF with help of HSS; S-CSCF may authenticate the V2X UE and may send registration notification to the HSS and may receive the V2X user profile from the HSS; the V2X user profile may be used for the 3rd party register to the V2X application server (AS); and S-CSCF may respond with OK to the V2X UE.

In an example embodiment, V2X UE may comprise capabilities such as capabilities for vehicle, pedestrian, or RSU (infrastructure). To avoid or reduce any possible compatibility issues, new service or application identifiers may be implemented for the additional capabilities. One example embodiment, IMS communication service identifiers (ICSIs) may be employed at the time of IMS registration to indicate different types for V2X UE e.g. pedestrian, vehicle, RSU. One or more IMS service parameters may be communicated during the registration process to indicate at least one V2X UE capability to a network server, e.g. a proxy server, a registrar server.

In an example embodiment, V2X UE may comprise capabilities for vehicle-to-vehicle service, vehicle-to-pedestrian service, vehicle-to-infrastructure service, and vehicle-to-network service capabilities. In order to communicate this with the network, the V2X UE may need to employ ICSs at the time of the registration to the network. One or more IMS service parameters may be communicated during the registration process to indicate at least one V2X UE capability to a network server, e.g. a proxy server, a registrar server.

In an example embodiment, the V2X UE may comprise capabilities for the emergency vehicle-to-vehicle service, emergency vehicle-to-pedestrian service, emergency vehicle-to-infrastructure service, and emergency vehicle-to-network service capabilities. In order to communicate this with the network, the V2X UE may need to employ ICSs at the time of the registration to the network. One or more IMS service parameters may be communicated during the registration process to indicate at least one V2X UE capability to a network server, e.g. a proxy server, a registrar server.

The wireless device registers one or more IMS communication service identifiers (ICSIs) of warning system, e.g. V2X in a wireless network. One of the one or more ICSIs indicates at least one of pedestrian, vehicle, infrastructure, vehicle-to-vehicle service, vehicle-to-pedestrian service, vehicle-to-infrastructure service, and/or vehicle-to-network service capabilities of the wireless device. ICSI may be in the form of a media feature tag. A feature tag may indicate one or more capability of the wireless device. For example, a specific feature tag, such as 3gpp-service.ims.icsi.v2x.vehicle may indicate V2X UE may be a vehicle or 3gpp-service.ims.icsi.v2n may indicate V2X UE may have capability for the service of communication between the vehicle and the network or 3gpp-service.ims.icsi.emergency.v2n may have capability for the service of communication between a high priority vehicle such as ambulance or police and the network. These are examples and other features tag names may be used. One or more ICSI may indicate a combination of at least two of pedestrian, vehicle, infrastructure, vehicle-to-vehicle service, vehicle-to-pedestrian service, vehicle-to-infrastructure service, and/or vehicle-to-network service capabilities of the wireless V2X device. For example, a feature tag 3gpp-service.ims.icsi.v2x may indicate capability for V2X which may be vehicle, pedestrian, and/or infrastructure or v2x services which may be vehicle-to-vehicle service, vehicle-to-pedestrian service, vehicle-to-infrastructure service, and/or vehicle-to-network service.

In an example embodiment, one or more additional parameters may be included in the registration message along with a feature tag to indicate the V2X device capability or a combination of one or more capabilities of the V2X device.

In one example implementation, the V2X device may transmit the registration message to a UE relay which relays to message to a network node. The wireless device may discover the UE relay using discovery model A or model B. In an example, the UE relay may decode the registration message and may update the message headers before retransmitting the message. The UE relay may update the source and destination address in the registration message.

In an example embodiment, the registration message may further register one or more IMS application reference identifiers (IARIs). One of the one or more IARIs may indicate at least one of pedestrian, vehicle, infrastructure, vehicle-to-vehicle application, vehicle-to-pedestrian application, vehicle-to-infrastructure application, and/or vehicle-to-network application capabilities of the wireless V2X device. In one example one or more of the one or more IARIs may indicate at least one of emergency case of the pedestrian, vehicle, infrastructure, vehicle-to-vehicle application, vehicle-to-pedestrian application, vehicle-to-infrastructure application, and/or vehicle-to-network application capabilities of the wireless V2X device. IARI may be in the form of a media feature tag. A feature tag may indicate one or more capability of the V2X device. For, example a specific feature tag, such as 3gpp-application.ims.iari.v2x.vehicle may indicate V2X UE having vehicle capability or 3gpp-application.imsi.iari.v2n may indicate V2X UE may have capability for the application vehicle-to-network communication or 3gpp-application.imsi.iari.emergency.v2n may indicate V2X UE may have capability for the application a high priority vehicle such as ambulance or police to the network communication. These are examples and other features tag names may be used. One or more IARI may indicate a combination of at least two of pedestrian, vehicle, infrastructure, vehicle-to-vehicle application, vehicle-to-pedestrian application, vehicle-to-infrastructure application, and/or vehicle-to-network application capabilities of the V2X device. For example, a feature tag 3gpp-application.ims.iari.v2x may indicate capability for V2X which may be vehicle, pedestrian, infrastructure, vehicle-to-vehicle application, vehicle-to-pedestrian application, vehicle-to-infrastructure application, and/or vehicle-to-network application.

In an example embodiment, the wireless device may register one or more IMS application reference identifiers (IARIs) of V2X in a wireless network. One of the one or more IARIs indicates at least one of pedestrian, vehicle, infrastructure, vehicle-to-vehicle application, vehicle-to-pedestrian application, vehicle-to-infrastructure application, and/or vehicle-to-network application capabilities of the V2X device. In one example, the one or more IARIs may indicate a combination of at least two of pedestrian, vehicle, infrastructure, vehicle-to-vehicle application, vehicle-to-pedestrian application, vehicle-to-infrastructure application, and/or vehicle-to-network application capabilities of the V2X device. The V2X device may further registering one or more IMS communication service identifiers (ICSIs). One of the one or more ICSIs indicates at least one of pedestrian, vehicle, infrastructure, vehicle-to-vehicle application, vehicle-to-pedestrian application, vehicle-to-infrastructure application, and/or vehicle-to-network application capabilities of the wireless device.

In an example embodiment, the V2X UE may register one or more IMS service parameters of V2X in a wireless network. The one or more IMS service parameters may indicate a combination of at least two of pedestrian, vehicle, infrastructure, vehicle-to-vehicle, vehicle-to-pedestrian, vehicle-to-infrastructure, and/or vehicle-to-network capabilities of the V2X UE. The one or more IMS service parameters may indicate at least one of pedestrian, vehicle, infrastructure, vehicle-to-vehicle, vehicle-to-pedestrian, vehicle-to-infrastructure, and/or vehicle-to-network capabilities of the V2X UE.

In an example embodiment, the embodiments may include enhanced service identifiers representing new services such as 3gpp-service.ims.icsi.v2x; 3gpp-service.ims.icsi.v2x.pedestrian; 3gpp-service.ims.icsi.v2x.vehicle; 3gpp-service.ims.icsi.v2x.infrastructure; 3gpp-service.ims.icsi.v2x.emergency; 3gpp-service.ims.icsi.v2x.emergency.pedestrian; 3gpp-service.ims.icsi.v2x.emergency.vehicle 3gpp-service.ims.icsi.v2x.emergency.infrastructure.

In an example embodiment, the embodiments may include enhanced service identifiers representing new services such as 3gpp-service.ims.icsi.v2i; 3gpp-service.ims.icsi.v2n; 3gpp-service.ims.icsi.v2p; 3gpp-service.ims.icsi.v2v; 3gpp-service.ims.icsi.v2i.emergency; 3gpp-service.ims.icsi.v2n.emergency; 3gpp-service.ims.icsi.v2p.emergency; 3gpp-service.ims.icsi.v2v.emergency.

In an example embodiment, the embodiments may include enhanced application identifiers that represent applications for the V2X service 3gpp-application.ims.iari.v2x; 3gpp-application.ims.iari.v2x.pedestrian; 3gpp-application.ims.iari.v2x.vehicle; 3gpp-application.ims.iari.v2x.infrastructure; 3gpp-application.ims.iari.v2x.emergency; 3gpp-application.ims.iari.v2x.emergency.pedestrian; 3gpp-application.ims.iari.v2x.emergency.vehicle; 3gpp-application.ims.iari.v2x.emergency.infrastructure.

In an example embodiment, the embodiments may include enhanced application identifiers that represent applications for the V2X service 3gpp-application.ims.iari.v2i; 3gpp-application.ims.iari.v2n; 3gpp-application.ims.iari.v2p; 3gpp-application.ims.iari.v2v; 3gpp-application.ims.iari.v2i.emergency; 3gpp-application.ims.iari.v2n.emergency; 3gpp-application.ims.iari.v2p.emergency; 3gpp-application.ims.iari.v2v.emergency.

In an example, the embodiments may register one or more IMS communication identifiers (ICSI) for capabilities such as for being V2X UE capable in a wireless network. In an example, the embodiments may register one or more IMS communication identifiers (ICSI) for capabilities such as for being pedestrian capable V2X UE in a wireless network. In an example, the embodiments may register one or more IMS communication identifiers (ICSI) for capabilities such as for being vehicle capable V2X UE in a wireless network. In an example, the embodiments may register one or more IMS communication identifiers (ICSI) for capabilities such as for being infrastructure capable V2X UE in a wireless network. In an example, the embodiments may register one or more IMS communication identifiers (ICSI) for capabilities such as for being emergency V2X UE capable in a wireless network. In an example, the embodiments may register one or more IMS communication identifiers (ICSI) for capabilities such as for being emergency pedestrian capable V2X UE in a wireless network. In an example, the embodiments may register one or more IMS communication identifiers (ICSI) for capabilities such as for being emergency vehicle capable V2X UE in a wireless network. In an example, the embodiments may register one or more IMS communication identifiers (ICSI) for capabilities such as for being emergency infrastructure capable V2X UE in a wireless network. In an example, the embodiments may register one or more IMS communication identifiers (ICSI) for capabilities such as for being vehicle-to-pedestrian service capable V2X UE in a wireless network. In an example, the embodiments may register one or more IMS communication identifiers (ICSI) for capabilities such as for being vehicle-to-vehicle service capable V2X UE in a wireless network. In an example, the embodiments may register one or more IMS communication identifiers (ICSI) for capabilities such as for being vehicle-to-infrastructure service capable V2X UE in a wireless network. In an example, the embodiments may register one or more IMS communication identifiers (ICSI) for capabilities such as for being vehicle-to-network service capable V2X UE in a wireless network. In an example, the embodiments may register one or more IMS communication identifiers (ICSI) for capabilities such as for being emergency vehicle-to-pedestrian service capable V2X UE in a wireless network. In an example, the embodiments may register one or more IMS communication identifiers (ICSI) for capabilities such as for being emergency vehicle-to-vehicle service capable V2X UE in a wireless network.

In an example, the embodiments may register one or more IMS communication identifiers (ICSI) for capabilities such as for being emergency vehicle-to-infrastructure service capable V2X UE in a wireless network. In an example, the embodiments may register one or more IMS communication identifiers (ICSI) for capabilities such as for being emergency vehicle-to-network service capable V2X UE in a wireless network. In an example, the embodiments may register one or more IMS communication identifiers (ICSI) for capabilities such as for being pedestrian, vehicle, infrastructure, vehicle-to-vehicle service, vehicle-to-pedestrian service, vehicle-to-infrastructure service, and/or vehicle-to-network service capable V2X UE in a wireless network.

In an example, the embodiments may register one or more IMS communication identifiers (ICSI) for capabilities such as for being emergency pedestrian, emergency vehicle, emergency infrastructure, emergency vehicle-to-vehicle service, emergency vehicle-to-pedestrian service, emergency vehicle-to-infrastructure service, and/or emergency vehicle-to-network service capable V2X UE in a wireless network.

In an example, the embodiments may register one or more IMS application reference identifiers (IARI) for capabilities such as for being V2X UE capable in a wireless network. In an example, the embodiments may register one or more IMS application reference identifiers (IARI) for capabilities such as for being pedestrian capable V2X UE in a wireless network. In an example, the embodiments may register one or more IMS application reference identifiers (IARI) for capabilities such as for being vehicle capable V2X UE in a wireless network. In an example, the embodiments may register one or more IMS application reference identifiers (IARI) for capabilities such as for being infrastructure capable V2X UE in a wireless network. In an example, the embodiments may register one or more IMS application reference identifiers (IARI) for capabilities such as for being vehicle-to-pedestrian application capable V2X UE in a wireless network. In an example, the embodiments may register one or more IMS application reference identifiers (IARI) for capabilities such as for being vehicle-to-vehicle application capable V2X UE in a wireless network. In an example, the embodiments may register one or more IMS application reference identifiers (IARI) for capabilities such as for being vehicle-to-infrastructure application capable V2X UE in a wireless network. In an example, the embodiments may register one or more IMS application reference identifiers (IARI) for capabilities such as for being vehicle-to-network application capable V2X UE in a wireless network. In an example, the embodiments may register one or more IMS application reference identifiers (IARI) for capabilities such as for being emergency V2X UE capable in a wireless network. In an example, the embodiments may register one or more IMS application reference identifiers (IARI) for capabilities such as for being emergency pedestrian capable V2X UE in a wireless network. In an example, the embodiments may register one or more IMS application reference identifiers (IARI) for capabilities such as for being emergency vehicle capable V2X UE in a wireless network. In an example, the embodiments may register one or more IMS application reference identifiers (IARI) for capabilities such as for being emergency infrastructure capable V2X UE in a wireless network. In an example, the embodiments may register one or more IMS application reference identifiers (IARI) for capabilities such as for being emergency vehicle-to-pedestrian application capable V2X UE in a wireless network. In an example, the embodiments may register one or more IMS application reference identifiers (IARI) for capabilities such as for being emergency vehicle-to-vehicle application capable V2X UE in a wireless network. In an example, the embodiments may register one or more IMS application reference identifiers (IARI) for capabilities such as for being emergency vehicle-to-infrastructure application capable V2X UE in a wireless network. In an example, the embodiments may register one or more IMS application reference identifiers (IARI) for capabilities such as for being emergency vehicle-to-network application capable V2X UE in a wireless network.

In an example, the embodiments may register one or more IMS application reference identifiers (IARI) for capabilities such as for being pedestrian, vehicle, infrastructure, vehicle-to-vehicle application, vehicle-to-pedestrian application, vehicle-to-infrastructure application, and/or vehicle-to-network application capable V2X UE in a wireless network.

In an example, the embodiments may register one or more IMS application reference identifiers (IARI) for capabilities such as for being emergency pedestrian, emergency vehicle, emergency infrastructure, emergency vehicle-to-vehicle application, emergency vehicle-to-pedestrian application, emergency vehicle-to-infrastructure application, and/or emergency vehicle-to-network application capable V2X UE in a wireless network.

In an example embodiment, a V2X UE may proxy one or many other V2X UEs for ICSI registration and/or IARI registration to the IMS network with no modification to the register message. In an example embodiment, a V2X UE may proxy one or many other V2X UEs for ICSI registration and/or IARI registration to the IMS network with modification to the header of the register message. In an example embodiment, a V2X UE may proxy one or many other V2X UEs for ICSI registration and/or IARI registration to the IMS network with modification to the body of the register message. In an example embodiment, a V2X UE may proxy one or many other V2X UEs for ICSI registration and/or IARI registration to the IMS network with modification to the header and the body of the register message.

Other combination for creating feature tags for service and application identifiers for V2X may be implemented.

Figure 17:
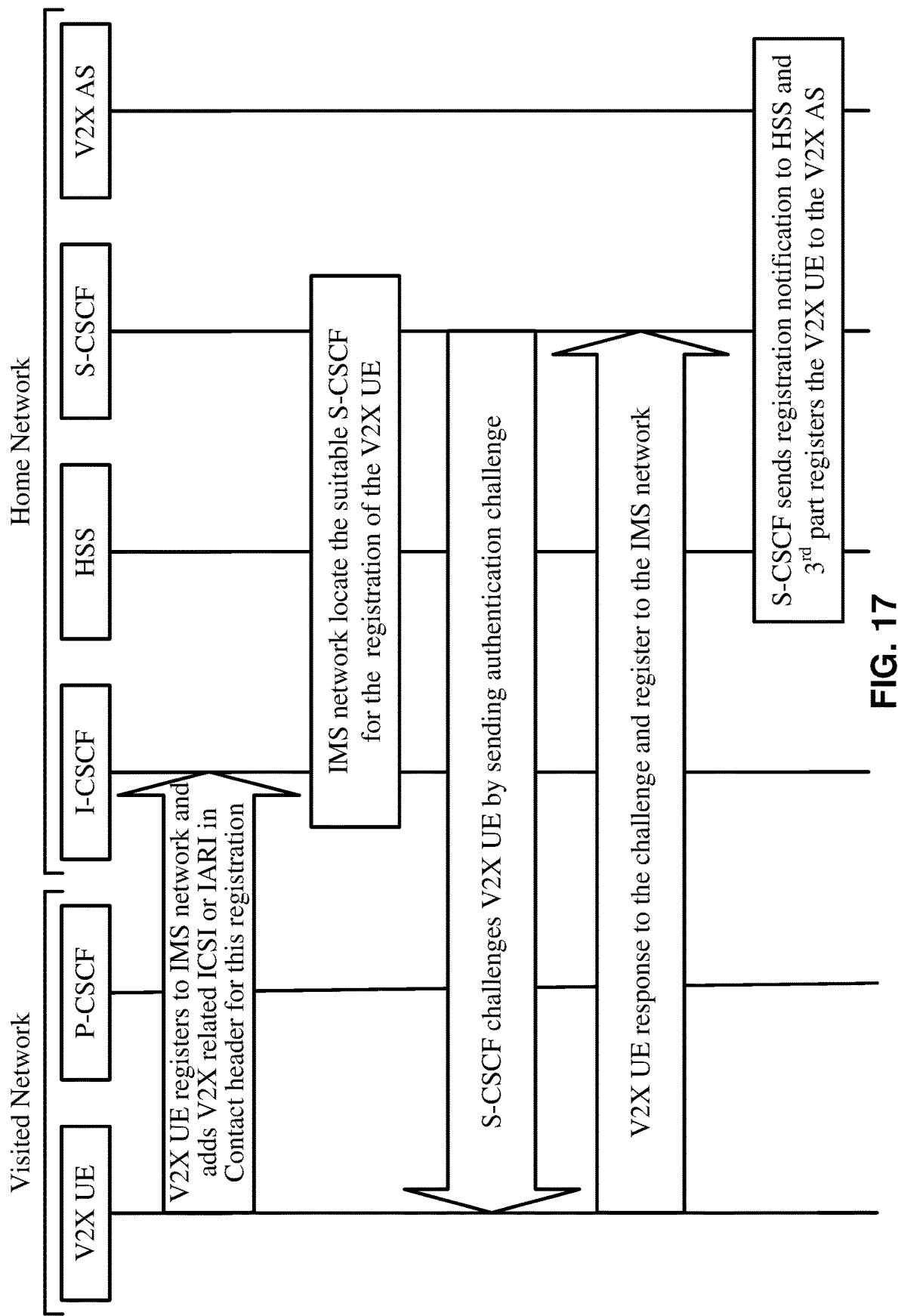
FIG. 17 is a flow diagram of an example IMS registration of a V2X UE as per an aspect of an embodiment of the present disclosure.

FIG. 17 shows flow diagram for an example embodiment of an IMS registration for a V2X UE. FIG. 17 shows V2X UE may include the V2X related ICSI and IARI which it may intent to use to its contact header field of the register message when registering to the IMS network; IMS network may locate the most suitable S-CSCF with the similar capabilities as of the UE's for this registration and may forward the registration request to that S-CSCF; S-CSCF may challenge the V2X UE by sending authentication request to the UE; V2X UE may respond to the authentication request; and S-CSCF 3rd part may register the UE to the V2X AS.

A wireless device may register one or more IMS communication service identifiers (ICSIs) for V2X in a wireless network. One of the one or more ICSIs may indicate at least one of pedestrian, vehicle, and/or infrastructure capabilities of the V2X device. 3GPP has defined warning system based on vehicle-to-vehicle (V2V), vehicle-to-pedestrian (V2P), vehicle-to-infrastructure (V2I), and vehicle to network (V2N). Due to different use cases, these new features may require new capabilities and it may result in compatibility issue at the time of communications. In some example cases, network (e.g. the registrar or application servers, and/or third party application servers, and/or other network entities) may need to know the V2X UE's capabilities in terms of supported services and applications.

A network node may transmit a request to a registrar and/or network node storing V2X UE capability and request for V2X UE capabilities. The network node may transmit a response message to the requester (directly or indirectly) indicating the V2X UE capabilities of the UE. The network nodes may communicate (transmit/receive) the V2X user's capabilities by exchanging SIP message(s) (e.g. SIP MESSAGE method). The network node may transmit a SIP message (e.g. SIP MESSAGE method) to the UE to set up a session to stream a video clip to the V2X UE. Thus the network needs to know if the V2X UE has the capability to receive it.

The network node may transmit a SIP message (e.g. SIP MESSAGE method) to the UE to set up a session to send information about multicast bearer and the related ports for media reception. Thus the network may need to know about the V2X UE's capabilities to receive the multicast media.

A third party entity may like to get a V2X UE's capabilities from the operator's network where V2X UE has registered to, in order to e.g. provide a service or application. A third party entity may transmit a SIP message (e.g. SIP MESSAGE method) to the UE to set up a session. Therefore, the network must know the V2X UE's capabilities to provide this information to the third party entity. The V2X UE may response to the SIP message. The network/third party may subsequently start communicating and transmitting/receiving data to/from the V2X UE.

In an example embodiment, once the V2X UEs are all registered to the IMS network and if a V2X UE may like to request a new dialog or standalone transaction, the V2X UE may include all its supported ICSI values for the IMS communication services it may intend to use to all other SIP methods than the SIP REGISTER method. The V2X UE may include all its supported IARI values for the IMS applications it may intend to use to those methods.

If this is a request for a new dialog, the Contact header field may be populated as a contact header value which may be a public GRUU value, a temporary GRUU value, or SIP URI containing the contact address of the V2X UE; an "ob" SIP URI parameter; an ICSI that the V2X UE may include in a g.3gpp.icsi-ref media feature tag; and an IARI that the V2X UE may include in a g.3gpp.iari-ref media feature tag.

If a V2X UE receives ICSI values corresponding to the IMS communication services that the network provides to the user, if the V2X UE constructs a request for a new dialog or standalone transaction and the request is related to one of the ICSI values, the V2X UE may populate a P-Preferred-Service header field with one of the ICSI values.

In construction of the same request for a new dialog and standalone transaction, the V2X UE may populate an Accept-Contact header field comprising an ICSI value which may differ from the one added to P-Preferred-Service header field. In construction of a request for a new dialog or standalone transaction, the V2X UE may populate an Accept-Contact header field comprising an IARI value if an IMS application indicates that an IARI is to be included in a request.

The V2X UE may modify the established dialog capabilities by e.g. adding a media or requesting a supplementary service if the modification is defined for the IMS communication service. If the modification is not defined for that IMS communication service, the V2X UE may initiate a new dialog.

In an example embodiment, a trusted application server may insert P-Asserted-Service header field in a request for a new dialog or standalone transaction and may include ICSI value for the related IMS communication service to that header field. In an example embodiment, an untrusted application server may insert P-Preferred-Service header field in a request for a new dialog or standalone transaction and may include ICSI value for the related IMS communication service to that header field.

In an example embodiment, if an AS may act as an initiating back-to-back user agent (B2BUA) or a routing B2BUA and may be sending a request for a dialog or a standalone transaction by including an ICSI value and one or more IARI values in the Accept-Contact header field, if there are ICSI value and IARI value(s) for the IMS communication service and IMS applications.

Figure 18:
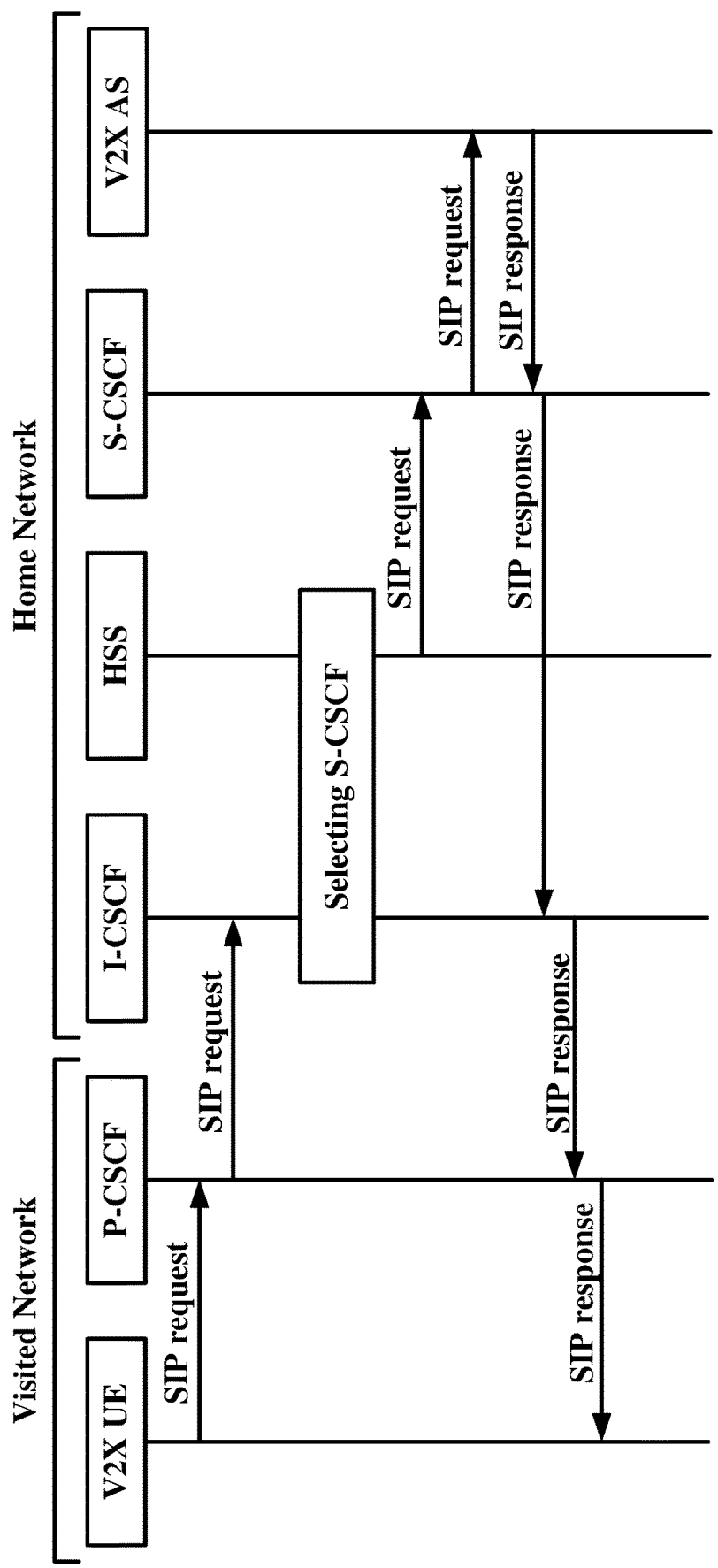
FIG. 18 is an example flow diagram showing a V2X UE sending a request to a V2X AS as per an aspect of an embodiment of the present disclosure.

The flow diagram in the example embodiment in FIG. 18 shows a V2X UE sends a request to V2X AS. FIG. 18 shows V2X UE may initiate a SIP request towards the V2X AS for a certain service or information. In an example embodiment, the SIP request comprises V2X feature tag in the Contact header field. In an example embodiment, the SIP request comprises V2X feature tag in the Contact header field and the Accept-Contact header field indicating the V2X service may be required for that SIP request; P-CSCF may use the V2X UE's ID to locate I-CSCF in the home network by DNS query; I-CSCF in the home network may select suitable S-CSCF with help of HSS; S-CSCF may validate the service profile of the V2X UE and may evaluate the filter criteria. It may thereafter forward the invite towards V2X AS; and V2X AS may analyze the feature tag and may send an appropriate response back towards the V2X UE.

In an example embodiment, V2X communication messages may comprise capabilities such as capabilities for vehicle, pedestrian, or infrastructure. To avoid or reduce any possible compatibility issues, new service or application identifiers may be implemented for the additional capabilities. An example embodiment, ICSIs may be employed at the time of establishing new dialog or standalone transaction to indicate different capabilities for V2X e.g. pedestrian, vehicle, infrastructure, vehicle-to-vehicle, vehicle-to-pedestrian, vehicle-to-infrastructure, and/or vehicle-to-network. One or more IMS service parameters be communicated during the new dialog establishment procedure and/or standalone transaction process to indicate at least one V2X capability to a network server, e.g. a proxy server, a registrar server.

An example embodiment, ICSIs may be employed at the time of establishing new dialog or standalone transaction to indicate different capabilities for V2X e.g. emergency pedestrian, emergency vehicle, emergency infrastructure, emergency vehicle-to-vehicle, emergency vehicle-to-pedestrian, emergency vehicle-to-infrastructure, and/or emergency vehicle-to-network. One or more IMS service parameters be communicated during the new dialog establishment procedure and/or standalone transaction process to indicate at least one V2X capability to a network server, e.g. a proxy server, a registrar server.

The V2X UE may employ one or more IMS communication service identifiers (ICSIs) of warning system e.g. V2X for new dialogs establishment or standalone transactions in a wireless network. One of the one or more ICSIs may indicate at least one of pedestrian, vehicle and/or infrastructure capabilities of the V2X device. ICSI may be in the form of a media feature tag. A feature tag may indicate one or more capability of the V2X device. For, example a specific feature tag, such as 3gpp-service.ims.icsi.v2x.rsu may indicate infrastructure capability of the V2X device or 3gpp-service.ims.icsi.v2n may indicate vehicle-to-network service capability or 3gpp-service.ims.icsi.emeregency.v2n may indicate emergency vehicle-to-network service capability. These are examples, other features tag names may be used. One or more ICSI may indicate a combination of at least two of pedestrian, vehicle, infrastructure, vehicle-to-vehicle service, vehicle-to-pedestrian service, vehicle-to-infrastructure service, and/or vehicle-to-network service capabilities of the V2X device. For example, a feature tag 3gpp-service.ims.icsi.v2x, may indicate capability for vehicle, pedestrian, infrastructure, vehicle-to-vehicle service, vehicle-to-pedestrian service, vehicle-to-infrastructure service, and/or vehicle-to-network service.

One or more ICSI may indicate a combination of at least two of emergency pedestrian, emergency vehicle, emergency infrastructure, emergency vehicle-to-vehicle service, emergency vehicle-to-pedestrian service, emergency vehicle-to-infrastructure service, and/or emergency vehicle-to-network service capabilities of the V2X device. For example, a feature tag 3gpp-service.ims.icsi.emergency.v2x, may indicate capability for emergency vehicle, emergency pedestrian, emergency infrastructure, emergency vehicle-to-vehicle service, emergency vehicle-to-pedestrian service, emergency vehicle-to-infrastructure service, and/or emergency vehicle-to-network service.

In another example, one or more additional parameters may be included in the new dialog establishment or a standalone transaction along with a feature tag to indicate the V2X device capability or a combination of one or more capabilities of the V2X device.

In an implementation, the V2X device may transmit the message to establish a new dialog or as a standalone transaction to a UE relay via PC5 which may relay the message to a network node. The V2X device may discover the UE relay using discovery model A or model B. In an example, the UE relay may decode the message for new dialog establishment or for the standalone transition and may update the message headers before retransmitting the message. The UE relay may update the source and destination address in the message for the new dialog and standalone transaction.

In an example embodiment, the message for the new dialog and the standalone transaction may further employ one or more IMS application reference identifiers (IARIs). One of the one or more IARIs may indicate at least one of pedestrian, vehicle, and/or infrastructure capabilities of the wireless V2X device. IARI may be in the form of a media feature tag. A feature tag may indicate one or more capability of the V2X device. For, example a specific feature tag, such as 3gpp-application.ims.iari.v2x.vehicle may indicate V2X UE having vehicle capability or 3gpp-application.ims.iari.v2n may indicate vehicle-to-network application capability or 3gpp-application.ims.iari.emergency.v2n may indicate high priority vehicle such as ambulance or police to-network application capability. These are examples and other features tag names may be used. One or more IARI may indicate a combination of at least two of pedestrian, vehicle, infrastructure, vehicle-to-vehicle application, vehicle-to-pedestrian application, vehicle-to-infrastructure application, and/or vehicle-to-network application capabilities of the V2X device. For example, a feature tag 3gpp-application.ims.iari.v2x may indicate capability for V2X which may be vehicle, pedestrian, infrastructure, vehicle-to-vehicle application, vehicle-to-pedestrian application, vehicle-to-infrastructure application, and/or vehicle-to-network application.

One or more IARI may indicate a combination of at least two of emergency pedestrian, emergency vehicle, emergency infrastructure, emergency vehicle-to-vehicle application, emergency vehicle-to-pedestrian application, emergency vehicle-to-infrastructure application, and/or emergency vehicle-to-network application capabilities of the V2X device. For example, a feature tag 3gpp-application.ims.iari.emergency.v2x may indicate capability for V2X which may be emergency vehicle, emergency pedestrian, emergency infrastructure, emergency vehicle-to-vehicle application, emergency vehicle-to-pedestrian application, emergency vehicle-to-infrastructure application, and/or emergency vehicle-to-network application.

In an example embodiment, the V2X device may employ one or more IMS application reference identifiers (IARIs) of V2X in a wireless network for establishment of a new dialog or for standalone message. One of the one or more IARIs may indicate at least one of vehicle, pedestrian, infrastructure, vehicle-to-vehicle application, vehicle-to-pedestrian application, vehicle-to-infrastructure application, and/or vehicle-to-network application capabilities of the V2X UE. In an example embodiment, the one or more IARIs may indicate a combination of at least two of pedestrian, vehicle, infrastructure, vehicle-to-vehicle application, vehicle-to-pedestrian application, vehicle-to-infrastructure application, and/or vehicle-to-network application capabilities of the wireless device. The wireless device may further employ one or more IMS communication service identifiers (ICSIs) for establishing new dialog or standalone message. One of the one or more ICSIs indicates at least one of pedestrian, vehicle, infrastructure, vehicle-to-vehicle service, vehicle-to-pedestrian service, vehicle-to-infrastructure service, and/or vehicle-to-network service capabilities of the V2X UE.

In an example, the V2X UE may employ one or more IMS service parameters of V2X in a wireless network for establishing a new dialog or a standalone message. The one or more IMS service parameters may indicate a combination of at least two of pedestrian, vehicle, infrastructure, vehicle-to-vehicle, vehicle-to-pedestrian, vehicle-to-infrastructure, and/or vehicle-to-network capabilities of the V2X UE. The one or more IMS service parameters indicate at least one of pedestrian, vehicle, infrastructure, vehicle-to-vehicle, vehicle-to-pedestrian, vehicle-to-infrastructure, and/or vehicle-to-network capabilities of the V2X UE.

In an example, the embodiments may include enhanced service identifiers representing new services such as 3gpp-service.ims.icsi.v2x; 3gpp-service.ims.icsi.v2x.pedestrian; 3gpp-service.ims.icsi.v2x.vehicle; 3gpp-service.ims.icsi.v2x.infrastructure; 3gpp-service.ims.icsi.v2x.emergency; 3gpp-service.ims.icsi.v2x.pedestrian.emergency; 3gpp-service.ims.icsi.v2x.vehicle.emergency; and 3gpp-service.ims.icsi.v2x.infrastructure.emergency.

In an example embodiment, the embodiments may include enhanced service identifiers representing new services such as 3gpp-service.ims.icsi.v2i; 3gpp-service.ims.icsi.v2n; 3gpp-service.ims.icsi.v2p; 3gpp-service.ims.icsi.v2v; 3gpp-service.ims.icsi.v2i.emergency; 3gpp-service.ims.icsi.v2n.emergency; 3gpp-service.ims.icsi.v2p.emergency; and 3gpp-service.ims.icsi.v2v.emergency.

In an example, the embodiments may include enhanced application identifiers that represent applications for the V2X service 3gpp-application.ims.iari.v2x; 3gpp-application.ims.iari.v2x.pedestrian; 3gpp-application.ims.iari.v2x.vehicle; 3gpp-application.ims.iari.v2x.infrastructure; 3gpp-application.ims.iari.v2x.emergency; 3gpp-application.ims.iari.v2x.emergency.pedestrian; 3gpp-application.ims.iari.v2x.emergency.vehicle; 3gpp-application.ims.iari.v2x.emergency.infrastructure.

In an example embodiment, the embodiments may include enhanced application identifiers that represent applications for the V2X service 3gpp-application.ims.iari.v2i; 3gpp-application.ims.iari.v2n; 3gpp-application.ims.iari.v2p; 3gpp-application.ims.iari.v2v; 3gpp-application.ims.iari.emergency.v2i; 3gpp-application.ims.iari.emergency.v2n; 3gpp-application.ims.iari.emergency.v2p; and 3gpp-application.ims.iari.emergency.v2v.

In an example embodiment, the message for new dialog establishment or standalone message may employ one or more IMS communication identifiers (ICSI) for capabilities such as for being V2X UE capable in a wireless network. In an example embodiment, the message for new dialog establishment or standalone message may employ one or more IMS communication identifiers (ICSI) for capabilities such as for being pedestrian capable V2X UE in a wireless network. In an example embodiment, the message for new dialog establishment or standalone message may employ one or more IMS communication identifiers (ICSI) for capabilities such as for being vehicle capable V2X UE in a wireless network. In an example embodiment, the message for new dialog establishment or standalone message may employ one or more IMS communication identifiers (ICSI) for capabilities such as for being infrastructure capable V2X UE in a wireless network. In an example embodiment, the message for new dialog establishment or standalone message may employ one or more IMS communication identifiers (ICSI) for capabilities such as for being vehicle-to-pedestrian service capable V2X UE in a wireless network. In an example embodiment, the message for new dialog establishment or standalone message may employ one or more IMS communication identifiers (ICSI) for capabilities such as for being vehicle-to-vehicle service capable V2X UE in a wireless network. In an example embodiment, the message for new dialog establishment or standalone message may employ one or more IMS communication identifiers (ICSI) for capabilities such as for being vehicle-to-infrastructure service capable V2X UE in a wireless network. In an example embodiment, the message for new dialog establishment or standalone message may employ one or more IMS communication identifiers (ICSI) for capabilities such as for being vehicle-to-network service capable V2X UE in a wireless network.

In an example embodiment, the message for new dialog establishment or standalone message may employ one or more IMS communication identifiers (ICSI) for capabilities such as for being pedestrian, vehicle, infrastructure, vehicle-to-vehicle service, vehicle-to-pedestrian service, vehicle-to-infrastructure service, and/or vehicle-to-network service capable V2X UE in a wireless network. In an example embodiment, the message for new dialog establishment or standalone message may employ one or more IMS communication identifiers (ICSI) for capabilities such as for being emergency V2X UE capable in a wireless network. In an example embodiment, the message for new dialog establishment or standalone message may employ one or more IMS communication identifiers (ICSI) for capabilities such as for being emergency pedestrian capable V2X UE in a wireless network.

In an example embodiment, the message for new dialog establishment or standalone message may employ one or more IMS communication identifiers (ICSI) for capabilities such as for being emergency vehicle capable V2X UE in a wireless network. In an example embodiment, the message for new dialog establishment or standalone message may employ one or more IMS communication identifiers (ICSI) for capabilities such as for being emergency infrastructure capable V2X UE in a wireless network. In an example embodiment, the message for new dialog establishment or standalone message may employ one or more IMS communication identifiers (ICSI) for capabilities such as for being emergency vehicle-to-pedestrian service capable V2X UE in a wireless network.

In an example embodiment, the message for new dialog establishment or standalone message may employ one or more IMS communication identifiers (ICSI) for capabilities such as for being emergency vehicle-to-vehicle service capable V2X UE in a wireless network. In an example embodiment, the message for new dialog establishment or standalone message may employ one or more IMS communication identifiers (ICSI) for capabilities such as for being emergency vehicle-to-infrastructure service capable V2X UE in a wireless network.

In an example embodiment, the message for new dialog establishment or standalone message may employ one or more IMS communication identifiers (ICSI) for capabilities such as for being emergency vehicle-to-network service capable V2X UE in a wireless network. In an example embodiment, the message for new dialog establishment or standalone message may employ one or more IMS communication identifiers (ICSI) for capabilities such as for being emergency pedestrian, emergency vehicle, emergency infrastructure, emergency vehicle-to-vehicle service, emergency vehicle-to-pedestrian service, emergency vehicle-to-infrastructure service, and/or emergency vehicle-to-network service capable V2X UE in a wireless network.

In an example embodiment, the message for new dialog establishment or standalone message may employ one or more IMS application reference identifiers (IARI) for capabilities such as for being V2X UE capable in a wireless network. In an example embodiment, the message for new dialog establishment or standalone message may employ one or more IMS application reference identifiers (IARI) for capabilities such as for being pedestrian capable V2X UE in a wireless network. In an example embodiment, the message for new dialog establishment or standalone message may employ one or more IMS application reference identifiers (IARI) for capabilities such as for being vehicle capable V2X UE in a wireless network.

In an example embodiment, the message for new dialog establishment or standalone message may employ one or more IMS application reference identifiers (IARI) for capabilities such as for being infrastructure capable V2X UE in a wireless network. In an example embodiment, the message for new dialog establishment or standalone message may employ one or more IMS application reference identifiers (IARI) for capabilities such as for being vehicle-to-pedestrian application capable V2X UE in a wireless network. In an example embodiment, the message for new dialog establishment or standalone message may employ one or more IMS application reference identifiers (IARI) for capabilities such as for being vehicle-to-vehicle application capable V2X UE in a wireless network.

In an example embodiment, the message for new dialog establishment or standalone message may employ one or more IMS application reference identifiers (IARI) for capabilities such as for being vehicle-to-infrastructure application capable V2X UE in a wireless network. In an example embodiment, the message for new dialog establishment or standalone message may employ one or more IMS application reference identifiers (IARI) for capabilities such as for being vehicle-to-network application capable V2X UE in a wireless network.

In an example embodiment, the message for new dialog establishment or standalone message may employ one or more IMS application reference identifiers (IARI) for capabilities such as for being pedestrian, vehicle, infrastructure, vehicle-to-vehicle application, vehicle-to-pedestrian application, vehicle-to-infrastructure application, and/or vehicle-to-network application capable V2X UE in a wireless network. In an example embodiment, the message for new dialog establishment or standalone message may employ one or more IMS application reference identifiers (IARI) for capabilities such as for being emergency V2X UE capable in a wireless network.

In an example embodiment, the message for new dialog establishment or standalone message may employ one or more IMS application reference identifiers (IARI) for capabilities such as for being emergency pedestrian capable V2X UE in a wireless network. In an example embodiment, the message for new dialog establishment or standalone message may employ one or more IMS application reference identifiers (IARI) for capabilities such as for being emergency vehicle capable V2X UE in a wireless network. In an example embodiment, the message for new dialog establishment or standalone message may employ one or more IMS application reference identifiers (IARI) for capabilities such as for being emergency infrastructure capable V2X UE in a wireless network.

In an example embodiment, the message for new dialog establishment or standalone message may employ one or more IMS application reference identifiers (IARI) for capabilities such as for being emergency vehicle-to-pedestrian application capable V2X UE in a wireless network. In an example embodiment, the message for new dialog establishment or standalone message may employ one or more IMS application reference identifiers (IARI) for capabilities such as for being emergency vehicle-to-vehicle application capable V2X UE in a wireless network.

In an example embodiment, the message for new dialog establishment or standalone message may employ one or more IMS application reference identifiers (IARI) for capabilities such as for being emergency vehicle-to-infrastructure application capable V2X UE in a wireless network. In an example embodiment, the message for new dialog establishment or standalone message may employ one or more IMS application reference identifiers (IARI) for capabilities such as for being emergency vehicle-to-network application capable V2X UE in a wireless network.

In an example embodiment, the message for new dialog establishment or standalone message may employ one or more IMS application reference identifiers (IARI) for capabilities such as for being emergency pedestrian, emergency vehicle, emergency infrastructure, emergency vehicle-to-vehicle application, emergency vehicle-to-pedestrian application, emergency vehicle-to-infrastructure application, and/or emergency vehicle-to-network application capable V2X UE in a wireless network.

In an example embodiment, a V2X UE may proxy one or many other V2X UEs for ICSI registration and/or IARI registration to the IMS network with no modification to the message for new dialog establishment or standalone message. In an example embodiment, a V2X UE may proxy one or many other V2X UEs for ICSI registration and/or IARI registration to the IMS network with modification to the header of the message for new dialog establishment or standalone message. In an example embodiment, a V2X UE may proxy one or many other V2X UEs for ICSI registration and/or IARI registration to the IMS network with modification to the body of the message for new dialog establishment or standalone message.

In an example embodiment, a V2X UE may proxy one or many other V2X UEs for ICSI registration and/or IARI registration to the IMS network with modification to the header and the body of the message for new dialog establishment or standalone message. Other combination for creating feature tags for service and application identifiers for V2X may be implemented.

Figure 19:
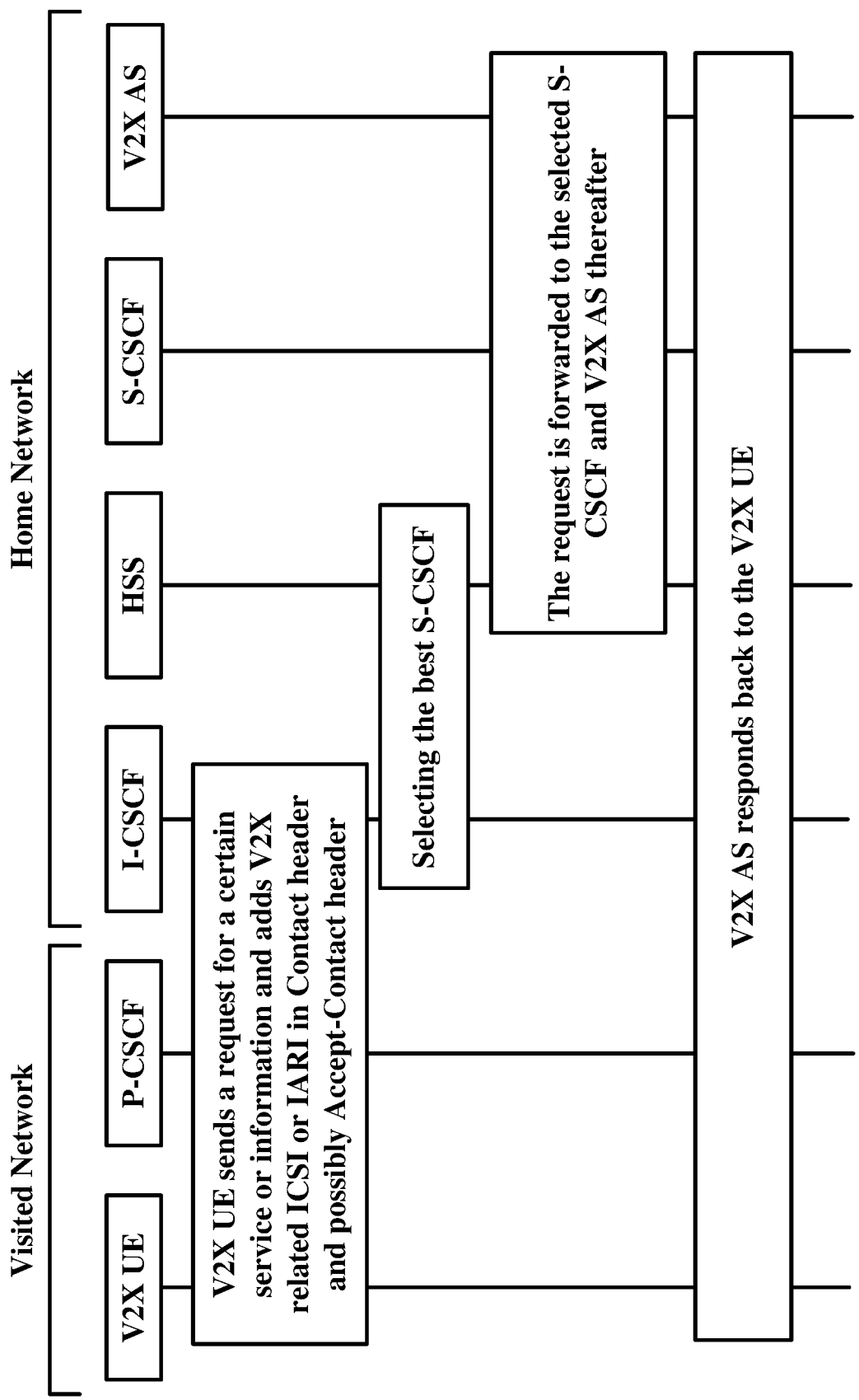
FIG. 19 is an example flow diagram showing a V2X UE sending a request to a V2X AS as per an aspect of an embodiment of the present disclosure.

The flow diagram in the example embodiment in FIG. 19 shows a V2X UE sends a request to V2X AS. FIG. 19 shows V2X UE may send a request for a service or send an information to the network which may comprise V2X related ICSI and IARI in the Contact header field. The Accept-Contact header field may also comprise the V2X related ICSI and IARI which may indicate that the V2X service or the V2X application which may be required for the V2X service; I-CSCF may get help HSS to locate the suitable S-CSCF to process the V2X UE request; S-CSCF may forward the request to the V2X AS which may analyze the request from the V2X UE; and V2X AS may send an appropriate response to V2X UE.

Figure 20:
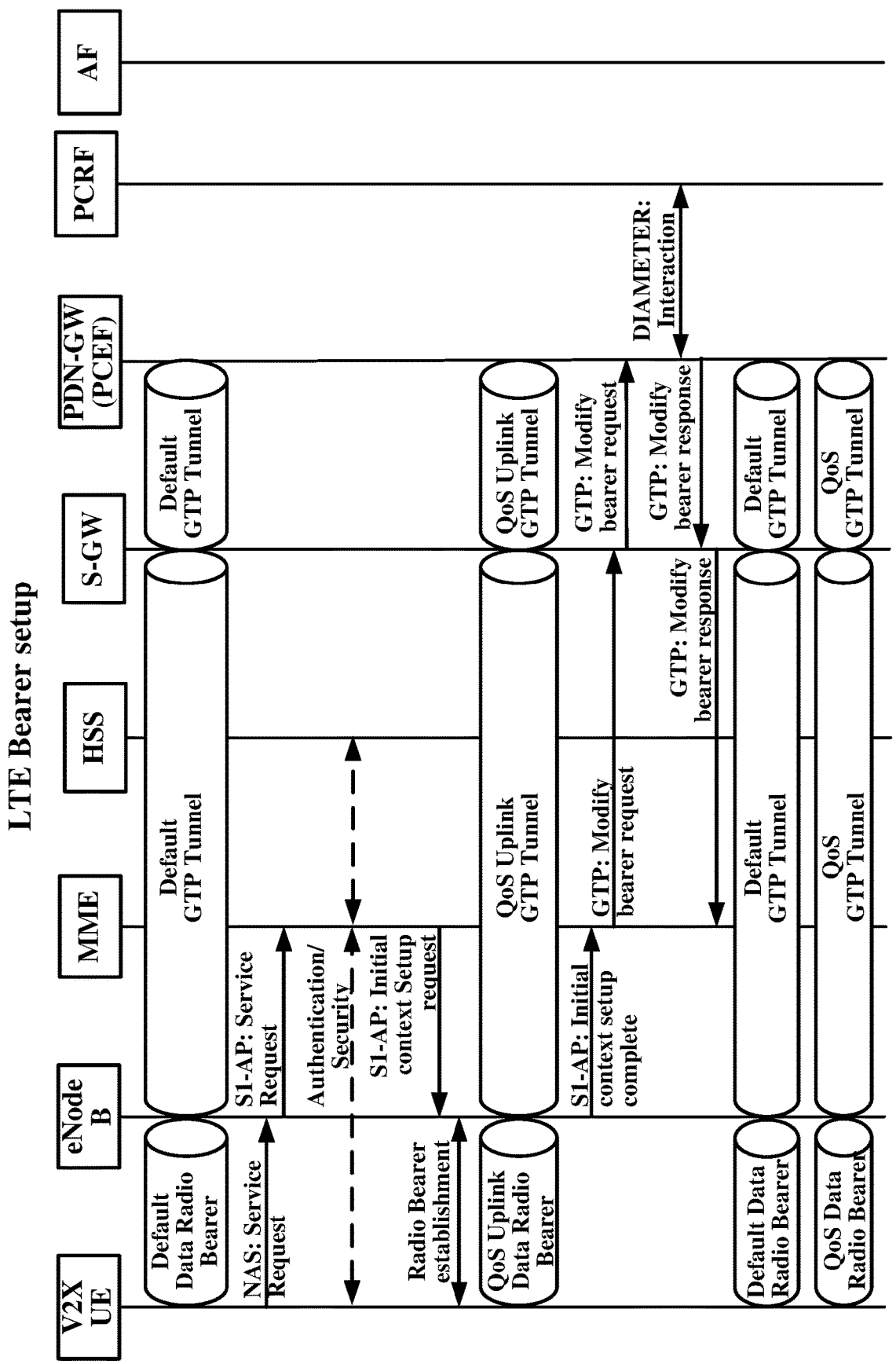
FIG. 20 is an example flow diagram showing an example LTE Bearer Setup process as per an aspect of an embodiment of the present disclosure.

The flow diagram in the example embodiment in FIG. 20 shows a V2X UE in idle mode gets an EPS bearer. In FIG. 20 example embodiment while the default EPS bearer is established and the V2X UE is in idle mode, the V2X UE may send NAS: service request message comprising system architecture evolution (SAE) temporary mobile subscriber identity (S-TMST) toward the MME via eNodeB which encapsulates the NAS: service request, tracking area identity (TAI), E-UTRAN cell global identifier (ECGI) in a S1-AP: message. The MME may perform authentication for the V2X UE due to operator policy. The MME may create an S1-AP: initial context setup request message comprising S-GW address and S1-TEID for uplink (UL), EPS bearer QoS, security context, and MME signaling connection ID. The MME may send the S1-AP: initial context setup request message toward UE via eNodeB which may store security context, MME signaling connection ID, EPS bearer QoS, and S1-TEID (UL). The eNodeB may establish the radio bearer with the V2X UE and the UE may now forward uplink data to the S-GW and thereafter PDN-GW. The eNodeB may send an S1-AP: initial context setup complete message comprising eNodeB address, list of accepted EPS bearers, list of rejected EPS bearers, S1-TEID for downlink (DL) towards the MME. The MME may send GTP: modify bearer request comprising eNodeB address, S1-TEID for DL user plane for accepted EPS bearers, delay downlink packet notification, and RAT type towards S-GW so the S-GW is able to send UE downlink data. In an example, the MME may transmit V2X UE capabilities and/or its V2X priority to PCEF. PCEF may transmit and/or receive one or more messages with PCRF comprising assigned QoS and/or PCC rules. The S-GW may send GTP: modify bearer request comprising with possible new information about UE and status such as RAT type, time, zone, location towards the PDN-GW which may interact with PCRF to get new PCC rules. The PDN-GW may send the GTP: modify bearer response back to S-GW. The S-GW may transmit GTP: modify bearer response comprising S-GW address and TEID towards MME. The dedicated EPS bearer with assigned QoS according to V2X user's subscription may now be established in FIG. 20.

In an example embodiment, V2X application function (AF) may offer an application requiring dynamic policy and/or charging control. In an example embodiment, V2X AF may communicate with policy and charging rules function (PCRF) to transmit the dynamic session information. PCRF may use that information to control the V2X service data flow, authorization of V2X service on incomplete service information (which may be used in e.g. IMS session setup when terminating side needs to resource allocate), gating, quality of service (QoS), and/or flow based charging. The V2X AF may also obtain the events of the bearer level information of the internet protocol connectivity to the access network (IP-CAN) such as the type of IP-CAN, transmission resource status (established/released/lost), access network charging correlation information, and/or credit denied.

In an example embodiment, the V2X AF may reject V2X service to a V2X UE if it receives a denial of a service from the PCRF that the service is not accepted for that V2X UE. The V2X AF may inform the V2X UE what would be accepted.

In an example embodiment, the V2X subscriber may define the priority of the V2X communication prior to initiation of such communications. The V2X subscriber may inform the V2X AS by using the V2X UE about the priority of the V2X service. If the V2X service may be an IMS application, an authorized Resource-Priority header field comprising an appropriate namespace and priority value may be used in the SIP message sent by the V2X UE to the V2X AS to identify the priority of the V2X service. If the V2X service may not be an IMS application, the priority value may be reached to the V2X AS as an information element dedicated to the priority in the signaling protocol used for V2X communications. The V2X AS may then convey this information to the PCRF by using a new dedicated V2X attribute value pairs (AVP) in the diameter AA-request transmitted by the V2X AF towards the PCRF. The PCRF may receive the AVP related to the V2X service and may adjust the IP-CAN to ensure that V2X service receives its assigned priorities.

In an example embodiment, the V2X subscriber may modify the priority of the V2X communication. The V2X subscriber may inform the V2X AS by using the V2X UE about the priority of the V2X service. If the V2X service is an IMS application, an authorized Resource-Priority header field comprising an appropriate namespace and priority value may be used in the SIP message sent by the V2X UE to the V2X AS to identify the priority of the V2X service. The V2X AS may convey this information to the PCRF by using a new dedicated V2X attribute value pairs (AVP) in the diameter AA-request transmitted by the V2X AS towards the PCRF. The PCRF may receive the AVP related to the V2X service and may modify the IP-CAN to ensure that V2X service V2X service receives its assigned priorities.

In an example embodiment, a new AVP may be created to implement the communication between the AF and the PCRF regarding the assigned priorities of V2X service. The new AVP may list a number of priority levels. The PCRF may employ those level to endure the IP-CAN is accordingly assigned to that V2X service. In an example embodiment, the AF and its functionalities may exist in a P-CSCF while in another example embodiment, the AF and its functionalities may exist in an application server (AS).

Figure 21:
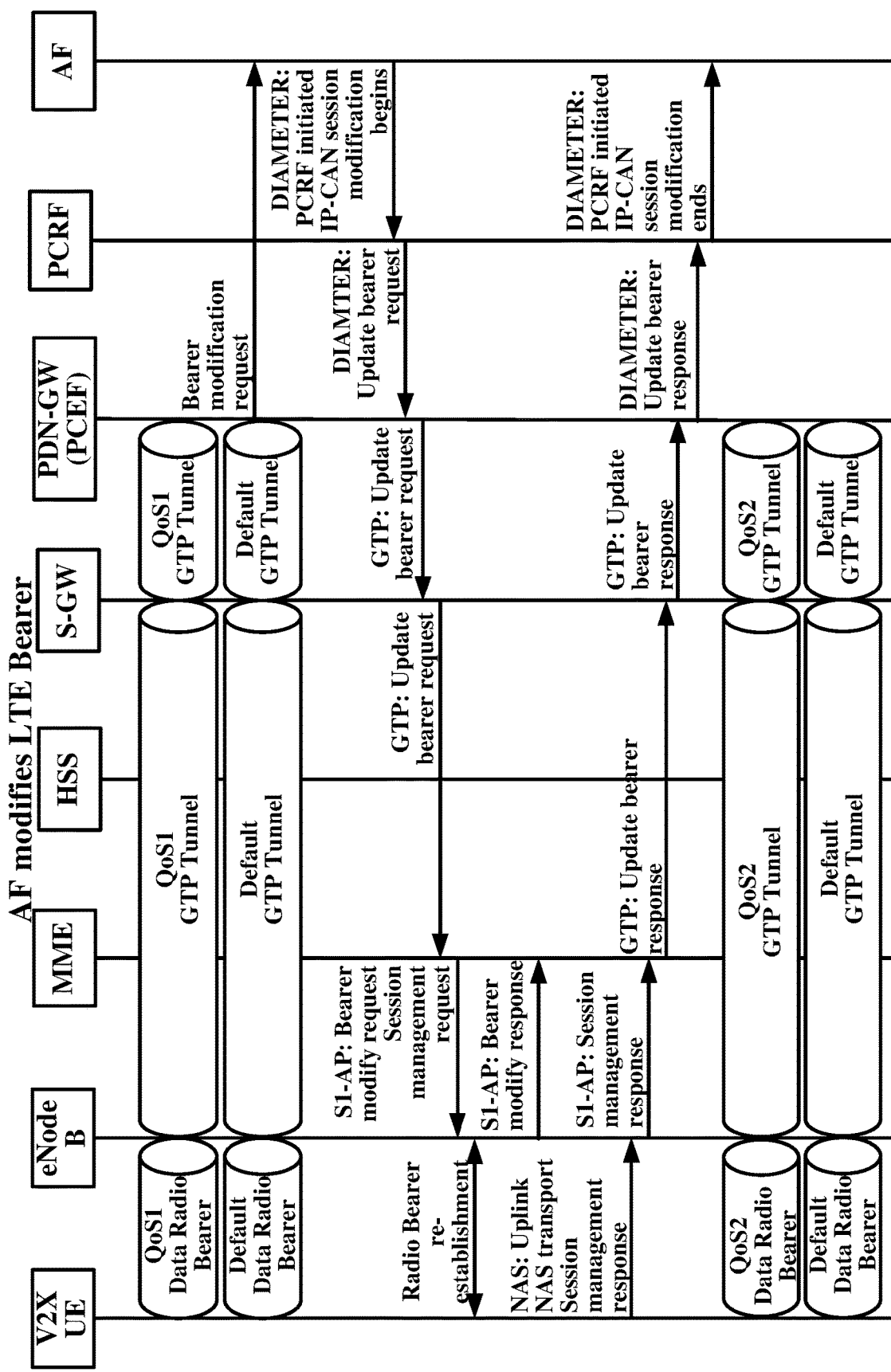
FIG. 21 is an example flow diagram showing an example process for an AF to modify an LTE Bearer as per an aspect of an embodiment of the present disclosure.

The flow diagram in the example embodiment in FIG. 21 shows the upgrade of the priority of the dedicated EPS bearer from QoS1 to QoS2 while the V2X UE having a dedicated EPS bearer with QoS1 and a default EPS bearer. The request may be triggered directly by the AF or a request directed to the AF. The latter is shown in this example embodiment. In FIG. 21 example embodiment, the AF is triggered by the e.g. the V2X user to upgrade the priority the V2X user may upgrade the priority of the V2X service by transmitting EPS bearer modification request as an authorized Resource-Priority header filed comprising an appropriate namespace and priority value in a SIP message if V2X service may be an IMS service. The EPS bearer modification may also be sent as a defined priority information element sent within an IP/UDP packet towards the V2X AF which may reside in a P-CSCF or in an AS. The AF initiate the IP-CAN session modification procedure. The PCRF may send a DIAMETER: update bearer request comprising a PCC decision provision (QoS2 policy) which may request the V2X user's location information and V2X UE time zone toward the PDN-GW. The PDN-GW may use the QoS2 policy to adjust the EPS bearer QoS and may use to generate the traffic flow template (TFT). The PDN-GW may create GTP: update bearer request message comprising procedure transaction identifier (PTI) for update bearer request, EPS bearer identity, EPS bearer QoS, APN-AMBR, and TFT. The PDN-GW may send the GTP: update bearer request toward the S-GW. The S-GW may send GTP: update bearer request message comprising PTI, EPS bearer identity, EPS bearer QoS, TFT, and APN-AMBR towards the MME. If the APN-AMBR has changed the MME may update the UE-AMBR is appropriate. The MME may create S1-AP: bearer modify request message comprising EPS bearer identity, EPS bearer QoS, UE-AMBR, and session management request message which is comprising PTI, EPS bearer QoS, TFT, APN-AMBR, and EPS bearer Identity. The MME may send the S1-AP: bearer modify request message towards the eNodeB. The eNodeB may map the modified EPS bearer QoS to the radio bearer QoS and it may send radio bearer QoS, session management request message, and EPD radio bearer towards the V2X UE. The V2X UE may store QoS2, radio priority, packet flow ID from the session management request message and modified APN-AMBR. The UE may provide the new EPS bearer QoS2 to the V2X application. The V2X UE may acknowledge the reception of the bearer modification request towards the MME via eNodeB. The UE create NAS: uplink NAS transport comprising session management response which is comprising EPS bearer identity and send it toward the MME via eNodeB. The MME may send GTP: session management response message comprising EPS bearer ID and the V2X user location towards the PDN-GW. The PDN-GW may send a provision acknowledge message towards PCRF to indicate that the QoS2 could have been enforced and it may inform the PCRF about user location information and the V2X UE time zone. The PCRF will inform the AF about the finalization of the IP-CAN session modification.

In an example embodiment, the V2X subscriber may register to the LTE network for V2X services. The V2X UE may inform the network about its V2X capability and the priority level of the V2X service, the V2X subscriber is assigned to at the time of the LTE registration. The mobility management entity (MME) due to the V2X UE's subscription may choose an IP-CAN bearer with a certain quality of service (QoS). The QoS may provide upper bound on the resources which may be reserved (guaranteed bit rate or GBR) or may be allocated (maximum bit rate or MBR) for the IP-CAN bearer. The policy and charging enforcement function (PCEF) may enforce the IP-CAN bearer QoS. The initial IP-CAN bearer at the time of NAS attach message may be default EPS bearer context which may not have any specific QoS. The PCEF may receive new policy control and charging (PCC) rules from the PCRF via Gx reference point to enforce new IP-CAN bearer QoS. The network may then use NAS activate dedicated EPS bearer context request message to assigned the QoS assigned to the V2X subscriber.

In an example embodiment, the V2X subscriber who may be already registered to the LTE network for V2X services, may request an upgrade to the priority of the V2X service by using NAS bearer resource allocation request or NAS bearer resource modification request.

Figure 22:
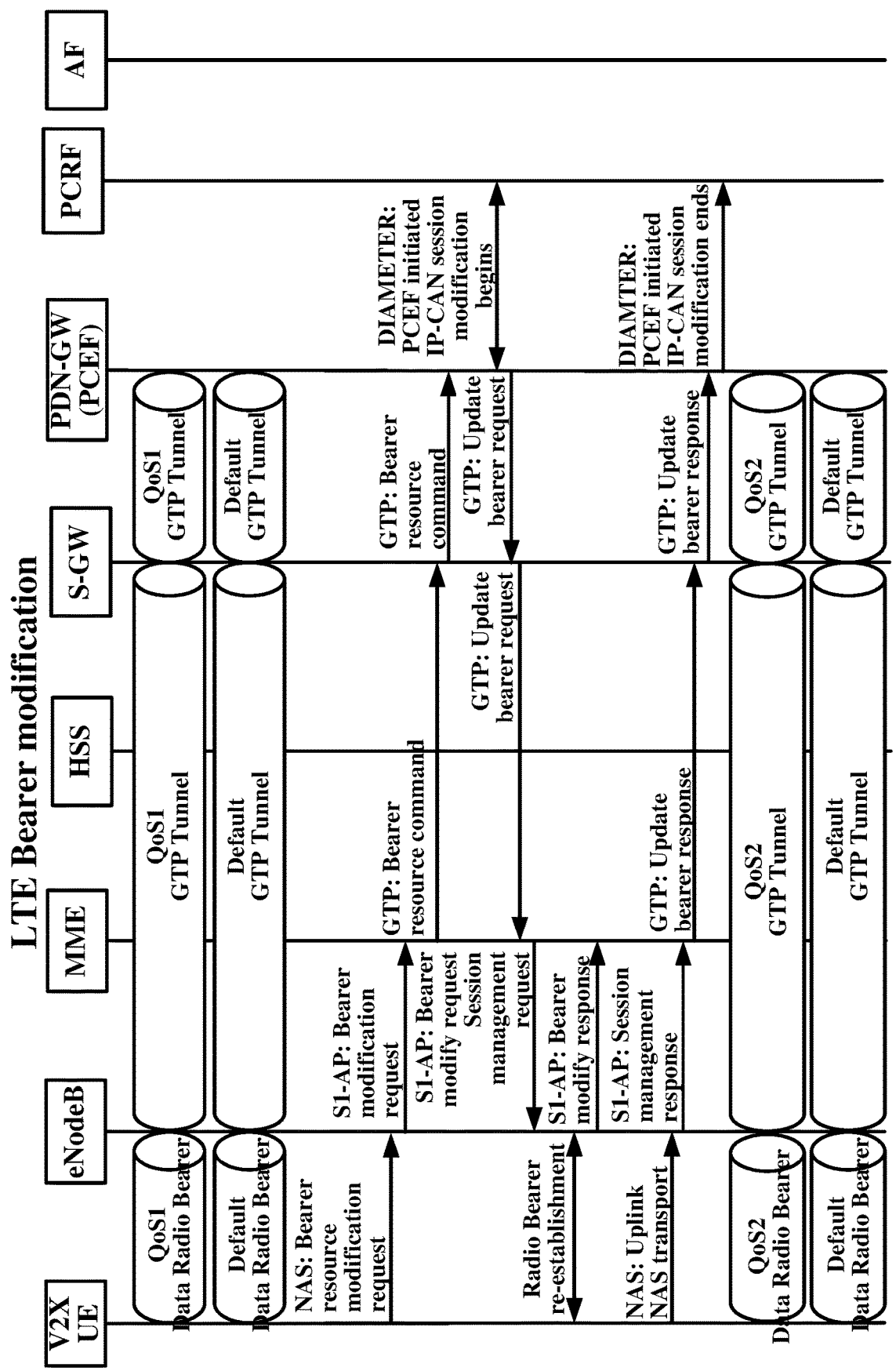
FIG. 22 is an example flow diagram showing an example process for LTE Bearer modification as per an aspect of an embodiment of the present disclosure.

The flow diagram in the example embodiment in FIG. 22 shows the upgrade of the priority of the dedicated EPS bearer from QoS1 to QoS2 while the V2X UE having a dedicated EPS bearer with QoS1 and a default EPS bearer. The request may be triggered directly by use of NAS. In FIG. 22 example embodiment, the V2X may employ NAS to upgrade the priority the V2X UE may send a NAS: bearer resource modification request message comprising linked bearer identity (LBI), PTI, EPS bearer ID, QoS2, and traffic aggregate description (TAD) towards the MME. The TAD is comprising the existing packet filter and guarantee bit rate (GBR) requirement for EPS bearer to increase the GBR. The MME may send GTP: bearer resource command message comprising IMSI, LBI, PTI, EPS bearer ID, QoS2, and TAD towards the S-GW. The S-GW may send GTP: bearer request command message comprising IMSI, LBI, PTI, EPS bearer ID, QoS2, and TAD towards the same PDN-GW as identified by the LBI. The PDN-GW may interact with the PCRF to trigger appropriate PCC decision with the V2X user's subscription information. In order to make this decision, the PDN-GW may provide the PCRF the content of TAD regarding the filter packet and the GBR requirement for the EPS bearer. The PCRF may request for the V2X user's location information and the V2X UE time zone. The PDN-GW may send the GTP: update bearer request toward the S-GW. The S-GW may send GTP: update bearer request message comprising PTI, EPS bearer identity, EPS bearer QoS, TFT, and APN-AMBR towards the MME. If the APN-AMBR has changed the MME may update the UE-AMBR is appropriate. The MME may create S1-AP: bearer modify request message comprising EPS bearer identity, EPS bearer QoS, UE-AMBR, and session management request message which is comprising PTI, EPS bearer QoS, TFT, APN-AMBR, and EPS bearer Identity. The MME may send the S1-AP: bearer modify request message towards the eNodeB. The eNodeB may map the modified EPS bearer QoS to the radio bearer QoS and it may send radio bearer QoS, session management request message, and EPD radio bearer towards the V2X UE. The V2X UE may store QoS2, radio priority, packet flow ID from the session management request message and modified APN-AMBR. The UE may provide the new EPS bearer QoS2 to the V2X application. The V2X UE may acknowledge the reception of the bearer modification request towards the MME via eNodeB. The UE create NAS: uplink NAS transport comprising session management response which is comprising EPS bearer identity and send it toward the MME via eNodeB. The MME may send GTP: session management response message comprising EPS bearer ID and the V2X user location towards the PDN-GW. The PDN-GW may send a provision acknowledge message towards PCRF to indicate that the QoS2 could have been enforced and it may inform the PCRF about user location information and the V2X UE time zone.

In an example, the embodiment may register to the LTE network as for being V2X UE capable in the wireless network at the time of NAS attachment procedure. In one example, the embodiment may define the AF as being a part of the P-CSCF and another embodiment may define AF as being a part of AS. In an example, the embodiment may modify the priority of the V2X service directly to the V2X AF by Resource-Priority header field in a SIP message while another embodiment may use a defined information element for this modification.

In an example, the embodiment may define a new dedicated AVP for V2X service, in the diameter AA-request transmitted by the V2X AF towards the PCRF, wherein the new AVP may modify the priority of the V2X service in terms of new QoS assignment. In an example, the embodiment sent by PCRF towards PCEF may authorized a new PCC rules due to the new priority to V2X service assigned by AF.

In one example, the embodiment may assign new dedicated EPS bearer with new QoS to fulfill the requirement for the new priority for the V2X service. In an example, the embodiment may attach to LTE network with a predefined default EPS bearer context, wherein the network may check the V2X subscription priority and may request the V2X UE to upgrade the EPS bearer connectivity to upgrade the QoS.

In an example embodiment, the V2X subscriber may upgrade the QoS for the dedicated EPS bearer context by using NAS ESM message, wherein the PCEF may check the PCC rules in the PCRF via Gx reference point for the V2X subscriber and may allow the upgrade due to the PCC rule.

Figure 23:
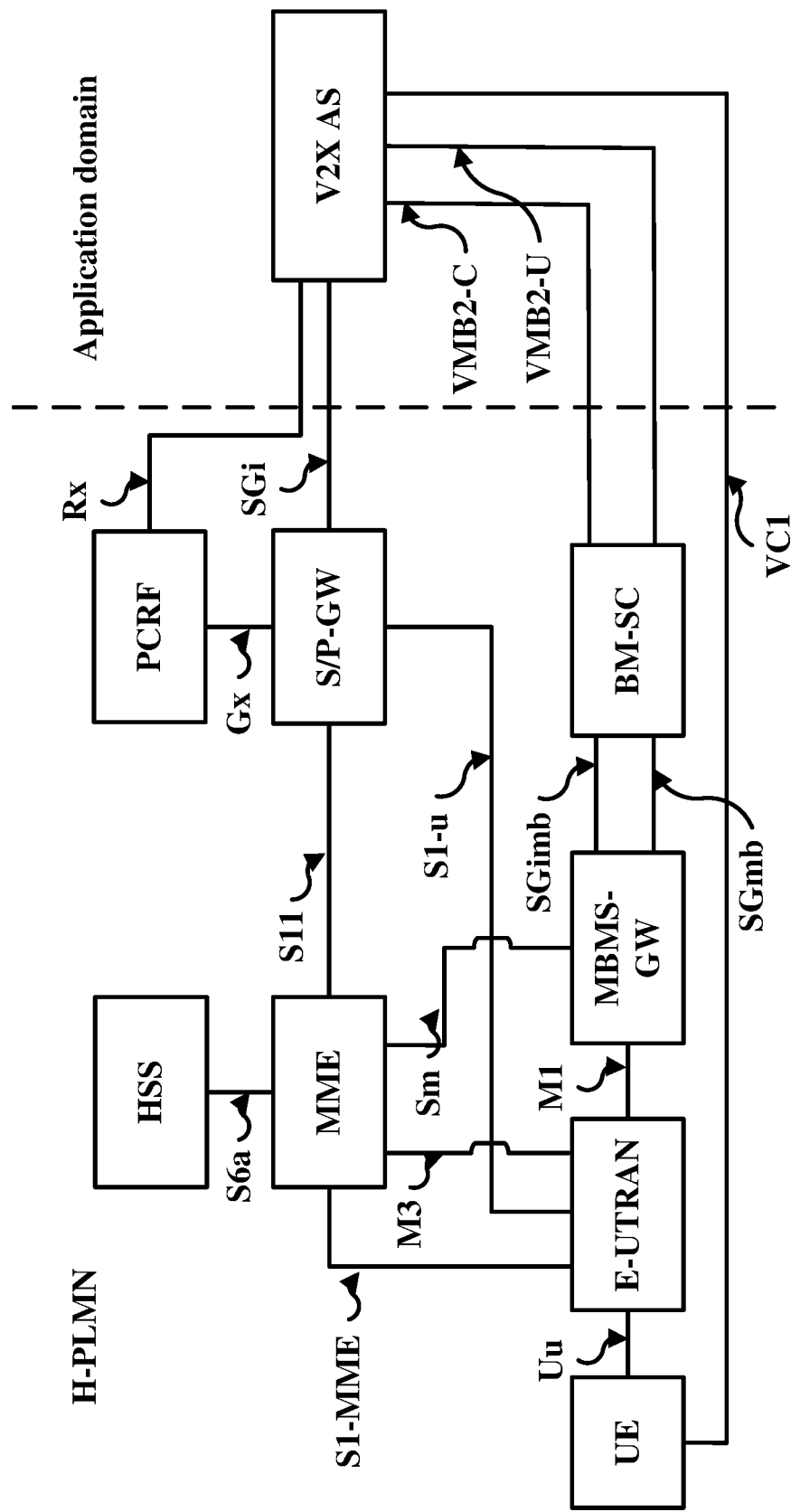
FIG. 23 is a block diagram of a V2X broadcast multicast architecture as per an aspect of an embodiment of the present disclosure.

In an example embodiment, shown in FIG. 23, V2X may be considered as group communication system enabler which may employ E-UTRAN broadcast multicast bearer for delivering the media to the end users, where MBMS-GW=multimedia broadcast multicast service gateway, BM-SC=broadcast multicast service center, PCRF=policy charging rules function.

In an example embodiment, VMB2 reference point may provide ability for V2X AS to request allocation of temporary mobile group identifiers (TMGIs) from BM-SC. In an example embodiment, VMB2 reference point may provide ability for V2X AS to request deallocation of TMGIs from BM-SC. In an example embodiment, VMB2 may provide the ability for BM-SC to report the status of MBMS bearer to V2X AS. In an example embodiment, VC1 reference point may provide ability for V2X AS to send the information about connectivity to the broadcast bearer to the V2X UE. In an example embodiment, the VC1 reference point may provide the ability for V2X UE to send information about broadcast multicast coverage to the V2X AS.

In an example embodiment, the reference point VC1 may employ SIP for communication between the V2X UE and the V2X AS. The dialogs, new dialogs, and the standalone transactions between the V2X UE and the V2X AS may comprise requests and responses which may employ one or more IMS communication service identifiers (ICSIs) of V2X and ICSIs of broadcast/multicast V2X service. One of the one or more ICSIs may indicate at least one of pedestrian, vehicle infrastructure, vehicle-to-vehicle, vehicle-to-pedestrian, vehicle-to-network, and/or vehicle-to-infrastructure capabilities of the V2X service. ICSI may be in the form of a media feature tag. A feature tag may indicate the V2X service. For, example a specific feature tag, such as 3gpp-service.ims.icsi.v2x may indicate the V2X service or 3gpp-service.ims.icsi.v2n may indicate the vehicle-to-network capability. A feature tag may indicate one or more capability of the V2X service. For, example a specific feature tag, such as 3gpp-service.ims.icsi.v2x.rsu may indicate infrastructure capability of the V2X service. A feature tag may indicate the broadcast/multicast service. For, example a specific feature tag, such as 3gpp-service.ims.icsi.v2x.multicast may indicate the multicast/broadcast V2X service or 3gpp-service.ims.icsi.v2n.multicast may indicate the multicast/broadcast vehicle-to-network service. These are examples, other features tag names may be used. One or more ICSI may indicate a combination of at least two of pedestrian, vehicle, infrastructure, vehicle-to-vehicle, vehicle-to-pedestrian, vehicle-to-network, and/or vehicle-to-infrastructure capabilities of the V2X service. For example, a feature tag 3gpp-service.ims.icsi.v2x, may indicate capability for vehicle, pedestrian, infrastructure, vehicle-to-vehicle, vehicle-to-pedestrian, vehicle-to-network, and/or vehicle-to-infrastructure. In an example, a feature tag 3gpp-service.ims.icsi.v2x.emergency, may indicate capability for emergency vehicle, emergency pedestrian, emergency infrastructure, emergency vehicle-to-vehicle, emergency vehicle-to-pedestrian, emergency vehicle-to-network, and/or emergency vehicle-to-infrastructure.

In an example embodiment, the message for the dialog, new dialog, and the standalone transaction between V2X UE and V2X AS over VC1 reference point may further employ one or more IMS application reference identifiers (IARIs). One of the one or more IARIs may indicate at least one of pedestrian, vehicle, infrastructure, vehicle-to-vehicle, vehicle-to-pedestrian, vehicle-to-network, and/or vehicle-to-infrastructure capabilities of the V2X application. IARI may be in the form of a media feature tag. A feature tag may indicate the V2X application. For, example a specific feature tag, such as 3gpp-application.ims.iari.v2x may indicate the V2X application or 3gpp-application.ims.iari.ve2 may indicate the vehicle-to-network application. A feature tag may indicate the broadcast/multicast application. For, example a specific feature tag, such as 3gpp-application.ims.iari.v2x.multicast may indicate the multicast/broadcast V2X application or 3gpp-application.ims.iari.v2n.multicast may indicate the multicast/broadcast vehicle-to-network application. A feature tag may indicate one or more capability of the V2X application. For, example a specific feature tag, such as 3gpp-application.ims.iari.v2x.vehicle may indicate V2X UE with vehicle capability or 3gpp-application.ims.iari.v2x.vehicle-to-vehicle may indicate V2X UE with vehicle-to-vehicle capability. These are examples and other features tag names may be used. One or more IARI may indicate a combination of at least two of pedestrian, vehicle, infrastructure, vehicle-to-vehicle, vehicle-to-pedestrian, vehicle-to-network, and/or vehicle-to-infrastructure capabilities of the V2X application. For example, a feature tag 3gpp-application.ims.iari.v2x may indicate capability for V2X which may be vehicle, pedestrian, infrastructure, vehicle-to-vehicle, vehicle-to-pedestrian, vehicle-to-network, and/or vehicle-to-infrastructure.

In one example, a feature tag 3gpp-application.ims.iari.v2x.emergency may indicate capability for V2X which may be emergency vehicle, emergency pedestrian, emergency infrastructure, emergency vehicle-to-vehicle, emergency vehicle-to-pedestrian, emergency vehicle-to-network, and/or emergency vehicle-to-infrastructure.

In another example, one or more additional parameters may be included in the new dialog establishment or a standalone transaction along with a feature tag to indicate the V2X device capability or a combination of one or more capabilities of the V2X device.

In an implementation, the V2X UE may transmit the message to establish a dialog, new dialog, or as a standalone transaction to a UE relay via PC5 which relays message to the V2X AS via VC1. The V2X UE may discover the UE relay using discovery model A or model B. In an example, the UE relay may decode the message for new dialog establishment or for the standalone transition and may update the message headers before retransmitting the message. The UE relay may update the source and destination address in the message for the new dialog and standalone transaction.

Figure 24:
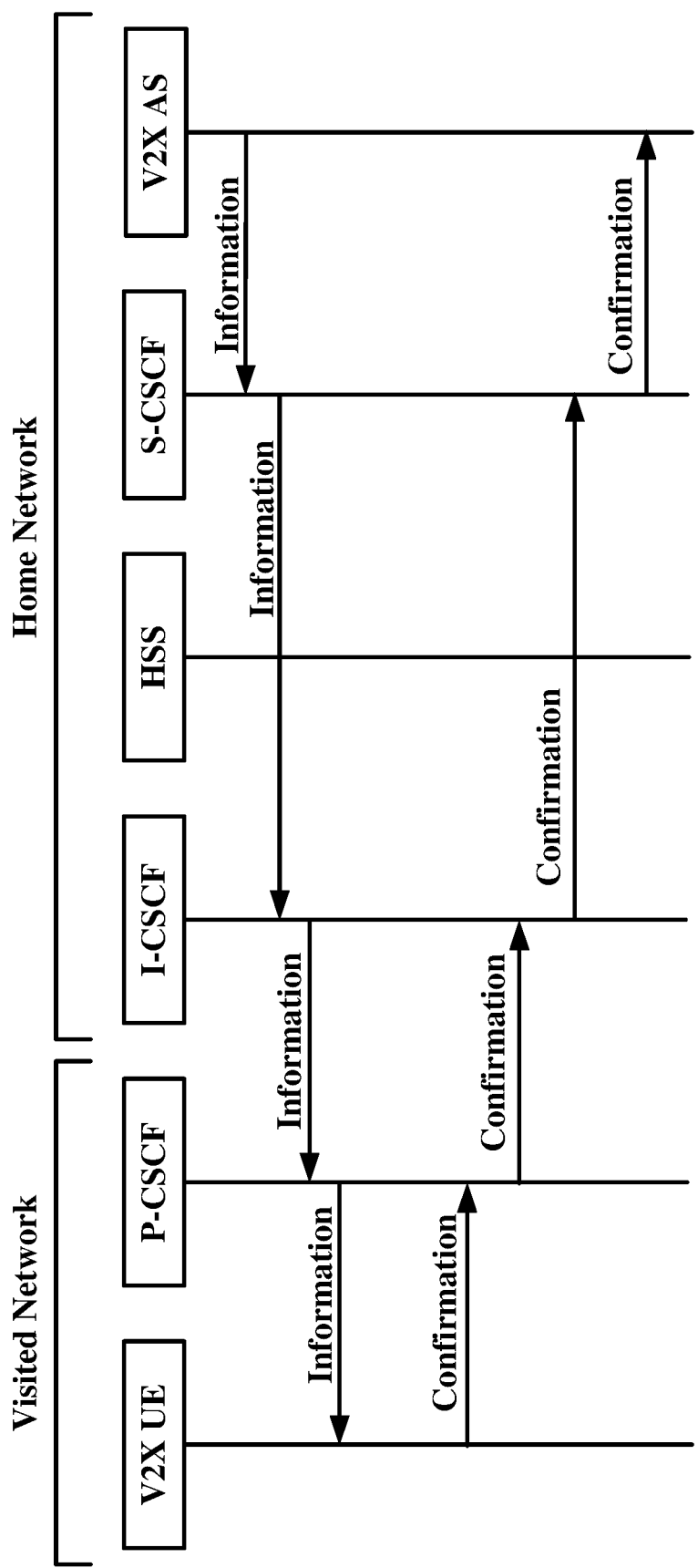
FIG. 24 is a flow diagram showing an example process of a V2X AS sending information about a broadcast/multicast bearer to a V2X UE as per an aspect of an embodiment of the present disclosure.

The flow diagram in the example embodiment in FIG. 24 shows a V2X AS sends information about broadcast/multicast bearer to the V2X UE. FIG. 24 shows that V2X AS may get the broadcast/multicast information from MS-BC and pass on to the V2X UE by employing a dialog, a new dialog, and/or a standalone transaction which comprises one or more ICSIs of V2X and/or one or more IARIs of V2X service/application and/or one or more ICSIs of V2X and/or one or more IARIs of broadcast/multicast service/application. In an example embodiment, the information may be about availability of broadcast/multicast bearer and the details for its connectivity. In an example embodiment, the information may be an update of the details of the broadcast/multicast bearer. In an example embodiment, the information may be the request for the release of the broadcast/multicast bearer. In an example embodiment, the information may be about the unicast bearer. V2X UE may confirm V2X AS the reception of the information.

Figure 25:
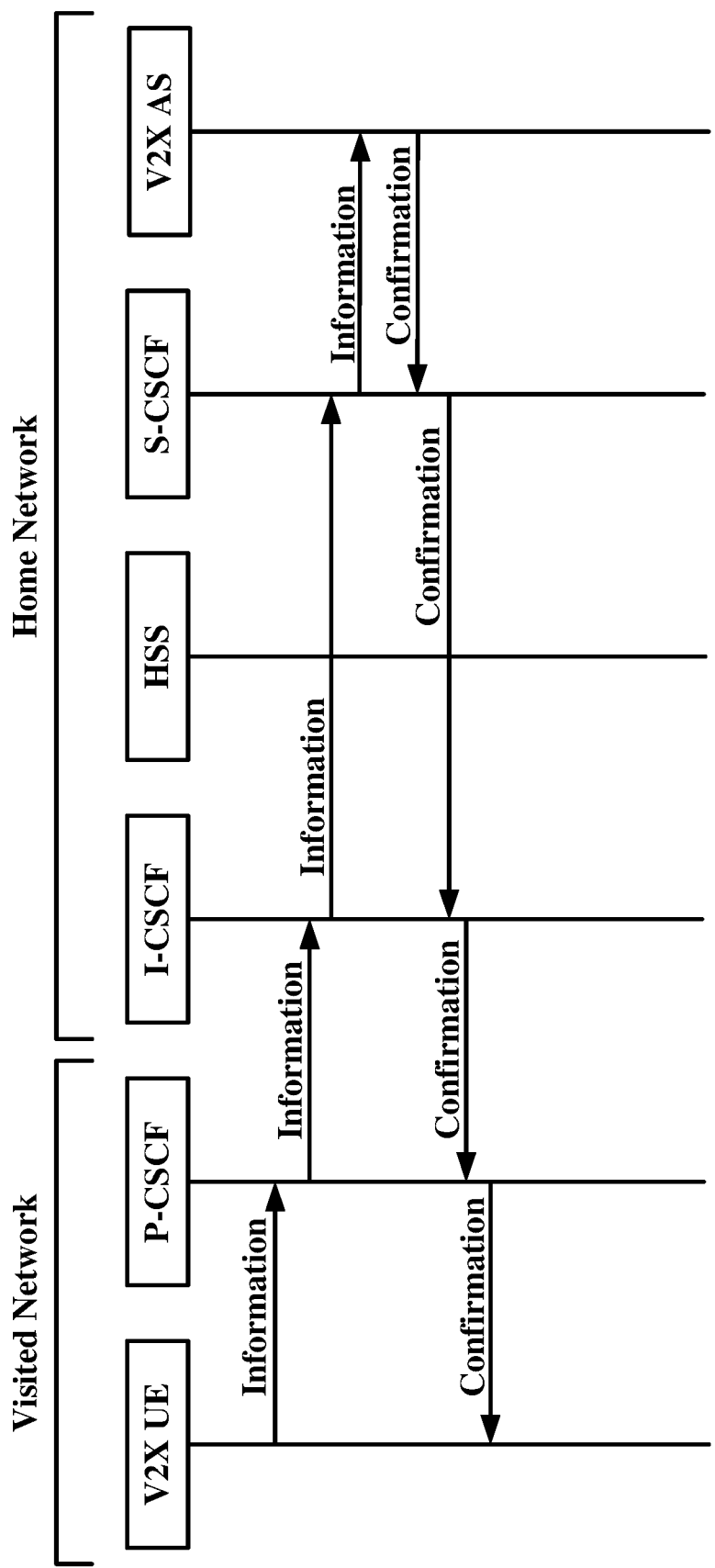
FIG. 25 is a flow diagram showing an example process of a V2X AS sending information about a broadcast/multicast bearer to a V2X AS as per an aspect of an embodiment of the present disclosure.

The flow diagram in the example embodiment in FIG. 25 shows a V2X UE sends information about broadcast/multicast bearer to the V2X AS. FIG. 25 shows that V2X UE may realize that it has lost the broadcast/multicast bearer coverage and may request V2X AS an update for the broadcast/multicast bearer by employing a dialog, a new dialog, and/or a standalone transaction which comprises one or more ICSIs of V2X and/or one or more IARIs of V2X service/application and/or one or more ICSIs of V2X and/or one or more IARIs of broadcast/multicast service/application. In an example embodiment, the information may be about updating the details of the broadcast/multicast bearer. In an example embodiment, the information may be about releasing the broadcast/multicast bearer and moving to the unicast bearer.V2X AS may confirm V2X UE the reception of the information.

V2X communication may rely on group discovery e.g. the members of a group discover each other in prior to the V2X group communications. The V2X group communication may be either on-network or off-network. The on-network V2X group communication may rely on having access to the network while the off-network may be the direct communications among the group members without any network involvements.

Depending on the geographic pattern, locations, velocity, etc. the members of an V2X group may come close to each other or get far apart. The V2X group members may need to keep track of each other by the periodic V2X discovery mechanism.

Examples for V2X direct discovery methods are Model A and Model B.

Model A may include the following examples two roles for the V2X-enabled UEs that are participating in V2X direct discovery: announcing UE: a) The UE may announce certain information that may be used by UEs in proximity that have permission to discover. b) monitoring UE: The UE that may monitor certain information of interest in proximity of announcing UEs.

In Model A, the announcing UE may broadcast discovery messages at discovery intervals (e.g. pre-defined intervals) and the monitoring UEs that are interested in these messages may read them and may process them. In an example, this model may be equivalent to "I am here" since the announcing UE may broadcast information about itself e.g. its V2X application code in the discovery message.

The UE may act as "announcing UE" in the carrier frequency signaled by the serving PLMN when using Model A mode. The UE may act as a "monitoring" UE in the resources of the serving PLMN and local PLMNs, when using Model A mode. When inter-PLMN discovery transmission is supported, the carrier frequency may be operated by a PLMN other than the serving PLMN. Open and/or restricted discovery types may be supported by Model A. If V2X is not employed as a mission critical feature, the discovery may be open discovery. If V2X is employed for mission critical communication, the discovery may be restricted.

Model B, when restricted discovery type is used, may include the following examples two roles for the V2X-enabled UEs that are participating in V2X direct discovery: a) discoverer UE: The UE may transmit a request containing certain information about what it is interested to discover. b) discoveree UE: The UE that may receive the request message may respond with some information related to the discoverer's request.

In an example embodiment, it is equivalent to "who is there/are you there". The discoverer UE may send information about other UEs that may like to receive responses from, e.g. the information may be about a V2X application identity corresponding to a group and the members of the group may respond.

When using Model B discovery, the discoverer UE and discoveree UE may announce in the carrier frequency signaled by the serving PLMN. When inter-PLMN discovery transmission is supported, the carrier frequency may be operated by a PLMN other than the serving PLMN. The discoverer UE and discoveree UE may be allowed to monitor in the serving PLMN and Local PLMNs when authorized. In an example implementation, only restricted discovery type may be supported by Model B. In an example application, the public safety discovery may be considered restricted. The monitoring UE/discoverer UE may need to have authorization (such as through pre-provisioned parameters) to perform discovery of the appropriate service(s).

In an example embodiment, the V2X discovery may be considered open and depending on Model A, it may use V2X application code for Model A.

In an example embodiment, the V2X discovery may be considered restricted and depending on Model A or Model B, it may use V2X restricted application code for Model A, it may use V2X query code/V2X response code respectively for Model B.

These code parameters may be n bits, e.g. 64 bits, and may be part of V2X application code. In an example embodiment, the code parameters may correspond to one or more V2X application ID(s). In an example embodiment, where the restricted discovery may be used, the code parameters may correspond to one or more restricted V2X application user ID(s) (RPAUID). In an example embodiment, where the restricted discovery may be used, the V2X application user ID may be allocated and bound to V2X discovery UE ID (PDUID) by the V2X application server.

Figure 26:
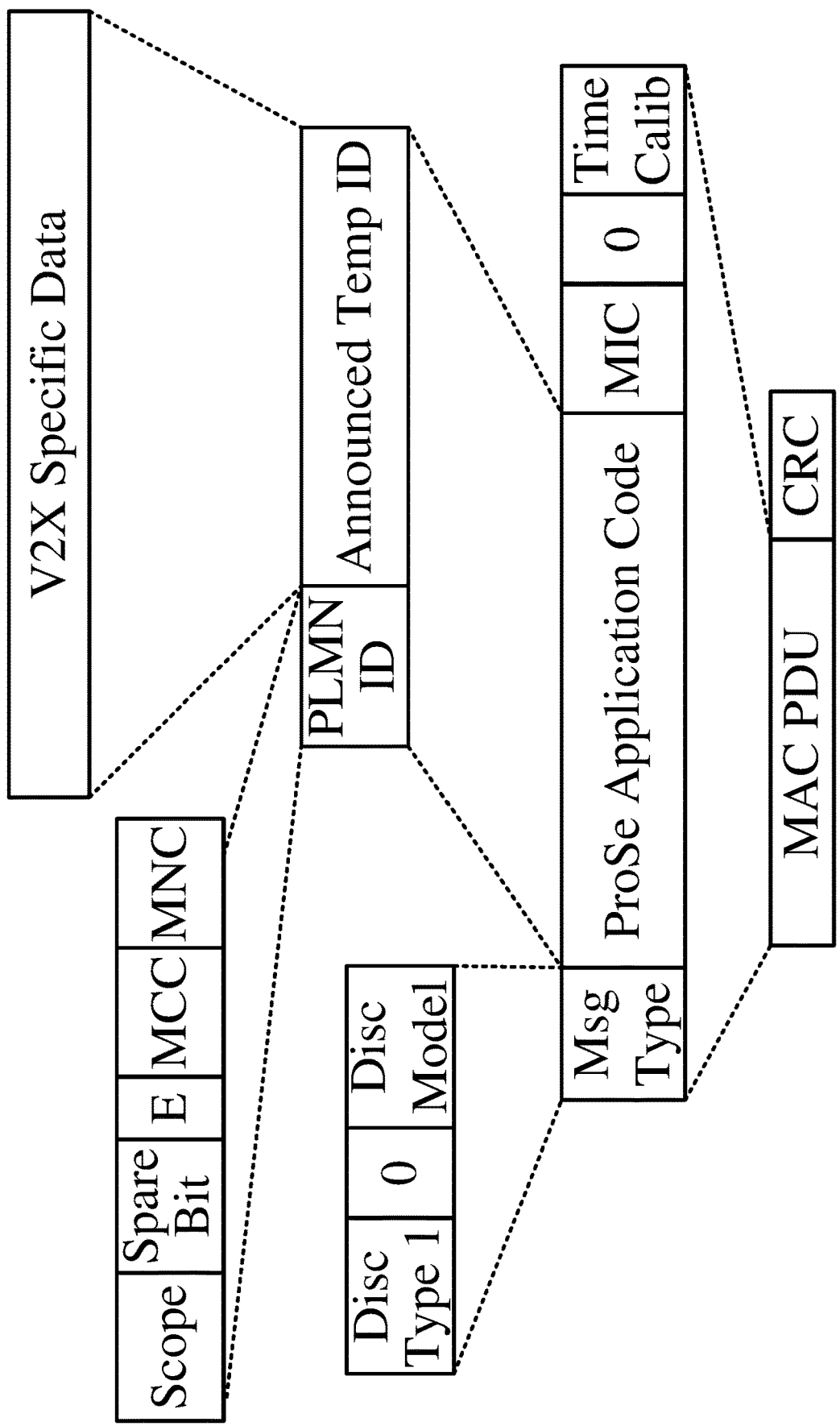
FIG. 26 is a diagram showing an example V2X discovery message as per an aspect of an embodiment of the present disclosure.

The figure in the example embodiment in FIG. 26 shows the V2X discovery message which is employed for discovery procedures in Model A and Model B.

Model A may comprise procedures for the announcing V2X UE and procedures for the monitoring V2X UE. Model A may include matching procedure for the case when the monitoring V2X UE may receive V2X code over the air that matches the discovery filter provided by the HPLMN V2X function to the monitoring V2X UE in the discovery response message, however the corresponding V2X application identity or restricted V2X application UE identity (RPAUID) may not have valid validity timer.

Figure 27:
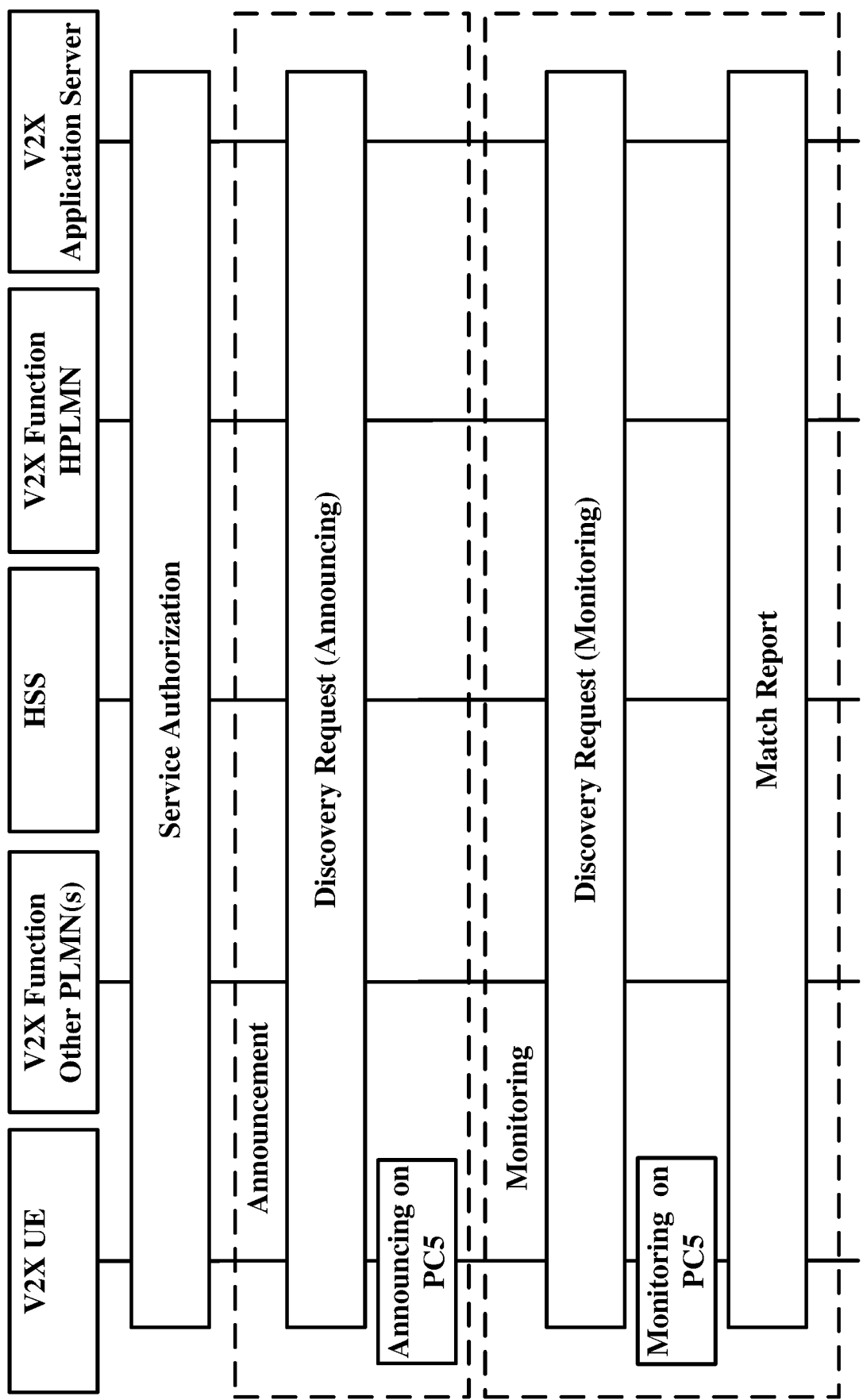
FIG. 27 is a flow diagram showing an example process for Model A Discovery as per an aspect of an embodiment of the present disclosure.

The flow diagram in the example embodiment in FIG. 27 shows the procedures for Model A Discovery. The procedure for the Model A discovery may be as authorization, announcement, and monitoring.

Model A authorization: In an example embodiment, the V2X UE may get authorized for V2X direct discovery. In an example embodiment, if V2X service is restricted, the V2X UE may get authorized for restricted V2X direct discovery.

Model A announcement: In an example embodiment, the announcing V2X UE may request for discovery and may receive the V2X application code (or V2X application code prefix and V2X application code suffix(es), if the application-controlled extension is used). The announcing V2X UE may announce the V2X application code (or V2X application code prefix and V2X application code suffix(es) if the application-controlled extension is used). In an example embodiment, if V2X employs restricted discovery, the announcing V2X UE may request for discovery and may receive the V2X restricted code (or V2X restricted code prefix and V2X restricted code suffix(es) to announce itself, if the application-controlled extension is used). The announcing V2X UE may announce the V2X restricted code (or V2X restricted code prefix and V2X restricted code suffix(es), if the application-controlled extension is used).

Model A monitoring: In an example embodiment, the monitoring V2X UE may request for discovery and may receive the V2X discovery filter(s) comprising the V2X application ID (or V2X application ID prefix and V2X application ID suffix(es), if the application-controlled extension is used). The monitoring V2X UE may monitor for the V2X application ID (or V2X application ID prefix and V2X application ID suffix(es), if the application-controlled extension is used). The monitoring UE may match-report if having monitored V2X application code that does not match the locally V2X application ID (or V2X application ID prefix and V2X application ID suffix(es), if the application-controlled extension is used). In an example embodiment, if the V2X service is restricted, the monitoring V2X UE may request for discovery and may receive the V2X discovery filter(s) comprising the V2X restricted code (or V2X restricted code prefix and V2X restricted code suffix(es), if the application-controlled extension is used). The monitoring V2X UE may monitor for the V2X restricted code (or V2X restricted code prefix and V2X restricted code suffix (es), if the application-controlled extension is used). The monitoring UE may match-report if having monitored V2X restricted code (or V2X restricted code prefix and V2X restricted code suffix(es), if the application-controlled extension is used) matches the discovery filter but the corresponding PRAUID associated with it, does not have a valid validity timer.

Figure 28:
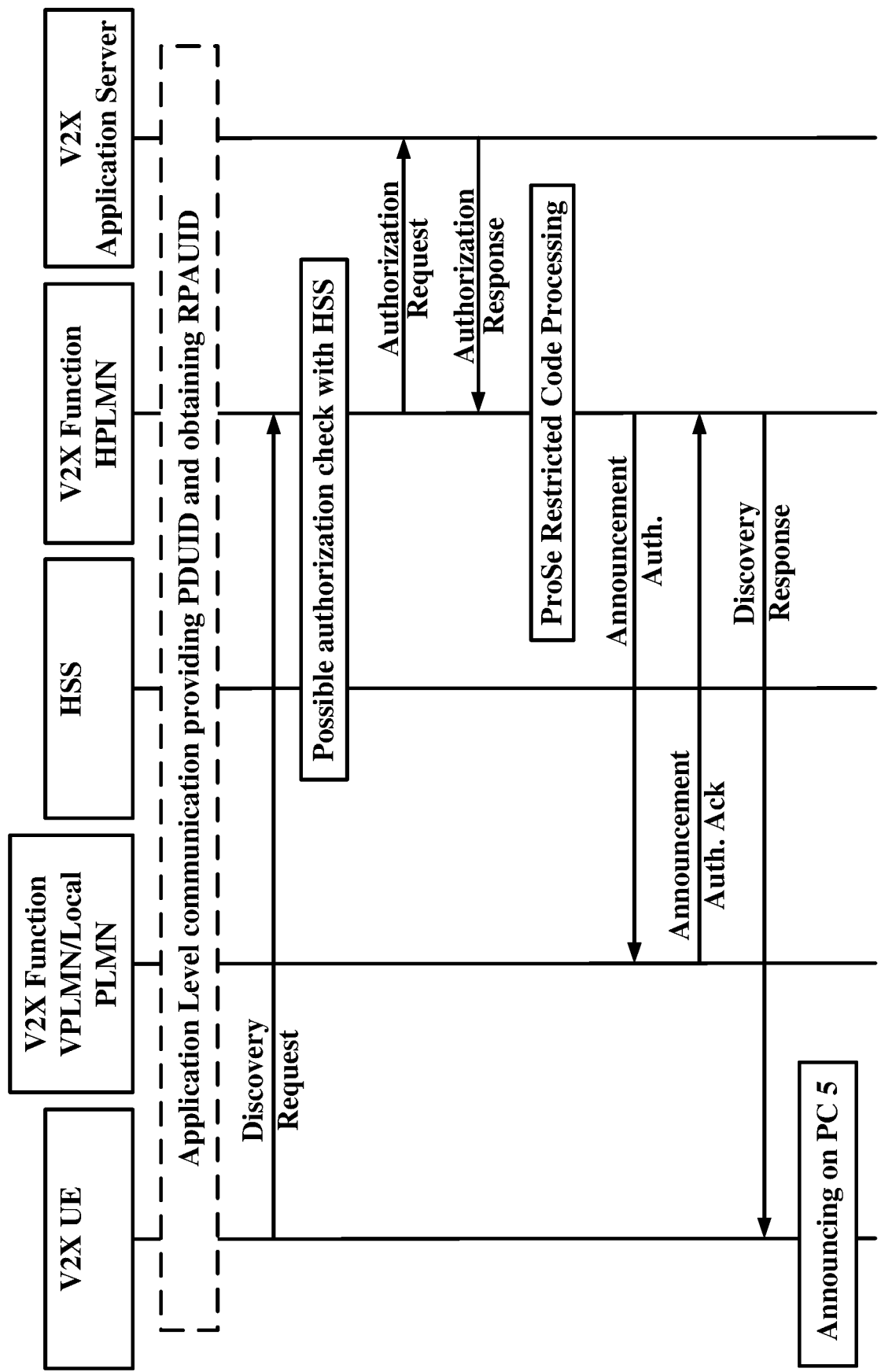
FIG. 28 is a flow diagram showing an example process for announcing a V2X UE as per an aspect of an embodiment of the present disclosure.

The flow diagram in the example embodiment in FIG. 28 shows the procedure for announcing V2X UE. In an example embodiment, if discovery is not restricted, the V2X UE may be configured with V2X application ID corresponding to the HPLMN. If the discovery is restricted, the application client in the V2X UE may retrieve the V2X discovery UE identity (PDUID) and may provide it to the V2X application server. The V2X application server may allocate a restricted V2X application UE identity (RPAUID) for that PDUID, may store the binding between the PDUID and the RPAUID and may return the RPAUID to the application client in the V2X UE. V2X UE may use RPAUID instead of PDUID since the announcement is restricted.

Procedure for the announcing V2X UE is In an example embodiment, if discovery is not restricted, the V2X UE may construct a discovery request message comprising V2X application ID, UE identity set to international mobile subscriber identity (IMSI), command=announce, discovery type set to open discovery, application ID set to unique identifier of the V2X application ID, discovery entry ID indicating if this is a new request, optional requested discovery timer set to validity timer associated with the expected V2X restricted code from the HPLMN V2X function (if it is set to zero, the V2X UE is requesting to remove the discovery entity ID and release the associated resources), (if application-controlled extension may be used) application level container containing the request and the relevant information, and the PLMN ID of the carrier frequency in announcing PLMN ID if the serving PLMN signaled carrier frequency is not operated by HPLMN or VPLMN and if inter-PLMN V2X discovery transmission is supported. V2X UE may send the discovery request message to HPLMN V2X function. If the discovery is restricted, the V2X UE may construct a discovery request message comprising RPAUID, UE identity set to international mobile subscriber identity (IMSI), command=announce, discovery type set to restricted discovery, application ID set to unique identifier of the V2X application ID, discovery entry ID indicating if this is a new request, optional requested discovery timer set to validity timer associated with the expected V2X restricted code from the HPLMN V2X function (if it is set to zero, the V2X UE is requesting to remove the discovery entity ID and release the associated resources), (if application-controlled extension may be used) application level container containing the request and the relevant information, announcing type such as "on demand" for the indicated application, and the PLMN ID of the carrier frequency in announcing PLMN ID if the serving PLMN signaled carrier frequency is not operated by HPLMN or VPLMN and if inter-PLMN V2X discovery transmission is supported. V2X UE may send the discovery request message to HPLMN V2X function.

In an example embodiment of a procedure for the announcing V2X UE, if the discovery is not restricted, HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered. If the discovery is restricted, HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered.

In an example embodiment of a procedure for the announcing V2X UE, if the discovery is not restricted, the HPLMN V2X function may send an authorization request comprising V2X application ID and request type set to "open discovery/announce" towards the V2X application server. The authorization request may contain allowed number of suffixes if open direct discovery with application-controlled extension is used. The request type may be set to "open discovery with application-controlled extension/announce". If the discovery is restricted, the HPLMN V2X function may send an authorization request comprising RPAUID and request type set to "restricted discovery/announce" towards the V2X application server. The authorization request may contain allowed number of suffixes if restricted direct discovery with application-controlled extension is used. The request type may be set to "restricted discovery with application-controlled extension/announce".

In an example embodiment of a procedure for the announcing V2X UE, if the discovery is not restricted, the V2X application server may answer by an authorization response comprising response type set to "open discover/announce ack". The authorization respond may include V2X application code suffix pool with allocated suffixes by the V2X application if the open direct discovery with application-controlled extension is used. the response type may be set to "open discovery with application-controlled extension/announce ack". If the discovery is restricted, the V2X application server may answer by an authorization response comprising PDUID(s) corresponding the RPAUID stored in the V2X application server and response type set to "restricted discover/announce ack". The authorization respond may include V2X restricted code suffix pool with allocated suffixes by the V2X application if restricted direct discovery with application-controlled extension is used. the response type may be set to "restricted discovery with application-controlled extension/announce ack".

In an example embodiment of a procedure for the announcing V2X UE, if the discovery is restricted, the HPLMN V2X function may assign a V2X restricted code corresponding to the RPAUID in the discovery request and an associated validity timer which may identify the duration of validity of the V2X restricted code. The V2X UE may use this V2X restricted code within this validity duration if PLMN is not changed. If restricted direct discovery with application-controlled is used, then the HPLMN V2X functions assigns V2X restricted code prefix instead of V2X restricted code. If discovery request message indicates "on demand" announcing and the "on demand" announcing is authorized and enabled based on application ID and operator's policy, the HPLMN V2X function may store RPAUID, V2X restricted code (or V2X restricted code prefix) with the associated validity timer, and enabled indicator in the user context. "On demand" announcing may be activated based on an ongoing monitoring request, otherwise, the following steps are not executed.

In an example embodiment of a procedure for the announcing V2X UE, if the discovery is not restricted, the HPLMN V2X function may check whether the V2X UE is authorized to use the V2X application ID in the original request. If V2X UE is authorized, the HPLMN V2X function may inform the PLMN where the V2X UE visiting at by sending an announce authorization comprising V2X application ID, V2X application code (or V2X application code prefix and V2X application code suffixes if application-controlled extension is used), V2X UE identity set to IMSI or mobile station identifier number (MSISDN), validity timer for charging purposes, and showing how long the V2X application code is valid discovery entry ID, and possible metadata. If the discovery is restricted, if the discovery request is authorized, HPLMN V2X function may construct announce authorization message containing RPAUID, V2X application ID, V2X restricted code (or V2X restricted code prefix with V2X restricted code suffix pool if restricted direct discovery with application-controlled extension is used) set to assigned code for this request, UE ID set to IMSI or mobile station identifier number (MSISDN), discovery entry ID, and validity timer. The HPLMN V2X function may update the existing announcing V2X UE's discovery entry with the new V2X restricted code (or the V2X restricted code prefix with V2X restricted code suffix pool if restricted direct discovery with application-controlled extension is used) and the new validity timer by using the V2X UE's corresponding discovery entry ID included in the discovery request message. If discovery request message included discovery timer set to zero for a discovery entity ID, then the HPLMN V2X function informs the VPLMN V2X function to remove resources for that discovery entry ID by setting the timer to zero. The HPLMN V2X function may send the announce authorization message towards the VPLMN V2X function.

In an example embodiment of a procedure for the announcing V2X UE, if the discovery is not restricted, the VPLMN V2X function may acknowledge the HPLMN V2X function that it may authorize the V2X UE to perform open discovery announcing if the announce authorization message contain a new discovery entry ID. If the discovery entry ID already exists, the VPLMN V2X function may acknowledge the update as requested. If the discovery is restricted, the VPLMN V2X function may acknowledge the HPLMN V2X function that it may authorize the V2X UE to perform restricted discovery announcing if the announce authorization message contain a new discovery entry ID. If the discovery entry ID already exists, the VPLMN V2X function may acknowledge the update as requested.

Procedure for the announcing V2X UE is In an example embodiment, if the discovery is not restricted, the HPLMN V2X function may construct a discovery respond message with V2X application code (or V2X application code prefix with V2X application code suffix pool if open direct discovery with application-controlled extension is used), validity timer, and discovery entity ID. The validity timer is set to zero if it is zero in discovery request message originated by the V2X UE. The HPLMN V2X function may send the discovery respond message towards the V2X UE. If the discovery is restricted and if the announcing is not "on-demand", the HPLMN V2X function may construct a discovery respond message with V2X restricted code (or V2X restricted code prefix with V2X restricted code suffix pool if restricted direct discovery with application-controlled extension is used), validity timer, and discovery entity ID. If the announcing is "on-demand" and is authorized and enabled, the HPLMN V2X function may construct the discovery respond message with validity timer, announcing enabled indicator, and discovery entity ID. The validity timer is set to zero if it is zero in discovery request message originated by the V2X UE. The HPLMN V2X function may send the discovery respond message towards the V2X UE.

Procedure for the announcing V2X UE is In an example embodiment, if the discovery is not restricted, V2X UE may start announcing the provided V2X restricted code. If restricted direct discovery with application-controlled extension is used, the V2X UE appends a V2X restricted code suffix from the received V2X restricted code suffix pool to the V2X restricted code prefix to form a V2X restricted code. The V2X UE may use different suffixes from the provided V2X restricted code suffix pool to form and announce different V2X restricted codes without having to contact the HPLMN V2X function as long as the validity timer permits. If the discovery is restricted, V2X UE may start announcing the provided V2X restricted code. If restricted direct discovery with application-controlled extension is used, the V2X UE appends a V2X restricted code suffix from the received V2X restricted code suffix pool to the V2X restricted code prefix to form a V2X restricted code. The V2X UE may use different suffixes from the provided V2X restricted code suffix pool to form and announce different V2X restricted codes without having to contact the HPLMN V2X function as long as the validity timer permits. If "on-demand" announcing is used and the HPLMN V2X function has not provided V2X restricted code (or V2X restricted code prefix with V2X restricted code suffix pool if restricted direct discovery with application-controlled extension is used), the V2X UE may need to wait for an announcing alert request message from the HPLMN V2X function before announcing on PC5 interface.

Figure 29:
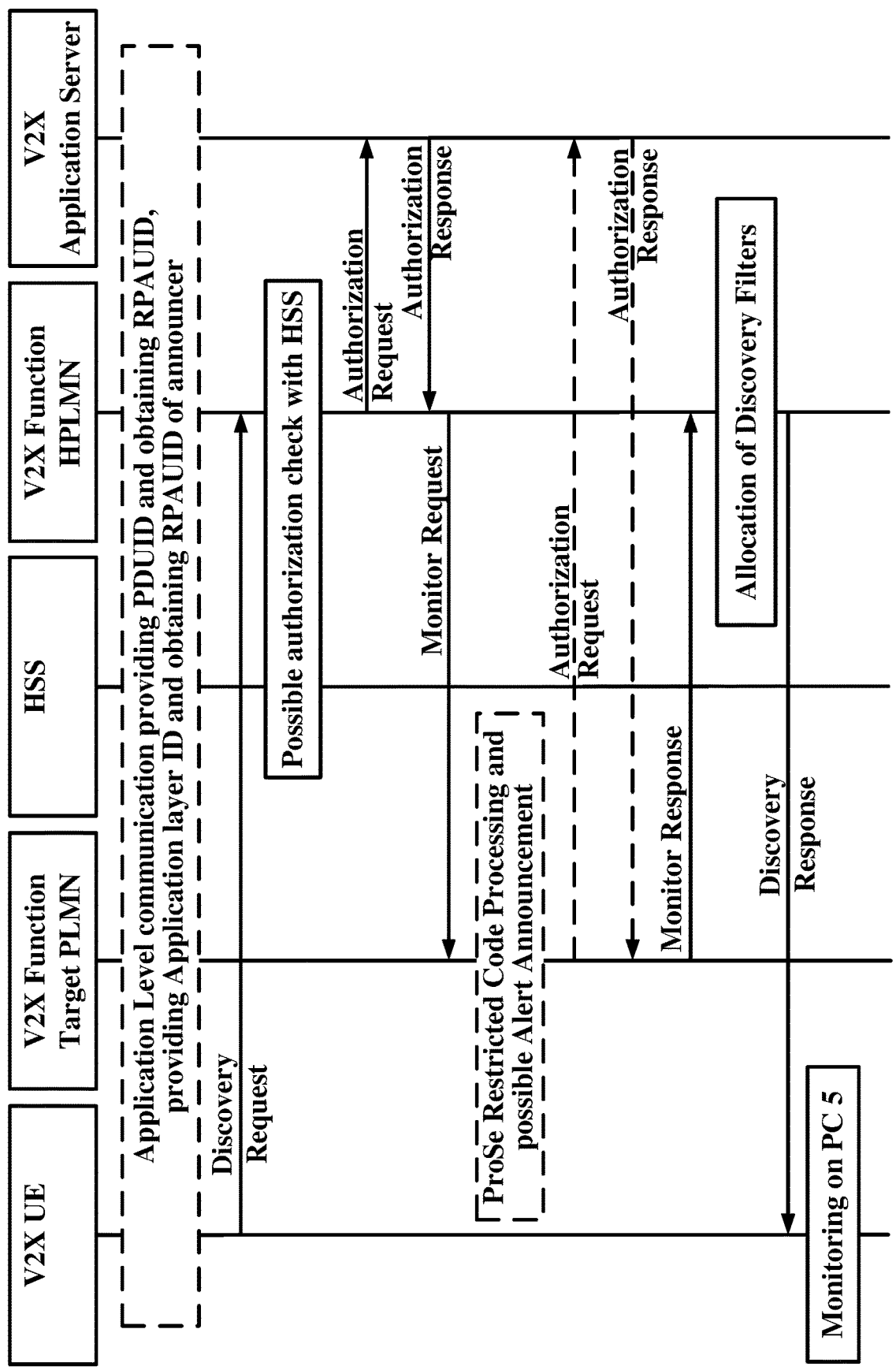
FIG. 29 is a flow diagram showing an example process for monitoring a V2X UE as per an aspect of an embodiment of the present disclosure.

The flow diagram in the example embodiment in FIG. 29 shows the procedure for monitoring V2X UE. The procedure for monitoring V2X UE is In an example embodiment, if the discovery is not restricted, the V2X UE may be configured for V2X application ID corresponding the PLMN where the UE is authorized to monitor. If the discovery is restricted, the application client in the V2X UE may retrieve the V2X discovery UE identity (PDUID) and may provide it to the V2X application server. The V2X application server may allocate a restricted V2X application UE identity (RPAUID) for that PDUID, may store the binding between the PDUID and the RPAUID and may return the RPAUID to the application client in the V2X UE. The V2X UE may obtain RPAUIDs of those V2X target users from the V2X application server passed in an application level container. V2X may use RPAUID instead of PDUID if the discovery is restricted.

The procedure for monitoring V2X UE In an example embodiment, if the discovery is not restricted, in order to get the discovery filter, the monitoring V2X UE may construct a discovery request message comprising V2X application ID, UE identity set to e.g. IMSI, command=monitor, discovery type, application ID set to unique identifier for the application that may have triggered discovery procedure, possible application level container comprising the target V2X application code suffix that the V2X UE is to monitor, discovery entry ID showing the discovery identity that it is a new discovery or an existing one, and the optional requested discovery timer. The requested discovery timer is set to zero to indicate HPLMN to delete the discovery filter(s) for that discovery entry ID. The application level container may include some information about V2X application code suffix such as group or user specific information if direct discovery with application-controlled extension is used. The V2X UE may send the discovery request message towards HPLMN V2X function. If the discovery is restricted, in order to get the discovery filter, the monitoring V2X UE may construct a discovery request message comprising RPAUID set to the monitoring V2X UE identity, UE identity set to IMSI, command=monitor, discovery type, application ID set to unique identifier for the application that may have triggered discovery procedure, application level container comprising the target RPAUIDs that the V2X UE is to monitor, discovery entry ID showing the discovery identity that it is a new discovery or an existing one, and the optional requested discovery timer. The requested discovery timer is set to zero to indicate HPLMN to delete the discovery filter(s) for that discovery entry ID. The application level container may include some information about V2X restricted code suffix such as group or user specific information if direct discovery with application-controlled extension is used. The V2X UE may send the discovery request message towards HPLMN V2X function.

The procedure for monitoring V2X UE In an example embodiment, if the discovery is not restricted, the HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered. If the discovery is restricted, the HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered.

The procedure for monitoring V2X UE one in example embodiment, if the discovery is restricted, the HPLMN V2X function may send an authorization request comprising V2X application ID and request type set to "open discovery/monitor" towards the V2X application server. If open direct discovery with application-controlled extension is used, the request type is then set to "open discovery with application-controlled extension/monitor". If the discovery is restricted, the HPLMN V2X function may send an authorization request comprising RPAUID and request type set to "restricted discovery/monitor" towards the V2X application server. If restricted direct discovery with application-controlled extension is used, the request type is then set to "restricted discovery with application-controlled extension/monitor".

The procedure for monitoring V2X UE In an example embodiment, if the discovery is not restricted, the V2X application server may construct an authorization response comprising mask(s) for V2X application code suffix(es) corresponding to V2X application ID and response type set to "open discovery/monitor ack" (or to "open discovery with application-controlled extension/monitor ack" if o direct discovery with application-controlled extension is used). The V2X application server may send the authorization response towards the HPLMN V2X function. If the discovery is restricted, the V2X application server may construct an authorization response comprising target PDUIDs and corresponding target RPAUID that the RPAUID in the authorization request may monitor, PDUID of the requesting V2X UE, and response type set to "restricted discovery/monitor ack" (or to "restricted discovery with application-controlled extension/monitor ack" if restricted direct discovery with application-controlled extension is used). The V2X application server may send the authorization response towards the HPLMN V2X function.

The procedure for monitoring V2X UE In an example embodiment, if the discovery is not restricted, the HPLMN V2X function may construct a monitor request message comprising V2X application ID of monitoring V2X UE which is set to the unique identifier for the application that may have triggered the discovery procedure, UE identity set to IMSI or MSISDN, V2X application code suffix(es) and corresponding mask(s), and discovery entry ID to identify the discovery entry being new or an existing one. The HPLMN V2X function may send the monitor request towards the target PLMN V2X function which may belong to the monitoring V2X UE. If the discovery entry ID is an existing one, the target PLMN V2X function may modify the existing discovery procedure with the parameters included in the monitor request message. If the discovery is restricted, the HPLMN V2X function may construct a monitor request message comprising RPAUID of monitoring V2X UE, UE identity set to IMSI or MSISDN, target PDUID and corresponding target RPAUID, application ID set to unique identifier for application that may have triggered the discovery procedure, and discovery entry ID to identify the discovery entry being new or an existing one. The HPLMN V2X function may send the monitor request towards the target PLMN V2X function which may belong to the monitoring V2X UE. If the discovery entry ID is an existing one, the target PLMN V2X function may modify the existing discovery procedure with the parameters included in the monitor request message.

The procedure for monitoring V2X UE In an example embodiment, if the discovery is restricted, the target PLMN V2X function may retrieve the V2X restricted code (or the V2X restricted code prefix if the restricted direct discovery with application-controlled extension is used) corresponding to the targeted PDUID, targeted RPAUID, and application ID. If in the context of the announcing V2X UE, the announcing enabled indicator is stored, the target PLMN V2X function may construct an announcing alert request message comprising RPAUID indicating which monitoring V2X UE is interested in the targeted V2X UE announcement, application ID set to unique identifier for the application that may have triggered discovery procedure, V2X restricted code retrieved from the context of the targeted announcing V2X UE (or V2X restricted code prefix with V2X restricted code suffix pool if restricted direct discovery with application-controlled extension was requested by the announcing V2X UE), and discovery entry ID to indicate it is a new discovery entity or an existing one. The target PLMN V2X function may send the message towards the targeted V2X UE and upon receipt of the announce alert response message from that V2X announcing UE, the V2X function removes the announcing enabled indication associated to the V2X restricted code (or V2X restricted code prefix with V2X restricted code suffix pool if restricted direct discovery with application-controlled extension was requested by the announcing V2X UE) from the announcing V2X UE context. The V2X UE may now start announcing the V2X restricted code (or V2X restricted code prefix with V2X restricted code suffix pool if restricted direct discovery with application-controlled extension was requested by the announcing V2X UE).

The procedure for monitoring V2X UE In an example embodiment, the target V2X function may have an option to construct an authorization request message comprising RPAUID set to that of the monitoring V2X UE, request type set to "restricted discovery/permission", and target RPAUID set to that of the announcing V2X UE. The target V2X function may send the authorization request message towards the V2X application server.

The procedure for monitoring V2X UE In an example embodiment, the V2X application server may acknowledge the target V2X function by constructing an authorization response message comprising PDUID of the announcing V2X UE which may be monitored and response type set to "restricted discovery/permission ack" and sending it towards the target PLMN V2X function.

The procedure for monitoring V2X UE In an example embodiment, if the discovery is not restricted, the target V2X function may construct a monitor response message comprising V2X application code (or V2X application code prefix with V2X application code suffix pool if open direct discovery with application-controlled extension was requested by the announcing V2X UE) and the corresponding validity timer. The target V2X function may send the monitor response message towards the HPLMN V2X function. If the discovery is restricted, the target V2X function may construct a monitor response message comprising V2X restricted code (or V2X restricted code prefix with V2X restricted code suffix pool if restricted direct discovery with application-controlled extension was requested by the announcing V2X UE) and the corresponding validity timer. The target V2X function may send the monitor response message towards the HPLMN V2X function.

The procedure for monitoring V2X UE In an example embodiment, if the discovery is not restricted, from the V2X application server, the HPLMN V2X function has now retrieved the V2X application code (or V2X application code prefix with V2X application code suffix pool if open direct discovery with application-controlled extension was requested by the announcing V2X UE). The HPLMN V2X function based on the V2X application code (or V2X application code prefix with V2X application code suffix pool if restricted direct discovery with application-controlled extension was requested by the announcing V2X UE) and the corresponding validity timer, may allocate a discovery filter with corresponding time-to-live (TTL). If the discovery is restricted, from the V2X application server, the HPLMN V2X function has now retrieved the V2X restricted code (or V2X restricted code prefix with V2X restricted code suffix pool if restricted direct discovery with application-controlled extension was requested by the announcing V2X UE) and the corresponding validity timer for each pair of target PDUID-target RPAUID bound with application ID and stored as the user content of the monitoring V2X UE. The HPLMN V2X function based on the V2X restricted code (or V2X restricted code prefix with V2X restricted code suffix pool if restricted direct discovery with application-controlled extension was requested by the announcing V2X UE) and the corresponding validity timer, may allocate a discovery filter with corresponding time-to-live (TTL).

Figure 30:
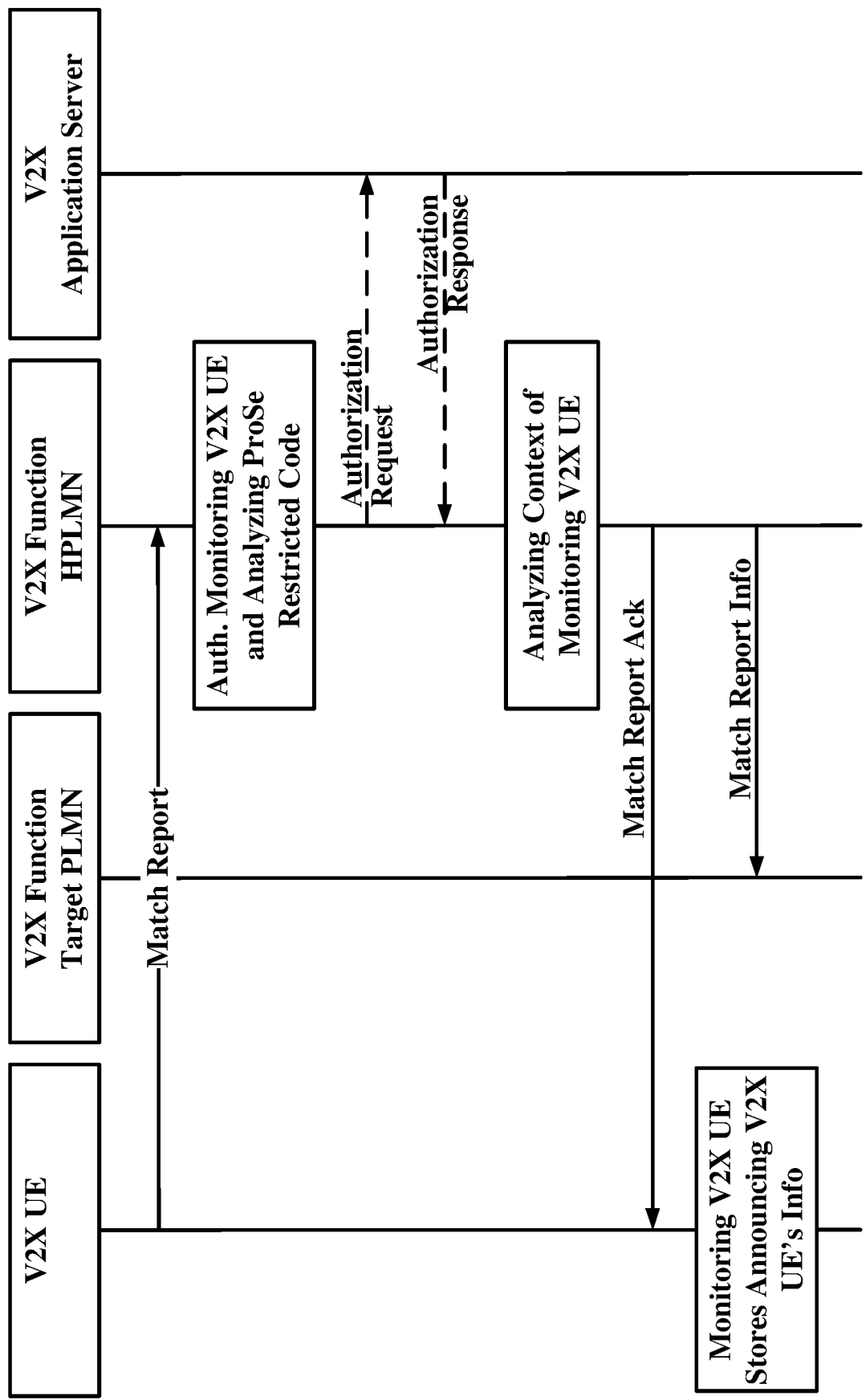
FIG. 30 is a flow diagram showing an example match report process as per an aspect of an embodiment of the present disclosure.

The procedure for monitoring V2X UE In an example embodiment, if the discovery is not restricted, the HPLMN V2X function may construct a discovery response message comprising discovery filter(s) that may comprise V2X application code (or V2X application code prefix with V2X application code suffix pool if open direct discovery with application-controlled extension was requested by the announcing V2X UE) to be monitored and the corresponding TTL showing how long the filter is valid. If the requested discovery timer in discovery request message sent by V2X monitoring UE was set to zero, the TTL in the discovery response message may be set to zero. The discovery response message may comprise discovery entry ID to identify the discovery entity. The HPLMN V2X function may send the discovery response message towards the monitoring V2X UE. If the discovery is restricted, the HPLMN V2X function may construct a discovery response message comprising target RPAUID(s) and the corresponding discovery filter(s) that may comprise V2X restricted code (or V2X restricted code prefix with V2X restricted code suffix pool if restricted direct discovery with application-controlled extension was requested by the announcing V2X UE) to be monitored and the corresponding TTL showing how long the filter is valid. If the requested discovery timer in discovery request message sent by V2X monitoring UE was set to zero, the TTL in the discovery response message may be set to zero. The discovery response message may comprise discovery entry ID to identify the discovery entity. The HPLMN V2X function may send the discovery response message towards the monitoring V2X UE. The V2X UE may use the discovery filter to monitor the announcing V2X UE. The flow diagram in the example embodiment in FIG. 30 shows the procedure for the match report.

The procedure for match report for announcing/monitoring is In an example embodiment, if the discovery is not restricted, if the monitoring V2X UE may have over the air received a V2X application code (or the V2X application code prefix and the V2X application code suffix if the restricted direct discovery with application-controlled extension is used) is matching the discovery filter obtained in the discovery response message from the HPLMN V2X function but the announcing V2X UE does not have an V2X application ID that matches the one that locally stored or its metadata is different from the one that locally stored, the monitoring V2X UE may construct a match report message comprising V2X application ID set to unique identifier for the application that may have triggered the monitoring request, IMSI or MSISDN as UE identity, discovery type set to "open discovery", the over the air received V2X application code, optional metadata requested, and announcing PLMN ID of the PLMN where the announcing V2X UE was monitored. The monitoring V2X UE may transmit the match report message towards the HPLMN V2X function. If the discovery is restricted, if the monitoring V2X UE may have over the air received a V2X restricted code (or the V2X restricted code prefix and the V2X restricted code suffix if the restricted direct discovery with application-controlled extension is used) is matching the discovery filter obtained in the discovery response message from the HPLMN V2X function but the announcing V2X UE does not have an RPAUID with a valid TTL, the monitoring V2X UE may construct a match report message comprising its own RPAUID, its IMSI or MSISDN as UE identity, discovery type set to "restricted discovery", application ID set to unique identifier for the application that may have triggered the monitoring request, the over the air received V2X restricted code, optional metadata requested, and announcing PLMN ID of the PLMN where the announcing V2X UE was monitored. The monitoring V2X UE may transmit the match report message towards the HPLMN V2X function.

The procedure for match report for announcing/monitoring is In an example embodiment, if the discovery is not restricted, the HPLMN V2X function may verify if the monitoring V2X UE may perform open discovery and may analyze V2X application code (or the V2X application code prefix and the V2X application code suffix if the open direct discovery with application-controlled extension is used). The HPLMN V2X function identifies the announcing V2X UE's V2X application code in the context of the monitoring V2X UE. If the discovery is restricted, the HPLMN V2X function may verify if the monitoring V2X UE may perform restricted discovery and may analyze V2X restricted code (or the V2X restricted code prefix and the V2X restricted code suffix if the restricted direct discovery with application-controlled extension is used). The HPLMN V2X function identifies the announcing V2X UE's RPAUID in the context of the monitoring V2X UE.

The procedure for match report for announcing/monitoring is In an example embodiment, if the discovery is restricted, if metadata requested was included to the originated match report message by the monitoring V2X UE, the HPLMN V2X function may locate the V2X application server from the application ID and may construct an authorization request message comprising monitoring V2X UE's RPAUID, announcing V2X UE's RPAUID, and request type set to "restricted discovery/match". The HPLMN V2X function may send the authorization request message towards the V2X application server. This step is optional if metadata requested was not included into the original match report message.

The procedure for match report for announcing/monitoring is In an example embodiment, if the discovery is restricted the V2X application server may construct an authorization response comprising monitoring V2X UE's PDUID, announcing V2X UE's PDUID, response type set to "restricted discovery/match ack", and metadata corresponding to the announcing V2X UE.

The procedure for match report for announcing/monitoring is In an example embodiment, if the discovery is not restricted, the HPLMN V2X function may verify that the V2X application ID may belong to the monitoring V2X UE and the announcing V2X UE's V2X application ID are the same as the announcing V2X UE's V2X application ID that is stored in the context of the monitoring V2X UE. If the discovery is restricted, the HPLMN V2X function may verify that the PDUID may belong to the monitoring V2X UE and the announcing V2X UE's PDUID are the same as the announcing V2X UE's PDUID that is stored in the context of the monitoring V2X UE.

The procedure for match report for announcing/monitoring is In an example embodiment, if the discovery is not restricted, the HPLMN V2X function may construct a match report ack comprising V2X application ID set to unique identifier for the application that may have triggered the monitoring request, announcing V2X UE's V2X application ID, validity timer, and optionally metadata. If the discovery is restricted, the HPLMN V2X function may construct a match report ack comprising V2X application ID set to unique identifier for the application that may have triggered the monitoring request, announcing V2X UE's RPAUID, validity timer, and optionally metadata.

The procedure for match report for announcing/monitoring is In an example embodiment, if the discovery is restricted, the monitoring V2X UE may store the mapping between the V2X restricted code (or the V2X restricted code prefix and the V2X restricted code suffix if the restricted direct discovery with application-controlled extension is used), announcing V2X UE's V2X application ID, the application ID unique identifier of the application that may have triggered the monitoring procedure, and the related validity timer. If the discovery is restricted, the monitoring V2X UE may store the mapping between the V2X restricted code (or the V2X restricted code prefix and the V2X restricted code suffix if the restricted direct discovery with application-controlled extension is used), announcing V2X UE's PRAUID, the application ID unique identifier of the application that may have triggered the monitoring procedure, and the related validity timer.

The procedure for match report for announcing/monitoring is In an example embodiment, if the discovery is not restricted, the HPLMN V2X function may construct a match report info message comprising monitoring V2X UE's V2X application ID, announcing V2X UE's V2X application ID, announcing V2X UE's identity set to IMSI or MSISDN for charging purposes, V2X application code (or the V2X application code prefix and the V2X application code suffix if the open direct discovery with application-controlled extension is used), and discovery type set to "open discovery". The HPLMN V2X function may send the match report info message towards the announcing V2X UE's PLMN V2X function and the V2X function of the PLMN where the announcing V2X UE may be roaming in. If the discovery is restricted, the HPLMN V2X function may construct a match report info message comprising monitoring V2X UE's RPAUID, announcing V2X UE's RPAUID, announcing V2X UE's identity set to IMSI or MSISDN for charging purposes, V2X restricted code (or the V2X restricted code prefix and the V2X restricted code suffix if the restricted direct discovery with application-controlled extension is used), and discovery type set to "restricted discovery". The HPLMN V2X function may send the match report info message towards the announcing V2X UE's PLMN V2X function and the V2X function of the PLMN where the announcing V2X UE may be roaming in.

Model B may comprise procedure for the discoveree V2X UE and procedure for the discoverer V2X UE procedure. It may include matching procedure for the case when the discoverer V2X UE may receive V2X response code over the air that may match the discovery filter provided by the HPLMN V2X function to the discoveree V2X UE in the discovery response message, however the corresponding V2X application ID may not have valid validity timer. Model B may always be for restricted discovery.

Figure 31:
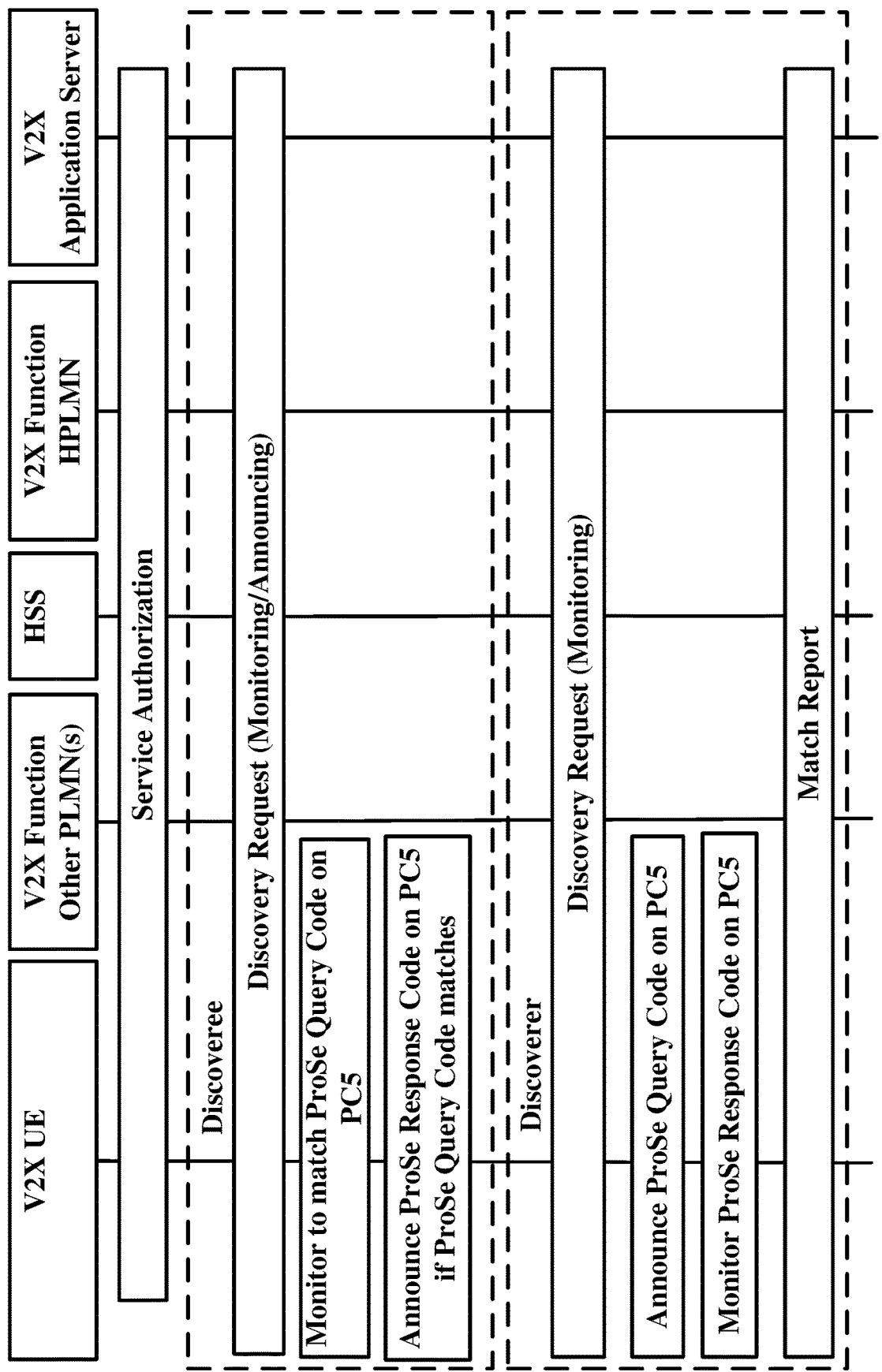
FIG. 31 is a flow diagram showing an example process for Model B Discovery as per an aspect of an embodiment of the present disclosure.

The flow diagram in the example embodiment in FIG. 31 shows the procedures for Model B Discovery. The procedure for the Model B discovery may be authorization, discoveree procedure, and discoverer procedure.

Model B authorization: The V2X UE may get authorized for restricted V2X direct discovery. In an example embodiment, the V2X direct discovery may need to be restricted.

Model B discoveree procedure: The discoveree V2X UE may request for discovery and may receive the V2X response code and associated discovery query filter(s). The discoveree V2X UE may employ the discovery filter(s) to monitor V2X query code on PC5. The discoveree V2X UE may announce the V2X response code if receiving a V2X query code over the air which matches any of discovery filter(s).

Model B discoverer Procedure: The discoverer V2X UE may request for discovery and may receive the V2X query code and associated discovery response filter(s). The discoverer V2X UE may announce the V2X query code on PC5 interface. The discoverer V2X UE may monitor V2X response code on PC5 interface that matches any of the discovery response filter(s). The discoverer UE may match-report if having discovered V2X response code with corresponding V2X application ID with no valid validity timer.

The discoveree, discoverer, and match-report procedures are explained in the details below.

Figure 32:
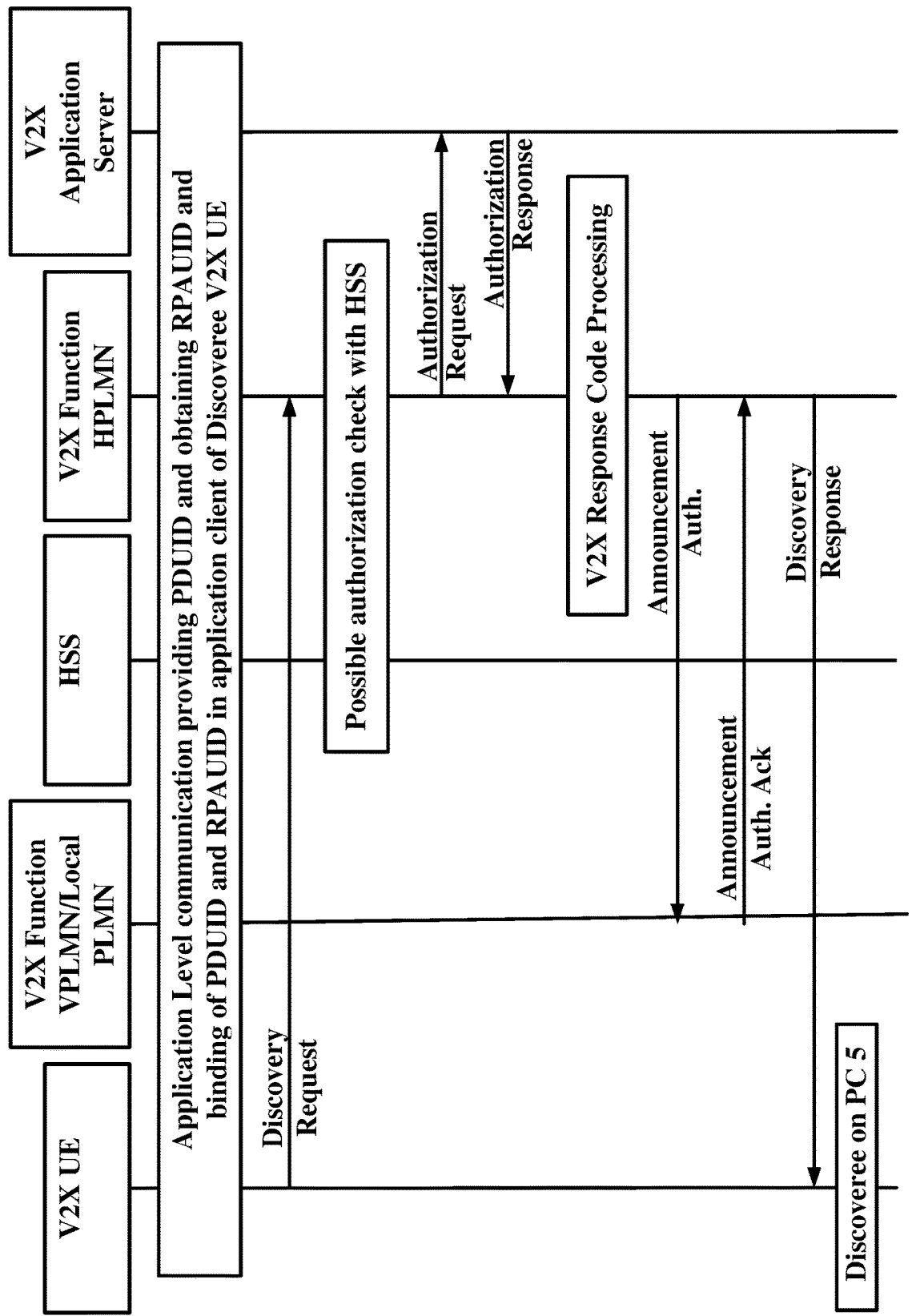
FIG. 32 is a flow diagram showing an example discoveree V2X UE process as per an aspect of an embodiment of the present disclosure.

The flow diagram in the example embodiment in FIG. 32 shows the procedure for discoveree V2X UE. The procedure for discoveree V2X UE is the application client in the V2X UE may retrieve the V2X discovery UE identity (PDUID) and may provide it to the V2X application server. The V2X application server may allocate a restricted V2X application UE identity (RPAUID) for that PDUID, may store the binding between the PDUID and the RPAUID and may return the RPAUID to the application client in the V2X UE. The application client in the V2X UE may store the binding between the RPAUID and its own PDUID and may use those RPAUID to perform discoveree request procedure. The discoveree V2X UE may establish connection to HPLMN V2X function and may construct a discovery request message comprising RPAUID set to what the V2X UE may announce, UE identity set to IMSI, command indicating this is for discoveree UE, discovery type set to "restricted discovery", discovery Model indicating Model B, application ID set to unique identifier for the application that may have triggered discovery procedure, discovery entry ID showing the discovery identity that it is a new discovery or an existing one, and PLMN ID of the carrier frequency in announcing PLMN ID if the serving PLMN signaled carrier frequency is not operated by HPLMN or VPLMN and if inter-PLMN V2X discovery transmission is supported. V2X UE may send the discovery request message to HPLMN V2X function. HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered. The HPLMN V2X function may locate the V2X application server based on the application ID in the discovery request message and may send an authorization request containing RPAUID and request type set to "restricted discovery/response" towards the V2X application server. The V2X application server answers by an authorization response containing PDUID(s) corresponding the RPAUID stored in the V2X application server and response type set to "restricted discover/response ack". The HPLMN V2X function may verify that at least of one of the PDUID(s) may belong to the discoveree V2X UE. The HPLMN V2X function assigns a V2X response code and V2X query code with the associated discovery query filter(s). The V2X response code corresponds to the RPAUID in the discovery request and the HPLMN V2X function assigns an associated validity timer for the V2X response code and V2X query code with the associated discovery query filter(s). The validity timer identifies the duration of validity of the V2X response code and V2X query code with the associated discovery query filter(s). The discoveree V2X UE may use this V2X response code within this validity duration if PLMN is not changed. The HPLMN V2X function may store V2X response code with its associated validity timer and V2X query code with associated discovery query filter(s) in the context of the V2X user. If the discovery request is authorized, HPLMN V2X function may construct announce authorization message containing RPAUID, V2X application ID, V2X response set to assigned code for this request, UE ID set to IMSI or MSISDN, discovery entry ID to identify the discovery entry, and validity timer indicating how long the V2X response code will be valid. The HPLMN V2X function may send the announce authorization message towards the VPLMN V2X function. The VPLMN V2X function may acknowledge the HPLMN V2X function that it may authorize the V2X UE to perform restricted discovery announcing if the announce authorization message contain a new discovery entry ID. If the discovery entry ID already exists, the VPLMN V2X function may acknowledge the update as requested i.e. updating the discoveree V2X UE's discovery entry by the new V2X response code and its associated validity timer. The HPLMN V2X function may construct a discovery response message with discovery type set to Model B, V2X response code, discovery query filter(s) matched for certain V2X query code, validity timer associated to V2X response code and the discovery query filter(s), and discovery entity ID to identify the discovery identity. The V2X discoveree UE may use the discovery query filter(s) (which may be multiple) to determine which V2X query code may trigger that the V2X discoveree UE may announce the assigned V2X response code. The HPLMN V2X function may send the discovery response message towards V2X discoveree UE. The V2X discoveree UE may use the discovery query filter(s) which may be multiple to determine which V2X query code may trigger that the V2X discoveree UE announces the assigned V2X response code. If the validity timer expires, the V2X discoveree UE may send a new discovery request message towards the HPLMN V2X function.

Figure 33:
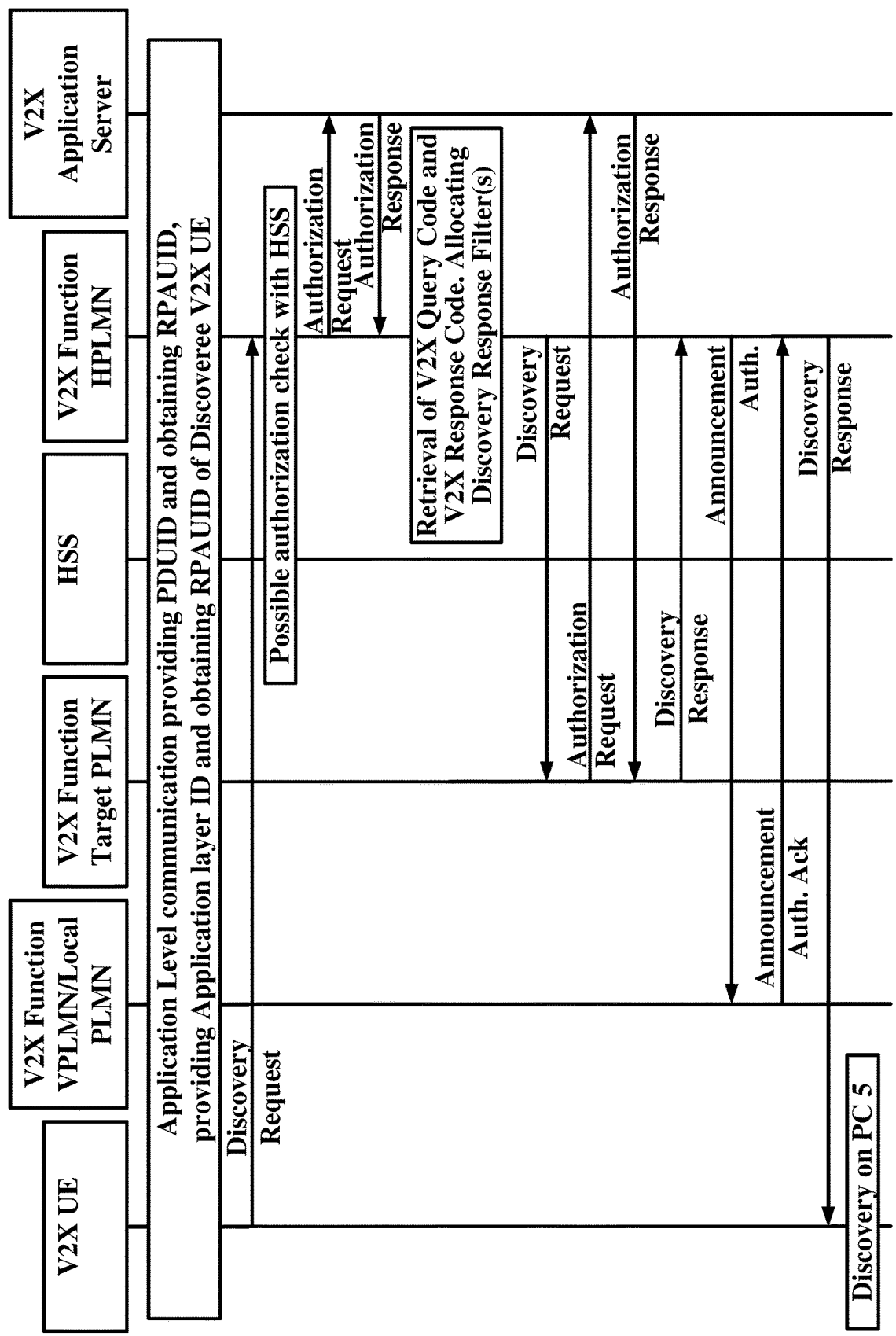
FIG. 33 is a flow diagram showing an example discoverer V2X UE process as per an aspect of an embodiment of the present disclosure.

The flow diagram in the example embodiment in FIG. 33 shows the procedure for discoverer V2X UE. The procedure for discoverer V2X UE is the application client in the V2X UE may retrieve the V2X discovery UE identity (PDUID) and may provide it to the V2X application server. The V2X application server may allocate a restricted V2X application UE identity (RPAUID) for that PDUID, may store the binding between the PDUID and the RPAUID and may return the RPAUID to the application client in the V2X UE. The V2X UE may obtain also RPAUIDs of those V2X target users from the V2X application server passed in an application level container. RPAUID instead of PDUID may be used since this is restricted discovery. The discoverer V2X UE may establish connection to the MPLMN V2X function and may construct a discovery request message comprising RPAUID set to what the discoverer V2X UE wants to announce, UE identity set to IMSI, command showing this is for V2X query procedure, discovery type set to "restricted discover", discovery Model set to Model B, application ID set to unique identifier for the application that may have triggered discovery procedure, application level container comprising the target RPAUIDs that the V2X UE is to discover, discovery entry ID showing the discovery identity that it is a new discovery or an existing one, and the optional requested discovery timer. The requested discovery timer may be set to zero to indicate HPLMN to delete the discovery filter(s) for that discovery entry ID. The V2X UE may send the discovery request message towards HPLMN V2X function. HPLMN V2X function may check for authorization for the V2X application. If there is not any associated V2X UE context, the HPLMN V2X function may check with HSS and if needed may create a new context for the V2X UE that may contain the subscription parameters for this V2X UE. HSS may provide also MSISDN of the V2X UE and PLMN ID of where the V2X UE is registered. The HPLMN V2X function may locate the V2X application server based on the application ID in the discovery request message and may send an authorization request containing RPAUID, request type set to "restricted discovery/query", and application level container towards the V2X application server. The V2X application server may construct an authorization response comprising target PDUIDs and corresponding target RPAUID that the RPAUID in the authorization request may discover, PDUID of the requesting V2X UE, and response type set to "restricted discovery/query ack". The V2X application server may send the authorization response towards the HPLMN V2X function. The HPLMN V2X function may allocate the context for the discoveree UE(s) if the PLMN ID in the target PDUID-target RPAUID corresponds to a valid V2X response code. The HPLMN V2X function may allocate the discovery response filter(s) which trigger the V2X discoveree UE to transmit the V2X response code. This procedure has expiration time which is specified by validity timer. The HPLMN V2X function may construct a discovery request message comprising RPAUID of discoveree V2X UE, UE identity set to IMSI or MSISDN, target PDUID and corresponding target RPAUID, application ID set to unique identifier for application that may have triggered the discovery procedure, and discovery entry ID to identify the discovery entry being new or an existing one. The HPLMN V2X function may send the discovery request towards the target PLMN V2X function which may belong to the discoveree V2X UE. If the discovery entry ID is an existing one, the target PLMN V2X function may modify the existing discovery procedure with the parameters included in the discovery request message. The target V2X function has an option to construct an authorization request message comprising RPAUID set to that of the discoverer V2X UE, request type set to "restricted discovery/query", and target RPAUID set to that of the discoveree V2X UE. The target V2X function may send the authorization request message towards the V2X application server. The V2X application server may acknowledge the target V2X function by constructing an authorization response message comprising PDUID of the discovery V2X UE, response type set to "restricted discovery/query ack", and target PDUID of the discoveree V2X UE. The V2X application server may send the authorization response message towards the target PLMN V2X function. The target PLMN V2X function may allocate the context of the discoveree V2X UE based on target PDUID-target RPAUID and the application ID. The target PLMN V2X function responds with a discovery response comprising V2X query code which will be used by HPLMN V2X function to build the discovery query filter so that it may trigger the discoveree UE to may send V2X response code, the actual V2X response code, and validity timer to indicate for how long the V2X query code and V2X response code are valid. The HPLMN V2X function may construct an announce authorization message comprising RPAUID of the discovery V2X UE, application ID, V2X query code and its associated validity timer, UE identity set to IMSI or MSISDN of discovery V2X UE for charging purposes in the visiting domain, and discovery entry ID to identify the discovery entry. The HPLMN V2X function may send the announce authorization message towards the VPLMN V2X function. The VPLMN may acknowledge that it may authorize the discovery V2X UE to perform V2X direct discovery procedure. If the discovery entry ID in the announce authorization message corresponded an already discovery entry, the VPLMN V2X function may acknowledge the replacement of the existing V2X query code and its associated validity timer. The HPLMN V2X function may construct the discovery response message comprising discovery model set to Model B, V2X query code, one or multiple discovery response filters which are generated by the HPLMN V2X function based on V2X response code, and validity timer for how long the V2X query code and discovery response filter(s) are valid. The HPLMN V2X function may transmit the discovery response message to the discoverer V2X UE. The discoverer V2X UE may obtain the information from the discovery response message to discover discoveree V2X UE. If the validity timer is expired, the discoverer V2X UE may send a new discovery request message towards the HPLMN V2X function.

Figure 34:
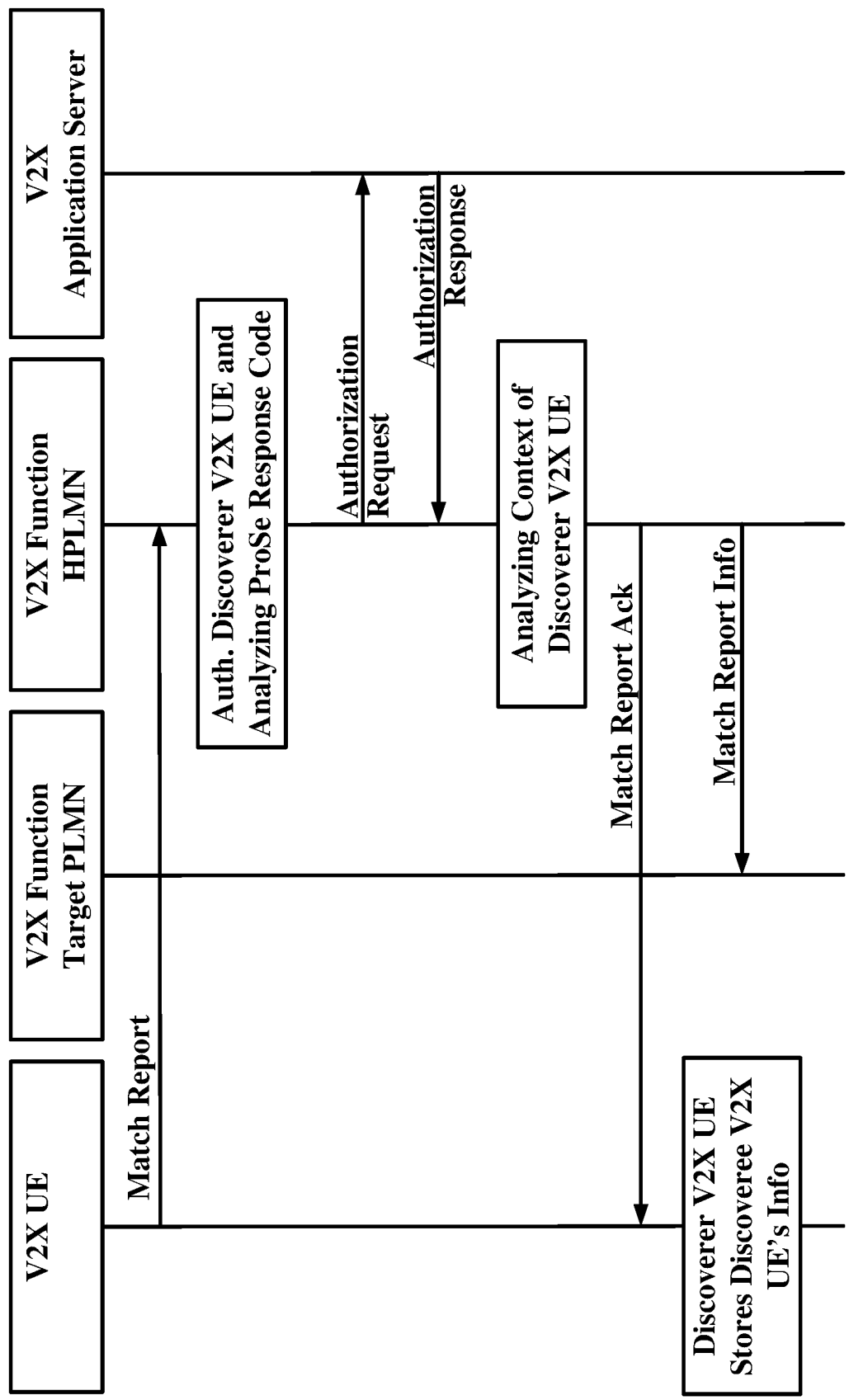
FIG. 34 is a flow diagram showing an example match report process as per an aspect of an embodiment of the present disclosure.

The flow diagram in the example embodiment in FIG. 34 shows the procedure for the match report. The procedure for match report for discoveree/discoverer is if the discoverer V2X UE may have over the air received a V2X response code is matching the discovery response filter obtained in the discovery response message from the HPLMN V2X function but the discoveree V2X UE may not have an RPAUID with a valid TTL, the discoverer V2X UE may construct a match report message comprising its own RPAUID, its IMSI or MSISDN as UE identity, discovery type set to "restricted discovery", application ID set to unique identifier for the application that may have triggered the monitoring request, the over the air received V2X response code, optional metadata requested, and discoveree PLMN ID of the PLMN where the discoveree V2X UE may have been discovered. The discoveree V2X UE may transmit the match report message towards the HPLMN V2X function. The HPLMN V2X function may verify if the discoverer V2X UE may perform restricted discovery and may analyze V2X response code. The HPLMN V2X function may identify the discoveree V2X UE's RPAUID in the context of the discoverer V2X UE. If metadata requested was included to the originated match report message by the discoverer V2X UE, the HPLMN V2X function may locate the V2X application server from the application ID and may construct an authorization request message comprising discoverer V2X UE's RPAUID, discoveree V2X UE's RPAUID, and request type set to "restricted discovery/match". The HPLMN V2X function may send the authorization request message towards the V2X application server. This step is optional if metadata requested was not included into the original match report message. The V2X application server may construct an authorization response comprising discoverer V2X UE's PDUID, discoveree V2X UE's PDUID, response type set to "restricted discovery/match ack", and metadata corresponding to the discoveree V2X UE. The HPLMN V2X function may verify that the PDUID may belong to the discoverer V2X UE and the discoveree V2X UE's PDUID are the same as the discoveree V2X UE's PDUID that may be stored in the context of the discoverer V2X UE. The HPLMN V2X function may construct a match report ack comprising application ID set to unique identifier for the application that may have triggered the discovery request, discoveree V2X UE's RPAUID, validity timer, and optionally metadata. The discoverer V2X UE may store the mapping between the V2X response code, discoveree V2X UE's PRAUID, the application ID unique identifier of the application that may have triggered the discovery procedure, and the related validity timer. The HPLMN V2X function may construct a match report info message comprising discoverer V2X UE's RPAUID, discoveree V2X UE's RPAUID, discoveree V2X UE's identity set to IMSI or MSISDN for charging purposes, V2X response code, and discovery type set to "restricted discovery". The HPLMN V2X function may send the match report info message towards the discoveree V2X UE's PLMN V2X function and the V2X function of the PLMN where the discoveree V2X UE may be roaming in.

Upon completion of the V2X group member discovery, the V2X group members may want to setup an V2X group call. In many situations, not all the V2X group members have visibility for each other. Most of the time, the V2X group members may not be visible by other members. Even if the V2X group members may be visible to each other at one point, the visibility may change due to e.g. movement of the V2X group members. In an example embodiment, in FIG. 35 V2X UE 1 sees V2X UE 2, V2X UE 3, V2X UE 4; V2X UE 2 sees V2X UE 1, V2X UE 3, V2X UE 4; V2X UE 3 sees V2X UE 1, V2X UE 2, V2X UE 4; and V2X UE 4 sees V2X UE 1, V2X UE 2, V2X UE 3. This configuration may be shown In an example embodiment, in FIG. 36, where number "1" may indicate visibility.

Figure 35:
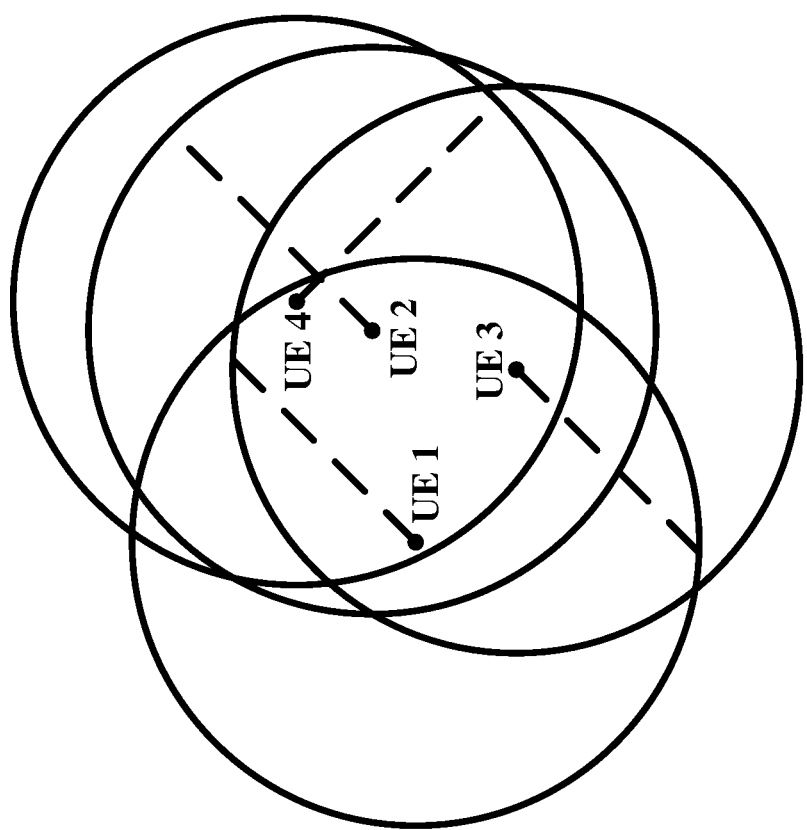
FIG. 35 is a diagram of an example visibility configuration as per an aspect of an embodiment of the present disclosure.
Figure 37:
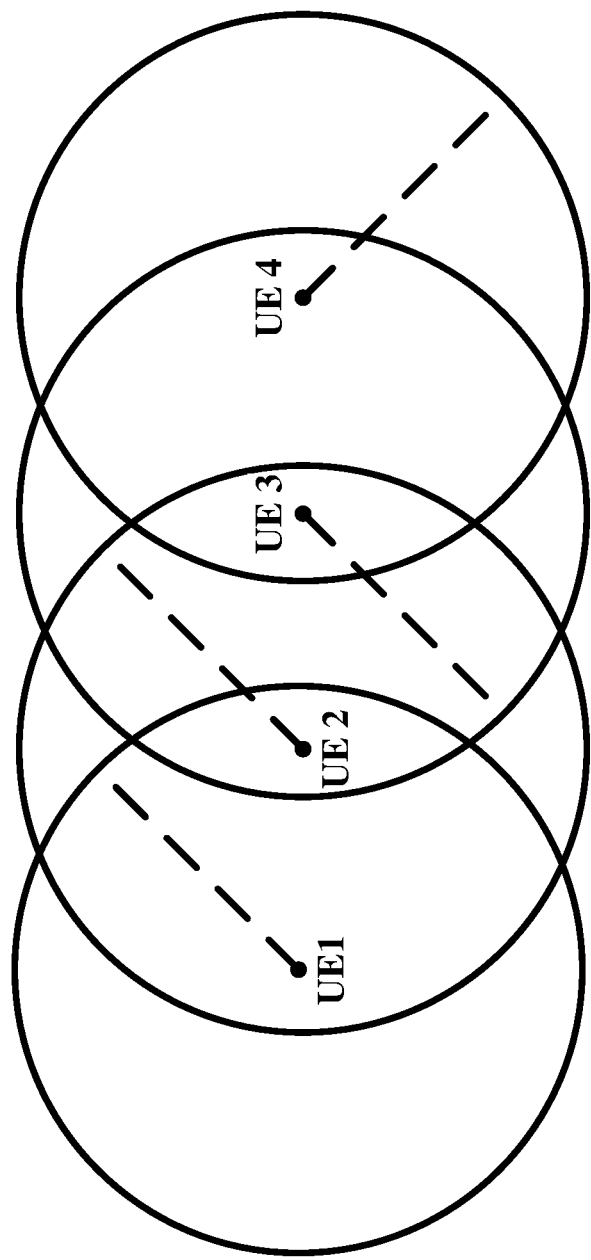
FIG. 37 is a diagram of an example visibility configuration as per an aspect of an embodiment of the present disclosure.

In an example embodiment, due to the possible e.g. movements of the V2X group members, the positions of the V2X group members may change from FIG. 35 to the example in FIG. 37, where V2X UE 1 sees V2X UE 2; V2X UE 2 sees V2X UE 3 and V2X UE 4; V2X UE 3 sees V2X UE 2 and V2X UE 4; and V2X UE 4 sees V2X UE 3. This configuration may be shown In an example embodiment, in FIG. 38, where "1" may show the visibility while "0" may show lack of visibility. The V2X group members who may be in a full communication as shown in the example in FIG. 35, may lose visibility of other V2X members e.g. V2X UE 1 and V2X UE 4 as shown in FIG. 37. This may happen due to the movement of the V2X members or other reasons e.g. geographic patterns, location.

Figure 39:
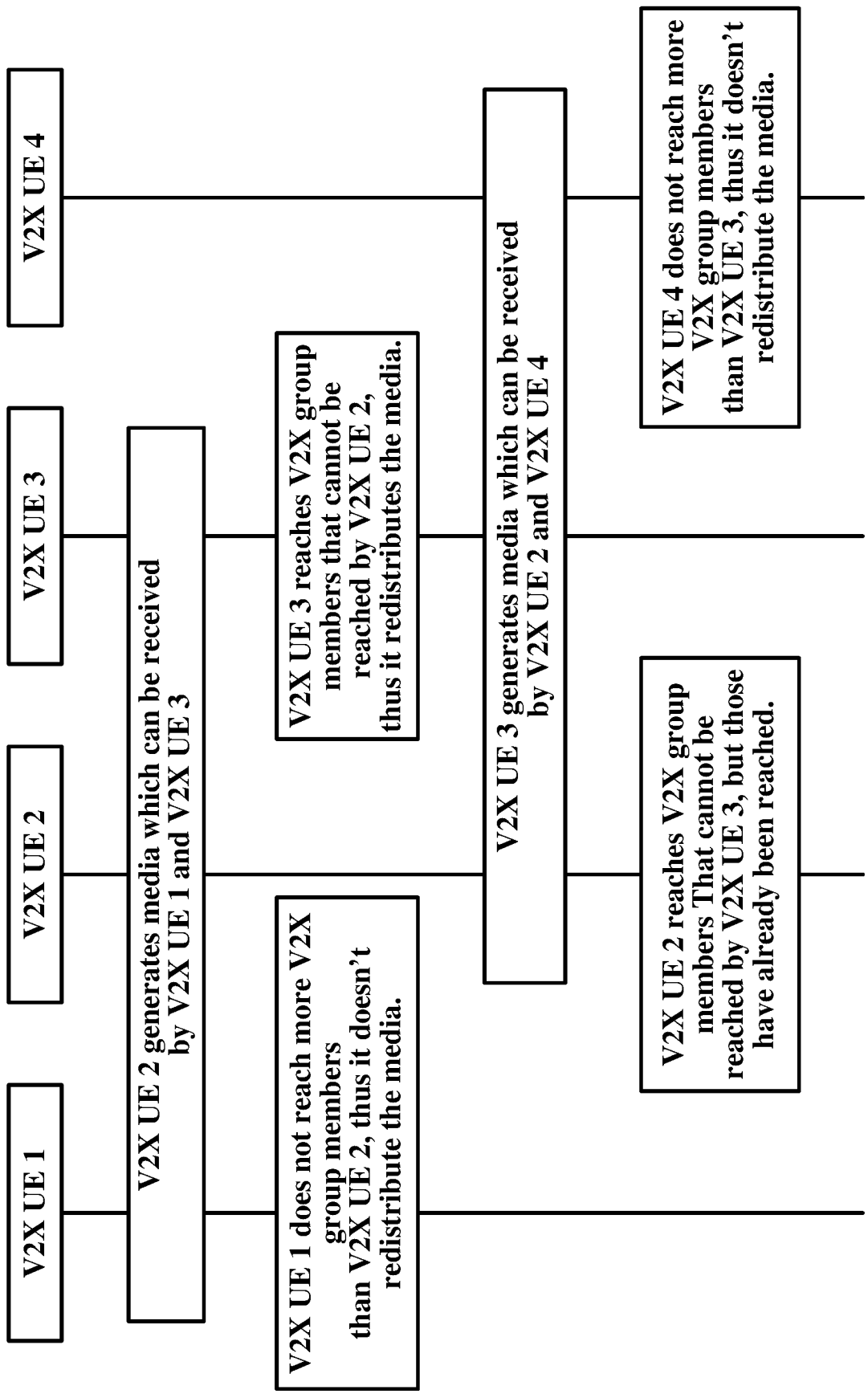
FIG. 39 is a flow diagram showing an V2X UE distributing media within a V2X group as per an aspect of an embodiment of the present disclosure.

In an example embodiment, the V2X group members may be aware of each other's visibility with other word they may know the neighbors' neighbors. See the flow diagram in FIG. 39 exemplifying when V2X UE 2 in FIG. 37 distributes media within the V2X group. If V2X UE 2 distributes media, V2X UE 1 and V2X UE 3 may receive that media. If V2X UE 1 knows that V2X UE 2 has far better visibility than itself (since V2X UE 3 may be visible to V2X UE 2 while not V2X UE 1), then it may realize there is no point to redistribute the media. If V2X UE 3 knows that it may have visibility for V2X UE 4 while V2X UE 2 does not, it may realize that it may need to redistribute the media. V2X UE 2 and V2X UE 4 may receive the media if the media is redistributed by V2X UE 3. V2X UE 2 may recognize the media by e.g. tag and may ignore it for being repetitive. V2X UE 4 may know that V2X UE 3 has better visibility than itself (since V2X UE 3 may see V2X UE 2 while V2X UE 4 may not see V2X UE 2), it may realize it may not need to redistribute the media. The exemplified configuration in FIG. 40 may illustrate the scenario in FIG. 37 where the numbering on the arrows may show the order of the media distribution by V2X UE 2 and media redistribution by V2X UE 3.

Figure 41:
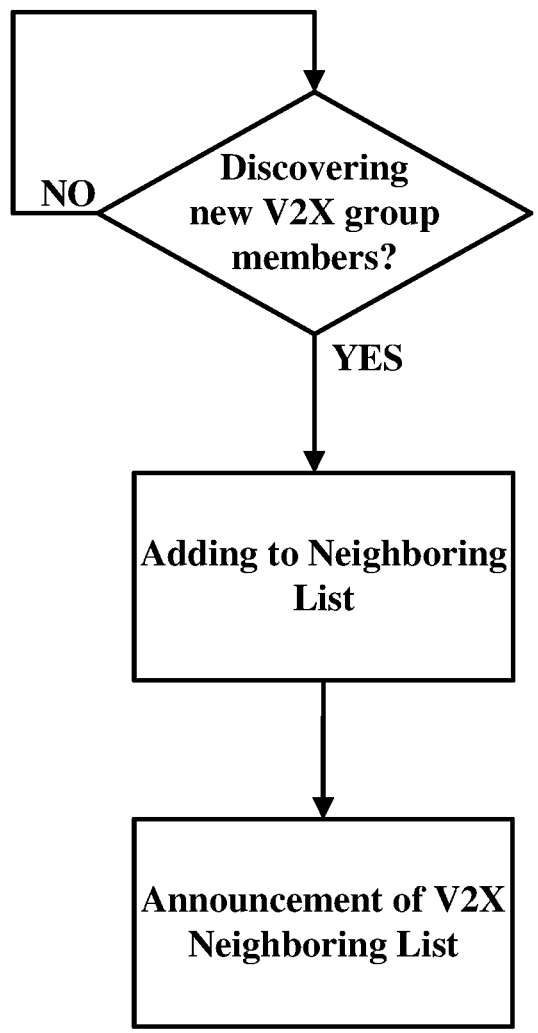
FIG. 41 is a flow diagram showing an V2X member discovery as per an aspect of an embodiment of the present disclosure.

In an example embodiment, as shown in FIG. 41, the steps of V2X member discovery may be described. The steps in FIG. 41 may describe the procedure of discovery new V2X group members and adding those to the neighboring list. Does the V2X group member discover a new member? If not, then the V2X group member keeps looking until it finds a new V2X group member. Once the V2X group member finds another V2X group member, it adds that discovered member into its neighboring list, and the V2X group member announces its neighboring list to other V2X group members.

Figure 42:
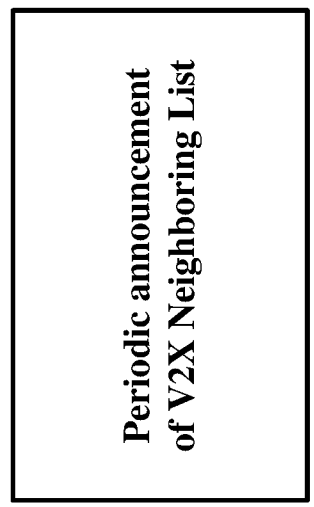
FIG. 42 is a flow diagram showing an announcement of a neighboring list as per an aspect of an embodiment of the present disclosure.

The last step in the flow chart is the announcement of the neighboring list may be periodic and independent of the discovery of any new V2X group members as shown in FIG. 42.

Figure 43:
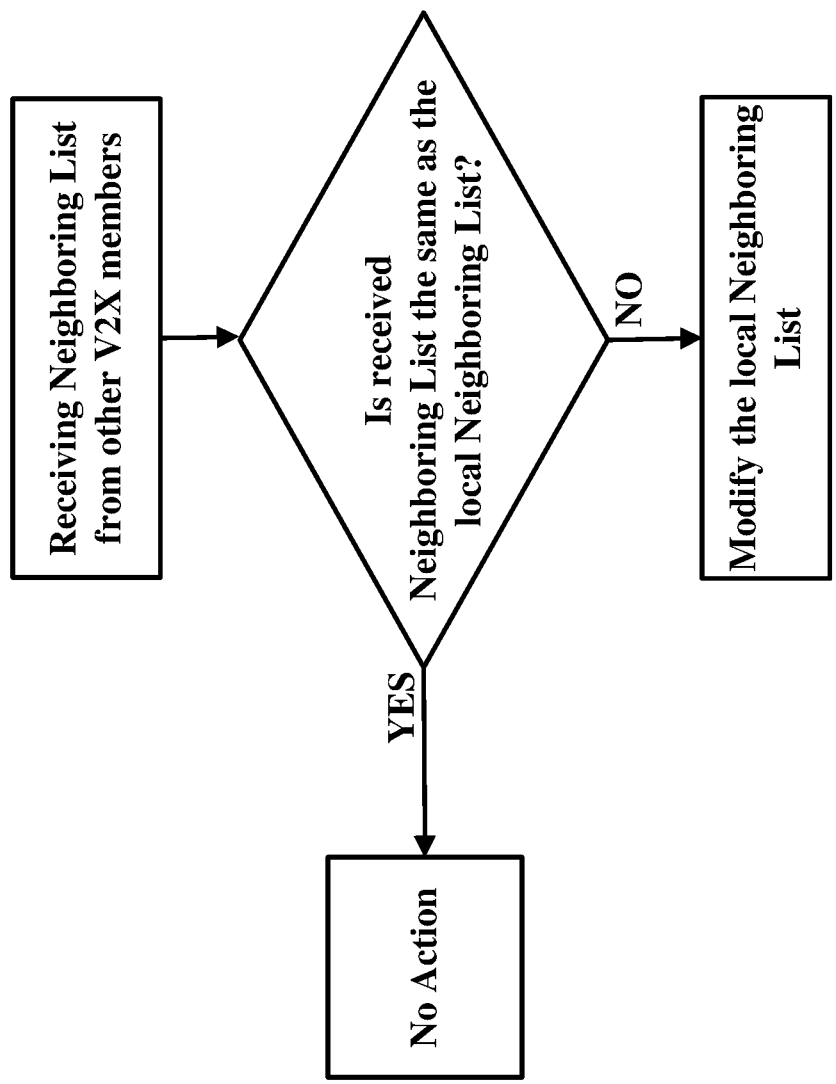
FIG. 43 is a flow diagram showing the receiving of a Neighboring List announcement by a V2X group member as per an aspect of an embodiment of the present disclosure.

In an example embodiment, the flow chart in FIG. 43 shows the procedure of receiving the Neighboring List announcement by a V2X group member. The example in FIG. 43 shows upon receipt of the announcement of the V2X neighboring list; the recipient checks if the received neighboring list is the same as the local neighboring list; if the answer is "YES", no action will be taken; and if the answer is "NO", the local neighboring list will be modified accordingly.

Figure 44:
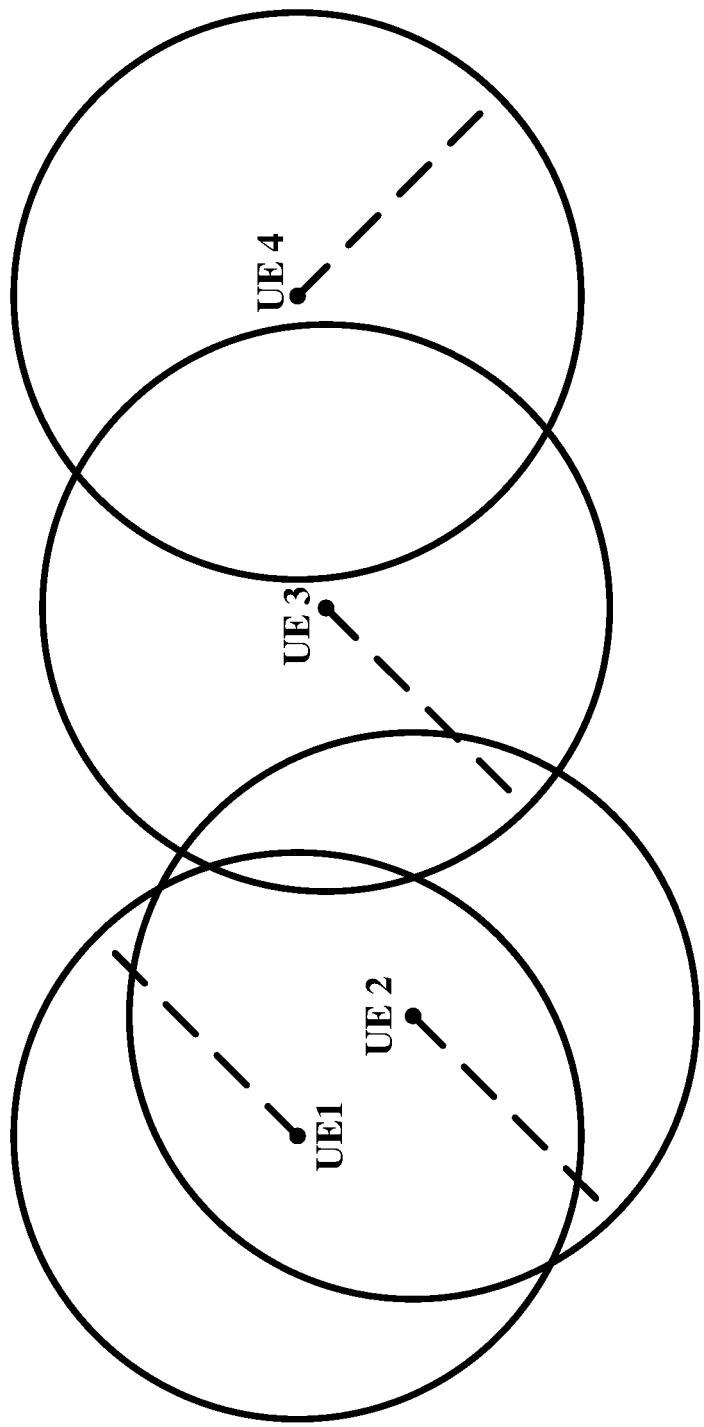
FIG. 44 is a diagram of an example visibility configuration as per an aspect of an embodiment of the present disclosure.

The above solution may not be applicable when there may exist a disconnect among some of the V2X group members. In an example embodiment as shown in FIG. 44, where V2X UE 1 discovers V2X UE 2; V2X UE 2 discovers V2X UE 1; V2X UE 3 discovers none; and V2X UE 4 discovers none. The simplified configuration is shown in FIG. 45.

Figure 46:
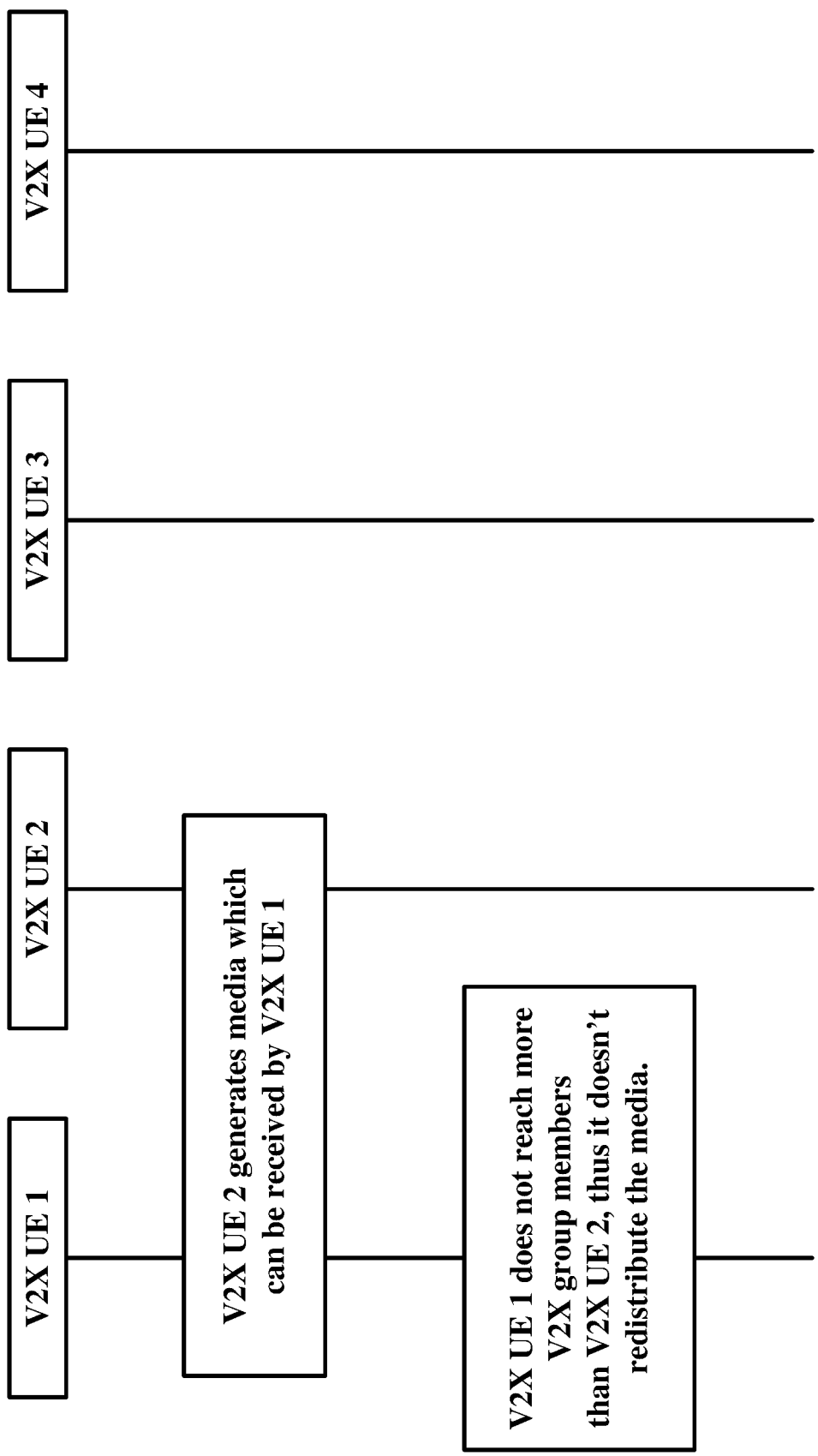
FIG. 46 is a flow diagram showing a UE generating media for reception by another UE as per an aspect of an embodiment of the present disclosure.

If V2X UE 2 distributes media, it may only be heard by V2X UE 1 due to the existing disconnect between V2X UE3, V2X UE 4 from V2X UE 1 and V2X UE 2. In the example embodiment shown in FIG. 46, V2X UE 2 may generate media which may be received by V2X UE 2 and The local neighboring list of V2X UE 2 contains V2X UE 1 and therefore V2X UE 2 will not re-distribute the media.

The configuration in FIG. 47 illustrates the above scenario where the numbering on the arrows shows there won't be any redistribution. Therefore, the V2X group call cannot be established among all the V2X group members.

In Model A, if the discovery is not restricted, the announced temp ID in FIG. 26 comprises V2X application code or V2X application code prefix with V2X application code suffix(es) if the application-controlled extension is used, or if the discovery is restricted, the announced temp ID in FIG. 26 comprises V2X restricted code or V2X restricted code prefix with V2X restricted code suffix(es) if the application-controlled extension is used. In Model B the announced temp ID in FIG. 26 comprises V2X query code or V2X response code.

Figure 48:
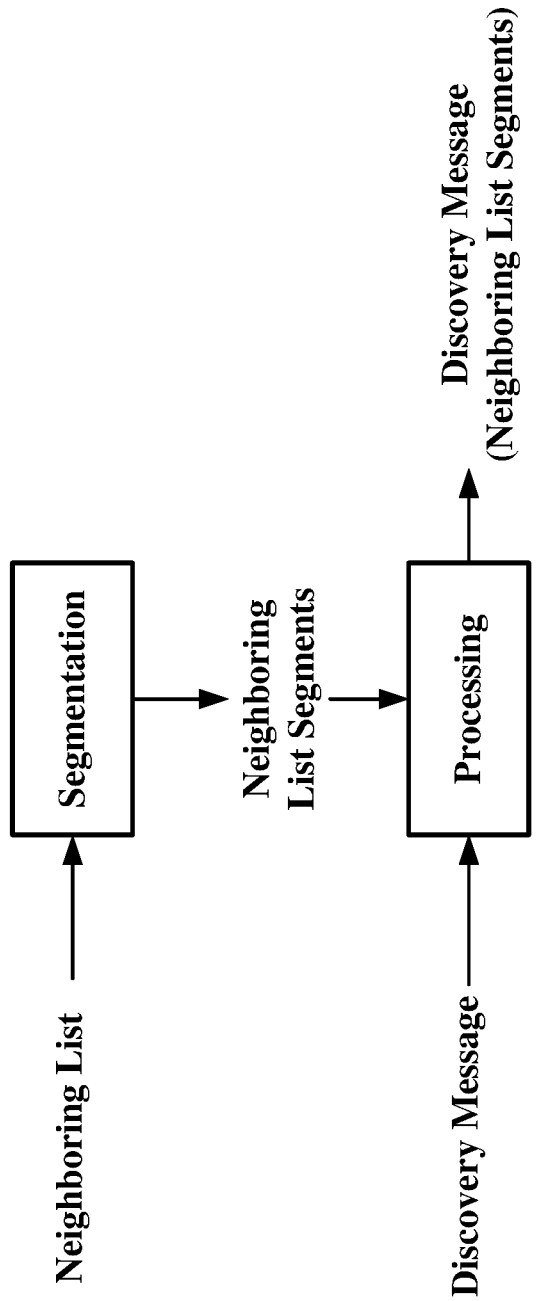
FIG. 48 is a diagram illustrating segmentation of a neighbor list as per an aspect of an embodiment of the present disclosure.

The length of the announced temp ID may be 160 bits and it comprises currently information about the V2X group ID and V2X user ID. In an example embodiment, to announce the neighboring list to the V2X group neighbors may be to process the announced temp ID of the V2X discovery message with neighboring list and the required parameters for the V2X discovery message and distributing the result over PC5 interface as exemplified in FIG. 48. FIG. 48 may show that the V2X discovery message and the neighboring list may be processed into a V2X discovery message comprising the neighboring list information. If the size of neighboring information is larger than the payload of the V2X discovery message, then neighboring list may be divided into segments which individually gets processed by V2X discovery message. The transmitting V2X UE transmits the V2X discovery messages over PC5 interface.

Figure 49:
FIG. 49 is a diagram illustrating reverse segmentation of a neighbor list as per an aspect of an embodiment of the present disclosure.

In the example embodiment FIG. 49, it is shown how the recipient V2X UEs may receive the V2X discovery message with the neighboring list information which may be in segments. Having reverse processed the V2X discovery message, the recipient V2X UE may parse the neighboring list or its segments from reversed processed V2X discovery message. If the neighboring list is in segments, the recipient V2X UE may collect the segments from several received V2X discover messages to reconstruct the neighboring list belonging to the transmitting V2X UE.

In an example embodiment, if the discovery is restricted in Model A, the announcing V2X UE may retrieve the PDUID and may provide it to the V2X application server. The V2X application server may allocate RPAUID for PDUID which have been provided by that V2X UE. The announcing V2X UE may use the obtained RPAUID instead of PDUID. The V2X application server may store the binding between the PDUID and RPAUID.

In an example embodiment, if the discovery is not restricted in Model A, the HPLMN V2X function may obtain V2X application ID from the announcing V2X UE and may provide V2X application code for that V2X application ID to that V2X UE. The V2X application code may be expired after a certain amount of time.

In an example embodiment, if the discovery is restricted in Model A, the HPLMN V2X function may obtain RPAUID from the announcing V2X UE and may provide V2X restricted code for that RPAUID to that V2X UE. The V2X restricted code may be expired after a certain amount of time.

In an example embodiment, if the discovery is not restricted in Model A, the HPLMN V2X function obtains V2X application ID from the announcing V2X UE and may provide V2X application code prefix with V2X application code suffix for that RPAUID to the V2X UE. The V2X application code prefix with V2X application code suffix may be expired after a certain amount of time.

In an example embodiment, if the discovery is restricted in Model A, the HPLMN V2X function obtains RPAUID from the announcing V2X UE and may provide V2X restricted code prefix with V2X restricted code suffix for that RPAUID to the V2X UE. The V2X restricted code prefix with V2X restricted code suffix may be expired after a certain amount of time.

In an example embodiment, if the discovery is not restricted in Model A, the HPLMN V2X function may obtain V2X application ID from the announcing V2X UE and may provide V2X application code prefix with V2X application code suffixes for that V2X application ID to the V2X UE. The V2X application code prefix with V2X application code suffixes may be expired after a certain amount of time.

In an example embodiment, if the discovery is restricted in Model A, the HPLMN V2X function may obtain RPAUID from the announcing V2X UE and may provide V2X restricted code prefix with V2X restricted code suffixes for that RPAUID to the V2X UE. The V2X restricted code prefix with V2X restricted code suffixes may be expired after a certain amount of time.

In an example embodiment, if the discovery is not restricted in Model A, the V2X UE may use V2X application code to announce its identity over PC5 interface. In an example embodiment, if the discovery is restricted in Model A, the V2X UE may use V2X restricted code to announce its identity over PC5 interface.

In an example embodiment, if the discovery is not restricted in Model A, the V2X UE may use V2X application code prefix and V2X application code suffix/V2X application code suffixes to announce its identity over PC5 interface. In an example embodiment, if the discovery is restricted in Model A, the V2X UE may use V2X restricted code prefix and V2X restricted code suffix/V2X restricted code suffixes to announce its identity over PC5 interface.

In an example embodiment, if the discovery is not restricted in Model A, the V2X UE may use V2X application code to announce its neighboring list to the V2X group neighbors over PC5 interface. In an example embodiment, if the discovery is restricted in Model A, the V2X UE may use V2X restricted code to announce its neighboring list to the V2X group neighbors over PC5 interface. In an example embodiment, if the discovery is not restricted in Model A, the V2X UE may use V2X application code to announce one or more segments of its neighboring list to the V2X group neighbors over PC5 interface.

In an example embodiment, if the discovery is restricted in Model A, the V2X UE may use V2X restricted code to announce one or more segments of its neighboring list to the V2X group neighbors over PC5 interface. In an example embodiment, if the discovery is not restricted in Model A, the V2X UE may use V2X restricted code prefix and V2X restricted code suffix/V2X restricted code suffixes to announce its neighboring list to the V2X group neighbors over PC5 interface.

In an example embodiment, if the discovery is restricted in Model A, the V2X UE may use V2X restricted code prefix and V2X restricted code suffix/V2X restricted code suffixes to announce its neighboring list to the V2X group neighbors over PC5 interface. In an example embodiment, if the discovery is not restricted in Model A, the V2X UE may use V2X application code prefix and V2X application code suffix/V2X application code suffixes to announce one or more segments its neighboring list to the V2X group neighbors over PC5 interface.

In an example embodiment, if the discovery is restricted in Model A, the V2X UE may use V2X restricted code prefix and V2X restricted code suffix/V2X restricted code suffixes to announce one or more segments its neighboring list to the V2X group neighbors over PC5 interface.

In example embodiment if the discovery is not restricted in Model A, the announcing V2X UE may be configured with V2X application ID. In an example embodiment, if the discovery is restricted in Model A, the announcing V2X UE may retrieve the PDUID and may provide it to the V2X application server. The V2X application server may allocate RPAUID for PDUID which have been provided by that V2X UE. The announcing V2X UE may use the obtained RPAUID instead of PDUID. The V2X application server may store the binding between the PDUID and RPAUID.

In an example embodiment, if the discovery is not restricted in Model A, the HPLMN V2X function may obtain V2X application ID from the announcing V2X UE and may provide container A for that V2X application ID to that V2X UE. Container A may be expired after a certain amount of time.

In an example embodiment, if the discovery is restricted in Model A, the HPLMN V2X function may obtain RPAUID from the announcing V2X UE and may provide container A for that RPAUID to that V2X UE. Container A may be expired after a certain amount of time.

In an example embodiment, if the discovery is not restricted container A may be V2X application code and/or V2X application code prefix with V2X application code suffix(es). In an example embodiment, if the discovery is restricted container A may be V2X restricted code and/or V2X restricted code prefix with V2X restricted code suffix(es).

In an example embodiment, in Model A, the V2X UE may use container A to announce its identity over PC5 interface. In an example embodiment, in Model A, the V2X UE may use container A to announce its neighboring list to the V2X group neighbors over PC5 interface. In an example embodiment, in Model A, the V2X UE may use container A to announce one or more segment(s) of its neighboring list to the V2X group neighbors over PC5 interface.

In an example embodiment, if the discovery is not restricted in the Model A, the V2X application ID of the announcing V2X UE may comprise the vehicle type of the V2X UE. In an example embodiment, if the discovery is not restricted in the Model A, the V2X application ID of the announcing V2X UE may comprise the pedestrian type of the V2X UE. In an example embodiment, if the discovery is not restricted in the Model A, the V2X application ID of the announcing V2X UE may comprise the infrastructure type of the V2X UE. In an example embodiment, if the discovery is not restricted in the Model A, the V2X application ID of the announcing V2X UE may comprise the vehicle-to-vehicle type of the V2X UE.

In an example embodiment, if the discovery is not restricted in the Model A, the V2X application ID of the announcing V2X UE may comprise the vehicle-to-pedestrian type of the V2X UE. In an example embodiment, if the discovery is not restricted in the Model A, the V2X application ID of the announcing V2X UE may comprise the vehicle-to-infrastructure type of the V2X UE.

In an example embodiment, if the discovery is not restricted in the Model A, the V2X application ID of the announcing V2X UE may comprise the vehicle-to-network type of the V2X UE. In an example embodiment, if the discovery is not restricted in the Model A, the V2X application ID of the announcing V2X UE may comprise at least two or more of the pedestrian type, vehicle type, infrastructure type, vehicle-to-vehicle type, vehicle-to-pedestrian type, vehicle-to-infrastructure type, and/or vehicle-to-network type of the V2X UE.

In an example embodiment, if the discovery is not restricted in the Model A, the V2X application ID of the announcing V2X UE may comprise all of the pedestrian type, vehicle type, infrastructure type, vehicle-to-vehicle type, vehicle-to-pedestrian type, vehicle-to-infrastructure type, and vehicle-to-network type of the V2X UE.

In an example embodiment, if the discovery is not restricted in the Model A, the V2X application ID of the announcing V2X UE may comprise the emergency vehicle type of the V2X UE. In an example embodiment, if the discovery is not restricted in the Model A, the V2X application ID of the announcing V2X UE may comprise the emergency pedestrian type of the V2X UE. In an example embodiment, if the discovery is not restricted in the Model A, the V2X application ID of the announcing V2X UE may comprise the emergency infrastructure type of the V2X UE. In an example embodiment, if the discovery is not restricted in the Model A, the V2X application ID of the announcing V2X UE may comprise the emergency vehicle-to-vehicle type of the V2X UE. In an example embodiment, if the discovery is not restricted in the Model A, the V2X application ID of the announcing V2X UE may comprise the emergency vehicle-to-pedestrian type of the V2X UE. In an example embodiment, if the discovery is not restricted in the Model A, the V2X application ID of the announcing V2X UE may comprise the emergency vehicle-to-infrastructure type of the V2X UE. In an example embodiment, if the discovery is not restricted in the Model A, the V2X application ID of the announcing V2X UE may comprise the emergency vehicle-to-network type of the V2X UE.

In an example embodiment, if the discovery is not restricted in the Model A, the V2X application ID of the announcing V2X UE may comprise at least two or more of the emergency pedestrian type, emergency vehicle type, emergency infrastructure type, emergency vehicle-to-vehicle type, emergency vehicle-to-pedestrian type, emergency vehicle-to-infrastructure type, and/or emergency vehicle-to-network type of the V2X UE.

In an example embodiment, if the discovery is not restricted in the Model A, the V2X application ID of the announcing V2X UE may comprise all of the emergency pedestrian type, emergency vehicle type, emergency infrastructure type, emergency vehicle-to-vehicle type, emergency vehicle-to-pedestrian type, emergency vehicle-to-infrastructure type, and emergency vehicle-to-network type of the V2X UE.

In an example embodiment, if the discovery is restricted in the Model A, the RPAUID which may be assigned to V2X discovery UE ID (PDUID) of the announcing V2X UE may comprise the vehicle type of the V2X UE. In an example embodiment, if the discovery is restricted in the Model A, the RPAUID which may be assigned to V2X discovery UE ID (PDUID) of the announcing V2X UE may comprise the pedestrian type of the V2X UE. In an example embodiment, if the discovery is restricted in the Model A, the RPAUID which may be assigned to V2X discovery UE ID (PDUID) of the announcing V2X UE may comprise the infrastructure type of the V2X UE. In an example embodiment, if the discovery is restricted in the Model A, the RPAUID which may be assigned to V2X discovery UE ID (PDUID) of the announcing V2X UE may comprise the vehicle-to-vehicle type of the V2X UE.

In an example embodiment, if the discovery is restricted in the Model A, the RPAUID which may be assigned to V2X discovery UE ID (PDUID) of the announcing V2X UE may comprise the vehicle-to-pedestrian type of the V2X UE. In an example embodiment, if the discovery is restricted in the Model A, the RPAUID which may be assigned to V2X discovery UE ID (PDUID) of the announcing V2X UE may comprise the vehicle-to-infrastructure type of the V2X UE. In an example embodiment, if the discovery is restricted in the Model A, the RPAUID which may be assigned to V2X discovery UE ID (PDUID) of the announcing V2X UE may comprise the vehicle-to-network type of the V2X UE. In an example embodiment, if the discovery is restricted in the Model A, the RPAUID which may be assigned to V2X discovery UE ID (PDUID) of the announcing V2X UE may comprise at least two or more of the pedestrian type, vehicle type, infrastructure type, vehicle-to-vehicle type, vehicle-to-pedestrian type, vehicle-to-infrastructure type, and/or vehicle-to-network type of the V2X UE.

In an example embodiment, if the discovery is restricted in the Model A, the RPAUID which may be assigned to V2X discovery UE ID (PDUID) of the announcing V2X UE may comprise all of the pedestrian type, vehicle type, infrastructure type, vehicle-to-vehicle type, vehicle-to-pedestrian type, vehicle-to-infrastructure type, and vehicle-to-network type of the V2X UE.

In an example embodiment, if the discovery is restricted in the Model A, the RPAUID which may be assigned to V2X discovery UE ID (PDUID) of the announcing V2X UE may comprise the emergency vehicle type of the V2X UE. In an example embodiment, if the discovery is restricted in the Model A, the RPAUID which may be assigned to V2X discovery UE ID (PDUID) of the announcing V2X UE may comprise the emergency pedestrian type of the V2X UE. In an example embodiment, if the discovery is restricted in the Model A, the RPAUID which may be assigned to V2X discovery UE ID (PDUID) of the announcing V2X UE may comprise the emergency infrastructure type of the V2X UE. In an example embodiment, if the discovery is restricted in the Model A, the RPAUID which may be assigned to V2X discovery UE ID (PDUID) of the announcing V2X UE may comprise the emergency vehicle-to-vehicle type of the V2X UE. In an example embodiment, if the discovery is restricted in the Model A, the RPAUID which may be assigned to V2X discovery UE ID (PDUID) of the announcing V2X UE may comprise the emergency vehicle-to-pedestrian type of the V2X UE. In an example embodiment, if the discovery is restricted in the Model A, the RPAUID which may be assigned to V2X discovery UE ID (PDUID) of the announcing V2X UE may comprise the emergency vehicle-to-infrastructure type of the V2X UE. In an example embodiment, if the discovery is restricted in the Model A, the RPAUID which may be assigned to V2X discovery UE ID (PDUID) of the announcing V2X UE may comprise the emergency vehicle-to-network type of the V2X UE.

In an example embodiment, if the discovery is restricted in the Model A, the RPAUID which may be assigned to V2X discovery UE ID (PDUID) of the announcing V2X UE may comprise at least two or more of the emergency pedestrian type, emergency vehicle type, emergency infrastructure type, emergency vehicle-to-vehicle type, emergency vehicle-to-pedestrian type, emergency vehicle-to-infrastructure type, and/or emergency vehicle-to-network type of the V2X UE.

In an example embodiment, if the discovery is restricted in the Model A, the RPAUID which may be assigned to V2X discovery UE ID (PDUID) of the announcing V2X UE may comprise all of the emergency pedestrian type, vehicle type, emergency infrastructure type, emergency vehicle-to-vehicle type, emergency vehicle-to-pedestrian type, emergency vehicle-to-infrastructure type, and vehicle-to-network type of the V2X UE.

In an example embodiment, if it is restricted discovery in Model A, the monitoring V2X UE may retrieve the PDUID and may provide it to the V2X application server. The V2X application server may allocate RPAUID for PDUID which have been provided by that V2X UE. The monitoring V2X UE may use the obtained RPAUID instead of PDUID. The V2X application server may store the binding between the PDUID and RPAUID.

In an example embodiment, if it is not restricted discovery in Model A, the HPLMN V2X function may obtain V2X application ID from the monitoring V2X UE and may provide discovery filter which may match V2X application code for that V2X application ID of the announcing V2X UE. The HPLMN V2X function may provide a time indicator for the expiration of the V2X application code for that V2X application ID of the announcing V2X UE.

In an example embodiment, if it is restricted discovery in Model A, the HPLMN V2X function may obtain RPAUID from the monitoring V2X UE and may provide discovery filter which may match V2X restricted code for that RPAUID of the announcing V2X UE. The HPLMN V2X function may provide a time indicator for the expiration of the V2X restricted code for that RPAUID of the announcing V2X UE.

In an example embodiment, if the discovery is not restricted in Model A, the HPLMN V2X function may obtain V2X application ID from the monitoring V2X UE and may provide discovery filter which may match V2X application code Prefix with V2X application code suffix for that V2X application ID of the announcing V2X UE. The HPLMN V2X function may provide a time indicator for the expiration of the V2X application code Prefix with V2X application code suffix for that V2X application ID of the announcing V2X UE.

In an example embodiment, if the discovery is restricted in Model A, the HPLMN V2X function may obtain RPAUID from the monitoring V2X UE and may provide discovery filter which may match V2X restricted code Prefix with V2X restricted code suffix for that RPAUID of the announcing V2X UE. The HPLMN V2X function may provide a time indicator for the expiration of the V2X restricted code Prefix with V2X restricted code suffix for that RPAUID of the announcing V2X UE.

In an example embodiment, if the discovery is not restricted in Model A, the HPLMN V2X function obtains V2X application ID from the monitoring V2X UE and may provide discovery filter which may match V2X application code Prefix with V2X application code suffixes for that V2X application ID of the announcing V2X UE. The HPLMN V2X function may provide a time indicator for the expiration of the V2X application code Prefix with V2X application code suffixes for that V2X application ID of the announcing V2X UE.

In an example embodiment, if the discovery is restricted in Model A, the HPLMN V2X function obtains RPAUID from the monitoring V2X UE and may provide discovery filter which may match V2X restricted code Prefix with V2X restricted code suffixes for that RPAUID of the announcing V2X UE. The HPLMN V2X function may provide a time indicator for the expiration of the V2X restricted code Prefix with V2X restricted code suffixes for that RPAUID of the announcing V2X UE.

In an example embodiment, if the discovery is not restricted in Model A the discovery filter of that monitoring V2X UE which may match V2X application code indicates announcing UE's neighboring list to the V2X group neighbors. In an example embodiment, if the discovery is restricted in Model A the discovery filter of that monitoring V2X UE which may match V2X restricted code indicates announcing UE's neighboring list to the V2X group neighbors. In an example embodiment, if the discovery is not restricted in Model A the discovery filter of that monitoring V2X UE which may match V2X application code prefix with V2X application code suffixes indicates announcing UE's neighboring list to the V2X group neighbors.

In an example embodiment, if the discovery is restricted in Model A the discovery filter of that monitoring V2X UE which may match V2X restricted code prefix with V2X restricted code suffixes indicates announcing UE's neighboring list to the V2X group neighbors. In example embodiment if the discovery is not restricted in Model A, the monitoring V2X UE may be configured with V2X application ID.

In an example embodiment, if the discovery is restricted in Model A the monitoring V2X UE may retrieve the PDUID and may provide it to the V2X application server. The V2X application server may allocate RPAUID for PDUID which have been provided by that V2X UE. The monitoring V2X UE may use the obtained RPAUID instead of PDUID. The V2X application server may store the binding between the PDUID and RPAUID.

In an example embodiment, if the discovery is not restricted in Model A, the HPLMN V2X function may obtain V2X application ID from the monitoring V2X UE and may provide container A which may match container B for that V2X application ID of the announcing V2X UE. The HPLMN V2X function may provide a time indicator for the expiration of the container B for that V2X application ID of the announcing V2X UE.

In an example embodiment, if the discovery is restricted in Model A, the HPLMN V2X function may obtain RPAUID from the monitoring V2X UE and may provide container A which may match container B for that RPAUID of the announcing V2X UE. The HPLMN V2X function may provide a time indicator for the expiration of the container B for that RPAUID of the announcing V2X UE.

In an example embodiment, if the discovery is not restricted in Model A container A of that monitoring V2X UE which may match container B indicates announcing UE's neighboring list to the V2X group neighbors. In an example embodiment, container A may be discovery filter. In an example embodiment, container B may be V2X application code and/or V2X application code Prefix with V2X application code suffix(es).

In an example embodiment, if the discovery is restricted in Model A container A of that monitoring V2X UE which may match container B indicates announcing UE's neighboring list to the V2X group neighbors. In an example embodiment, container A may be discovery filter. In an example embodiment, container B may be V2X restricted code and/or V2X restricted code Prefix with V2X restricted code suffix(es).

In an example embodiment, if the discovery is not restricted in the Model A, the discovery filter of the monitoring V2X UE which may match V2X application code for that V2X application ID of the announcing V2X may identify the vehicle type of the announcing V2X UE. In an example embodiment, if the discovery is not restricted in the Model A, the discovery filter of the monitoring V2X UE which may match V2X application code for that V2X application ID of the announcing V2X may identify the pedestrian type of the announcing V2X UE.

In an example embodiment, if the discovery is not restricted in the Model A, the discovery filter of the monitoring V2X UE which may match V2X application code for that V2X application ID of the announcing V2X may identify the infrastructure type of the announcing V2X UE. In an example embodiment, if the discovery is not restricted in the Model A, the discovery filter of the monitoring V2X UE which may match V2X application code for that V2X application ID of the announcing V2X may identify the vehicle-to-vehicle type of the announcing V2X UE.

In an example embodiment, if the discovery is not restricted in the Model A, the discovery filter of the monitoring V2X UE which may match V2X application code for that V2X application ID of the announcing V2X may identify the vehicle-to-pedestrian type of the announcing V2X UE. In an example embodiment, if the discovery is not restricted in the Model A, the discovery filter of the monitoring V2X UE which may match V2X application code for that V2X application ID of the announcing V2X may identify the vehicle-to-infrastructure type of the announcing V2X UE.

In an example embodiment, if the discovery is not restricted in the Model A, the discovery filter of the monitoring V2X UE which may match V2X application code for that V2X application ID of the announcing V2X may identify the vehicle-to-network type of the announcing V2X UE.

In an example embodiment, if the discovery is not restricted in the Model A, the discovery filter of the monitoring V2X UE which may match V2X application code for that V2X application ID of the announcing V2X may identify at least two or more of the pedestrian type, the vehicle type, the infrastructure type, vehicle-to-vehicle type, vehicle-to-pedestrian type, vehicle-to-network, and/or vehicle-to infrastructure type of the announcing V2X UE.

In an example embodiment, if the discovery is not restricted in the Model A, the discovery filter of the monitoring V2X UE which may match V2X application code for that V2X application ID of the announcing V2X may identify all of the pedestrian type, the vehicle type, the infrastructure type, vehicle-to-vehicle type, vehicle-to-pedestrian type, vehicle-to-network, and vehicle-to infrastructure type of the announcing V2X UE.

In an example embodiment, if the discovery is not restricted in the Model A, the discovery filter of the monitoring V2X UE which may match V2X application code prefix with V2X application code suffix(es) for that V2X application ID of the announcing V2X may identify the vehicle type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the pedestrian type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the infrastructure type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the vehicle-to-vehicle type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the vehicle-to-network type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the vehicle-to-pedestrian type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the vehicle-to-infrastructure type of the announcing V2X UE.

In an example embodiment, if the discovery is not restricted in the Model A, the discovery filter of the monitoring V2X UE which may match V2X application code prefix with V2X application code suffix(es) for that V2X application ID of the announcing V2X may identify at least two or more of the pedestrian type, the vehicle type, or the infrastructure type, vehicle-to-vehicle type, vehicle-to-pedestrian type, vehicle-to-network, and/or vehicle-to infrastructure type of the announcing V2X UE.

In an example embodiment, if the discovery is not restricted in the Model A, the discovery filter of the monitoring V2X UE which may match V2X application code prefix with V2X application code suffix(es) for that V2X application ID of the announcing V2X may identify all of the pedestrian type, the vehicle type, the infrastructure type, vehicle-to-vehicle type, vehicle-to-pedestrian type, vehicle-to-network, and vehicle-to infrastructure type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the vehicle type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the pedestrian type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the infrastructure type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the vehicle-to-vehicle type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the vehicle-to-pedestrian type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the vehicle-to-infrastructure type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the vehicle-to-network type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise at least two or more of the pedestrian type, the vehicle type, the infrastructure type, vehicle-to-vehicle type, vehicle-to-pedestrian type, vehicle-to-network, and/or vehicle-to infrastructure type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise all of the pedestrian type, the vehicle type, the infrastructure type, vehicle-to-vehicle type, vehicle-to-pedestrian type, vehicle-to-network, and vehicle-to infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the vehicle type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the pedestrian type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the infrastructure type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the vehicle-to-vehicle type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the vehicle-to-pedestrian type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the vehicle-to-infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the vehicle-to-network type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise at least two or more of the pedestrian type, the vehicle type, the infrastructure type, vehicle-to-vehicle type, vehicle-to-pedestrian type, vehicle-to-network, and/or vehicle-to-infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise all of the pedestrian type, the vehicle type, the infrastructure type, vehicle-to-vehicle type, vehicle-to-pedestrian type, vehicle-to-network, and vehicle-to-infrastructure type of the announcing V2X UE.

In an example embodiment, if the discovery is not restricted in the Model A, the discovery filter of the monitoring V2X UE which may match V2X application code for that V2X application ID of the announcing V2X may identify the emergency vehicle type of the announcing V2X UE. In an example embodiment, if the discovery is not restricted in the Model A, the discovery filter of the monitoring V2X UE which may match V2X application code for that V2X application ID of the announcing V2X may identify the emergency pedestrian type of the announcing V2X UE. In an example embodiment, if the discovery is not restricted in the Model A, the discovery filter of the monitoring V2X UE which may match V2X application code for that V2X application ID of the announcing V2X may identify the emergency infrastructure type of the announcing V2X UE. In an example embodiment, if the discovery is not restricted in the Model A, the discovery filter of the monitoring V2X UE which may match V2X application code for that V2X application ID of the announcing V2X may identify the emergency vehicle-to-vehicle type of the announcing V2X UE. In an example embodiment, if the discovery is not restricted in the Model A, the discovery filter of the monitoring V2X UE which may match V2X application code for that V2X application ID of the announcing V2X may identify the emergency vehicle-to-pedestrian type of the announcing V2X UE. In an example embodiment, if the discovery is not restricted in the Model A, the discovery filter of the monitoring V2X UE which may match V2X application code for that V2X application ID of the announcing V2X may identify the emergency vehicle-to-infrastructure type of the announcing V2X UE. In an example embodiment, if the discovery is not restricted in the Model A, the discovery filter of the monitoring V2X UE which may match V2X application code for that V2X application ID of the announcing V2X may identify the emergency vehicle-to-network type of the announcing V2X UE. In an example embodiment, if the discovery is not restricted in the Model A, the discovery filter of the monitoring V2X UE which may match V2X application code for that V2X application ID of the announcing V2X may identify at least two or more of the emergency pedestrian type, the emergency vehicle type, the emergency infrastructure type, emergency vehicle-to-vehicle type, emergency vehicle-to-pedestrian type, emergency vehicle-to-network, and/or emergency vehicle-to infrastructure type of the announcing V2X UE.

In an example embodiment, if the discovery is not restricted in the Model A, the discovery filter of the monitoring V2X UE which may match V2X application code for that V2X application ID of the announcing V2X may identify all of the emergency pedestrian type, the emergency vehicle type, the emergency infrastructure type, emergency vehicle-to-vehicle type, emergency vehicle-to-pedestrian type, emergency vehicle-to-network, and emergency vehicle-to infrastructure type of the announcing V2X UE.

In an example embodiment, if the discovery is not restricted in the Model A, the discovery filter of the monitoring V2X UE which may match V2X application code prefix with V2X application code suffix(es) for that V2X application ID of the announcing V2X may identify the emergency vehicle type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency pedestrian type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency infrastructure type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency vehicle-to-vehicle type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency vehicle-to-network type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency vehicle-to-pedestrian type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify the emergency vehicle-to-infrastructure type of the announcing V2X UE. In an example embodiment, if the discovery is not restricted in the Model A, the discovery filter of the monitoring V2X UE which may match V2X application code prefix with V2X application code suffix(es) for that V2X application ID of the announcing V2X may identify at least two or more of the emergency pedestrian type, the emergency vehicle type, or the emergency infrastructure type, emergency vehicle-to-vehicle type, emergency vehicle-to-pedestrian type, emergency vehicle-to-network, and/or emergency vehicle-to infrastructure type of the announcing V2X UE.

In an example embodiment, if the discovery is not restricted in the Model A, the discovery filter of the monitoring V2X UE which may match V2X application code prefix with V2X application code suffix(es) for that V2X application ID of the announcing V2X may identify all of the emergency pedestrian type, the emergency vehicle type, the emergency infrastructure type, emergency vehicle-to-vehicle type, emergency vehicle-to-pedestrian type, emergency vehicle-to-network, and emergency vehicle-to infrastructure type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency vehicle type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency pedestrian type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency infrastructure type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency vehicle-to-vehicle type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency vehicle-to-pedestrian type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency vehicle-to-infrastructure type of the announcing V2X UE. In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise the emergency vehicle-to-network type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise at least two or more of the emergency pedestrian type, the emergency vehicle type, the emergency infrastructure type, emergency vehicle-to-vehicle type, emergency vehicle-to-pedestrian type, emergency vehicle-to-network, and/or emergency vehicle-to infrastructure type of the announcing V2X UE.

In an example embodiment, if the discovery is restricted in the Model A, the discovery filter of the monitoring V2X UE which may match V2X restricted code for the RPAUID which may have been assigned to V2X discovery UE ID (PDUID) of the announcing V2X UE may comprise all of the emergency pedestrian type, the emergency vehicle type, the emergency infrastructure type, emergency vehicle-to-vehicle type, emergency vehicle-to-pedestrian type, emergency vehicle-to-network, and emergency vehicle-to infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency vehicle type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency pedestrian type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency infrastructure type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency vehicle-to-vehicle type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency vehicle-to-pedestrian type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency vehicle-to-infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise the emergency vehicle-to-network type of the announcing V2X UE. In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise at least two or more of the emergency pedestrian type, the emergency vehicle type, the emergency infrastructure type, emergency vehicle-to-vehicle type, emergency vehicle-to-pedestrian type, emergency vehicle-to-network, and/or emergency vehicle-to-infrastructure type of the announcing V2X UE.

In an example embodiment, if the discovery is restricted in the Model A, the discovery filter of the monitoring V2X UE which may match V2X restricted code prefix with V2X restricted code suffix(es) for the RPAUID which may have been assigned to V2X discovery UE ID (PDUID) of the announcing V2X UE may comprise all of the emergency pedestrian type, the emergency vehicle type, the emergency infrastructure type, emergency vehicle-to-vehicle type, emergency vehicle-to-pedestrian type, emergency vehicle-to-network, and emergency vehicle-to-infrastructure type of the announcing V2X UE.

In an example embodiment, in Model B the discoveree V2X UE may retrieve the PDUID and may provide it to the V2X application server. The V2X application server may allocate RPAUID for PDUID which have been provided by that V2X UE. The discoveree V2X UE may use the obtained RPAUID instead of PDUID. The V2X application server may store the binding between the PDUID and RPAUID. In an example embodiment, in Model B, the HPLMN V2X function may obtain RPAUID from the discoveree V2X UE and may provide V2X response code and V2X query filter matched for certain V2X query code for that RPAUID to that V2X UE. The V2X response code and V2X query filter may be expired after a certain amount of time.

In an example embodiment, in Model B, the HPLMN V2X function obtains RPAUID from the discoveree V2X UE and may provide V2X response code and V2X query filters matched for certain V2X query code for that RPAUID to that V2X UE. The V2X response code and V2X query filters may be expired after a certain amount of time.

In an example embodiment, in Model B the discoveree V2X UE may use V2X response code to response over interface PC5 to a received V2X query code which may be matched to the V2X query filter. In an example embodiment, in Model B the discoveree V2X UE may use V2X response code to response over interface PC5 to a received V2X query code which may be matched to one or more of the V2X query filters. In an example embodiment, in Model B the V2X response code and one or more V2X query filter(s) which may be matched to a V2X query code indicate discoveree UE's neighboring list to the V2X group neighbors. In an example embodiment, in Model B the V2X response code and one or more V2X query filter(s) which may be matched to a V2X query code indicate one or more segment(s) of discoveree UE's neighboring list to the V2X group neighbors.

In an example embodiment, in Model B the discoveree V2X UE may retrieve the PDUID and may provide it to the V2X application server. The V2X application server may allocate RPAUID for PDUID which have been provided by that V2X UE. The discoveree V2X UE may use the obtained RPAUID instead of PDUID. The V2X application server may store the binding between the PDUID and RPAUID.

In an example embodiment, in the Model B, the V2X query filter of the discoveree V2X UE which may match V2X query code for the RPAUID which may have been assigned to V2X discovery UE ID (PDUID) of the discoverer V2X UE may comprise the vehicle type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the pedestrian type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the infrastructure type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the vehicle-to-vehicle type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the vehicle-to-pedestrian type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the vehicle-to-network type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the vehicle-to-infrastructure type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise at least two or more of the pedestrian type, the vehicle type, the infrastructure type, vehicle-to-vehicle type, vehicle-to-pedestrian type, vehicle-to-network, and/or vehicle-to-infrastructure type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise all of the pedestrian type, the vehicle type, the infrastructure type, vehicle-to-vehicle type, vehicle-to-pedestrian type, vehicle-to-network, and vehicle-to-infrastructure type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency vehicle type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency pedestrian type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency infrastructure type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency vehicle-to-vehicle type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency vehicle-to-pedestrian type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency vehicle-to-network type of the discoverer V2X UE. In an example embodiment, in the Model B, the V2X query filter of the discoveree V2X UE which may match V2X query code for the RPAUID which may have been assigned to V2X discovery UE ID (PDUID) of the discoverer V2X UE may comprise the emergency vehicle-to-infrastructure type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise at least two or more of the emergency pedestrian type, the emergency vehicle type, the emergency infrastructure type, emergency vehicle-to-vehicle type, emergency vehicle-to-pedestrian type, emergency vehicle-to-network, and/or emergency vehicle-to-infrastructure type of the discoverer V2X UE.

In an example embodiment, in the Model B, the V2X query filter of the discoveree V2X UE which may match V2X query code for the RPAUID which may have been assigned to V2X discovery UE ID (PDUID) of the discoverer V2X UE may comprise all of the emergency pedestrian type, the emergency vehicle type, the emergency infrastructure type, emergency vehicle-to-vehicle type, emergency vehicle-to-pedestrian type, emergency vehicle-to-network, and emergency vehicle-to-infrastructure type of the discoverer V2X UE.

In an example embodiment, in Model B, the HPLMN V2X function may obtain RPAUID from the discoveree V2X UE and may provide container A and one or more container B(s) matched for certain container C for that RPAUID to that V2X UE. The V2X response code and V2X query filter may be expired after a certain amount of time. In an example embodiment, in Model B the discoveree V2X UE may use container A to response over interface PC5 to a received container C which may be matched to the one or more container C(s). In an example embodiment, in Model B the container A and one or more container B which may be matched to a container C indicate discoveree UE's neighboring list to the V2X group neighbors. In an example embodiment, in Model B container A and one or more container B which may be matched to container C indicate one or more segment(s) of discoveree UE's neighboring list to the V2X group neighbors.

In an example embodiment, container A may be V2X response code. In an example embodiment, container A may be V2X query filter. In an example embodiment, container A may be V2X query code. In an example embodiment, in Model B the discoverer V2X UE may retrieve the PDUID and may provide it to the V2X application server. The V2X application server may allocate RPAUID for PDUID which have been provided by that V2X UE. The discoverer V2X UE may use the obtained RPAUID instead of PDUID. The V2X application server may store the binding between the PDUID and RPAUID.

In an example embodiment, in Model B, the HPLMN V2X function obtains RPAUID from the discoverer V2X UE and may provide V2X query code and the V2X response filter matched for a certain V2X response code for that RPAUID to the discoverer V2X UE. The V2X query code and the V2X response filter may be expired after a certain amount of time.

In an example embodiment, in Model B, the HPLMN V2X function obtains RPAUID from the discoverer V2X UE and may provide V2X query code and the V2X response filters matched for a certain V2X response code for that RPAUID to the discoverer V2X UE. The V2X query code and the V2X response filters may be expired after a certain amount of time.

In an example embodiment, in Model B the discoverer V2X UE may use V2X query code to response over interface PC5 to find out it is matched to the V2X response filter. In an example embodiment, in Model B the discoverer V2X UE may use V2X query code to response over interface PC5 to find out it is matched to one or more of the V2X response filters. In an example embodiment, in Model B the V2X query code and one or more V2X response filter(s) which may be matched to a V2X response code indicate discoverer UE's neighboring list to the V2X group neighbors.

In an example embodiment, in Model B the V2X query code and one or more V2X response filter(s) which may be matched to a V2X response code indicate one or more segment(s) of discoverer UE's neighboring list to the V2X group neighbors. In an example embodiment, in Model B the discoverer V2X UE may retrieve the PDUID and may provide it to the V2X application server. The V2X application server may allocate RPAUID for PDUID which have been provided by that V2X UE. The discoverer V2X UE may use the obtained RPAUID instead of PDUID. The V2X application server may store the binding between the PDUID and RPAUID.

In an example embodiment, in Model B, the HPLMN V2X function may obtain RPAUID from the discoverer V2X UE and may provide container A and one or more container B(s) matched for a certain container C for that RPAUID to the discoverer V2X UE. The container A and the container B may be expired after a certain amount of time.

In an example embodiment, in Model B the discoverer V2X UE may use container A to response over interface PC5 to find out it is matched to one or more of container B(s). In an example embodiment, in Model B the container A and one or more container B(s) which may be matched to a container C indicate discoverer UE's neighboring list to the V2X group neighbors. In an example embodiment, in Model B container A and one or more container B(s) which may be matched to a container C indicate one or more segment(s) of discoverer UE's neighboring list to the V2X group neighbors.

In an example embodiment, container A may be V2X query code. In an example embodiment, container B may be V2X response filter. In an example embodiment, container C may be V2X response code. In an example embodiment, in the Model B, the V2X response filter of the discoverer V2X UE which may match V2X response code for the RPAUID which may have been assigned to V2X discovery UE ID (PDUID) of the discoveree V2X UE may comprise the vehicle type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the pedestrian type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the infrastructure type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the vehicle-to-vehicle type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the vehicle-to-pedestrian type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the vehicle-to-infrastructure type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the vehicle-to-network type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise at least two or more of the pedestrian type, the vehicle type, or the infrastructure type, vehicle-to-vehicle type, vehicle-to-pedestrian type, vehicle-to-network, and/or vehicle-to-infrastructure type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise all of the pedestrian type, the vehicle type, the infrastructure type, vehicle-to-vehicle type, vehicle-to-pedestrian type, vehicle-to-network, and vehicle-to-infrastructure type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency vehicle type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency pedestrian type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency infrastructure type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency vehicle-to-vehicle type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency vehicle-to-pedestrian type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency vehicle-to-infrastructure type of the discoveree V2X UE. In an example embodiment, in the Model B, the V2X response filter of the discoverer V2X UE which may match V2X response code for the RPAUID which may have been assigned to V2X discovery UE ID (PDUID) of the discoveree V2X UE may comprise the emergency vehicle-to-network type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise at least two or more of the emergency pedestrian type, the emergency vehicle type, or the emergency infrastructure type, emergency vehicle-to-vehicle type, emergency vehicle-to-pedestrian type, emergency vehicle-to-network, and/or emergency vehicle-to-infrastructure type of the discoveree V2X UE.

In an example embodiment, in the Model B, the V2X response filter of the discoverer V2X UE which may match V2X response code for the RPAUID which may have been assigned to V2X discovery UE ID (PDUID) of the discoveree V2X UE may comprise all of the pedestrian type, the vehicle type, the infrastructure type, vehicle-to-vehicle type, vehicle-to-pedestrian type, vehicle-to-network, and vehicle-to-infrastructure type of the discoveree V2X UE.

Figure 50:
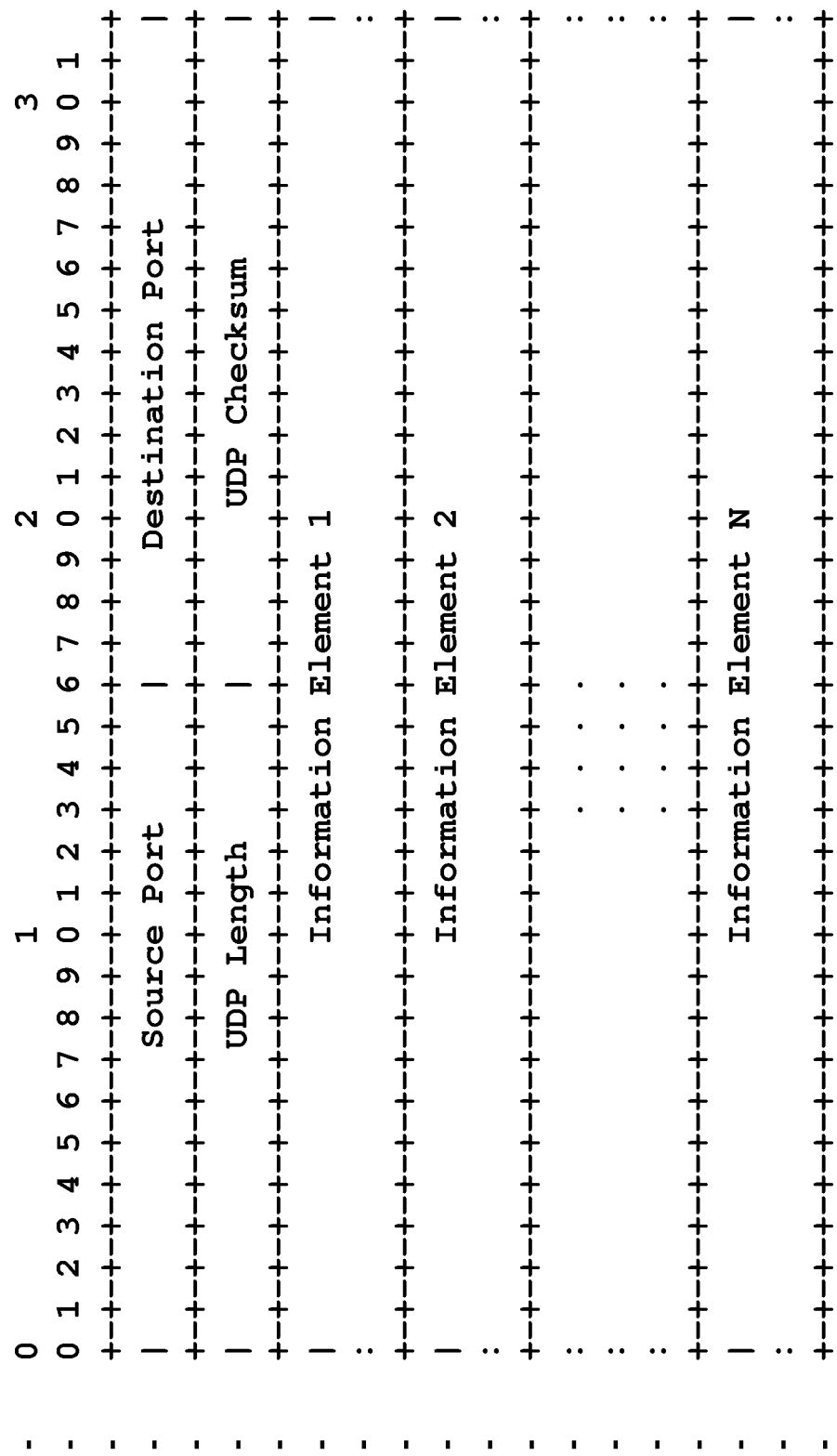
FIG. 50 is a diagram illustrating an example information element of a user diagram protocol as per an aspect of an embodiment of the present disclosure.
Figure 51:
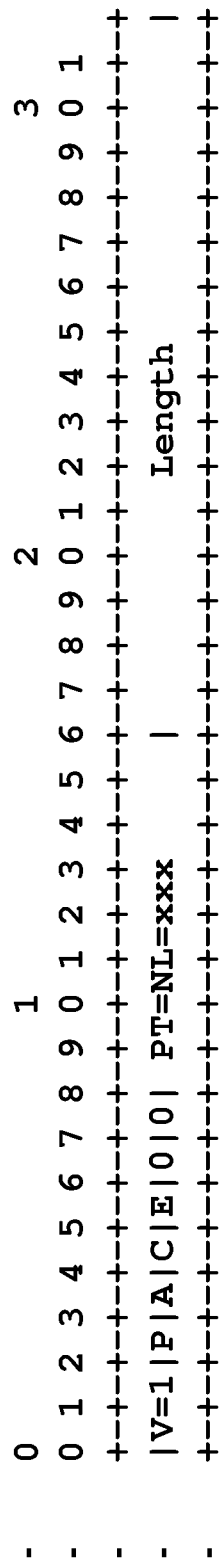
FIG. 51 is a diagram illustrating an example information element as per an aspect of an embodiment of the present disclosure.

In an example embodiment, the neighboring list of a V2X group member may be announced and may be broadcasted by using the payload of user diagram protocol (UDP) as shown in FIG. 50 with a set of information elements comprising the neighboring list and the related information elements for announcements. In an example embodiment, an information element may be as in FIG. 51, where V may be version number and may be set to 1; P may be set to 1 if there is padding at the end of payload otherwise may be set to zero; A is address type which may be set to "0" if the V2X neighbor list announcer has a specific type of address e.g. IPV4 address and may be set to "1" if it has another specific type of address e.g. IPV6 address; C is compressed bit which may be set to "1" if the packet is compressed or may be set to "0" if otherwise; E is encryption bit which may be set to "1" if the packet is encrypted or may be set to "0" if otherwise (if both compression and encryption are applied to the packet format, the compression may need to be applied first.); Packet Type (PT) may be to show this is neighboring list (NL) and may be set to a certain value to indicate that this packet may contain the V2X neighboring list; and length may be the length of the payload of the UDP packet.

Figure 52:
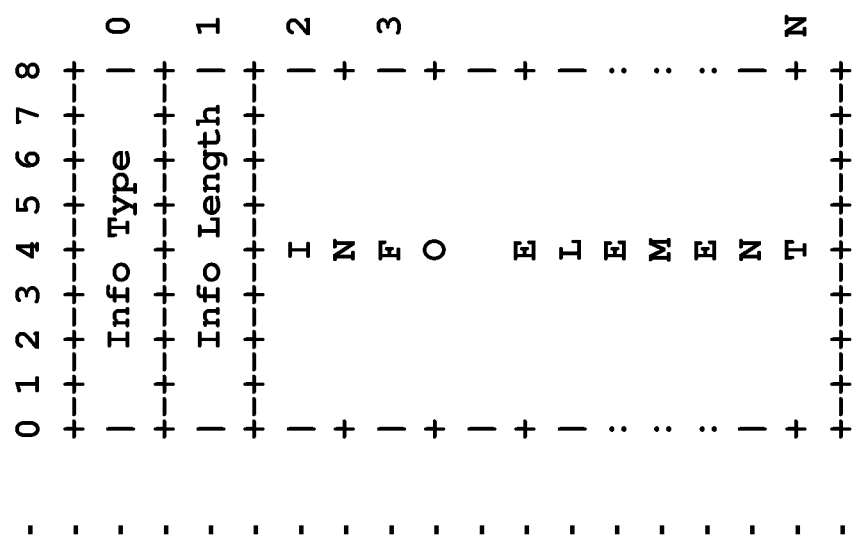
FIG. 52 is a diagram illustrating an example information element as per an aspect of an embodiment of the present disclosure.

In an example embodiment, the information element can be represented according to FIG. 52, where the first byte may indicate the type of the information element and the second byte may indicate the length of the information element and the rest may be the content of the information element.

In an example embodiment real-time transport control protocol (RTCP) may be a sister protocol for real-time transport protocol (RTP) (with an example in IETF RFC 3550). RTP may be used for transmission of media between different entities while RTCP may be used for periodically sending control information to maintain certain quality for the media transmission and also synchronization between the media streams. RTCP may have been used as floor control signaling protocol for application such as push to talk over cellular (PoC) in OMA or mission critical push-to-talk (MCPTT) in 3GPP standard bodies. The protocol may be light and may be transmitted over user datagram protocol (UDP) which is connectionless and offers no guarantee to be delivered to the endpoint, but at the same time may not require any tedious connection oriented procedures which may not be suitable for the wireless communications. Therefore, RTCP may be a good candidate for link layer transmission of data burst and thereby announcement of neighboring list.

RTCP packet format may be specified as in FIG. 53 (as example is shown in IETF RFC 3550). The following figure may show the format of RTCP for the transportation of the neighboring list, where V may be version number and may be set to 2 (an example is shown in IETF RFC 3550); P may be set to 1 if there is padding at the end of payload otherwise may be set to zero; A is address type which may be set to "0" if the V2X neighbor list announcer has a specific type of address e.g. IPV4 address and may be set to "1" if it has another specific type of address e.g. IPV6 address; C is compressed bit which may be set to "1" if the packet is compressed or may be set to "0" if otherwise; E is encryption bit which may be set to "1" if the packet is encrypted or may be set to "0" if otherwise (if both compression and encryption are applied to the packet format, the compression may need to be applied first.); Packet Type (PT) may be to show this is neighboring list (NL) and may be set to a certain value to indicate that this packet may contain the V2X neighboring list; length may be the length of the RTCP packet; SSRC may be the synchronization source identifier for the originator announcing the V2X Neighboring List; NLAP (4 Bytes) may be chosen to define the V2X neighboring list announcement protocol packets to be unique with respect to other application packets this V2X might receive; optional authentication data; and the list of the V2X neighbor ID and possible zero padding to make this field a multiple of 32 bits.

The neighboring list announcement protocol (NLAP) may be broadcasted may be broadcasted of a pre-defined channel with a pre-defined port number, an optional authentication data may be added so that the V2X users from non-affiliated groups may be able to ignore the neighboring list announcements.

Figure 54:
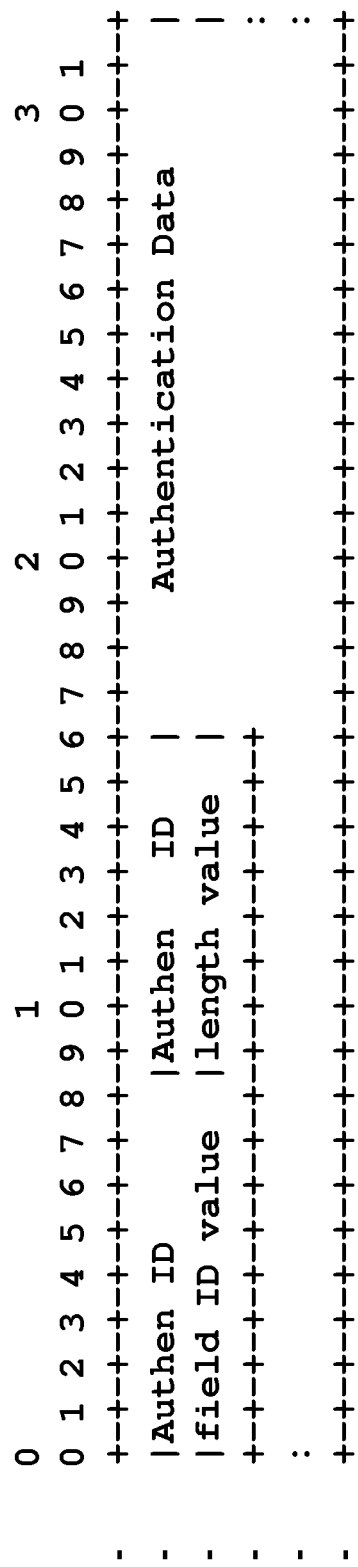
FIG. 54 is a diagram illustrating an example information element as per an aspect of an embodiment of the present disclosure.

In an example embodiment, an information element in FIG. 50 and/or the possible authentication data in FIG. 43 may be defined according to FIG. 54, where Authen ID field ID value may be a predefined binary value to indicate this field; Authen ID length ID with its binary value may show the length of this field; and Authentication data may be the authentication data to authenticate the announcer of the neighboring list.

Figure 55:
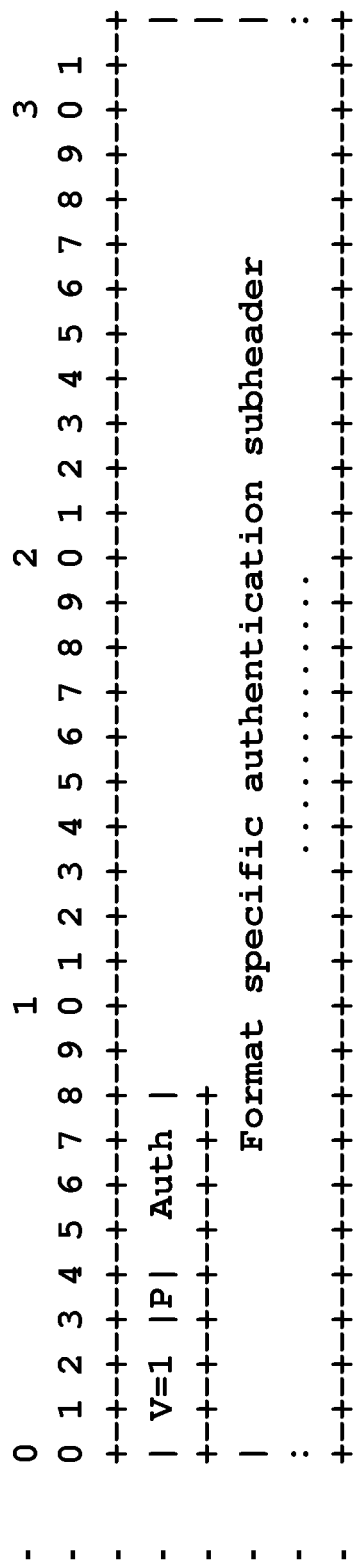
FIG. 55 is a diagram illustrating an example information element as per an aspect of an embodiment of the present disclosure.

In an example embodiment, an information element in FIG. 50 and/or the possible authentication data in FIG. 55 may be according to the following figure (an example is shown in IETF RFC 2974) with the following format, where V is the version number and may be set to "1"; P is the padding bit and may be set to "1" if authentication data may be padded to be a multiple of 32 bits; Auth is authentication type which may be 4 bits and may be set to "0" if OpenPGP message format (an example in IETF RFC 2440) is employed for authentication. It may be set to "1" if cryptographic message syntax (CMS) (an example in IETF RFC 3369 and IETF RFC 3370), is used for authentication; and format specific authentication subheader may be according to one for OpenPGP authentication (an example in IETF RFC 2440) or may be according to the one for CMS authentication (an example in IETF RFC 3369 and IETF RFC 3370).

Figure 56:
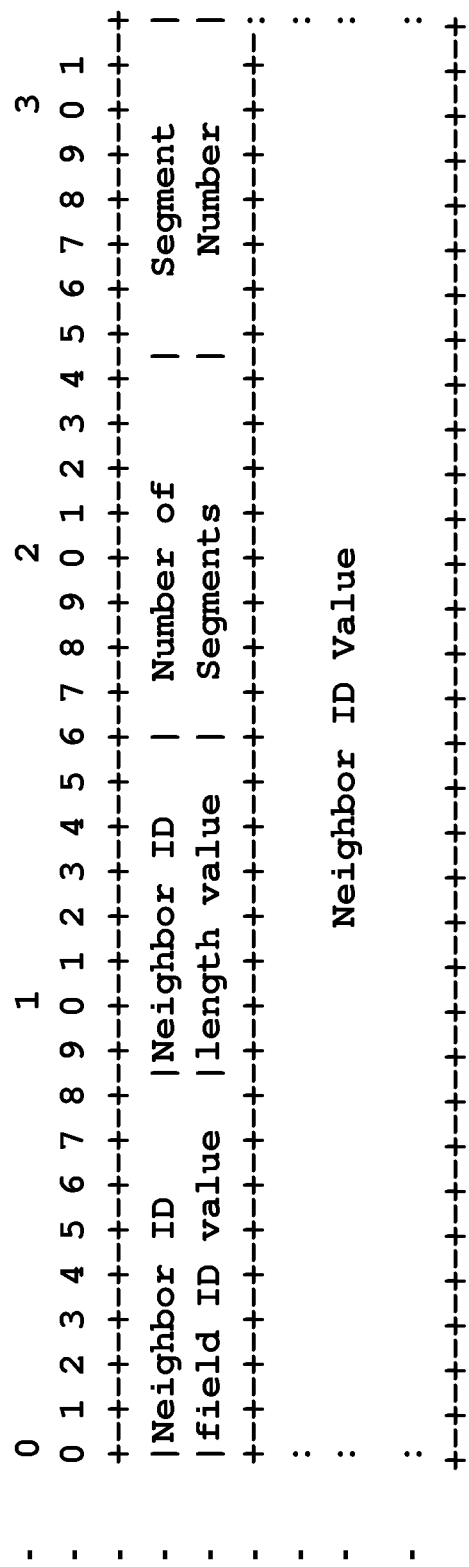
FIG. 56 is a diagram illustrating an example information element as per an aspect of an embodiment of the present disclosure.

In an example embodiment, an information element in FIG. 50 and/or the neighbor ID field and possible zero padding to make this field a multiple of 32 bits and may be according to FIG. 56, where neighbor ID field ID may have a predefined binary value to indicate this field; neighbor ID length ID with its binary value may show the length of the field; number of Segments may be the total number of UDP packets in FIG. 50 and/or RTCP packets in FIG. 53 which may be employed to allocate all the neighbors in the neighboring list; and segment number may be the current number of total segments used to announce all the neighbors in neighboring list.

The information element for the neighboring list may also be presented as in FIG. 57. In an example embodiment, an information element may not be a part of UDP and/or RTCP and may be represented according to FIG. 52. The zero padding may be a multiple of 8 bits. If IP addressing is not used by UDP and/or RTCP, the information elements can be broadcasted/multi-casted to the groups of interest on PC5 interface for conveying different information such as information about authentication of the broadcasted/multi-casted information, neighboring list, or any other information.

If IP addressing is employed, the UDP packets in FIG. 50 and/or RTCP packet in FIG. 52 may be generated periodically by the V2X group members. The periodicity may be pre-configured.

Figure 58:
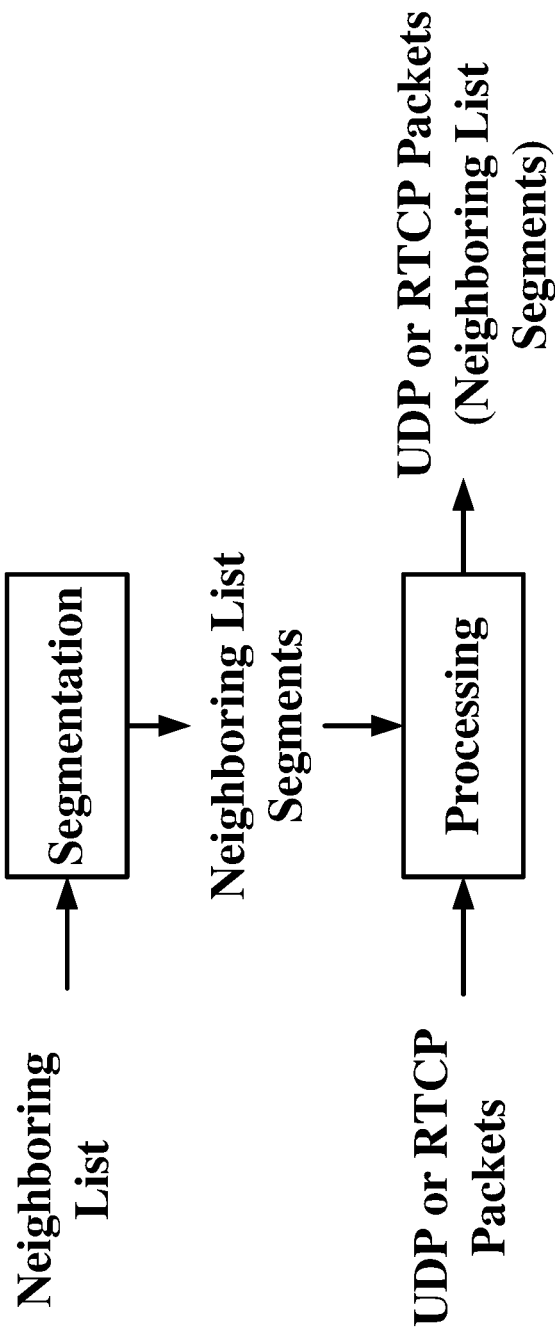
FIG. 58 is a diagram illustrating segmentation of a neighbor list as per an aspect of an embodiment of the present disclosure.

The example in FIG. 58 shows that the neighboring list are processed into the UDP and/or RTCP packets comprising the neighboring list information. If the size of neighboring information is larger than the payload of the UDP and/or RTCP packet, then neighboring list is divided into segments which individually gets processed by the UDP and/or RTCP packets. The transmitting V2X UE transmits the UDP and/or RTCP packets on PC5 interface.

Figure 59:
FIG. 59 is a diagram illustrating reverse segmentation of a neighbor list as per an aspect of an embodiment of the present disclosure.

The example in FIG. 59 shows on the recipient side the recipient V2X UEs may receive the UDP and/or RTCP packets with the neighboring list information which may be in segments. Having reverse processed the UDP and/or RTCP packets, the recipient V2X UE may parse the neighboring list or its segments from the reversed processed RTCP packets. If the neighboring list is in several segments, the recipient V2X UE collect all the segments from several received UDP and/or RTCP packets to reconstruct the entire neighboring list belonging to the transmitting V2X UE.

In an example embodiment, a V2X member may divide its neighbor list into several segments. In an example embodiment, a V2X member may transmit its neighboring list by use of a payload container. In an example embodiment, a V2X member may periodically transmit its neighboring list by use of a payload container. In an example embodiment, a V2X member may transmit segments of it neighboring list by use of a payload container. In an example embodiment, a V2X member may periodically transmit segments of it neighboring list by use of a payload container. In an example embodiment, the payload container may be part of RTCP. In an example embodiment, the RTCP can be transmitted over UDP. In an example embodiment, the payload container may directly be part of UDP. In an example embodiment, the payload container is transmitted with no IP addressing, e.g. UDP, IP, RTCP. In an example embodiment, the encryption may be use to encrypt the information about V2X neighboring's neighboring list. In an example embodiment, the encryption may be use to encrypt the information about the segments V2X neighboring's neighboring list. In an example embodiment, the compression may be used to compress the information about the V2X members' neighboring list. In an example embodiment, the authentication may be used to authenticate the V2X member announcing its neighboring list. In an example embodiment, the payload container identifies the payload by an indicator. In an example embodiment, the information about compression, authentication, compression, neighboring list and/or any other necessary information may use different information elements and may be transmitted by first being wrapped in IP, TCP, UDP, RTCP, or any other IP protocol. In an example embodiment, the information about compression, authentication, compression, neighboring list and/or any other necessary information may use different information elements and may be transmitted periodically by first being wrapped in IP, TCP, UDP, RTCP, or any other IP protocol.

In an example embodiment, the information about compression, authentication, compression, neighboring list and/or any other necessary information may use different information elements and may be transmitted without any IP addressing and by themselves. In an example embodiment, the information about compression, authentication, compression, neighboring list and/or any other necessary information may use different information elements and may be transmitted periodically without any IP addressing and by themselves.

In an example embodiment, the payload is identified by RTCP packet. In an example embodiment, an V2X member may receive a payload container comprising an V2X user's neighboring list. In an example embodiment, an V2X member may receive a payload container comprising a segment of an V2X user's neighboring list. In an example embodiment, a recipient V2X member collects all the segments of the neighboring list's segments to build the neighboring list of the announcing V2X member. In an example embodiment, a V2X member may receive the payload container as a part of a UDP packet.

In an example embodiment, a V2X member may receive the payload container as a part of an RTCP packet. In an example embodiment, a V2X member may receive the RTCP packet over UDP. In an example embodiment, the received neighboring list may be encrypted. In an example embodiment, the received segment of the neighboring list may be encrypted. In an example embodiment, the received neighboring list may be compressed. In an example embodiment, the received segment of the neighboring list may be compressed. In an example embodiment, the recipient V2X member may need to authenticate the V2X member who announces its neighboring list. In an example embodiment, the recipient V2X member may need to authenticate the V2X member who announces segments of its neighboring list. In an example embodiment, the recipient V2X member may receive the modified neighbor list and may replace the current local one with the received one. In an example embodiment, the recipient V2X member may receive the same neighbor list and may replace the current local one with the received one. In an example embodiment, the recipient V2X member may receive the modified segment of the neighbor list and may replace the current local one with the received one. In an example embodiment, the recipient V2X member may receive the same segment neighbor list and may replace the current local one with the received one. In an example embodiment, the recipient V2X member may need to collect all the received segments from the announcing V2X member to create the announcing V2X user's neighboring list.

In an example embodiment, the V2X communication may be divided into vehicle-to-vehicle (V2V); vehicle-to-infrastructure (V2I); vehicle-to-network (V2N); and vehicle-to-pedestrian (V2P).

V2V may use E-UTRAN to allow the UEs to communicate with each other once they are at each other proximities if the permission by MNOs is fulfilled. In an example embodiment, the vehicles may or may not be served by E-UTRAN for such communications. UEs supporting V2V may periodically share information about their locations, speeds, and dynamics for V2V service. The periodicity may be configured by existing circumstances, which are defined by the MNOs and the UEs may broadcast or unicast this information when using V2V service.

V2I and V2N may be used by a UE supporting these services to send information to another UE or to a group of the UEs. In an example embodiment, RSU and network supporting V2I and V2N may broadcast/multicast the received information to a group a UE. In an example embodiment, RSU and network supporting V2I and V2N may uncast the received information to a certain UE which may support V2I/V2N service.

V2P may use E-UTRAN to allow the UEs to communicate with each other once they are at each other proximities if the permission by MNOs is fulfilled. In an example embodiment, the vehicle and the pedestrian may or may not be served by E-UTRAN for such communications. UEs supporting V2P may periodically share information about their locations, speeds, and dynamics for V2P service. The periodicity may be configured by existing circumstances, which are defined by the MNOs and the UEs may broadcast or unicast this information when using V2P service.

In an example embodiment, a vehicle may broadcast/multicast periodically its location, speed, acceleration, and estimated trajectory to other vehicles to avoid or mitigate any collision. In an example embodiment, a vehicle may broadcast/multicast periodically its location, speed, acceleration, and estimated trajectory at the time of control loss to other vehicles to avoid or mitigate any collision. The periodicity may be adjusted due to MNO policy and/or other circumstances but may be limited to 10 per second. The size of the broadcasted/multicasted messages may be 50-300 bytes but may be up 1200 bytes. UE may use E-UTRAN to transmit the messages and/or UE may transmit the messages directly without any access to E-UTRAN. Both E-UTRAN or direct communication may support communication range to give the UEs ample response time e.g. 4 seconds.

In an example embodiment, an emergency vehicle such as an ambulance, a police car broadcasts/multicasts periodically message CAM comprising its location, speed, and direction information to assist other vehicle to allow it a passage path. The periodicity may be adjusted by the MNO policy and/or other circumstances but may be limited to 10 per second. The size of the broadcasted/multicasted CAM may be 50-300 Bytes and should have a latency less than 100 msec. Both E-UTRAN or direct communication may support communication range to give the UEs ample response time e.g. 4 seconds.

In an example embodiment, a vehicle in case of emergency stop may broadcast/multicast periodically a message DENM with the stationary vehicle warning to alert the other cars about its current situation. The periodicity may be adjusted by the MNO policy and/or other circumstances but may be limited to 10 per second. The size of the broadcasted/multicasted DENM may be 400 Bytes but with the maximum of 1200 Bytes and should have a latency less than 100 msec. Both E-UTRAN or direct communication may support communication range to give the UEs ample response time e.g. 4 seconds.

In an example embodiment, a group of vehicle may periodically with periodicity of one message per second, broadcast/multicast the cooperative adaptive cruise control message (CACC) about the gap policy, speed, position in the CACC group to other vehicles. A vehicle may receive the CACC message and may identify that group is acceptable due to e.g. speed, size, etc. and may like to join the CACC group by sending a request to join the CACC group. Once the vehicle has been accepted to join the group by at least one of the group members, the vehicle may inform the group members that it joined the CACC group.

In an example embodiment, an RSU may receive a vehicle's stationary vehicle warning DENM message and may periodically broadcast/multicast that message. The periodicity may be adjusted by the MNO policy and/or other circumstances but may be limited to 10 per second. The size of the broadcasted/multicasted DENM may be 400 Bytes but with the maximum of 1200 Bytes and should have a latency less than 100 msec. Both E-UTRAN or direct communication may support communication range to give the UEs ample response time e.g. 4 seconds.

In an example embodiment, a vehicle may be able to broadcast/multicast periodically with RSUs and other vehicles about a queue characteristic such as status, size to avoid and mitigate any accidents or any other road safety issue. The periodicity may be adjusted by the MNO policy and/or other circumstances but may be limited to 10 per second. The size of the broadcasted/multicasted messages may be 50-400 Bytes but with the maximum of 1200 Bytes and should have a latency less than 100 msec. Both E-UTRAN or direct communication may support communication range to give the UEs ample response time e.g. 4 seconds.

In an example embodiment, a vehicle may be able to send and receive unicast message to an RSU for a service such as paying toll or reserving a parking place. The size of the unicast messages may be 50-400 Bytes and should have a latency of 100 msec. Both E-UTRAN or direct communication may support communication range to give the UEs ample response time e.g. 4 seconds.

In an example embodiment, a vehicle may be able to broadcast/multicast periodically with other vehicles about an inevitable accident to warn those vehicles. The periodicity may be adjusted by the MNO policy and/or other circumstances. The size of the broadcasted/multicasted messages may be 50-300 Bytes and should have a latency less than 20 msec. Both E-UTRAN or direct communication may support communication range to give the UEs ample response time.

In an example embodiment, UEs supporting V2V communications may be pre-configured by MNO to operate by sending and/or receiving message directly without any E-UTRAN involvement.

In an example embodiment, the network server for traffic safety may be able to unicast the safety messages to the RSU which may broadcast/multicast those messages to vehicles or pedestrians. The delivery of these message may be less than 500 msec.

In an example embodiment, a vulnerable road user such a pedestrian or cyclist may receive a periodically broadcasted/multicasted warning message from a vehicle about the vehicle's e.g. speed, location, and direction of driving. The periodicity may be adjusted by the MNO policy and/or other circumstances. The size of the broadcasted/multicasted messages may be 50-300 Bytes but with the maximum of 1200 Bytes. Both E-UTRAN or direct communication may support communication.

In an example embodiment, a vehicle may receive a periodically broadcasted/multicasted warning message from a vulnerable road user such as pedestrian and cyclist about its location, speed and/or user behavior such as texting, talking on the phone. The periodicity may be adjusted by the MNO policy and/or other circumstances but may be limited to 10 per second. The size of the broadcasted/multicasted messages may be 50-300 Bytes but with the maximum of 1200 Bytes and should have a latency less than 100 msec.

Both E-UTRAN or direct communication may support communication range to give the UEs ample response time e.g. 4 seconds.

In an example embodiment, E-UTRAN network may be congested and its resources may not be enough to cover all V2X communication. It may be needed that E-UTRAN network may need to prioritize V2X messages serving emergency purposes. It may be needed that E-UTRAN network may need to prioritize V2X messages with specific type e.g. road safety.

In an example embodiment, the V2X communication messages for location do not reveal the vehicle/pedestrian privacy and identity.

In an example embodiment, a vehicle may be able to periodically unicast messages to a server in the network directly through E-UTRAN or via an RSU. The vehicle may be able to receive unicast messages from the server via an RSU or directly from the E-UTRAN network. The V2X may be for maintenance services.

In one example a V2X communication may be established by creating new messages multicast/broadcast or unicast by using the payload of user diagram protocol (UDP), FIG. 50, where the source port may be the address of the V2X message originator. In an example embodiment, the destination port is the address of a broadcast/multicast port when/if the V2X message may need to be broadcasted or multicasted. In an example embodiment, the destination port is a private destination address if the V2X message may need to be transmitted privately to an end V2X UE. In an example embodiment, the first information element may determine the type of V2X messages such as In an example embodiment real-time transport control protocol (RTCP) may be a sister protocol for real-time transport protocol (RTP) (with an example in IETF RFC 3550). RTP may be used for transmission of media between different entities while RTCP may be used for periodically sending control information to maintain certain quality for the media transmission and also synchronization between the media streams. The protocol may be light and may be transmitted over UDP (as shown in FIG. 58 as the first information element).

RTCP packet format may be specified as following figure (as example is shown in IETF RFC 3550). FIG. 60 may show the format of RTCP for the transportation of the neighboring list, where V may be version number and may be set to 2 (an example is shown in IETF RFC 3550); P may be set to 1 if there is padding at the end of payload otherwise may be set to zero; A is address type which may be set to "0" if the V2X announcer has a specific type of address e.g. IPV4 address and may be set to "1" if it has another specific type of address e.g. IPV6 address; C is compressed bit which may be set to "1" if the packet is compressed or may be set to "0" if otherwise; E is encryption bit which may be set to "1" if the packet is encrypted or may be set to "0" if otherwise (if both compression and encryption are applied to the packet format, the compression may need to be applied first.); Packet Type (PT) may be to show this is V2X and may be set to a certain value to indicate that this packet may contain V2X communication; length may be the length of the RTCP packet; SSRC may be the synchronization source identifier for the V2X originator; V2XX (4 Bytes) may be chosen to define the V2X communication protocol packets to be unique with respect to other application packets; and information element field as described above to identify the V2X message and other properties and possible zero padding to make this field a multiple of 32 bits.

The V2X messages may be broadcasted may be broadcasted of a pre-defined channel with a pre-defined port number, an optional authentication data may be added so that the V2X users from non-affiliated groups may be able to ignore the neighboring list announcements.

In an example embodiment, the message type may be following, where DENM: decentralized environmental notification message; DNM: decentralized notification message; CAM: cooperative awareness message; CACC: cooperative adaptive cruise control; and BSM: basic safety message. The following are message types and other values may be considered to represent the type of the V2X messages: GROUP DENM: Warning message of an accident may have a value of 00000001, GROUP CAM: message the group may have a value of 00000010, CACC: cooperative adaptive cruise control may have a value of 00000100, PROBE CACC: to join a cooperative adaptive cruise control may have a value of 00001000, INVITE CACC: Inviting to join CACC may have a value of 00010000, ACCEPT CACC: inform members about having joined CACC may have a value of 00100000, RELEASE CACC: leaving a CACC may have a value of 01000000, Bill request: bill request for a service e.g. toll, parking may have a value of 10000000, Bill response: amount of request bill for a service may have a value of 10000001, PAY request: pay information e.g. credit card info may have a value of 10000010, PAY response: means of paying an amount may have a value of 10000100, PRIVATE DNM: sent privately may have a value of 10001000, PRIVATE CAM: sent privately may have a value of 10010000, REJECT CACC may have a value of 10100000, and BSM may have a value of 11000000.

Figure 61:
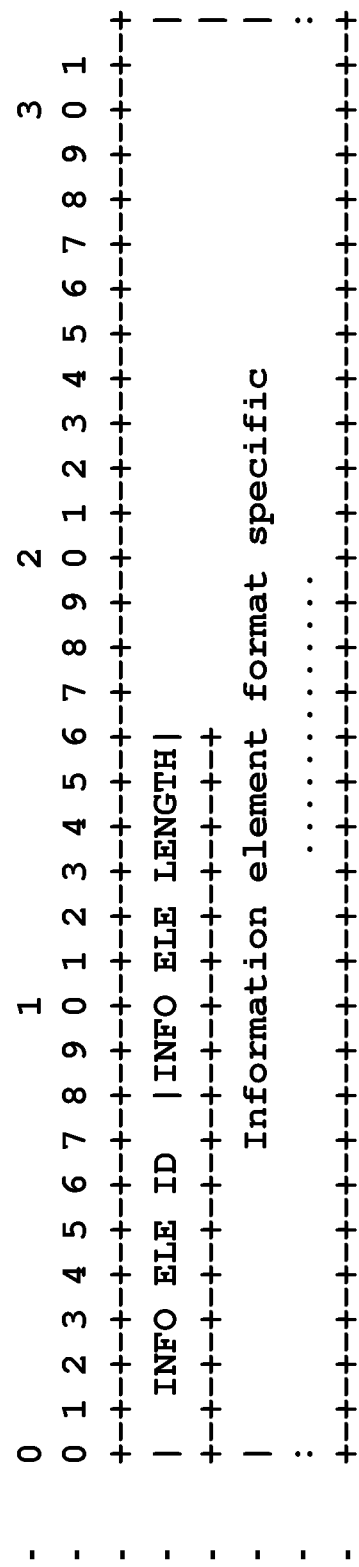
FIG. 61 is a diagram illustrating an example information element as per an aspect of an embodiment of the present disclosure.

In an example embodiment, the information elements of the V2X message may be according to FIG. 61, where information element ID may have a value to identify the information element. The information element length may be the number of 32 bit words for the information subheader and subbody. The information element may represent the type of the V2X client e.g. V2V, V2I, V2N, and/or V2P, V2X message priority, location, speed, acceleration, trajectory, behavior of the user e.g. talking, texting, getting direction.

In an example embodiment, the a V2X communication may be established by creating new messages multicast/broadcast or unicast by using the structure of the information element in FIG. 52, where information element ID may have a value to identify the information element. The information element length may be the number of 8 bit words for the information subheader and subbody. The information element may represent the type of the V2X client e.g. V2V, V2I, V2N, and/or V2P, V2X message priority, location, speed, acceleration, trajectory, behavior of the user e.g. talking, texting, getting direction.

This type of information element may use user plane solution by using generic NAS transport for being unicasted, multi-casted, and/or broadcasted. Uplink NAS transport with the information element identifier for V2X may be used by V2X UE to send V2X messages which are directed to the terminating V2X devices/entities which may have one or more established EPS bearer(s) with the originating V2X UE. Downlink NAS transport with the information element identifier for V2X may be used by V2X UE to receive V2X messages through one or more established EPS bearer(s) from the originating V2X devices/entities.

Uplink generic NAS transport with the information element identifier for V2X may be used by V2X UE to send V2X messages which are directed to the terminating V2X devices/entities which may have one or more established EPS bearer(s) with the originating V2X UE. Downlink generic NAS transport with the information element identifier for V2X may be used by V2X UE to receive V2X messages through one or more established EPS bearer(s) from the originating V2X devices/entities. For generic NAS transport, a new generic message container type may be created to distinguish the V2X message type from the existing ones. For generic NAS transport, a new additional information element may be created to provide additional information to upper layers in relation to generic NAS message transport mechanism. Choice of NAS transport or NAS generic transport messages may be dependent on the size of the information element in FIG. 52.

Figure 62:
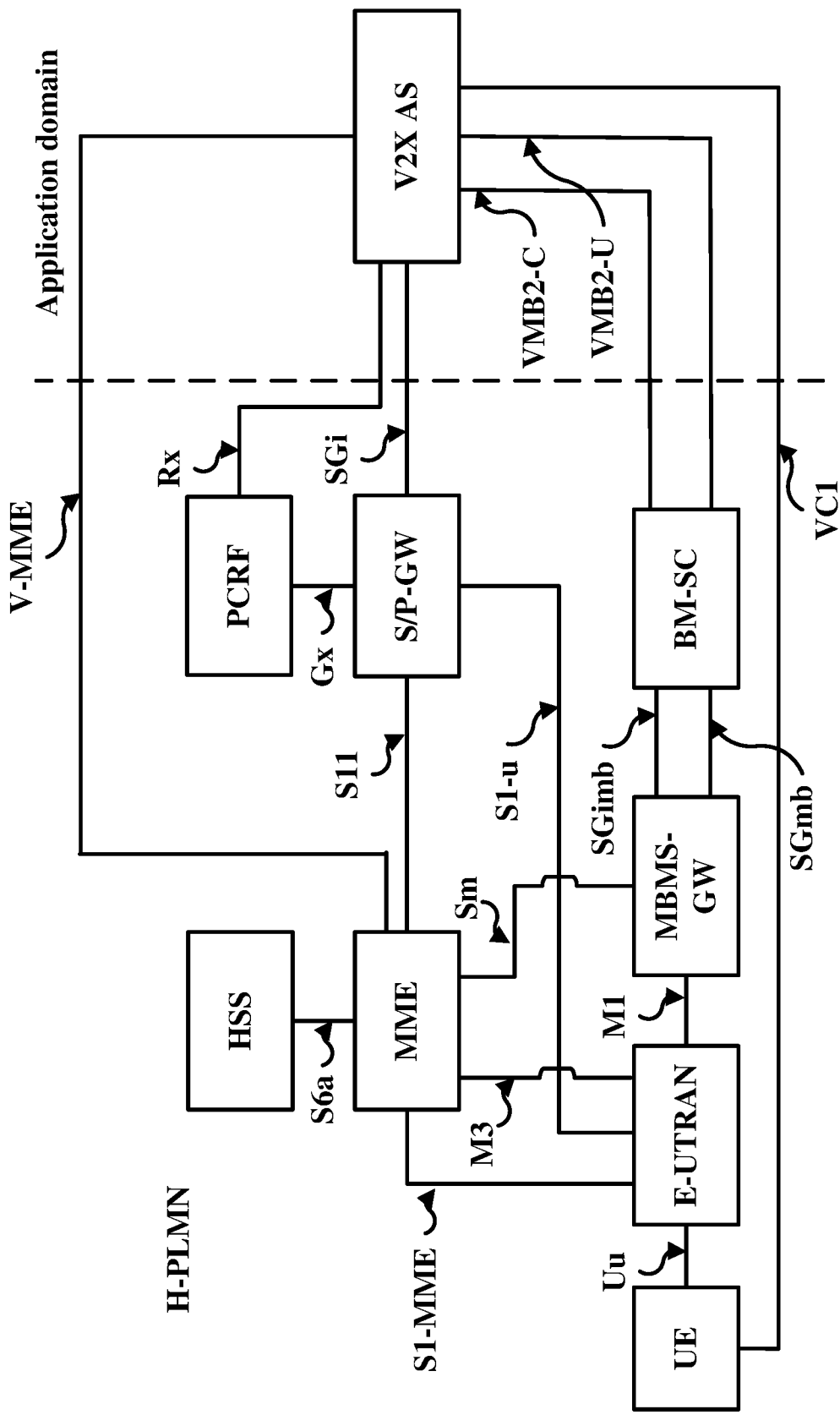
FIG. 62 is a block diagram of a MME communication with V2X AS architecture as per an aspect of an embodiment of the present disclosure.

In an example embodiment, shown in FIG. 62, V2X UE may employ default EPS bearer to transmit V2X information element as shown in FIG. 52 towards MME via E-UTRAN by employing uplink generic NAS transport message. The V2X information element received by the MME may further be transmitted towards the V2X AS via a reference point shown as V-MME in FIG. 62.

In an example embodiment, shown in FIG. 62, V2X AS may transmit V2X information element as shown in FIG. 52 towards MME by using the reference point V-MME as shown in FIG. 62. The MME may further transmit the V2X information element towards the V2X UE by employing generic NAS transport message which will be transmitted from E-UTRAN to the V2X UE as the downlink generic NAS transport by using the default EPS bearer. In an example embodiment, shown in FIG. 63, V2X UE may employ default EPS bearer to transmit V2X information element as shown in FIG. 52 towards MME via E-UTRAN by employing uplink NAS transport message. The V2X information element received by the MME may further be transmitted towards the V2X AS via MSC/VLR, SMSC and through a reference point shown as V-SMSC in FIG. 63.

Figure 63:
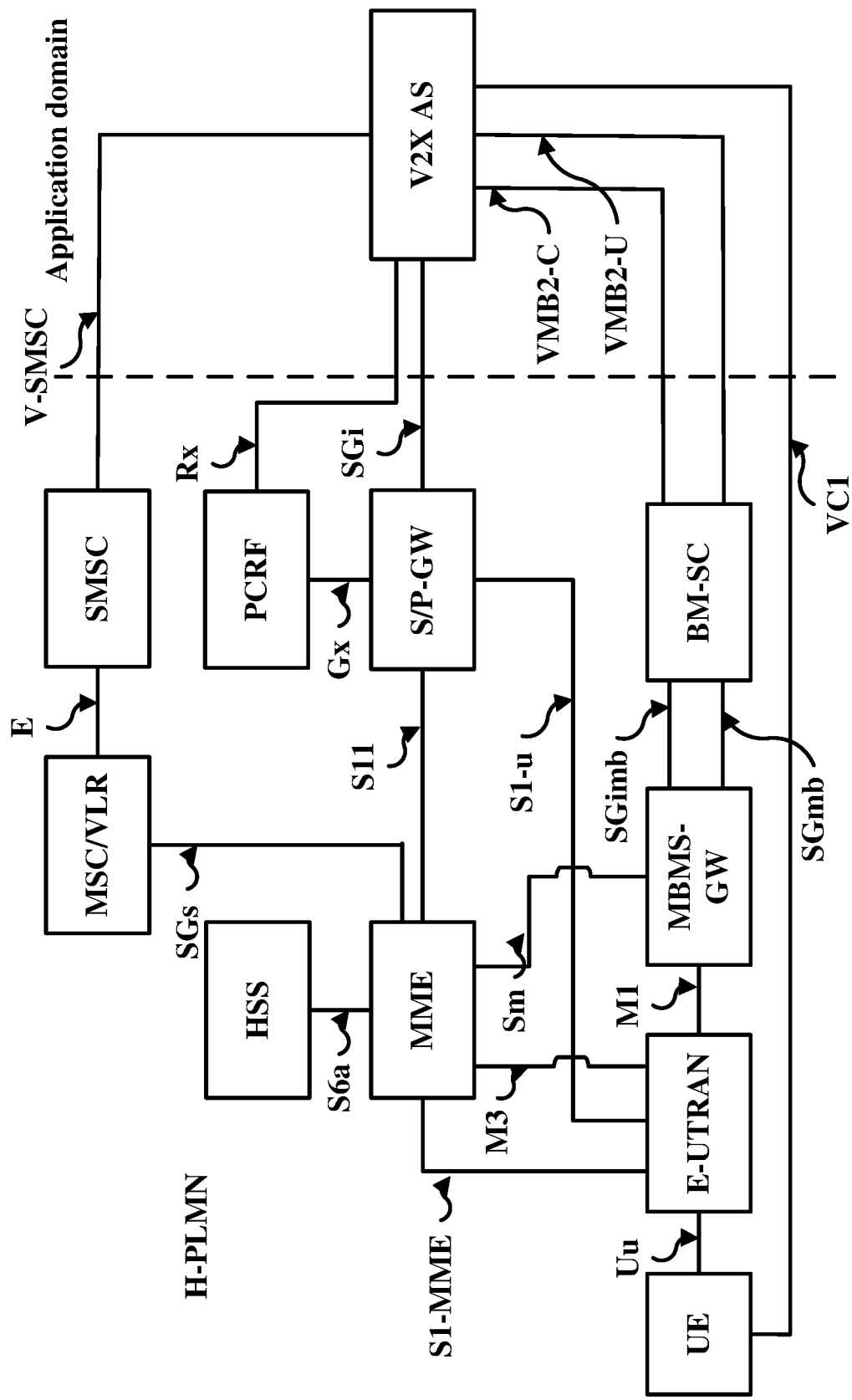
FIG. 63 is a block diagram of a MME communication with V2X AS architecture as per an aspect of an embodiment of the present disclosure.

In an example embodiment, shown in FIG. 63, V2X AS may transmit V2X information element as shown in FIG. 52 towards MME by using the reference point V-SMSC as shown in FIG. 63 and via SMSC and MSC/VLR. The MME may further transmit the V2X information element towards the V2X UE by employing NAS transport message which will be transmitted from E-UTRAN to the V2X UE as the downlink NAS transport by using the default EPS bearer.

In an example embodiment, the information element may describe the following V2X parameters: Message type which may show the type of the message; Version identity which may reflect which version of this protocol is employed; Message identity which may identify the V2X message if the caller transmitting several V2X messages. The message identity and the V2X message originator identity may need to be unique. The V2X message originator may need to change the message identity if modifying the message information elements; Message originator identity, which may show the sender identity; Message originator type which may be vehicle, pedestrian, infrastructure, and/or network; Message originator property which may show if the message originator is an emergency user such as ambulance; Message terminator identity, which may be a V2X group identity or a V2X private identity; Authentication data, which may be used to authenticate the V2X user at the time of receiving the message; Group identity, which may identify the V2X group the V2X user is affiliated with. This parameter may comprise identities from several groups; Organization identity, which may identify the organization the V2X message may belong to such as police department; Broadcast/multicast interval, which may identify the periodicity of this broadcasted/multicasted message; Commencement mode (automatic or acknowledgment) which may identify that the CACC originator may require other V2X members automatically joining the CACC or the CACC originator may require an acknowledgement in prior to joining the CACC; Information type (emergency, imminent peril, or normal), which may identify the nature of the V2X message; Mode such as behavior of user such as talking, texting, using an application; Movement such as speed and acceleration; Path and trajectory; Gap information for CACC; Message priority, which may identify the priority of the V2X message. The priorities may be defined with several levels; each may represent a level of the V2X message priority; Message encryption, which may identify the employed encryption method to encrypt the UDP packet; Message compression which may identify the employed compression method to compress the UDP packet. If both compression and encryption are applied to UDP packet format, the compression may need to be applied first; V2X UE location, which may identify the current location of the V2X UE; V2X message start time which may indicate the time of the start of the V2X message; V2X finish time (absolute time referring when the transmission of the message ends, relative time referring number of minutes until the transmission of the message ends, or immediate) which may indicate when the transmission of the V2X message may be terminated. The format of message finish time information element may be absolute e.g. the exact termination time. The format of message finish time information time may be relative e.g. how long the call may last. The format of the message finish time may be immediate which may indicate the message transmission may terminate immediately; Device model which may reflect the model of the V2X UE its capabilities; Application type which may reflect the application for the V2X message transmission of the V2X message.

In an example embodiment, SIP request can be used for standalone V2X communications. The header and the body of the SIP request may be used to convey V2X message information. In an example embodiment, Contact header field may be populated as a contact header value which may be an ICSI value for V2X type (e.g. V2V, V2i, v2p, AND/OR v2n) of V2X UE and/or an IARI value for V2X type (e.g. V2V, V2i, v2p, AND/OR v2n) of V2X UE. The V2X UE may construct a SIP request by populating a P-Preferred-Service header field with one ICSI value. In this example embodiment, the V2X UE may populate and Accept-Contact header field comprising an ICSI value and/or an IARI value for V2X type of communication e.g. V2V, V2P, V2I, and/or V2N. As an example the SIP INFO request message which list the V2X parameters as they listed above in the body of the SIP INFO request may list the header as INFO sip:V2Xmember@pc33.example.com SIP/2.0; Via: SIP/2.0/UDP 192.0.2.2:5060;branch=z9hG4bKnabcdef; To: Bob<sip:V2Xgroup@example.com>;tag=a6c85cf; From: Alice <sip:V2Xmember@example.com>;tag=1928301774; Contact: Alice <sip:V2Xmember@example.com>;+g.service.ims.icsi.v2x.rsu; Call-Id: a84b4c76e66710@pc33.example.com; CSeq: 314333 INFO; Info-Package: v2x; Content-type: application/v2x; Content-Disposition: Info-Package; Content-length: nnnn, where the content of the body of SIP INFO request with length 'nnnn' may be V2X structured to list the V2X parameters as described above.

The body of the SIP INFO request may also list the V2X parameter in by employing extensible markup language (XML) where Content-Type of the above header may be presented as INFO sip:V2Xmember@pc33.example.com SIP/2.0; Via: SIP/2.0/UDP 192.0.2.2:5060; branch=z9hG4bKnabcdef; To: Bob<sip:V2Xgroup@example.com>;tag=a6c85cf; From: Alice <sip:V2Xmember@example.com>;tag=1928301774; Contact: Alice <sip:V2Xmember@example.com>;+g.service.ims.icsi.v2x.rsu; Call-Id: a84b4c76e66710@pc33.example.com; CSeq: 314333 INFO; Info-Package: v2x; Content-type: application/V=v2x-list+xml; Content-Disposition: Info-Package; Content-length: nnnn, where the content of the body of SIP INFO request with length 'nnnn' may be XML format describing the V2X parameters as described above. Employing SIP INFO request is only an example and any SIP message can be used for the V2X communication. The content type is not limited to XML format or and V2X structured format. It may use other formats.

In an example embodiment, V2X UE may be one or a combination of V2V UE, V2I UE, V2N UE, and/or V2P UE. In an example embodiment, V2I UE, V2P UE, and/or V2V UE may have direct communication without any network involvement with each other. In an example embodiment, V2I UE, V2P UE, V2N and/or V2V UE may have communication via E-UTRAN network involvement with each other. In an example embodiment, V2X UE may broadcast media directly without any E-UTRAN involvement to other V2X UEs. In an example embodiment, V2X UE may unicast media directly without any E-UTRAN involvement to other V2X UEs. In an example embodiment, V2X UE may broadcast media via E-UTRAN to other V2X UEs In an example embodiment, V2X UE may unicast media via E-UTRAN to other V2X UEs. In an example embodiment, V2X UE may employ Model A and/or Model B ProSe discovery to discover other V2X UEs. In an example embodiment, V2X UE may employ Model A and/or Model B ProSe discovery to be discovered by other V2X UEs. In an example embodiment, V2X UE may be pre-configured with unicast port number(s) for unicast signaling to other V2X UEs. In an example embodiment, V2X UE may be pre-configured with broadcast port number(s) for broadcast signaling to other V2X UEs. In an example embodiment, V2X UE may be pre-configured with unicast port number(s) for media distribution to other V2X UEs. In an example embodiment, V2X UE may be pre-configured with broadcast port number(s) for media distribution to other V2X UEs. In an example embodiment, V2X UE may broadcast signaling to all other V2X UEs. In an example embodiment, V2X UE may unicast signaling to other V2X UE(s). In an example embodiment, V2X UE may broadcast media to all other V2X UEs. In an example embodiment, V2X UE may unicast media to other V2X UE(s). In an example embodiment, V2X UE may multicast signaling to a certain group(s) of V2X UEs. In an example embodiment, V2X UE may multicast media to a certain group(s) of V2X UEs. In an example embodiment, V2X UE may use UDP/IP for media and/or signaling transmission to other V2X UE(s). In an example embodiment, V2X UE may use RTCP/UDP/IP for media and/or signaling transmission to other V2X UE(s). In an example embodiment, V2X UE may use SIP for media and/or signaling transmission to other V2X UE(s). In an example embodiment, V2X UE may use user plane for media and/or signaling transmission to other V2X UE(s). In an example embodiment, V2X UE may use NAS transport message for media and/or signaling transmission to other V2X UE(s). In an example embodiment, V2X service may define an information element identity for generic NAS transport message and for NAS transport message for use of user plane for media and/or signaling transmission. In an example embodiment, V2X service may define a generic message container type for generic NAS transport message for use of user plane for media and/or signaling transmission. In an example embodiment, V2X service may define an additional information for generic NAS transport message for use of user plane for media and/or signaling transmission. In an example embodiment, V2X UE may use generic NAS transport message for media and/or signaling transmission to other V2X UE(s). In an example embodiment, V2X UE obtain an address such as IPv4 and/or IPv6 address(es) for signaling and/or media transmission to other V2X UEs. In an example embodiment, signaling and/or media may be in the same SIP, RTCP, TCP, and/or UDP packet. In an example embodiment, SIP header field in the SIP message may include the capability(ies) of the V2X UE e.g. V2I, V2P, V2N, and/or V2V. In an example embodiment, V2X message types identifying the action to be taken such as CAM, DENM, CACC etc. and responds to those, may be identified by pre-defined series of 1s and 0s. In an example embodiment, V2X message types identifying the action to be taken such as CAM, DENM, CACC etc. and responds to those, may be identified by pre-defined series of text such as ASCII text. It is an example and is not limited to ASCII. In an example embodiment, V2X message types identifying the action to be take such as CAM, DENM, CACC etc. and responds to those, may be identified by pre-defined XML. In an example embodiment, V2X message comprises a set of information elements such as originator identity, terminator identity, security, group identity, path, gap information, etc. to define the V2X messages. In an example embodiment, the information elements of the V2X messages may be presented by a series of ones and zeros. In an example embodiment, the information elements of the V2X messages may be presented by text such as ASCII. ASCII is an example for and this presentation should not be limited to it. In an example embodiment, the information elements of V2X messages may be presented by XML. In an example embodiment, the information elements may be part of body of SIP messages. Example non-limiting claims are presented here. Other examples may be provided.

According to various embodiments, a device such as, for example, a wireless device, off-network wireless device, a V2X wireless device, a base station, a V2X network entity, an IMS network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 64:
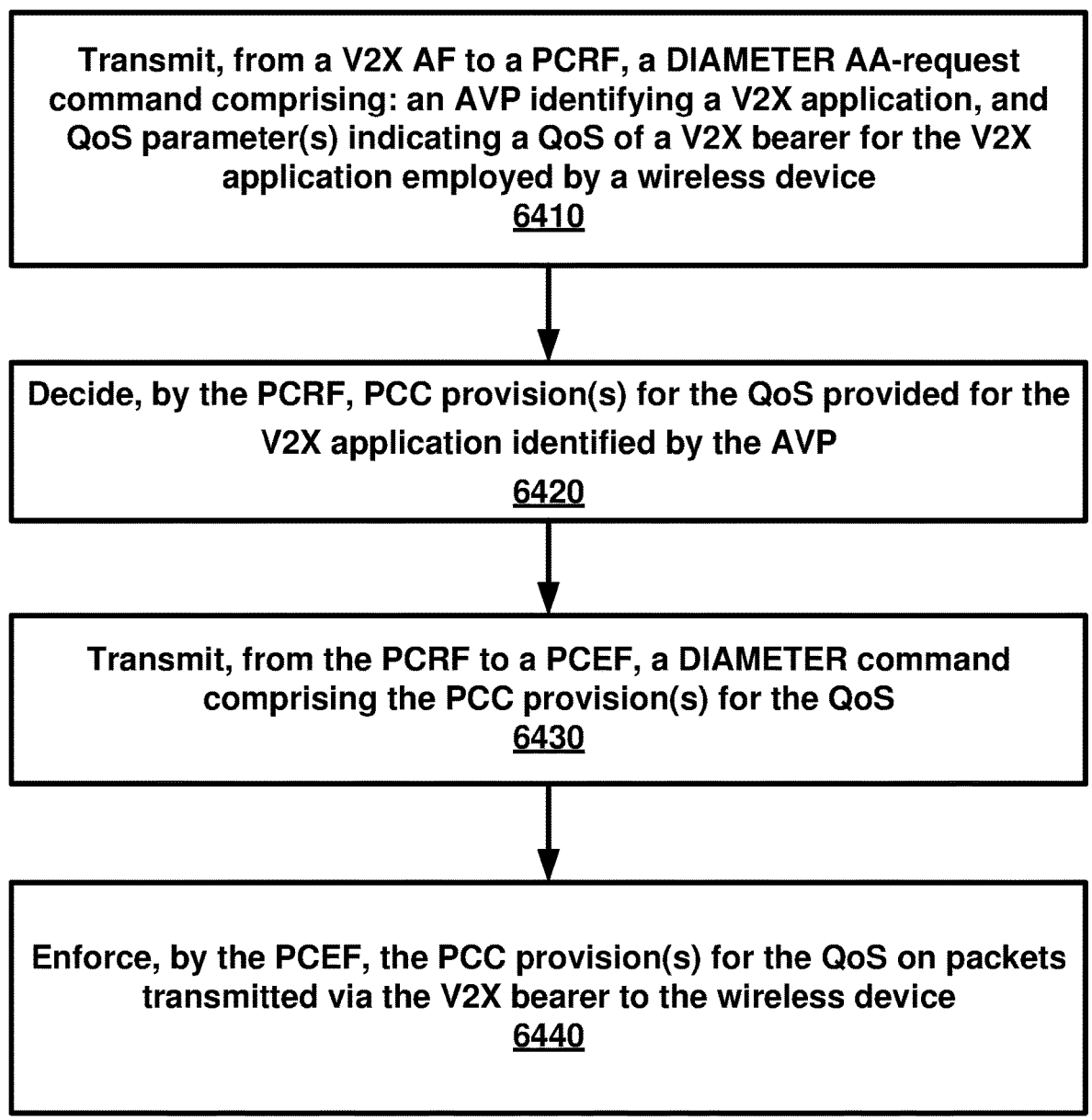
FIG. 64 is an example flow diagram as per an aspect of an embodiment of the present disclosure.

FIG. 64 is an example flow diagram as per an aspect of an embodiment of the present disclosure. At 6410 a vehicle to everything application function (V2X AF) may transmit a DIAMETER AA-request command to a policy and charging rule function (PCRF). The DIAMETER AA-request command may comprise an attribute value pairs (AVP) identifying a V2X application. The DIAMETER AA-request command may comprise one of more quality of service (QoS) parameters indicating a QoS of a V2X bearer for the V2X application employed by a wireless device. At 6420, the PCRF may decide one or more policy and charging control (PCC) provisions for the QoS provided for the V2X application identified by the AVP. At 6430, the PCRF may transmit a DIAMETER command to a policy charging enforcement function (PCEF). The DIAMETER command may comprise the one or more PCC provisions for the QoS. At 6440, the PCEF may enforce the one or more PCC provisions for the QoS on a plurality of packets transmitted via the V2X bearer to the wireless device.

According to an embodiment, the V2X AF may receive an EPS bearer modification request from the wireless device. The EPS bearer modification request may comprise the one or more QoS parameters. According to an embodiment, a session initiation protocol (SIP) header field may comprises an identifier for the V2X application. The identifier may indicate the EPS bearer modification request. According to an embodiment, the identifier for the V2X application may comprise at least one of: an Internet multimedia subsystem (IMS) communication service identifier (ICSI), and an IMS application reference identifier (IARI). According to an embodiment, the wireless device may employ a default bearer to modify the priority of the V2X application. According to an embodiment, the AVP may comprise priority multi-levels to implement multi-levels for the QoS of the V2X bearer.

According to an embodiment, the V2X bearer may comprise a dedicated evolved packet system (EPS) bearer. According to an embodiment, the V2X AF may recite at least one of a V2X application server (AS), and a proxy call session control function (P-CSCF). According to an embodiment, a network entity employing a subscription of the wireless device may request the wireless device to modify the V2X bearer. According to an embodiment, the EPS bearer modification request may be for a modification of a priority of the V2X application.

Figure 65:
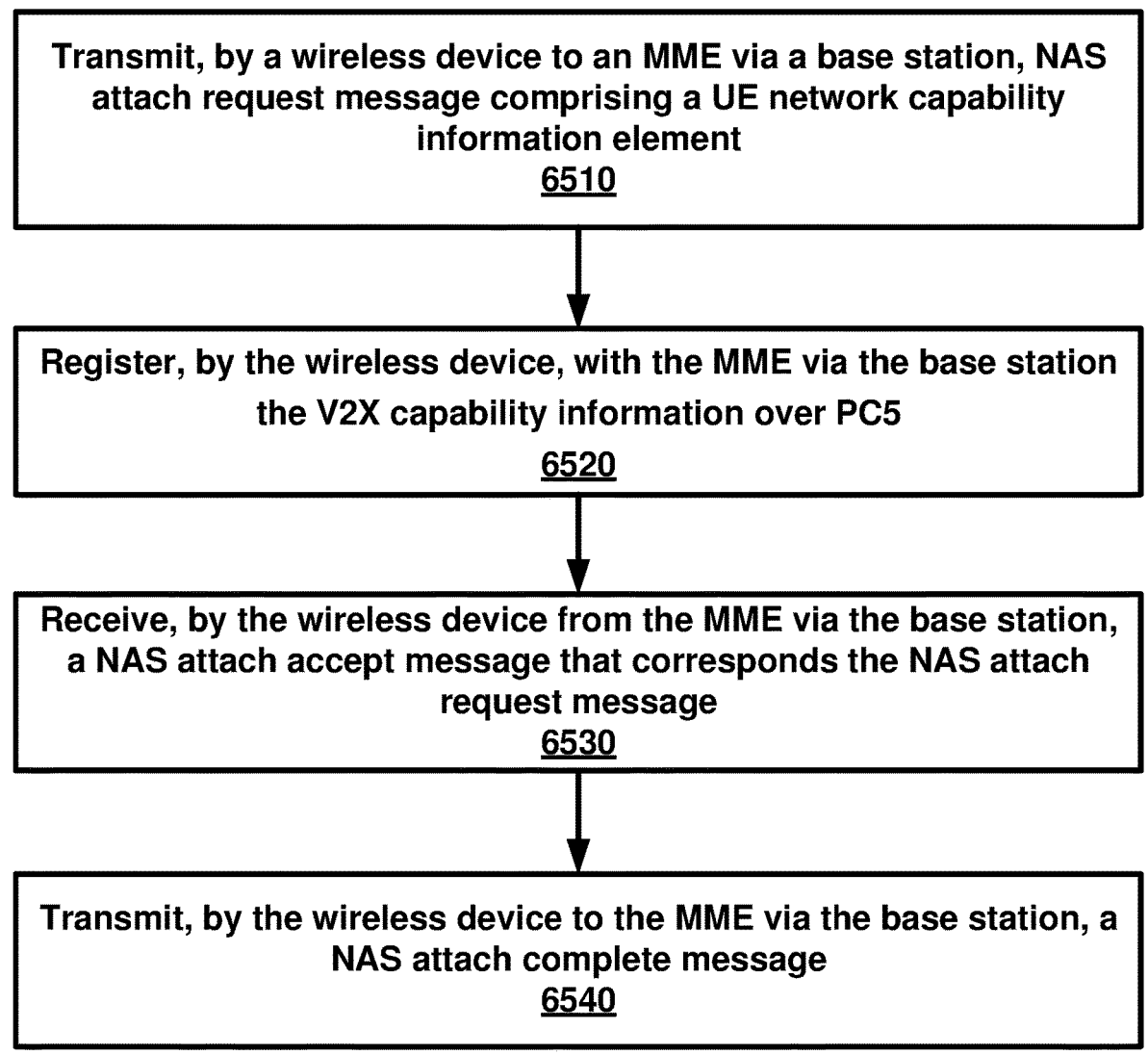
FIG. 65 is an example flow diagram as per an aspect of an embodiment of the present disclosure.

FIG. 65 is an example flow diagram as per an aspect of an embodiment of the present disclosure. At 6510 a wireless device may transmit a non-access stratum (NAS) attach request message to a mobility management entity (MME) via a base station. The non-access stratum (NAS) attach request message may comprise a user equipment (UE) network capability information element. The user equipment (UE) network capability information element may comprise a V2X capability information over PC5. The user equipment (UE) network capability information element may comprise at least one of: an international mobile subscriber identity (IMSI), an international mobile equipment identity (IMEI), and a globally unique temporary UE identity (GUTTI). At 6520, the wireless device may register the V2X capability information over PC5 with the MME via the base station. At 6530, the wireless device may receive a NAS attach accept message from the MME via the base station. The NAS attach accept message may correspond with the NAS attach request message. At 6540, the wireless device may transmit a NAS attach complete message to the MME via the base station.

Figure 66:
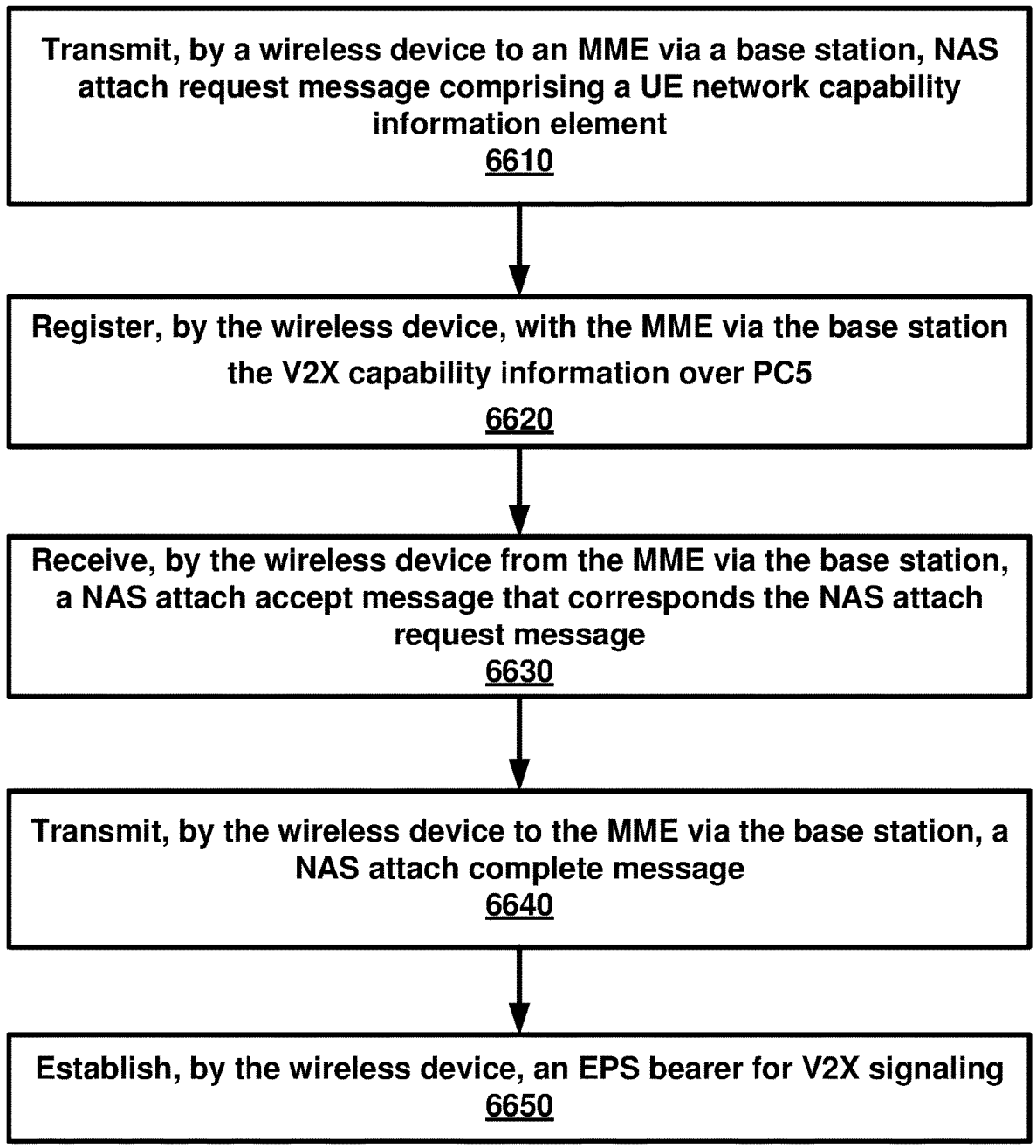
FIG. 66 is an example flow diagram as per an aspect of an embodiment of the present disclosure.

FIG. 66 is an example flow diagram as per an aspect of an embodiment of the present disclosure. At 6610 a wireless device may transmit a non-access stratum (NAS) attach request message to a mobility management entity (MME) via a base station. The non-access stratum (NAS) attach request message may comprise a user equipment (UE) network capability information element. The user equipment (UE) network capability information element may comprise a V2X capability information over PC5. The user equipment (UE) network capability information element may comprise at least one of: an international mobile subscriber identity (IMSI), an international mobile equipment identity (IMEI), and a globally unique temporary UE identity (GUTTI). At 6620, the wireless device may register the V2X capability information over PC5 with the MME via the base station. At 6630, the wireless device may receive a NAS attach accept message from the MME via the base station. The NAS attach accept message may correspond with the NAS attach request message. At 6640, the wireless device may transmit a NAS attach complete message to the MME via the base station. At 6650, the wireless device may establish a dedicated evolved packet system (EPS) bearer for V2X signaling comprising a V2X default EPS bearer for quality of service (QoS). The V2X default EPS bearer QoS may be implemented by a policy charging rules function (PCRF).

According to an embodiment, the wireless device may further establish a default evolved packet system (EPS) bearer for control signaling. According to an embodiment, the V2X capability information over PC5 may comprise at least one of: a vehicle to vehicle capability information, a vehicle to pedestrian capability information, and a vehicle to infrastructure capability information. According to an embodiment, the EPS mobile identity of the wireless device may comprise at least one of: the international mobile subscriber identity (IMSI), the international mobile equipment identity (IMEI), and the globally unique temporary UE identity (GUTTI). According to an embodiment, the wireless device may be configured for V2X communication employing information from the NAS attach accept message. According to an embodiment, the wireless device may transmit to the MME via the base station, the NAS attach request message comprising the V2X capability information over PC5 comprises priority. According to an embodiment, the wireless device may transmit to the MME via the base station, the NAS attach request message comprising a V2X capability information for vehicle to network. According to an embodiment, the wireless device may transmit to the MME via the base station, the NAS attach request message comprising the V2X capability information comprises priority. According to an embodiment, the priority of the V2X capability information for vehicle to network may require a quality of service QoS allocation. According to an embodiment, the priority of the V2X capability information for vehicle to network may require charging.

FIG. 67 is an example flow diagram as per an aspect of an embodiment of the present disclosure. At 6710, a first off-network V2X wireless device may discover a second off-network V2X wireless device employing a proximity services (ProSe) discovery procedure. The second off-network V2X wireless device may be capable of broadcasting a received V2X message. At 6720, the first off-network V2X wireless device may receive a geographic location of the second off-network wireless device. At 6730, the first off-network V2X wireless device may construct the received V2X message comprising one or more information elements. The one or more information elements may comprise at least one of: one or more control units as a header, and one or more data units as a body. At 6740, the first off-network V2X wireless device may transmit, based on at least the geographic location, the received V2X message to the second off-network V2X wireless device. The second off-network V2X wireless device may broadcast the received V2X message to one or more off-network wireless devices.

According to an embodiment, the second off-network V2X wireless device may unicast the received V2X message to another off-network wireless device. According to an embodiment, the first off-network V2X wireless device may transmit the one or more information elements to the second off-network V2X wireless device employing a device to device communication protocol. The device to device communication protocol may comprise: an origination address, and a destination address. According to an embodiment, the ProSe discovery procedure may be a mutual ProSe discovery procedure. According to an embodiment, the first off-network V2X wireless device may discover the second V2X wireless device employing at least one of a Method A or a Method B proximity service (ProSe). According to an embodiment, the second off-network V2X wireless device may broadcast periodically to the one or more off-network wireless devices. According to an embodiment, the one or more control units may comprise at least one or more: a message type, a version identity, a message identity, a message originator identity, a message originator type, a message originator property, a message terminator identity, an authentication data, a group identity, an organization identity, a broadcast multicast interval, commencement mode, an information type, a message priority, a mode, a movement, a path and trajectory, a gap information, a message encryption, a message compression, a location, a message start time, a message finish time, a device model, an application type, a combination thereof, and/or the like. According to an embodiment, the one or more data units may comprise at least one or more: Speech, Text, Data, and/or the like. According to an embodiment, first off-network V2X wireless device may not reveal its privacy. According to an embodiment, the first off-network V2X wireless device may discover by the second off-network V2X wireless device, where the second off-network V2X wireless device broadcasts a received V2X message. According to an embodiment, the message type may indicate a session establishment among the first off-network V2X wireless device and the one or more off-network wireless devices, via the second off-network V2X wireless device.

Figure 68:
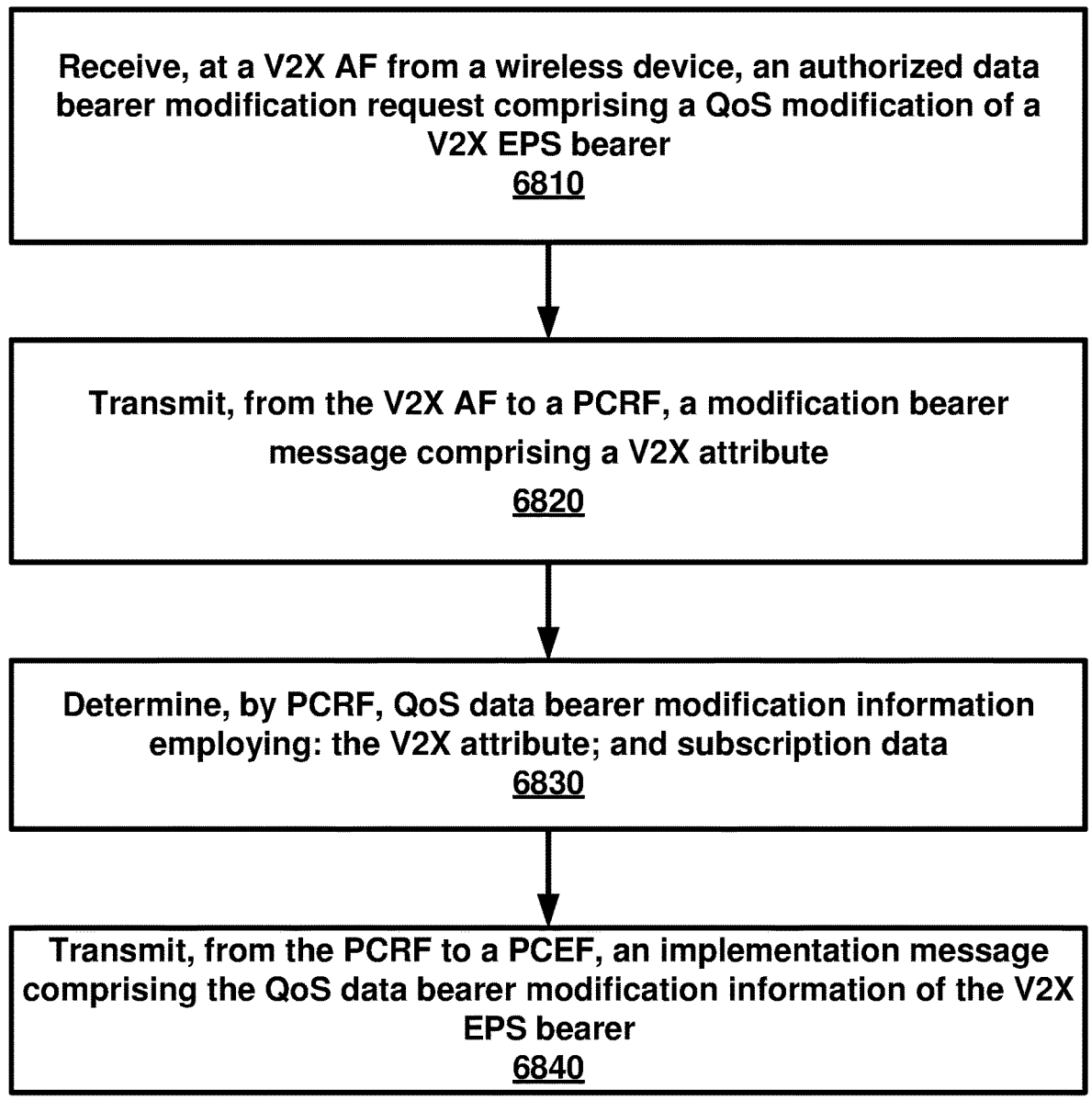
FIG. 68 is an example flow diagram as per an aspect of an embodiment of the present disclosure.

FIG. 68 is an example flow diagram as per an aspect of an embodiment of the present disclosure. At 6810, a V2X AF may receive an authorized data bearer modification request from a wireless device. The authorized data bearer modification request may comprise a QoS modification of a V2X EPS bearer. At 6820, the V2X AF may transmit a modification bearer message to a PCRF. The modification bearer message may comprise a V2X attribute. The modification bearer message may request a modification of the V2X EPS bearer. At 6830, the PCRF may determine QoS data bearer modification information employing: the V2X attribute; and subscription data associated with a subscription of a wireless user of the wireless device. At 6840, the PCRF may transmit an implementation message to a PCEF. The implementation message may comprise the QoS data bearer modification information of the V2X EPS bearer. According to an embodiment, the third computing device may modify the QoS data bearer.

FIG. 69 is an example flow diagram as per an aspect of an embodiment of the present disclosure. At 6910, a first computing device may receive an authorized data bearer modification request from a wireless device. The authorized data bearer modification request may comprise a QoS modification. The first computing device may comprise a V2X application function (AF). At 6920, the first computing device may transmit a modification bearer message to a second computing device. The modification bearer message may comprise a V2X attribute. The second computing device may comprise a policy and charging rules function (PCRF). The modification bearer message may be configured to cause the second computing device to transmit an implementation message to a third computing device. The implementation message may comprise QoS data bearer modification information. The third computing device may comprise a policy and charging enforcement function (PCEF). The implementation message may be configured by the second computing device employing at least in part subscription data associated with the wireless device. According to an embodiment, the implementation message may be further configured to cause the third computing device to modify the QoS data bearer.

FIG. 70 is an example flow diagram as per an aspect of an embodiment of the present disclosure. At 7010, a second computing device may receive a modification bearer message from the first computing device. The modification bearer message may comprise a V2X attribute. The second computing device may comprise a policy and charging rules function (PCRF). The first computing device may comprise a V2X application function (AF). The modification bearer message may be generated in response to an authorized data bearer modification request from a wireless device to the first computing device. The authorized data bearer modification request may comprise a QoS modification. At 7020, the second computing device may transmit an implementation message to a third computing device. The implementation message may comprise QoS data bearer modification information. The third computing device may comprise a policy and charging enforcement function (PCEF). The implementation message may be configured by the second computing device employing at least in part subscription data associated with the wireless device. The implementation message may be configured to cause the third computing device to modify the QoS data bearer.

Figure 71:
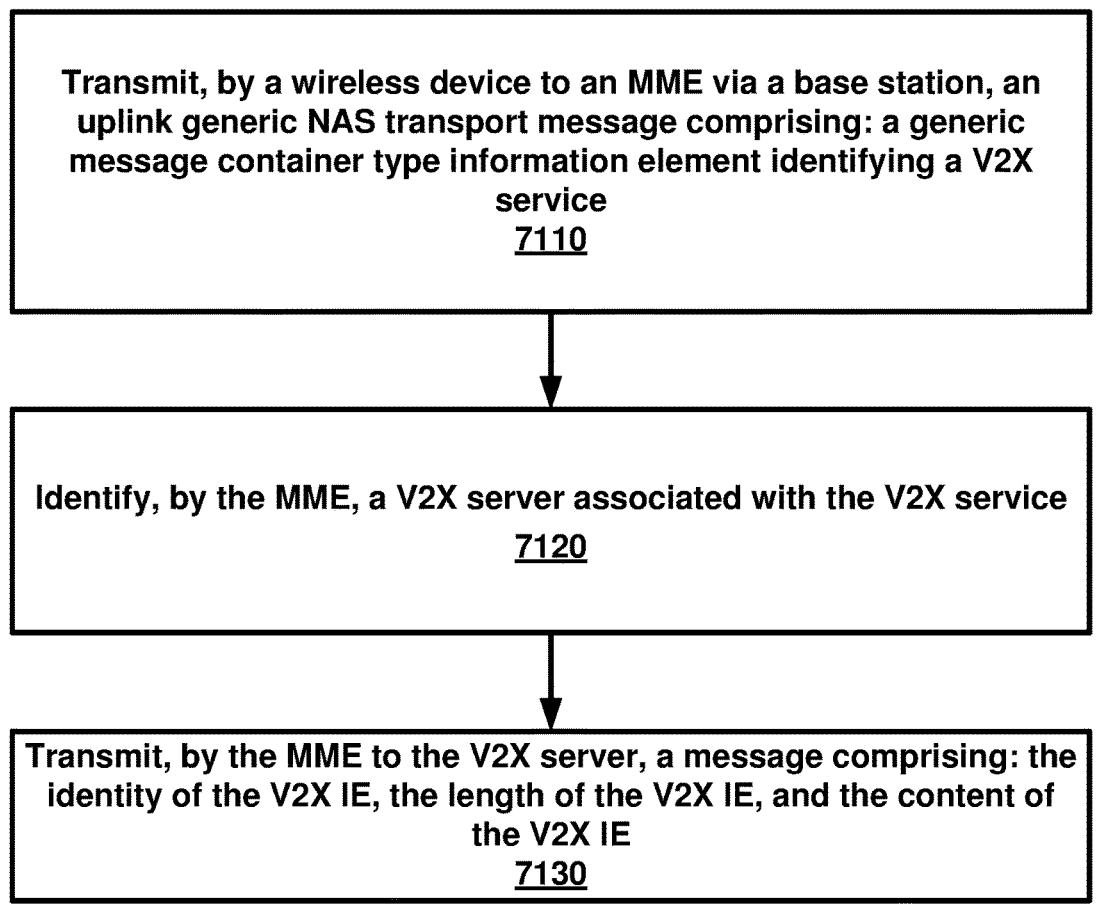
FIG. 71 is an example flow diagram as per an aspect of an embodiment of the present disclosure.

FIG. 71 is an example flow diagram as per an aspect of an embodiment of the present disclosure. At 7110, a wireless device may transmit an uplink generic NAS transport message to an MME via a base station. The uplink generic NAS transport message may comprise a generic message container type information element identifying a V2X service. The uplink generic NAS transport message may comprise a generic message container content comprising a V2X IE. The V2X IE may comprise: an identity of the V2X IE, a length of the V2X IE, and a content of the V2X IE. At 7120, the MME may identify a V2X server associated with the V2X service. At 7130, the MME may transmit a message to the V2X server. The message may comprise: the identity of the V2X IE, the length of the V2X IE, and the content of the V2X IE.

Figure 72:
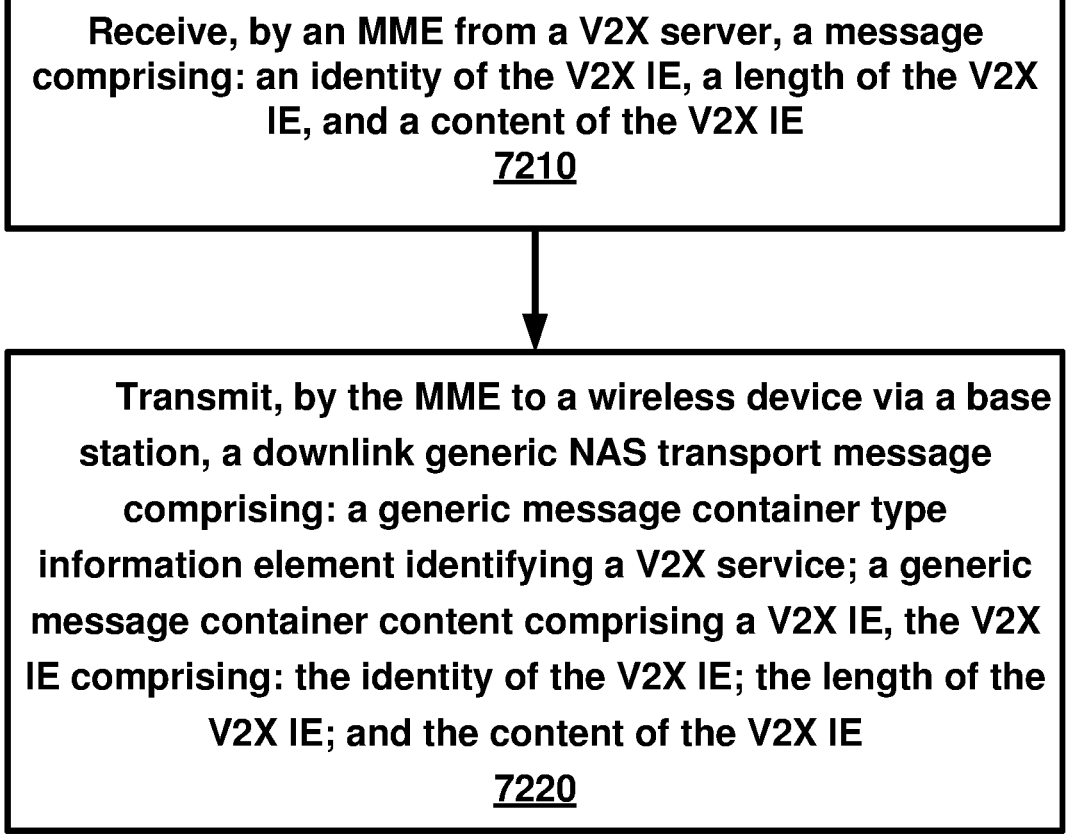
FIG. 72 is an example flow diagram as per an aspect of an embodiment of the present disclosure.

FIG. 72 is an example flow diagram as per an aspect of an embodiment of the present disclosure. At 7210, an MME may receive a message from a V2X server. The message may comprise: an identity of the V2X IE, a length of the V2X IE, and a content of the V2X IE. At 7220, the MME may transmit a downlink generic NAS transport message to a wireless device via a base station. The downlink generic NAS transport message may comprise: a generic message container type information element identifying a V2X service, and a generic message container content. The generic message container content may comprise a V2X IE. The V2X IE may comprise: the identity of the V2X IE, the length of the V2X IE, and the content of the V2X IE. According to an embodiment, the uplink generic NAS transport message may comprise an EMM message. According to an embodiment, the downlink generic NAS transport message may comprise an EMM message.

At least one non-access stratum (NAS) management message may be communicated between a wireless device and a base station. The at least one non-access stratum (NAS) management message may comprise at least one of an uplink generic NAS transport and a downlink generic NAS transport. The at least one non-access stratum (NAS) management message may comprise a generic message container type information element identifying a V2X service. The at least one non-access stratum (NAS) management message may comprise a generic message container. The generic message container may comprise: a length element, and/or at least one content element. The message container type information element may identify a V2X service. The uplink generic NAS transport may comprise an uplink NAS transport. The downlink generic NAS transport may comprise a downlink NAS transport. The generic message container may comprise a message container. The generic message container type information element may comprise a message container type information element residing in the message container. The message container type information element may reside in the message container. The method NAS management message may further comprises at least one additional information element. The at least one additional information element may comprise: an additional information length element, and at least one additional information value element. The NAS management message may comprise an evolved packet system (EPS) mobility management (EMM) message.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, various embodiments are disclosed. Limitations, features, and/or elements from the disclosed example embodiments may be combined to create further embodiments within the scope of the disclosure.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:

1. A method comprising:
receiving, by a device associated with policy and charging from a vehicle to everything (V2X) application function (AF), a first DIAMETER message comprising:
a V2X attribute value pair (AVP) indicating one or more V2X parameters associated with V2X capabilities of a wireless device, and
one or more quality of service (QoS) parameters indicating a QoS of a V2X bearer for a V2X application for the wireless device;
based on the V2X AVP and the QoS, determining one or more policy and charging control (PCC) provisions for adjusting the V2X bearer;
sending, to a policy charging enforcement function (PCEF), a second DIAMETER message comprising the one or more PCC provisions for adjusting the V2X bearer; and
receiving, from the PCEF and after sending the second DIAMETER message, a third DIAMETER message indicating an ability to enforce the QoS.

2. The method of claim 1, further comprising receiving an indication of an evolved packet system (EPS) bearer modification request comprising the one or more QoS parameters.

3. The method of claim 1, wherein the V2X bearer comprises a dedicated evolved packet system (EPS) bearer.

4. The method of claim 1, wherein the V2X AF is located in at least one of:
a V2X application server (AS); or
a proxy call session control function (P-CSCF).

5. The method of claim 1, further comprising receiving a request for a modification of a priority of the V2X application.

6. The method of claim 1, further comprising receiving an evolved packet system (EPS) bearer modification request indicated by an identifier for the V2X application, wherein a session initiation protocol (SIP) header field comprises the identifier for the V2X application.

7. The method of claim 1, further comprising causing the wireless device to use a default bearer to modify a priority of the V2X application.

8. The method of claim 1, wherein the V2X AVP comprises priority multi-levels to implement multi-levels for the QoS of the V2X bearer.

9. The method of claim 1, further comprising:
receiving a session initiation protocol (SIP) message that comprises an identifier, for the V2X application, comprising at least one of:
an internet multimedia subsystem (IMS) communication service identifier (ICSI); or
an IMS application reference identifier (IARI),
wherein the SIP message indicates one or more V2X capabilities of the wireless device.

10. The method of claim 1, further comprising causing sending at least one packet based on enforcing the one or more PCC provisions for adjusting the V2X bearer.

11. The method of claim 1, further comprising sending, to the V2X AF and based on the third DIAMETER message, a fourth DIAMETER message indicating adjustment of the V2X bearer.

12. The method of claim 1, wherein:
the first DIAMETER message comprises a DIAMETER AA-request command;
the second DIAMETER message comprises a DIAMETER command; and
the third DIAMETER message comprises a DIAMETER response.

13. The method of claim 1, wherein the one or more V2X parameters associated with the V2X capabilities of the wireless device comprises priorities of the V2X capabilities of the wireless device.

14. A device comprising:
one or more processors; and
memory storing instructions that, when executed by the one or more processors, cause the device to:
  receive, from a vehicle to everything (V2X) application function (AF), a first DIAMETER message comprising:
    a V2X attribute value pair (AVP) indicating one or more V2X parameters associated with V2X capabilities of a wireless device, and
    one or more quality of service (QoS) parameters indicating a QoS of a V2X bearer for a V2X application for the wireless device;
  based on the V2X AVP and the QoS, determine one or more policy and charging control (PCC) provisions for adjusting the V2X bearer; and
  send, to a policy charging enforcement function (PCEF), a second DIAMETER message comprising the one or more PCC provisions for adjusting the V2X bearer; and
  receive, from the PCEF and after sending the second DIAMETER message, a third DIAMETER message indicating an ability to enforce the QoS.

15. The device of claim 14, wherein the instructions, when executed by the one or more processors, cause the device to receive an indication of an evolved packet system (EPS) bearer modification request comprising the one or more QoS parameters.

16. The device of claim 14, wherein the V2X bearer comprises a dedicated evolved packet system (EPS) bearer.

17. The device of claim 14, wherein the V2X AF is located in at least one of:
  a V2X application server (AS); or
  a proxy call session control function (P-CSCF).

18. The device of claim 14, wherein the instructions, when executed by the one or more processors, cause the device to receive a request for a modification of a priority of the V2X application.

19. The device of claim 14, wherein the instructions, when executed by the one or more processors, cause the device to cause the wireless device to use a default bearer to modify a priority of the V2X application.

20. The device of claim 14, wherein the V2X AVP comprises priority multi-levels to implement multi-levels for the QoS of the V2X bearer.

21. The device of claim 14, wherein the instructions, when executed by the one or more processors, cause the device to cause the PCEF to send at least one packet based on enforcing the one or more PCC provisions for adjusting the V2X bearer.

22. The device of claim 14, wherein the instructions, when executed by the one or more processors, cause the device to send, to the V2X AF and based on the third DIAMETER message, a fourth DIAMETER message indicating adjustment of the V2X bearer.

23. The device of claim 14, wherein:
  the first DIAMETER message comprises a DIAMETER AA-request command;
  the second DIAMETER message comprises a DIAMETER command; and
  the third DIAMETER message comprises a DIAMETER response.

24. The device of claim 14, wherein the one or more V2X parameters associated with the V2X capabilities of the wireless device comprises priorities of the V2X capabilities of the wireless device.

25. The device of claim 14, wherein the device is associated with policy and charging.

26. A system comprising:
a policy and charging rule function (PCRF);
a policy charging enforcement function (PCEF); and
at least one device comprising a vehicle to everything (V2X) application function (AF);
wherein the V2X AF is configured to:
  send, to the PCRF, a first DIAMETER message comprising:
    a V2X attribute value pair (AVP) indicating one or more V2X parameters associated with V2X capabilities of a wireless device, and
    one or more quality of service (QoS) parameters indicating a QoS of a V2X bearer for a V2X application for the wireless device;
wherein the PCRF is configured to:
  based on the V2X AVP and the QoS, determine one or more policy and charging control (PCC) provisions for adjusting the V2X bearer; and
  send, to the PCEF, a second DIAMETER message comprising the one or more PCC provisions for adjusting the V2X bearer; and
wherein the PCEF is configured to:
  send, to the PCRF and after receiving the second DIAMETER message, a third DIAMETER message indicating an ability to enforce the QoS.

27. The system of claim 26, wherein the V2X AF is configured to receive an evolved packet system (EPS) bearer modification request comprising the one or more QoS parameters.

28. The system of claim 26, wherein the V2X bearer comprises a dedicated evolved packet system (EPS) bearer.

29. The system of claim 26, wherein the V2X AF is located in at least one of:
  a V2X application server (AS); or
  a proxy call session control function (P-CSCF).

30. The system of claim 26, wherein the V2X AF is configured to send an indication, to the wireless device, to modify the V2X bearer.

31. The system of claim 26, wherein the V2X AF is configured to receive a request for a modification of a priority of the V2X application.

32. The system of claim 26, wherein the V2X AF is configured to receive an evolved packet system (EPS) bearer modification request indicated by an identifier for the V2X application, wherein a session initiation protocol (SIP) header field comprises the identifier for the V2X application.

33. The system of claim 26, wherein the wireless device is configured to use a default bearer to modify a priority of the V2X application.

34. The system of claim 26, wherein the V2X AVP comprises priority multi-levels to implement multi-levels for the QoS of the V2X bearer.

35. The system of claim 26, wherein a session initiation protocol (SIP) header field comprises an identifier, for the V2X application, comprising at least one of:
  an internet multimedia subsystem (IMS) communication service identifier (ICSI); or
  an IMS application reference identifier (IARI),
  wherein the SIP header field indicates one or more V2X capabilities of the wireless device.

36. The system of claim 26, wherein the PCEF is configured to send at least one packet based on enforcing the one or more PCC provisions for adjusting the V2X bearer.

37. The system of claim 26, wherein the PCRF is configured to send, to the V2X AF and based on the third DIAMETER message, a fourth DIAMETER message indicating adjustment of the V2X bearer.

38. The system of claim 26, wherein:
- the first DIAMETER message comprises a DIAMETER AA-request command;
- the second DIAMETER message comprises a DIAMETER command; and
- the third DIAMETER message comprises a DIAMETER response.

39. The system of claim 26, wherein the one or more V2X parameters associated with the V2X capabilities of the wireless device comprises priorities of the V2X capabilities of the wireless device.

* * * * *

UNITED STATES PATENT AND TRADEMARK OFFICE
CERTIFICATE OF CORRECTION

PATENT NO. : 10,965,479 B2
APPLICATION NO. : 15/472801
DATED : March 30, 2021
INVENTOR(S) : Atarius et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 13 days.

Signed and Sealed this
Twenty-fourth Day of January, 2023

Katherine Kelly Vidal
*Director of the United States Patent and Trademark Office*